(12) United States Patent
Mullet et al.

(10) Patent No.: US 9,745,797 B2
(45) Date of Patent: Aug. 29, 2017

(54) METHOD FOR OPERATING A MOTORIZED SHADE

(71) Applicant: The Watt Stopper, Inc., Santa Clara, CA (US)

(72) Inventors: Willis Jay Mullet, Gulf Breeze, FL (US); Darrin W. Brunk, Pensacola, FL (US); Christopher Lee Wysocynski, Gulf Breeze, FL (US); Harry Edward Asbury, Holt, FL (US); Richard Scott Hand, Pace, FL (US); Yan Rodriguez, Suwanee, GA (US); Benjamin Bruckner, Atlanta, GA (US)

(73) Assignee: The Watt Stopper, Inc., Santa Clara, CA (US)

( * ) Notice: Subject to any disclaimer, the term of this patent is extended or adjusted under 35 U.S.C. 154(b) by 0 days.

(21) Appl. No.: 15/166,367

(22) Filed: May 27, 2016

(65) Prior Publication Data

US 2016/0273269 A1  Sep. 22, 2016

Related U.S. Application Data

(63) Continuation of application No. 14/512,597, filed on Oct. 13, 2014, now Pat. No. 9,376,862, which is a
(Continued)

(51) Int. Cl.
*H02P 1/00* (2006.01)
*H02P 3/00* (2006.01)
(Continued)

(52) U.S. Cl.
CPC .................. *E06B 9/42* (2013.01); *E06B 9/40* (2013.01); *E06B 9/44* (2013.01); *E06B 9/50* (2013.01);
(Continued)

(58) Field of Classification Search
CPC .................. E09B 9/42; E09B 9/40; E09B 9/44
(Continued)

(56) References Cited

U.S. PATENT DOCUMENTS 179,319 A   6/1876   Johnson
330,579 A   11/1885  Grimm
(Continued)

FOREIGN PATENT DOCUMENTS

CN   2707936   7/2005
CN   1930360   3/2007
(Continued)

OTHER PUBLICATIONS

Australian Examiner's Report mailed Apr. 24, 2014 for Australian Appl. No. 2011220886.
(Continued)

*Primary Examiner* — Erick Glass
(74) *Attorney, Agent, or Firm* — Christopher A. Proskey; BrownWinick Law Firm

(57) ABSTRACT

An architectural covering is provided. The architectural covering includes: shade material; the shade material operatively connected to a motor unit such that movement of the motor unit causes movement of the shade material; the motor unit comprising a DC motor and a shaft connected to the DC motor; a power supply unit electrically connected to the motor unit; a controller unit electrically connected to the motor unit, the controller unit having a microprocessor; and a rotation detector configured to detect rotation of the motor unit and upon detection of rotation of the motor unit transmit a signal to the microprocessor, wherein the microprocessor of the controller unit is configured to power an encoder unit in response to determination of manual movement of the shade material. A motor and control unit for an architectural covering may be provided.

47 Claims, 82 Drawing Sheets

Related U.S. Application Data continuation of application No. 14/251,427, filed on Apr. 11, 2014, now Pat. No. 9,249,623, which is a continuation of application No. 13/921,950, filed on Jun. 19, 2013, now Pat. No. 9,194,179, which is a continuation-in-part of application No. 13/847,607, filed on Mar. 20, 2013, now Pat. No. 8,791,658, which is a continuation of application No. 13/276,963, filed on Oct. 19, 2011, now Pat. No. 8,659,246, which is a continuation-in-part of application No. 12/711,192, filed on Feb. 23, 2010, now Pat. No. 8,299,734, said application No. 14/251,427 is a continuation-in-part of application No. 13/653,451, filed on Oct. 17, 2012, now Pat. No. 8,575,872, which is a continuation-in-part of application No. 12/711,193, filed on Feb. 23, 2010, now Pat. No. 8,368,328.

(60) Provisional application No. 61/811,650, filed on Apr. 12, 2013.

(51) Int. Cl.
*H02P 5/00* (2016.01)
*E06B 9/42* (2006.01)
*E06B 9/40* (2006.01)
*E06B 9/50* (2006.01)
*E06B 9/62* (2006.01)
*E06B 9/72* (2006.01)
*E06B 9/44* (2006.01)
*E06B 9/68* (2006.01)
*E06B 9/24* (2006.01)

(52) U.S. Cl.
CPC ............ *E06B 9/62* (2013.01); *E06B 9/68* (2013.01); *E06B 9/72* (2013.01); *E06B 2009/2476* (2013.01); *E06B 2009/6809* (2013.01); *E06B 2009/6818* (2013.01); *E06B 2009/6845* (2013.01); *E06B 2009/6872* (2013.01)

(58) Field of Classification Search
USPC .......................................... 318/255, 265, 286
See application file for complete search history.

(56) References Cited

U.S. PATENT DOCUMENTS

| | | |
|---|---|---|
| 481,733 A | 8/1892 | Perkins |
| 504,970 A | 9/1893 | Dennis |
| 953,657 A | 3/1910 | Aldhouse |
| 978,246 A | 12/1910 | Weiher |
| 1,298,716 A | 4/1919 | Hoover |
| 1,575,695 A | 3/1926 | La Rue |
| 1,746,458 A | 2/1930 | Bollinger |
| 1,853,704 A | 4/1932 | Standow |
| 2,060,676 A | 11/1936 | Kuyper |
| 2,188,824 A | 1/1940 | Thigpen |
| 2,243,780 A | 5/1941 | Thigpen |
| 2,280,358 A | 4/1942 | Tietig |
| 2,341,217 A | 2/1944 | Holtzclaw |
| 2,955,817 A | 10/1960 | Campbell et al. |
| 3,292,453 A | 12/1966 | Recknagel |
| 3,298,197 A | 1/1967 | Roth |
| 3,631,659 A | 1/1972 | Horowitz et al. |
| 3,853,166 A | 12/1974 | Wrono |
| 3,930,738 A | 1/1976 | Thuss et al. |
| 3,964,296 A | 6/1976 | Matzuk |
| RE29,047 E | 11/1976 | Brindley |
| 4,009,745 A | 3/1977 | Erpenbeck |
| 4,022,105 A | 5/1977 | White |
| 4,047,441 A | 9/1977 | Kellogg |
| 4,096,903 A | 6/1978 | Ringle, III |
| 4,101,899 A | 7/1978 | Jones, Jr. et al. |
| 4,102,242 A | 7/1978 | Liedke |
| 4,114,187 A | 9/1978 | Uke |
| 4,160,348 A | 7/1979 | Chapman et al. |
| 4,171,845 A | 10/1979 | Hirsch |
| 4,223,714 A | 9/1980 | Weinreich et al. |
| 4,237,956 A | 12/1980 | Sivin et al. |
| 4,290,070 A | 9/1981 | Tanaka et al. |
| 4,294,313 A | 10/1981 | Schwegman |
| 4,364,202 A | 12/1982 | Zavatkay |
| 4,394,605 A | 7/1983 | Terazawa |
| 4,399,855 A | 8/1983 | Volfson |
| 4,417,185 A | 11/1983 | Bullat |
| 4,427,050 A | 1/1984 | Toppen |
| 4,476,416 A | 10/1984 | Licata et al. |
| RE31,793 E | 1/1985 | Berman et al. |
| 4,495,978 A | 1/1985 | Carroll |
| 4,527,223 A | 7/1985 | Maglica |
| 4,554,762 A | 11/1985 | Anderson |
| 4,562,387 A | 12/1985 | Lehnhoff |
| 4,572,467 A | 2/1986 | Farrell |
| 4,575,662 A | 3/1986 | Lehnhoff |
| 4,577,263 A | 3/1986 | Maglica |
| 4,584,707 A | 4/1986 | Goldberg et al. |
| 4,618,804 A | 10/1986 | Iwasaki |
| 4,656,565 A | 4/1987 | Maglica |
| 4,657,059 A | 4/1987 | Clauss |
| 4,678,975 A | 7/1987 | Vrabel et al. |
| 4,680,682 A | 7/1987 | Parker |
| 4,683,975 A | 8/1987 | Booth et al. |
| 4,706,726 A | 11/1987 | Nortoft |
| 4,731,965 A | 3/1988 | Jensen |
| 4,766,941 A | 8/1988 | Sloop et al. |
| 4,768,733 A | 9/1988 | Willey |
| 4,807,686 A | 2/1989 | Schnebly et al. |
| 4,825,133 A | 4/1989 | Tanuma et al. |
| 4,831,509 A | 5/1989 | Jones et al. |
| 4,848,823 A | 7/1989 | Flohr et al. |
| 4,865,107 A | 9/1989 | Dube |
| 4,911,381 A | 3/1990 | Cannon et al. |
| 4,951,730 A | 8/1990 | Hsu |
| 4,956,588 A | 9/1990 | Ming |
| 4,962,337 A | 10/1990 | Creed |
| 4,979,582 A | 12/1990 | Forster |
| 5,038,087 A | 8/1991 | Archer et al. |
| 5,054,605 A | 10/1991 | Bavis |
| 5,070,927 A | 12/1991 | Chen |
| 5,083,598 A | 1/1992 | Schon |
| 5,105,871 A | 4/1992 | Baud et al. |
| 5,123,079 A | 6/1992 | Tanii et al. |
| 5,133,330 A | 7/1992 | Sharp |
| 5,133,399 A | 7/1992 | Hiller et al. |
| 5,207,261 A | 5/1993 | Quezel |
| 5,271,446 A | 12/1993 | Hwang |
| 5,274,499 A | 12/1993 | Shopp |
| 5,278,480 A | 1/1994 | Murray |
| 5,313,216 A | 5/1994 | Wang et al. |
| 5,391,967 A | 2/1995 | Domel et al. |
| 5,413,161 A | 5/1995 | Corazzini |
| 5,419,010 A | 5/1995 | Mullet et al. |
| 5,434,487 A | 7/1995 | Long et al. |
| 5,440,289 A | 8/1995 | Riordan |
| 5,444,339 A | 8/1995 | Domel et al. |
| 5,445,209 A | 8/1995 | Lichy |
| 5,453,752 A | 9/1995 | Wang et al. |
| 5,462,105 A | 10/1995 | Supernak |
| 5,467,808 A | 11/1995 | Bell |
| 5,482,100 A | 1/1996 | Kuhar |
| 5,486,432 A | 1/1996 | Sharrah et al. |
| 5,495,153 A | 2/1996 | Domel et al. |
| 5,509,239 A | 4/1996 | Fullwood |
| 5,517,094 A | 5/1996 | Domel et al. |
| 5,531,257 A | 7/1996 | Kuhar |
| 5,547,008 A | 8/1996 | Sullivan |
| 5,552,769 A | 9/1996 | Riordan |
| 5,566,736 A | 10/1996 | Crider et al. |
| 5,572,101 A | 11/1996 | Rutkowski et al. |
| 5,647,421 A | 7/1997 | Hoffmann et al. |
| 5,655,342 A | 8/1997 | Guillemet et al. |

(56) References Cited

U.S. PATENT DOCUMENTS

| | | |
|---|---|---|
| 5,655,343 A | 8/1997 | Seals |
| 5,698,958 A | 12/1997 | Domel et al. |
| 5,701,063 A | 12/1997 | Cook et al. |
| 5,714,855 A | 2/1998 | Domel et al. |
| 5,729,103 A | 3/1998 | Domel et al. |
| 5,731,675 A | 3/1998 | McCarthy |
| 5,734,353 A | 3/1998 | Van Voorhies |
| 5,752,557 A | 5/1998 | Crider et al. |
| 5,760,558 A | 6/1998 | Popat |
| 5,769,345 A | 6/1998 | Morner et al. |
| 5,785,105 A | 7/1998 | Crider et al. |
| 5,793,174 A | 8/1998 | Kovach et al. |
| 5,794,876 A | 8/1998 | Morizane et al. |
| 5,799,716 A | 9/1998 | Yamaguchi et al. |
| 5,813,447 A | 9/1998 | Lysyj |
| 5,848,634 A | 12/1998 | Will |
| RE36,058 E | 1/1999 | Sokol |
| 5,880,532 A | 3/1999 | Stopher |
| 5,883,480 A | 3/1999 | Domel et al. |
| 5,889,377 A | 3/1999 | Mao |
| 5,905,442 A | 5/1999 | Mosebrook et al. |
| 5,907,227 A | 5/1999 | Domel et al. |
| 5,929,580 A | 7/1999 | Mullet et al. |
| 5,960,847 A | 10/1999 | Crider et al. |
| 5,964,427 A | 10/1999 | Aiston |
| 5,990,646 A | 11/1999 | Kovach et al. |
| 6,003,584 A | 12/1999 | Weinreich |
| 6,020,829 A | 2/2000 | Hormann |
| 6,055,885 A | 5/2000 | Shea |
| 6,057,658 A | 5/2000 | Kovach et al. |
| 6,060,852 A | 5/2000 | Domel et al. |
| 6,062,290 A | 5/2000 | Domel |
| 6,069,465 A | 5/2000 | de Boois et al. |
| 6,070,640 A | 6/2000 | Miyagawa et al. |
| 6,082,433 A | 7/2000 | Vafaie et al. |
| 6,104,349 A | 8/2000 | Cohen |
| 6,109,819 A | 8/2000 | Welch |
| 6,116,320 A | 9/2000 | Peterson |
| 6,116,323 A | 9/2000 | Huang |
| 6,125,907 A | 10/2000 | Tokuyama et al. |
| 6,127,977 A | 10/2000 | Cohen |
| 6,144,177 A | 11/2000 | Mao |
| 6,148,894 A | 11/2000 | Judkins |
| 6,155,328 A | 12/2000 | Welfonder |
| 6,181,089 B1 | 1/2001 | Kovach et al. |
| 6,196,508 B1 | 3/2001 | Nijs |
| 6,201,364 B1 | 3/2001 | Will et al. |
| 6,212,221 B1 | 4/2001 | Wakayama et al. |
| 6,238,818 B1 | 5/2001 | Dalton |
| 6,259,218 B1 | 7/2001 | Kovach et al. |
| 6,283,190 B1 | 9/2001 | Hu et al. |
| 6,283,192 B1 | 9/2001 | Toti |
| 6,286,579 B1 | 9/2001 | Gottschalk |
| 6,303,248 B1 | 10/2001 | Peterson |
| 6,318,662 B1 | 11/2001 | Hori et al. |
| 6,338,377 B1 | 1/2002 | Domel |
| 6,369,530 B2 | 4/2002 | Kovach et al. |
| 6,371,192 B1 | 4/2002 | Anderson et al. |
| 6,376,832 B1 | 4/2002 | Smith et al. |
| 6,382,294 B1 | 5/2002 | Anderson et al. |
| 6,392,558 B1 | 5/2002 | Schulmeyer et al. |
| 6,419,176 B1 | 7/2002 | Mizuno |
| 6,433,498 B1 | 8/2002 | Domel et al. |
| 6,446,693 B1 | 9/2002 | Anderson et al. |
| 6,452,553 B1 | 9/2002 | Cohen |
| 6,459,175 B1 | 10/2002 | Potega |
| 6,469,666 B1 | 10/2002 | Tonn |
| 6,489,169 B1 | 12/2002 | Cohen et al. |
| 6,497,267 B1 | 12/2002 | Azar et al. |
| 6,516,858 B1 | 2/2003 | Anderson et al. |
| 6,533,018 B2 | 3/2003 | Anderson et al. |
| 6,536,503 B1 | 3/2003 | Anderson et al. |
| 6,550,733 B1 | 4/2003 | Lassen et al. |
| 6,606,072 B1 | 8/2003 | Hayward et al. |
| 6,628,029 B2 | 9/2003 | Astegno |
| 6,646,399 B2 | 11/2003 | Kitamura |
| 6,648,050 B1 | 11/2003 | Toti |
| 6,651,720 B1 | 11/2003 | DiSilvestro et al. |
| 6,659,156 B2 | 12/2003 | Wen et al. |
| 6,680,594 B2 | 1/2004 | Collett et al. |
| 6,700,246 B1 | 3/2004 | Bruhn |
| 6,708,750 B2 | 3/2004 | Collett et al. |
| 6,712,116 B2 | 3/2004 | Beaudoin et al. |
| 6,733,413 B2 | 5/2004 | Lagarde et al. |
| 6,736,186 B2 | 5/2004 | Anderson et al. |
| 6,795,226 B2 | 9/2004 | Agrawal et al. |
| 6,817,399 B2 | 11/2004 | Berman et al. |
| 6,850,017 B1 | 2/2005 | Domel et al. |
| 6,850,252 B1 | 2/2005 | Hoffberg |
| 6,854,503 B2 | 2/2005 | Cross et al. |
| 6,867,565 B2 | 3/2005 | Maistre et al. |
| 6,870,338 B2 | 3/2005 | Walker et al. |
| 6,873,461 B1 | 3/2005 | McPherson, Jr. |
| 6,879,122 B1 | 4/2005 | Stewart et al. |
| 6,891,838 B1 | 5/2005 | Petite et al. |
| 6,935,401 B2 | 8/2005 | Fraczek |
| 6,957,683 B2 | 10/2005 | Toti |
| 6,959,748 B2 | 11/2005 | Hudoba |
| 6,967,565 B2 | 11/2005 | Lingemann |
| 6,971,202 B2 | 12/2005 | Bender |
| 6,978,822 B2 | 12/2005 | Schoonen |
| 6,979,962 B2 | 12/2005 | Cavarec et al. |
| 6,980,092 B2 | 12/2005 | Turnbull et al. |
| 6,983,783 B2 | 1/2006 | Carmen et al. |
| 7,002,265 B2 | 2/2006 | Potega |
| 7,057,360 B1 | 6/2006 | Hsu |
| 7,059,377 B2 | 6/2006 | Nien et al. |
| 7,066,699 B2 | 6/2006 | Gosling |
| 7,088,965 B1 | 8/2006 | Ngan |
| 7,093,643 B2 | 8/2006 | Ikle |
| 7,111,659 B2 | 9/2006 | Harper et al. |
| 7,129,657 B2 | 10/2006 | Cavarec et al. |
| 7,137,530 B2 | 11/2006 | Chirnomas |
| 7,147,029 B2 | 12/2006 | Kovach et al. |
| 7,151,464 B2 | 12/2006 | Ramus |
| 7,193,502 B2 | 3/2007 | Vandrunen et al. |
| 7,215,292 B2 | 5/2007 | McLean |
| 7,231,953 B2 | 6/2007 | Varley et al. |
| 7,237,592 B2 | 7/2007 | Arnoux et al. |
| 7,240,716 B2 | 7/2007 | Nichols, Jr. et al. |
| 7,259,485 B2 | 8/2007 | Cavarec et al. |
| 7,281,561 B2 | 10/2007 | Anderson et al. |
| 7,296,607 B2 | 11/2007 | Krupke et al. |
| 7,299,848 B2 | 11/2007 | Streib et al. |
| 7,315,143 B2 | 1/2008 | Mullet et al. |
| 7,337,824 B2 | 3/2008 | Berger |
| 7,346,016 B2 | 3/2008 | Nielsen et al. |
| 7,350,736 B2 | 4/2008 | Caamano et al. |
| 7,356,041 B2 | 4/2008 | Nielsen et al. |
| 7,365,685 B2 | 4/2008 | Takeuchi et al. |
| 7,375,494 B2 | 5/2008 | Daniel et al. |
| 7,389,806 B2 | 6/2008 | Kates |
| 7,417,397 B2 | 8/2008 | Berman et al. |
| 7,438,111 B2 | 10/2008 | Grimes et al. |
| 7,453,401 B2 | 11/2008 | Jow |
| 7,517,609 B2 | 4/2009 | Cheng |
| 7,533,842 B2 | 5/2009 | Saito et al. |
| 7,562,840 B2 | 7/2009 | Takamatsu et al. |
| 7,590,433 B2 | 9/2009 | Sung et al. |
| 7,599,612 B2 | 10/2009 | Moseley et al. |
| 7,607,263 B2 | 10/2009 | Mullet et al. |
| 7,625,151 B2 | 12/2009 | Li et al. |
| 7,640,964 B2 | 1/2010 | Berger |
| 7,686,061 B2 | 3/2010 | Mullet et al. |
| 7,717,156 B2 | 5/2010 | Costello et al. |
| 7,719,215 B2 | 5/2010 | Meewis et al. |
| 7,723,939 B2 | 5/2010 | Carmen, Jr. |
| 7,750,774 B2 | 7/2010 | Fullerton et al. |
| 7,832,453 B2 | 11/2010 | Lin |
| 7,849,907 B2 | 12/2010 | Jang |
| 7,854,419 B2 | 12/2010 | Ng et al. |
| 7,857,030 B2 | 12/2010 | Cheng |
| 7,883,045 B2 | 2/2011 | Yamada |
| 7,891,399 B2 | 2/2011 | Rasmussen |

(56) References Cited

U.S. PATENT DOCUMENTS

| | | |
|---|---|---|
| 7,898,486 B2 | 3/2011 | Kim et al. |
| 7,923,948 B2 | 4/2011 | Rodas et al. |
| 7,934,673 B2 | 5/2011 | Saito et al. |
| 7,975,748 B2 | 7/2011 | Yu et al. |
| 8,009,433 B2 | 8/2011 | Ares |
| 8,016,016 B2 | 9/2011 | Berman et al. |
| 8,044,630 B2 | 10/2011 | Ramus |
| 8,122,932 B2 | 2/2012 | Cannaverde |
| 8,125,167 B1 | 2/2012 | Mullet et al. |
| 8,136,569 B2 | 3/2012 | Bohlen et al. |
| 8,186,413 B2 | 5/2012 | Fujita et al. |
| 8,193,742 B2 | 6/2012 | Skinner et al. |
| 8,210,460 B2 | 7/2012 | Scherzinger et al. |
| 8,220,520 B2 | 7/2012 | Lukos |
| 8,258,993 B2 | 9/2012 | Inoue et al. |
| 8,299,734 B2 | 10/2012 | Mullet et al. |
| 8,302,655 B2 | 11/2012 | Lin |
| 8,368,328 B2 | 2/2013 | Mullet et al. |
| 8,371,358 B1 | 2/2013 | Mullet et al. |
| 8,464,776 B2 | 6/2013 | Anthoine |
| 8,550,142 B2 | 10/2013 | Gaskill et al. |
| 8,575,872 B2 | 11/2013 | Mullet et al. |
| 8,659,246 B2 | 2/2014 | Mullet et al. |
| 8,723,455 B2 | 5/2014 | Mullet et al. |
| 2001/0050538 A1 | 12/2001 | Kovach et al. |
| 2002/0027184 A1 | 3/2002 | Kovach et al. |
| 2002/0088561 A1 | 7/2002 | Anderson et al. |
| 2002/0161456 A1 | 10/2002 | Mayer |
| 2002/0163473 A1 | 11/2002 | Koyama et al. |
| 2002/0190678 A1 | 12/2002 | Huber et al. |
| 2003/0075283 A1 | 4/2003 | Collett |
| 2003/0145956 A1 | 8/2003 | Domel et al. |
| 2003/0145957 A1 | 8/2003 | Domel et al. |
| 2003/0145958 A1 | 8/2003 | Domel et al. |
| 2003/0160723 A1 | 8/2003 | Cohen |
| 2004/0061462 A1 | 4/2004 | Bent et al. |
| 2004/0162040 A1 | 8/2004 | Ramus |
| 2004/0169116 A1 | 9/2004 | Nogare et al. |
| 2005/0035238 A1 | 2/2005 | Fun |
| 2005/0183835 A1 | 8/2005 | Nien |
| 2005/0189080 A1 | 9/2005 | Mullet et al. |
| 2005/0205217 A1 | 9/2005 | Harper et al. |
| 2005/0206334 A1 | 9/2005 | Cavarec et al. |
| 2005/0211391 A1 | 9/2005 | Varley et al. |
| 2006/0000936 A1 | 1/2006 | Caamano et al. |
| 2006/0006751 A1 | 1/2006 | Cavarec et al. |
| 2006/0012319 A1 | 1/2006 | Bouix et al. |
| 2006/0027339 A1 | 2/2006 | Hsu |
| 2006/0071619 A1 | 4/2006 | Vrielink |
| 2006/0086874 A1 | 4/2006 | Habel et al. |
| 2006/0137837 A1 | 6/2006 | Costello et al. |
| 2006/0158045 A1 | 7/2006 | Speri |
| 2006/0185799 A1 | 8/2006 | Kates |
| 2006/0232233 A1 | 10/2006 | Adams et al. |
| 2006/0232234 A1 | 10/2006 | Newman |
| 2006/0272782 A1 | 12/2006 | Nichols et al. |
| 2007/0060214 A1 | 3/2007 | Sung et al. |
| 2007/0261801 A1 | 11/2007 | Mullet et al. |
| 2007/0272374 A1 | 11/2007 | Moseley et al. |
| 2007/0273309 A1 | 11/2007 | Carmen |
| 2007/0284053 A1 | 12/2007 | Mullet et al. |
| 2008/0053628 A1 | 3/2008 | Anderson |
| 2008/0067278 A1 | 3/2008 | Fortunato et al. |
| 2008/0121353 A1 | 5/2008 | Detmer et al. |
| 2008/0128097 A1 | 6/2008 | Yu et al. |
| 2008/0153606 A1 | 6/2008 | Koop et al. |
| 2008/0191083 A1 | 8/2008 | Sumiyashiki |
| 2008/0196846 A1 | 8/2008 | Glasl |
| 2008/0202709 A1 | 8/2008 | Anderson et al. |
| 2008/0210802 A1 | 9/2008 | Sumiyashiki |
| 2008/0230189 A1 | 9/2008 | Rossato et al. |
| 2008/0230192 A1 | 9/2008 | Kane |
| 2008/0258666 A1 | 10/2008 | Carmen |
| 2008/0289777 A1 | 11/2008 | Costello et al. |
| 2008/0290823 A1 | 11/2008 | Grehant |
| 2009/0005911 A1 | 1/2009 | Decroix et al. |
| 2009/0127369 A1 | 5/2009 | Mullet et al. |
| 2009/0139668 A1 | 6/2009 | Naylor |
| 2009/0277593 A1 | 11/2009 | Stewart |
| 2009/0283225 A1 | 11/2009 | Luger |
| 2009/0308543 A1 | 12/2009 | Kates |
| 2010/0252211 A1 | 10/2010 | Barnes et al. |
| 2010/0269988 A1 | 10/2010 | Mullet et al. |
| 2010/0308149 A1 | 12/2010 | Allington et al. |
| 2011/0005694 A1 | 1/2011 | Ng |
| 2011/0048655 A1 | 3/2011 | Andreasen et al. |
| 2011/0101145 A1 | 5/2011 | Maemura et al. |
| 2011/0203748 A1 | 8/2011 | Mullet et al. |
| 2011/0203754 A1 | 8/2011 | Mullet et al. |
| 2011/0241967 A1 | 10/2011 | Kaikkonen |
| 2011/0272106 A1 | 11/2011 | Mullet et al. |
| 2012/0024485 A1 | 2/2012 | Mullet et al. |
| 2012/0031567 A1 | 2/2012 | Shier et al. |
| 2012/0031571 A1 | 2/2012 | Mullet et al. |
| 2012/0043029 A1 | 2/2012 | Gaskill et al. |
| 2012/0090797 A1 | 4/2012 | Mullet et al. |
| 2012/0097344 A1 | 4/2012 | Gaskill et al. |
| 2012/0111509 A1 | 5/2012 | Mullet et al. |
| 2012/0222824 A1 | 9/2012 | Lin |
| 2012/0225340 A1 | 9/2012 | Mullet et al. |
| 2012/0234956 A1 | 9/2012 | Lin |
| 2012/0255689 A1 | 10/2012 | Blair et al. |
| 2012/0261079 A1 | 10/2012 | Chambers et al. |
| 2012/0281511 A1 | 11/2012 | Charbon |
| 2012/0291964 A1 | 11/2012 | Marocco |
| 2012/0291965 A1 | 11/2012 | Marocco |
| 2013/0068398 A1 | 3/2013 | Wills et al. |
| 2013/0098564 A1 | 4/2013 | Jang |
| 2013/0099714 A1 | 4/2013 | Mullet et al. |
| 2013/0105095 A1 | 5/2013 | Anderson et al. |
| 2014/0055061 A1 | 2/2014 | Chambers |
| 2015/0013920 A1 | 1/2015 | Mullet |
| 2015/0226001 A1 | 8/2015 | Adams et al. |

FOREIGN PATENT DOCUMENTS

| | | |
|---|---|---|
| CN | 200959524 | 10/2007 |
| DE | 3231684 | 3/1984 |
| EP | 729856 | 9/1996 |
| EP | 924379 | 8/1999 |
| EP | 1752606 | 8/2005 |
| FR | 2790031 | 8/2000 |
| JP | 3154109 | 7/1991 |
| JP | 10046961 | 2/1998 |
| JP | 11-336453 | 7/1999 |
| JP | 2005-511935 | 4/2005 |
| JP | 2005-120760 | 5/2005 |
| JP | 3118685 | 2/2006 |
| JP | 2006-348518 | 12/2006 |
| JP | 2008202397 | 9/2008 |
| JP | 2013520594 | 6/2013 |
| WO | 02/091549 | 11/2002 |
| WO | 2004074620 | 9/2004 |

OTHER PUBLICATIONS

International Preliminary Report on Patentability (Chapter I of the Patent Cooperation Treaty) for PCT/US2013/034207, mailed Nov. 6, 2014.

Chinese Office Action dated May 7, 2015, with partial English translation.

Chinese Office Action mailed Apr. 23, 2014 for Chinese Appl. No. 2011800202807.

International Search Report and Written Opinion of the International Searching Authority dated Feb. 21, 2013 in the name of HomeRun Holdings Corporation.

European Search Report issued May 9, 2014 in corresponding EP Appl. No. 14151185.7.

International Search Report & Written Opinion, PCT/US2011/025889, dated May 9, 2011.

International Search Report & Written Opinion, PCT/US2012/059432, dated Feb. 21, 2013.

(56) References Cited

OTHER PUBLICATIONS

International Search Report and Written Opinion dated Jun. 14, 2013 in the name of HomeRun Holdings Corporation.
International Search Report for PCT/US2012/061795.
International Search Report for corresponding application PCT/US2013/046451 mailed Nov. 27, 2013.
International Search Report mailed Aug. 27, 2014 in corresponding Appl. No. PCT/US2014/033737.
John P. Gianvitorio, et al., "Fractal Antennas: A Novel Antenna Miniaturization Technique, and Applications", IEEE Antennas and Propagation Magazine, IEEE Service Center, Feb. 1, 2002, pp. 20-36, vol. 44, No. 1, Piscataway, NJ.
Notice of Allowance dated Sep. 15, 2014, in U.S. Appl. No. 13/771,994.
Office Action for Japanese Patent Application No. 2012-555107, dated Sep. 24, 2014.
Office Action in corresponding Japanese Application No. 2012-555106, dated Sep. 24, 2014.
Office Action in corresponding Japanese Application No. 2014-030674, dated Sep. 24, 2014.
Office Action issued May 30, 2014 in Chinese Patent Appl. No. 201180020576.9, filed Feb. 23, 2010 (with an English Translation).
Supplementary European Search Report, EP 11747979.0, dated Jul. 29, 2013.
Written Opinion for corresponding application PCT/US2013/046451 mailed Nov. 27, 2013.
Written Opinion of the International Searching Authority mailed Aug. 27, 2014 in corresponding Appl. No. PCT/US2014/033737.

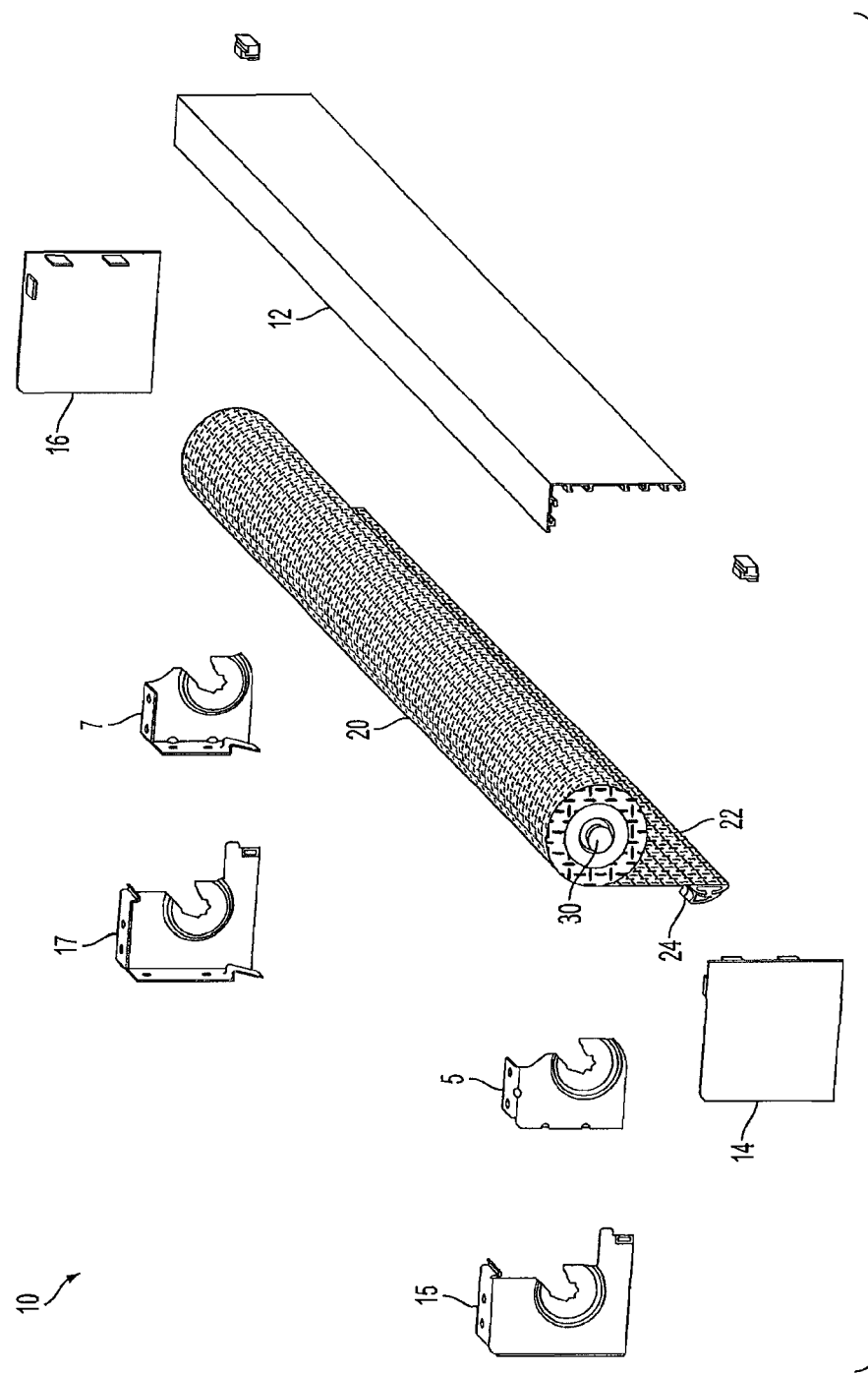

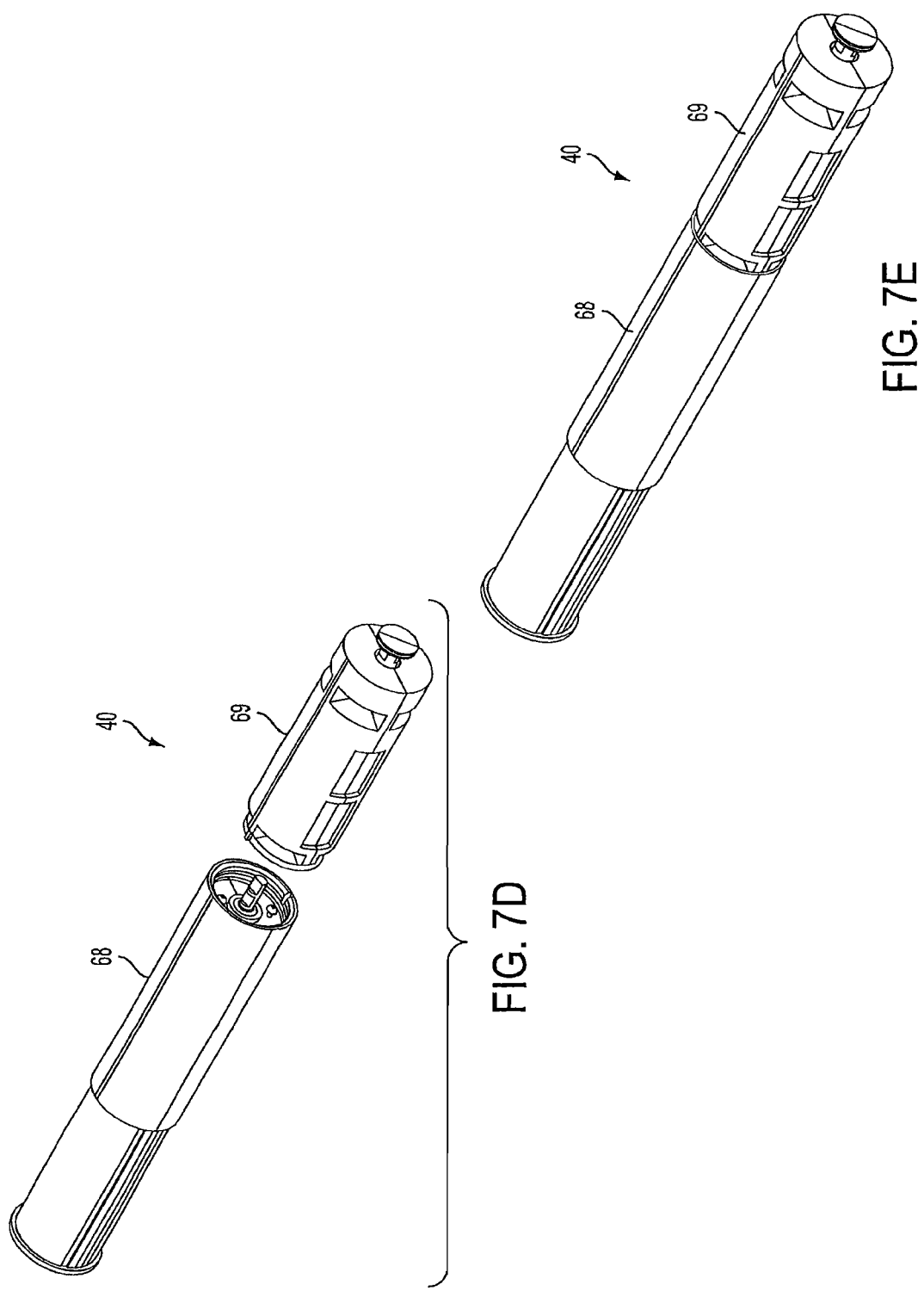

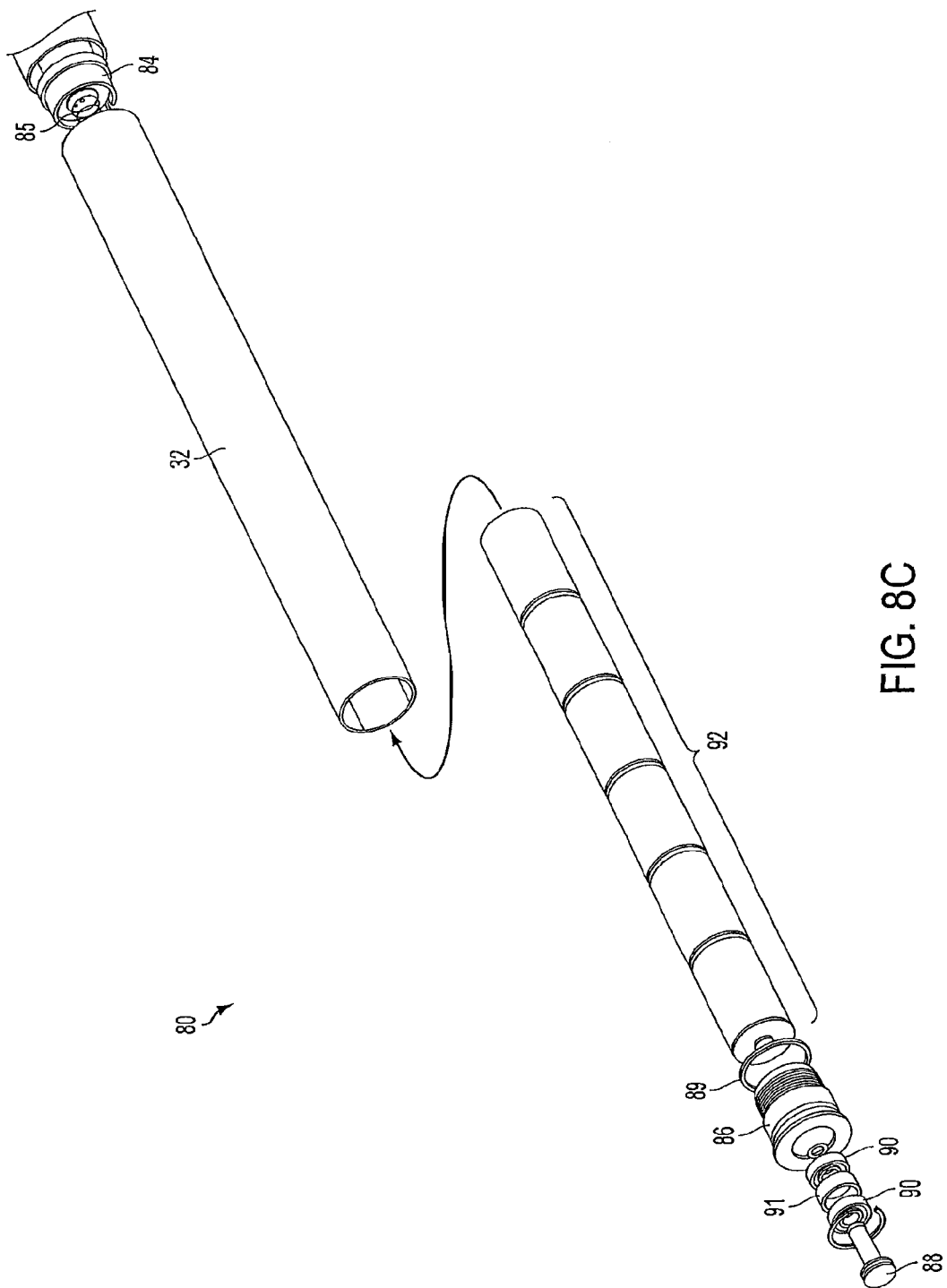

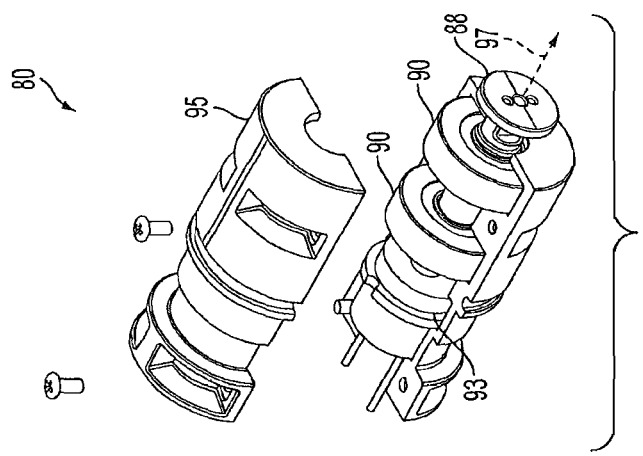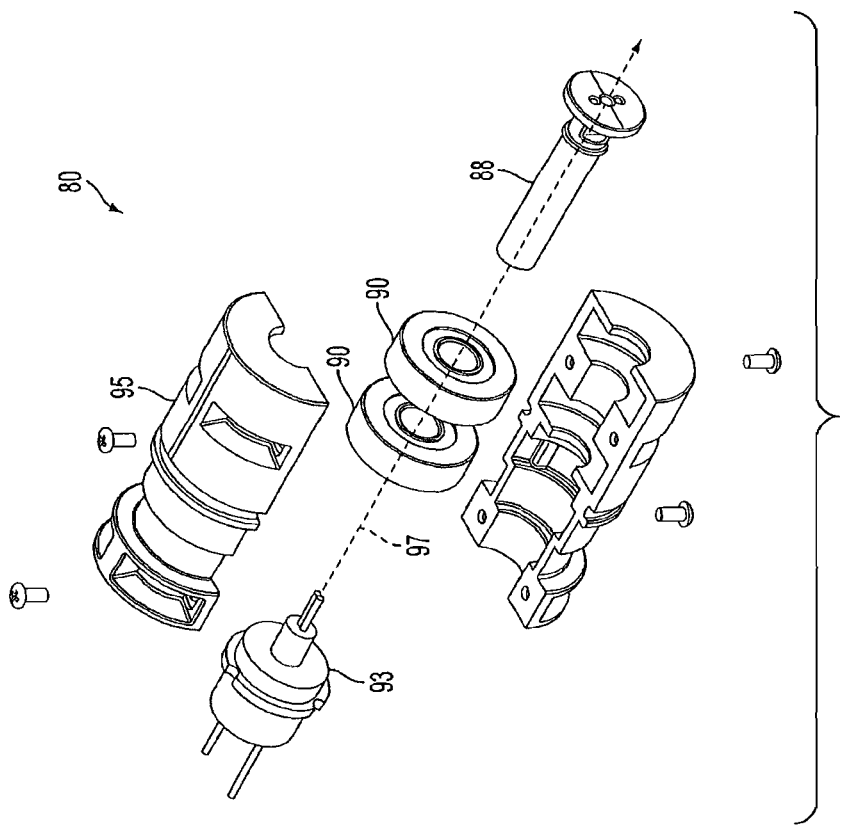

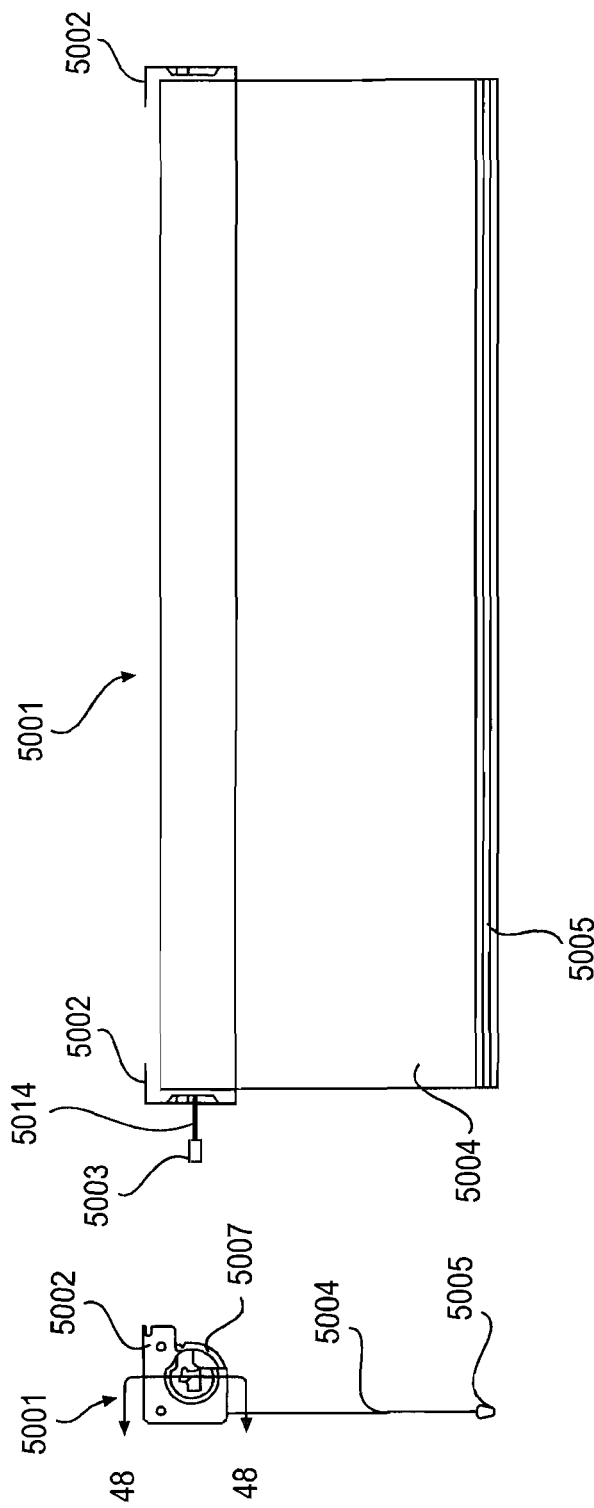

METHOD FOR OPERATING A MOTORIZED SHADE

CROSS-REFERENCE TO RELATED APPLICATIONS

This application claims priority under 35 U.S.C. §119 to U.S. Provisional Application No. 61/811,650 filed on Apr. 12, 2013. This application also is a continuation of U.S. application Ser. No. 14/512,597 filed on Oct. 13, 2014, which is a continuation of U.S. application Ser. No. 14/251,427 filed on Apr. 11, 2014, now U.S. Pat. No. 9,249,623, which is a continuation-in-part of Ser. No. 13/921,950 filed on Jun. 19, 2013, now U.S. Pat. No. 9,194,179, which is a continuation-in-part of Ser. No. 13/847,607 filed on Mar. 20, 2013, now U.S. Pat. No. 8,791,658, which is a continuation-in-part of Ser. No. 13/771,994 filed on Feb. 20, 2013, now U.S. Pat. No. 9,018,868, which is a continuation-in-part of Ser. No. 13/653,451 filed on Oct. 17, 2012, now U.S. Pat. No. 8,575,872, which is a continuation of Ser. No. 13/276,963 filed on Oct. 19, 2011, now U.S. Pat. No. 8,659,246, which is a continuation-in-part of Ser. No. 12/711,193 filed on Feb. 23, 2010, now U.S. Pat. No. 8,368,328, which is a continuation-in-part of Ser. No. 12/711,192 filed on Feb. 23, 2010, now U.S. Pat. No. 8,299,734. This application also claims priority to U.S. application Ser. No. 13/921,950 filed on Jun. 19, 2013, which is a continuation-in-part of U.S. application Ser. No. 13/847,607 filed on Mar. 20, 2013, now U.S. Pat. No. 8,791,658, which is a continuation of U.S. application Ser. No. 13/276,963 filed on Oct. 19, 2011, now U.S. Pat. No. 8,659,246, which is a continuation-in-part of U.S. application Ser. No. 12/711,192 filed on Feb. 23, 2010, now U.S. Pat. No. 8,299,734. This application also claims priority to U.S. application Ser. No. 13/771,994 filed on Feb. 20, 2013, which is a continuation-in-part of U.S. application Ser. No. 13/653,451 filed on Oct. 17, 2012, now U.S. Pat. No. 8,575,872, which is a continuation-in-part of U.S. application Ser. No. 12/711,193 filed on Feb. 23, 2010, now U.S. Pat. No. 8,368,328. This application claims priority to each of the above referenced applications and the disclosures of each of the above referenced applications are hereby incorporated by reference in their entirety. In addition, the cited prior art in each of these cases is intended to be considered cited prior art in this case.

FIELD OF THE INVENTION

The present invention relates to an architectural covering. Specifically, the present invention relates to a low-power architectural covering.

BACKGROUND OF THE INVENTION

One ubiquitous form of window treatment is the roller shade. A common window covering during the $19^{th}$ century, a roller shade is simply a rectangular panel of fabric, or other material, that is attached to a cylindrical, rotating tube. The shade tube is mounted near the header of the window such that the shade rolls up upon itself as the shade tube rotates in one direction, and rolls down to cover the a desired portion of the window when the shade tube is rotated in the opposite direction.

A control system, mounted at one end of the shade tube, can secure the shade at one or more positions along the extent of its travel, regardless of the direction of rotation of the shade tube. Simple mechanical control systems include ratchet-and-pawl mechanisms, friction brakes, clutches, etc. To roll the shade up and down, and to position the shade at intermediate locations along its extend of travel, ratchet-and-pawl and friction brake mechanisms require the lower edge of the shade to be manipulated by the user, while clutch mechanisms include a control chain that is manipulated by the user.

Not surprisingly, motorization of the roller shade was accomplished, quite simply, by replacing the simple, mechanical control system with an electric motor that is directly coupled to the shade tube. The motor may be located inside or outside the shade tube, is fixed to the roller shade support and is connected to a simple switch, or, in more sophisticated applications, to a radio frequency (RF) or infrared (IR) transceiver, that controls the activation of the motor and the rotation of the shade tube.

Many known motorized roller shades provide power, such as 120 VAC, 220/230 VAC 50/60 Hz, etc., to the motor and control electronics from the facility in which the motorized roller shade is installed. Recently-developed battery-powered roller shades provide installation flexibility by removing the requirement to connect the motor and control electronics to facility power. The batteries for these roller shades are typically mounted within, above, or adjacent to the shade mounting bracket, headrail or fascia. Unfortunately, these battery-powered systems suffer from many drawbacks, including, for example, high levels of self-generated noise, inadequate battery life, inadequate or nonexistent counter-balancing capability, inadequate or nonexistent manual operation capability, inconvenient installation requirements, and the like.

Therefore, to improve the battery life of battery-powered roller shades and, thus the expenses associated with operation of the battery-powered roller shades, a new, low-power roller shade is needed.

Another problem in the industry is that many motorized window shades do not allow for manual movement. That is, when the motorization components are added to a window shade the window shade can no longer be moved by hand. As one example, a certain hotel in Las Vegas, Nev. installed a great number of motorized shades in their rooms. While the functionality of motorized shades was an added advantage, an unforeseen problem arose when patrons of the hotel, who were unaware that the shades were movable only by way of motorization, attempted to open or close the shades manually. This manual movement would break the internal gears of the shades requiring replacement at great inconvenience and cost. This breakage is a result of the arrangement where the motor is designed to rotate fast requiring a substantial gear reduction. This substantial gear reduction causes a great amount of back drive in the motor when someone tugs on it in an attempt to make it manually move which causes the gears to break.

Therefore, to improve upon these prior art motorized window shades, an improved shade is needed that allows for manual movement as well as motorized movement.

SUMMARY OF THE INVENTION

Some embodiments in accordance with the present disclosure may provide an architectural covering. The architectural covering includes: shade material; the shade material operatively connected to a motor unit such that movement of the motor unit causes movement of the shade material; the motor unit comprising a DC motor and a shaft connected to the DC motor; a power supply unit electrically connected to the motor unit; a controller unit electrically connected to the motor unit, the controller unit having a microprocessor; and a rotation detector configured to detect rotation of the motor unit and upon detection of rotation of the motor unit transmit a signal to the microprocessor, wherein the microprocessor of the controller unit is configured to power an encoder unit in response to determination of manual movement of the shade material. A motor and control unit for an architectural covering may be provided.

Some embodiments in accordance with the present disclosure may provide a motor and control unit for an architectural covering. The control unit may include: a motor unit; the motor unit comprising a DC motor and a shaft connected to the DC motor; a magnetic device connected to the shaft such that rotation of the shaft causes rotation of the magnetic device; a controller unit electrically connected to the motor unit, the controller unit having a microprocessor; a power supply unit electrically connected to the motor unit and the controller unit; a rotation detector electrically connected to the microprocessor; at least one Hall Effect sensor positioned adjacent to the magnetic device, the at least one Hall Effect sensor electrically connected to the microprocessor; the microprocessor of the controller unit configured to switch between an awake state wherein the microprocessor energizes the at least one Hall Effect sensor, and an asleep state wherein the microprocessor does not energize the at least one Hall Effect sensor; wherein when energized, the at least one Hall Effect sensor detects rotation of the shaft.

Some embodiments in accordance with the present disclosure may provide an architectural covering including: shade material; a motor operatively connected to the shade material, a controller unit operatively connected to the motor; the controller unit having a microprocessor, a rotation detector and an encoder unit; and a power supply unit operatively connected to the motor and the controller unit, wherein the rotation detector is configured to detect a change in voltage caused by a manual movement of the shade material and transmit a signal to the microprocessor, and wherein the microprocessor is configured to supply power to the encoder unit in response to detection of movement by the shade material by the rotation detector and the encoder unit is configured to track movement of the motor when in powered awake state.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIGS. 7C, 7D and 7E depict isometric views of a motor/controller unit according to another alternative embodiment of the present invention.

FIG. 8C depicts an exploded, isometric view of a power supply unit according to an alternative embodiment of the present invention.

FIGS. 9A and 9B depict exploded, isometric views of a power supply unit according to an alternative embodiment of the present invention.

FIG. 58 is a side or end view of a roll shade system according to an embodiment of the present invention.

FIG. 59 is a plane view taken along the line 48-48 in FIG. 58.

DETAILED DESCRIPTION

Figure 1A:
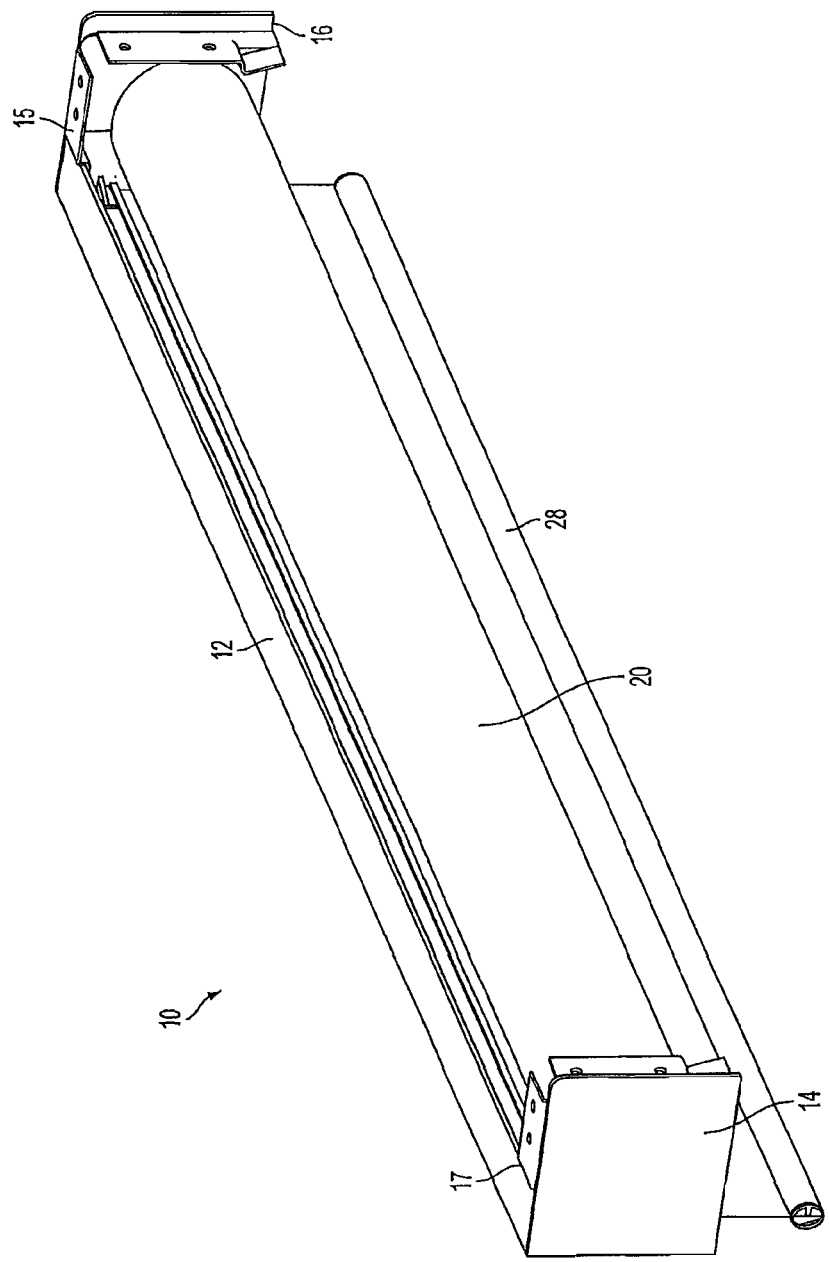
FIGS. 1A and 1B depict complementary isometric views of a motorized roller shade assembly, in accordance with embodiments of the present invention.

The invention will now be described with reference to the drawing figures, in which like reference numerals refer to like parts throughout. The term "shade" as used herein describes any flexible material, such as a shade, a curtain, a screen, etc., that can be deployed from, and retrieved onto, a storage tube.

Embodiments of the present invention provide an architectural covering, such as a motorized roller shade in which the batteries, DC gear motor, control circuitry are entirely contained within a shade tube that is supported by bearings. Two support shafts are attached to respective mounting brackets, and the bearings rotatably couple the shade tube to each support shaft. The output shaft of the DC gear motor is fixed to one of the support shafts, while the DC gear motor housing is mechanically coupled to the shade tube. Accordingly, operation of the DC gear motor causes the motor housing to rotate about the fixed DC gear motor output shaft, which causes the shade tube to rotate about the fixed DC gear motor output shaft as well. Because these embodiments do not require external wiring for power or control, great flexibility in mounting, and re-mounting, the motorized roller shade is provided.

Encapsulation of the motorization and control components within the shade tube, combined with the performance of the bearings and enhanced battery capacity of the DC gear motor configuration described above, greatly increases the number of duty cycles provided by a single set of batteries and provides a highly efficient roller shade. Additionally, encapsulation advantageously prevents dust and other contaminants from entering the electronics and the drive components.

In an alternative embodiment, the batteries may be mounted outside of the shade tube, and power may be provided to the components located within the shade tube using commutator or slip rings, induction techniques, and the like. Additionally, the external batteries may be replaced by any external source of DC power, such as, for example, an AC/DC power converter, a solar cell, etc.

Figure 1B:
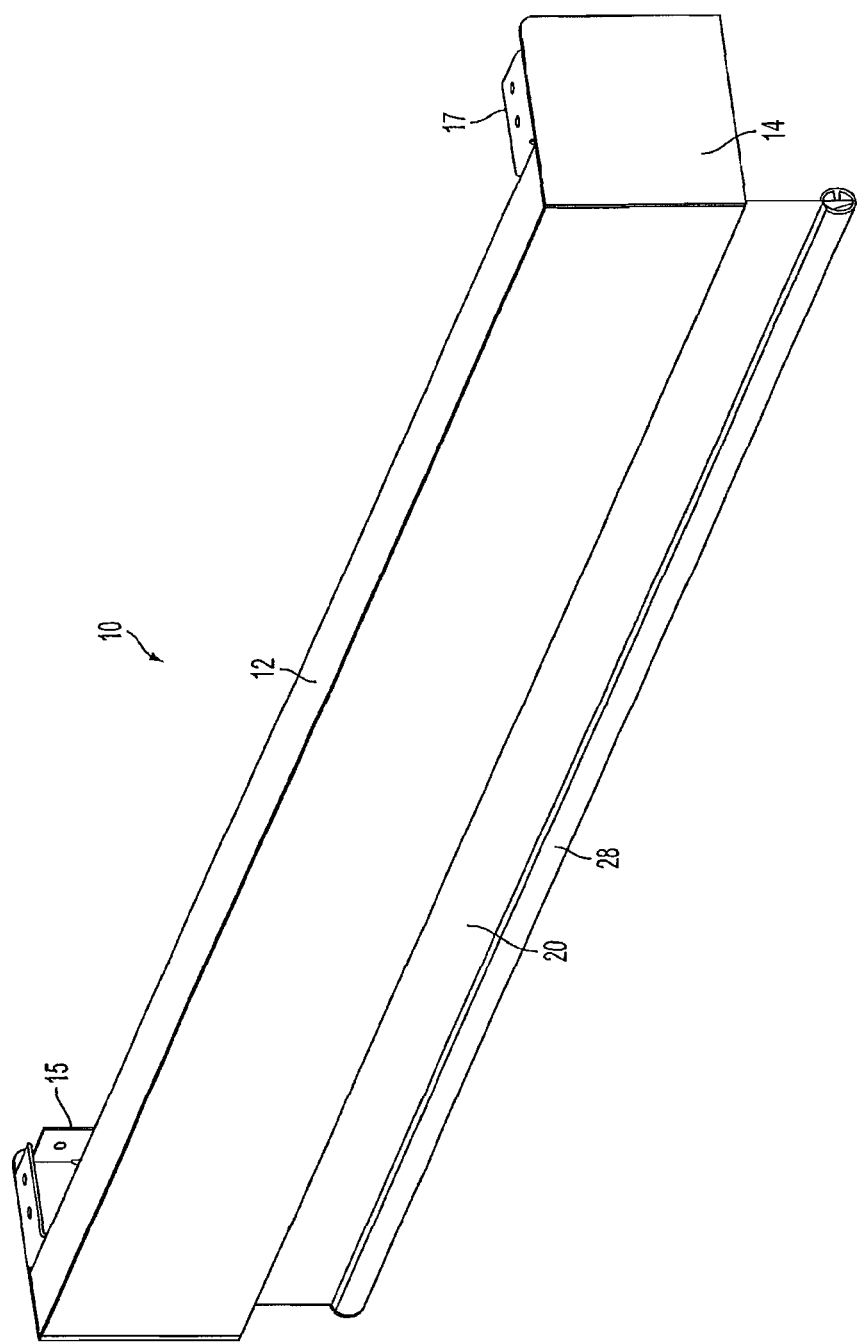
Figure 2B:
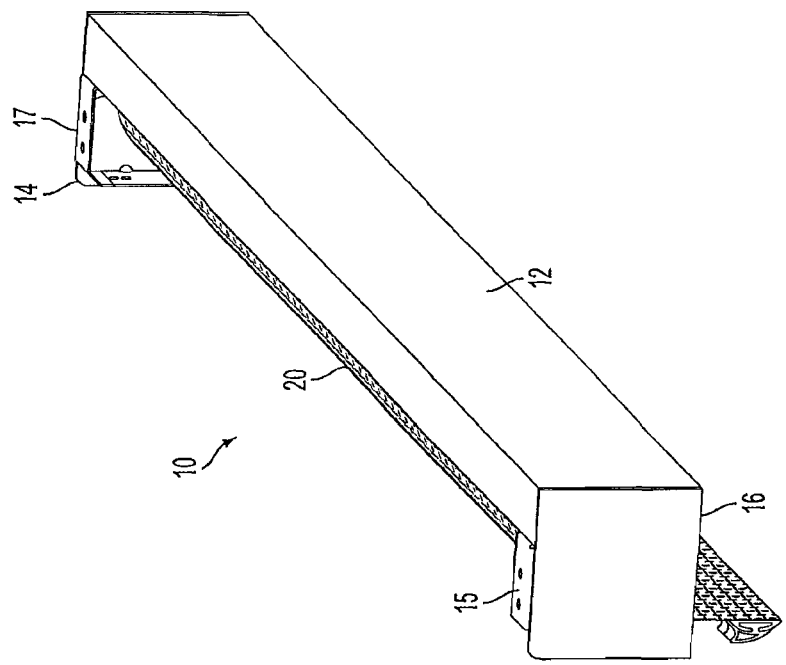
FIGS. 2A and 2B depict complementary isometric views of a motorized roller shade assembly, in accordance with embodiments of the present invention.
Figure 2A:
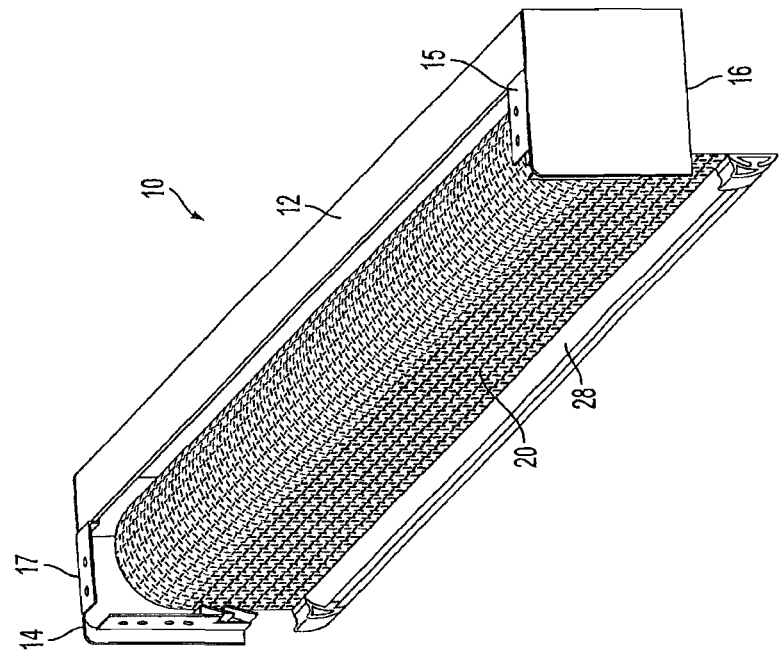

FIGS. 1A and 1B depict complementary isometric views of a motorized roller shade assembly 10 having a reverse payout, in accordance with embodiments of the present invention. FIGS. 2A and 2B depict complementary isometric views of a motorized roller shade assembly 10 having a standard payout, in accordance with embodiments of the present invention, while FIG. 3 depicts an exploded, isometric view of the motorized roller shade assembly 10 depicted in FIG. 2B. In one embodiment, motorized roller shade 20 is mounted near the top portion of a window, door, etc., using mounting brackets 5 and 7. In another embodiment, motorized roller shade 20 is mounted near the top portion of the window using mounting brackets 15 and 17, which also support fascia 12. In the latter embodiment, fascia end caps 14 and 16 attach to fascia 12 to conceal motorized roller shade 20, as well as mounting brackets 15 and 17.

Generally, motorized roller shade 20 includes a shade 22 and a motorized tube assembly 30. In a preferred embodiment, motorized roller shade 20 also includes a bottom bar 28 attached to the bottom of shade 22. In one embodiment, bottom bar 28 provides an end-of-travel stop, while in an alternative embodiment, end-of-travel stops 24 and 26 may be provided. As discussed in more detail below, in preferred embodiments, all of the components necessary to power and control the operation of the motorized roller shade 20 are advantageously located within motorized tube assembly 30.

Figure 4:
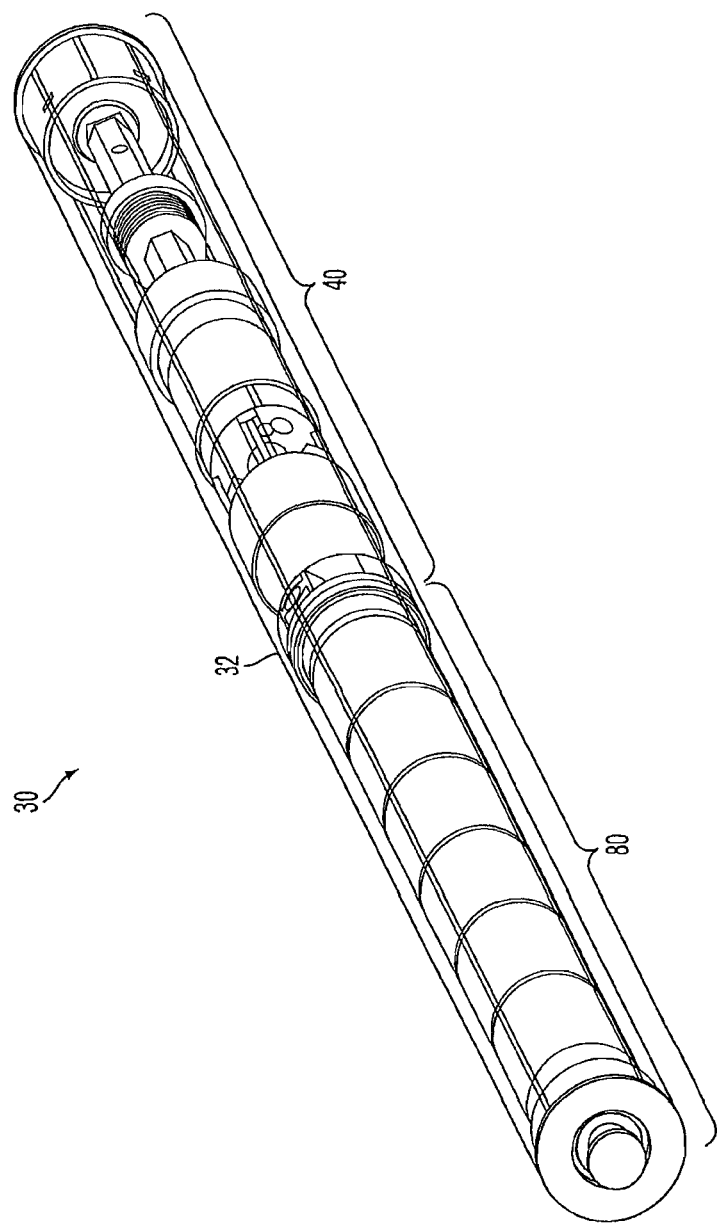
FIG. 4 depicts an isometric view of a motorized tube assembly, according to one embodiment of the present invention.
Figure 5:
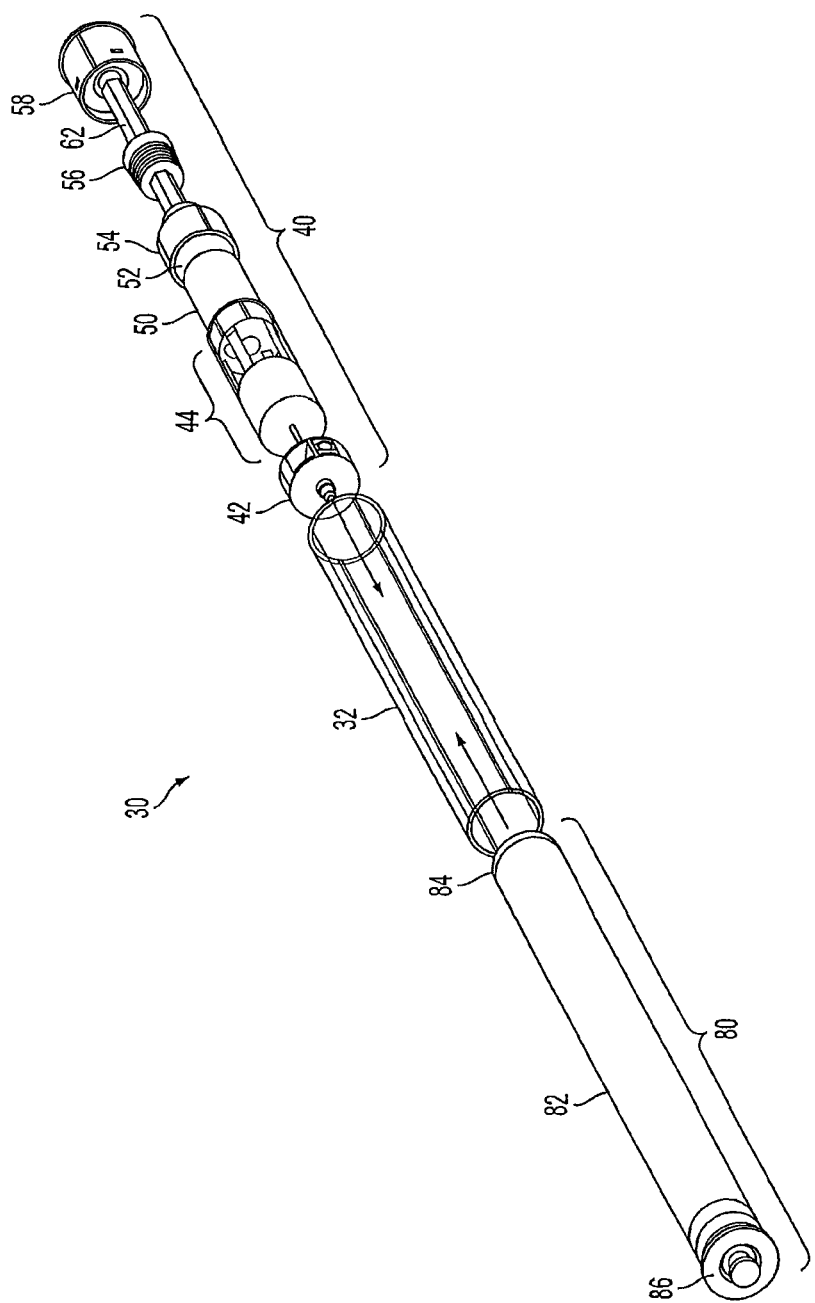
FIG. 5 depicts a partially-exploded, isometric view of the motorized tube assembly depicted in FIG. 4.

FIGS. 4 and 5 depict isometric views of motorized tube assembly 30, according to one embodiment of the present invention. Motorized tube assembly 30 includes a shade tube 32, motor/controller unit 40 and power supply unit 80. The top of shade 22 is attached to the outer surface of shade tube 32, while motor/controller unit 40 and power supply unit 80 are located within an inner cavity defined by the inner surface of shade tube 32.

Figure 6:
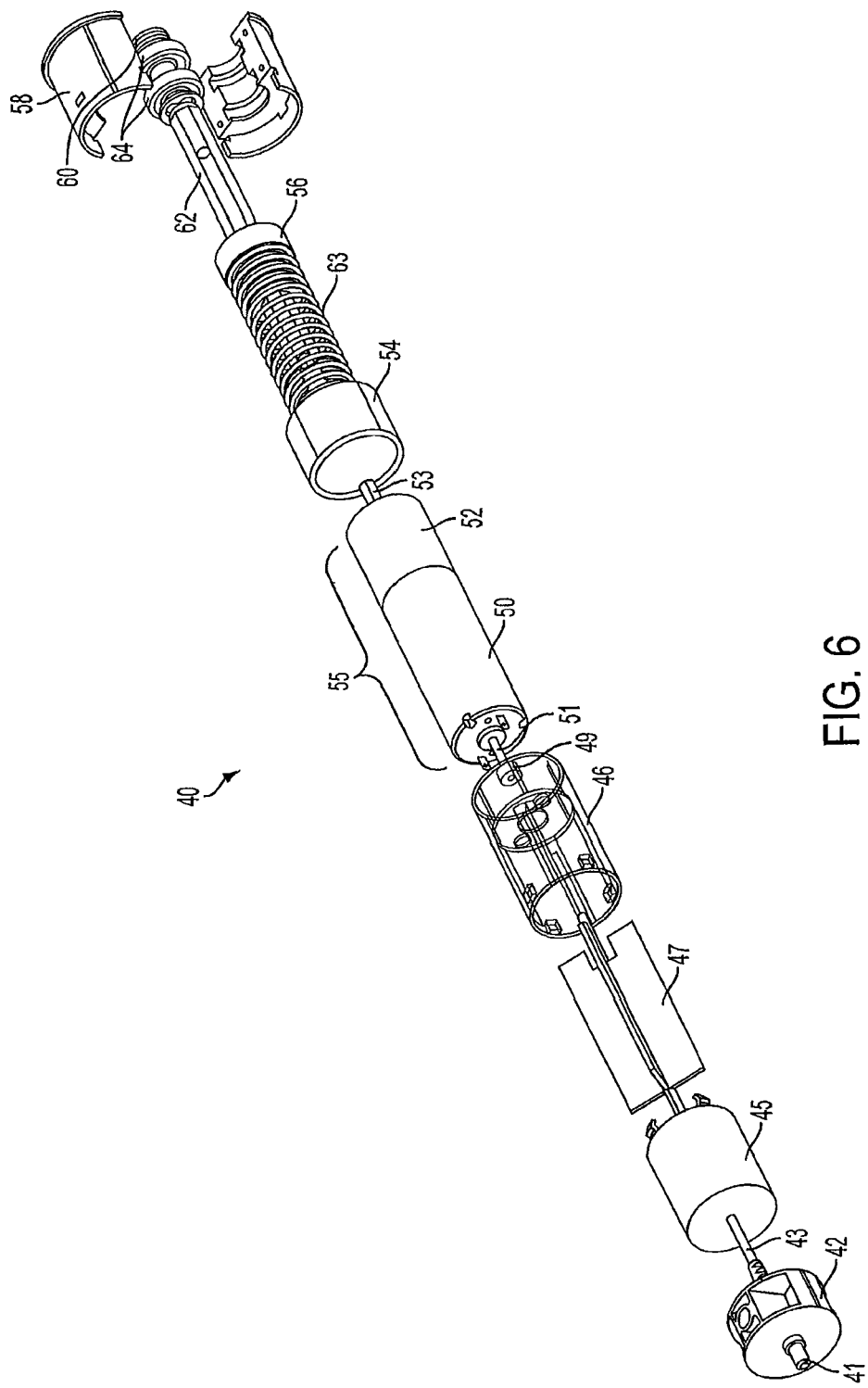
FIG. 6 depicts an exploded, isometric view of the motor/controller unit depicted in FIG. 5.

FIG. 6 depicts an exploded, isometric view of the motor/controller unit 40 depicted in FIG. 5. Generally, the motor/controller unit 40 includes an electrical power connector 42, a circuit board housing 44, a DC gear motor 55 that includes a DC motor 50 and an integral motor gear reducing assembly 52, a mount 54 for the DC gear motor 55, and a bearing housing 58.

The electrical power connector 42 includes a terminal 41 that couples to the power supply unit 80, and power cables 43 that connect to the circuit board(s) located within the circuit board housing 44. Terminal 41 includes positive and negative connectors that mate with cooperating positive and negative connectors of power supply unit 80, such as, for example, plug connectors, blade connectors, a coaxial connector, etc. In a preferred embodiment, the positive and negative connectors do not have a preferred orientation. The electrical power connector 42 is mechanically coupled to the inner surface of the shade tube 32 using a press fit, an interference fit, a friction fit, a key, adhesive, etc.

The circuit board housing 44 includes an end cap 45 and a housing body 46 within which at least one circuit board 47 is mounted. In the depicted embodiment, two circuit boards 47 are mounted within the circuit board housing 44 in an orthogonal relationship. Circuit boards 47 generally include all of the supporting circuitry and electronic components necessary to sense and control the operation of the motor 50, manage and/or condition the power provided by the power supply unit 80, etc., including, for example, a controller or microcontroller, memory, a wireless receiver, a Hall Effect sensor, etc. In one embodiment, the microcontroller is an Microchip 8-bit microcontroller, such as the PIC18F25K20, while the wireless receiver is a Micrel QwikRadio® receiver, such as the MICRF219. The microcontroller may be coupled to the wireless receiver using a local processor bus, a serial bus, a serial peripheral interface, etc. In another embodiment, the wireless receiver and microcontroller may be integrated into a single chip, such as, for example, the Zensys ZW0201 Z-Wave Single Chip, etc.

The antenna for the wireless receiver may be mounted to the circuit board or located, generally, inside the circuit board housing 44. Alternatively, the antenna may be located outside the circuit board housing 44, including, for example, the outer surface of the circuit board housing 44, the inner surface of the shade tube 32, the outer surface of the shade tube 32, the bearing housing 58, etc. In a further embodiment, at least a portion of the outer surface of the shade tube 32 may act as the antenna. The circuit board housing 44 may be mechanically coupled to the inner surface of the shade tube 32 using, for example, a press fit, an interference fit, a friction fit, a key, adhesive, etc.

In another embodiment, a wireless transmitter is also provided, and information relating to the status, performance, etc., of the motorized roller shade 20 may be transmitted periodically to a wireless diagnostic device, or, preferably, in response to a specific query from the wireless diagnostic device. In one embodiment, the wireless transmitter is a Micrel QwikRadio® transmitter, such as the MICRF102. A wireless transceiver, in which the wireless transmitter and receiver are combined into a single component, may also be included, and in one embodiment, the wireless transceiver is a Micrel RadioWire® transceiver, such as the MICRF506. In another embodiment, the wireless transceiver and microcontroller may be integrated into a single module, such as, for example, the Zensys ZM3102 Z-Wave Module, etc. The functionality of the microcontroller, as it relates to the operation of the motorized roller shade 20, is discussed in more detail below.

In an alternative embodiment, the shade tube 32 includes one or more slots to facilitate the transmission of wireless signal energy to the wireless receiver, and from the wireless transmitter, if so equipped. For example, if the wireless signal is within the radio frequency (RF) band, the slot may be advantageously matched to the wavelength of the signal. For one RF embodiment, the slot is ⅛" wide and 2½" long; other dimensions are also contemplated.

The DC motor 50 is electrically connected to the circuit board 47, and has an output shaft that is connected to the input shaft of the motor gear reducing assembly 52. The DC motor 50 may also be mechanically coupled to the circuit board housing body 46 using, for example, a press fit, an interference fit, a friction fit, a key, adhesive, mechanical fasteners, etc. In various embodiments of the present invention, DC motor 50 and motor gear reducing assembly 52 are provided as a single mechanical package, such as the DC gear motors manufactured by Buhler Motor Inc.

In one preferred embodiment, DC gear motor 55 includes a 24V DC motor and a two-stage planetary gear system with a 40:1 ratio, such as, for example, Buhler DC Gear Motor 1.61.077.423, and is supplied with an average battery voltage of $9.6V_{avg}$ provided by an eight D-cell battery stack. Other alternative embodiments are also contemplated by the present invention. However, this preferred embodiment offers particular advantages over many alternatives, including, for example, embodiments that include smaller average battery voltages, smaller battery sizes, 12V DC motors, three-stage planetary gear systems, etc.

For example, in this preferred embodiment, the 24V DC gear motor 55 draws a current of about 0.1 A when supplied with a battery voltage of $9.6V_{avg}$. However, under the same torsional loading and output speed (e.g., 30 rpm), a 12V DC gear motor with a similar gear system, such as, e.g., Buhler DC Gear Motor 1.61.077.413, will draw a current of about 0.2 A when supplied with a battery voltage of $4.8V_{avg}$. Assuming similar motor efficiencies, the 24V DC motor supplied with $9.6V_{avg}$ advantageously draws about 50% less current than the 12V DC gear motor supplied with $4.8V_{avg}$ while producing the same power output.

In one embodiment, the DC gear motor 55 includes a 24V DC motor and a two-stage planetary gear system with a 40:1 ratio, while the operating voltage is provided by a six cell battery stack. In another embodiment, the DC gear motor 55 includes a 24V DC motor and a two-stage planetary gear system with a 22:1 ratio, while the operating voltage is provided by a four cell battery stack; counterbalancing is also provided.

In preferred embodiments of the present invention, the rated voltage of the DC gear motor is much greater than the voltage produced by the batteries, by a factor of two or more, for example, causing the DC motor to operate at a reduced speed and torque rating, which advantageously eliminates undesirable higher frequency noise and draws lower current from the batteries, thereby improving battery life. In other words, applying a lower-than-rated voltage to the DC gear motor causes the motor to run at a lower-than-rated speed to produce quieter operation and longer battery life as compared to a DC gear motor running at its rated voltage, which draws similar amperage while producing lower run cycle times to produce equivalent mechanical power. In the embodiment described above, the 24V DC gear motor, running at lower voltages, enhances the cycle life of the battery operated roller shade by about 20% when compared to a 12V DC gear motor using the same battery capacity. Alkaline, zinc and lead acid batteries may provide better performance than lithium or nickel batteries, for example.

In another example, four D-cell batteries produce an average battery voltage of about $4.8V_{avg}$, while eight D-cell batteries produce an average battery voltage of about $9.6V_{avg}$. Clearly, embodiments that include an eight D-cell battery stack advantageously provide twice as much battery capacity than those embodiments that include a four D-cell battery stack. Of course, smaller battery sizes, such as, e.g., C-cell, AA-cell, etc., offer less capacity than D-cells.

In a further example, supplying a 12V DC gear motor with $9.6V_{avg}$ increases the motor operating speed, which requires a higher gear ratio in order to provide the same output speed as the 24V DC gear motor discussed above. In other words, assuming the same torsional loading, output speed (e.g., 30 rpm) and average battery voltage ($9.6V_{avg}$), the motor operating speed of the 24V DC gear motor will be about 50% of the motor operating speed of the 12V DC gear motor. The higher gear ratio typically requires an additional planetary gear stage, which reduces motor efficiency, increases generated noise, reduces backdrive performance and may require a more complex motor controller. Consequently, those embodiments that include a 24V DC gear motor supplied with $9.6V_{avg}$ offer higher efficiencies and less generated noise.

In one embodiment, the shaft 51 of DC motor 50 protrudes into the circuit board housing 44, and a multi-pole magnet 49 is attached to the end of the motor shaft 51. A magnetic encoder (not shown for clarity) is mounted on the circuit board 47 to sense the rotation of the multi-pole magnet 49, and outputs a pulse for each pole of the multi-pole magnet 49 that moves past the encoder. In a preferred embodiment, the multi-pole magnet 49 has eight poles and the gear reducing assembly 52 has a gear ratio of 30:1, so that the magnetic encoder outputs 240 pulses for each revolution of the shade tube 32. The controller advantageously counts these pulses to determine the operational and positional characteristics of the shade, curtain, etc. Other types of encoders may also be used, such as optical encoders, mechanical encoders, etc.

The number of pulses output by the encoder may be associated with a linear displacement of the shade 22 by a distance/pulse conversion factor or a pulse/distance conversion factor. In one embodiment, this conversion factor is constant regardless of the position of shade 22. For example, using the outer diameter d of the shade tube 32, e.g., 1⅝ inches (1.625 inches), each rotation of the shade tube 32 moves the shade 22 a linear distance of π*d, or about 5 inches. For the eight-pole magnet 49 and 30:1 gear reducing assembly 52 embodiment discussed above, the distance/pulse conversion factor is about 0.02 inches/pulse, while the pulse/distance conversion factor is about 48 pulses/inch. In another example, the outer diameter of the fully-wrapped shade 22 may be used in the calculation. When a length of shade 22 is wrapped on shade tube 32, such as 8 feet, the outer diameter of the wrapped shade 22 depends upon the thickness of the shade material. In certain embodiments, the outer diameter of the wrapped shade 22 may be as small as 1.8 inches or as large as 2.5 inches. For the latter case, the distance/pulse conversion factor is about 0.03 inches/pulse, while the pulse/distance conversion factor is about 30 pulses/inch. Of course, any diameter between these two extremes, i.e., the outer diameter of the shade tube 32 and the outer diameter of the wrapped shade 22, may be used. These approximations generate an error between the calculated linear displacement of the shade and the true linear displacement of the shade, so an average or intermediate diameter may preferably reduce the error. In another embodiment, the conversion factor may be a function of the position of the shade 22, so that the conversion factor depends upon the calculated linear displacement of the shade 22.

In various preferred embodiments discussed below, the position of the shade 22 is determined and controlled based on the number of pulses that have been detected from a known position of shade 22. While the open position is preferred, the closed position may also be used as the known position. In order to determine the full range of motion of shade 22, for example, the shade may be electrically moved to the open position, an accumulated pulse counter may be reset and the shade 22 may then be moved to the closed position, manually and/or electrically. The total number of accumulated pulses represents the limit of travel for the shade, and any desirable intermediate positions may be calculated based on this number.

For example, an 8 foot shade that moves from the open position to the closed position may generate 3840 pulses, and various intermediate positions of the shade 22 can be advantageously determined, such as, 25% open, 50% open, 75% open, etc. Quite simply, the number of pulses between the open position and the 75% open position would be 960, the number of pulses between the open position and the 50% open position would be 1920, and so on. Controlled movement between these predetermined positions is based on the accumulated pulse count. For example, at the 50% open position, this 8 foot shade would have an accumulated pulse count of 1920, and controlled movement to the 75% open position would require an increase in the accumulated pulse count to 2880. Accordingly, movement of the shade 22 is determined and controlled based on accumulating the number of pulses detected since the shade 22 was deployed in the known position. An average number of pulses/inch may be calculated based on the total number of pulses and the length of shade 22, and an approximate linear displacement of the shade 22 can be calculated based on the number of pulses accumulated over a given time period. In this example, the average number of pulses/inch is 40, so movement of the shade 22 about 2 inches would generate about 80 pulses. Positional errors are advantageously eliminated by resetting the accumulated pulse counter to zero whenever the shade 22 is moved to the known position.

A mount 54 supports the DC gear motor 55, and may be mechanically coupled to the inner surface of the shade tube 32. In one embodiment, the outer surface of the mount 54 and the inner surface of the shade tube 32 are smooth, and the mechanical coupling is a press fit, an interference fit, a friction fit, etc. In another embodiment, the outer surface of the mount 54 includes several raised longitudinal protrusions that mate with cooperating longitudinal recesses in the inner surface of the shade tube 32. In this embodiment, the mechanical coupling is keyed; a combination of these methods is also contemplated. If the frictional resistance is small enough, the motor/controller unit 40 may be removed from the shade tube 32 for inspection or repair; in other embodiments, the motor/controller unit 40 may be permanently secured within the shade tube 32 using adhesives, etc.

As described above, the circuit board housing 44 and the mount 54 may be mechanically coupled to the inner surface of the shade tube 32. Accordingly, at least three different embodiments are contemplated by the present invention. In one embodiment, the circuit board housing 44 and the mount 54 are both mechanically coupled to the inner surface of the shade tube 32. In another embodiment, only the circuit board housing 44 is mechanically coupled to the inner surface of the shade tube 32. In a further embodiment, only the mount 54 is mechanically coupled to the inner surface of the shade tube 32.

The output shaft of the DC gear motor 55 is fixed to the support shaft 60, either directly (not shown for clarity) or through an intermediate shaft 62. When the motorized roller shade 20 is installed, support shaft 60 is attached to a mounting bracket that prevents the support shaft 60 from rotating. Because (a) the output shaft of the DC gear motor 55 is coupled to the support shaft 60 which is fixed to the mounting bracket, and (b) the DC gear motor 55 is mechanically-coupled to the shade tube, operation of the DC gear motor 55 causes the DC gear motor 55 to rotate about the fixed output shaft, which causes the shade tube 32 to rotate about the fixed output shaft as well.

Bearing housing 58 includes one or more bearings 64 that are rotatably coupled to the support shaft 60. In a preferred embodiment, bearing housing 58 includes two rolling element bearings, such as, for example, spherical ball bearings; each outer race is attached to the bearing housing 58, while each inner race is attached to the support shaft 60. In a preferred embodiment, two ball bearings are spaced about ⅜" apart giving a total support land of about 0.8" or 20 mm; in an alternative embodiment, the intra-bearing spacing is about twice the diameter of support shaft 60. Other types of low-friction bearings are also contemplated by the present invention.

The motor/controller unit 40 may also include counterbalancing. In a preferred embodiment, motor/controller unit 40 includes a fixed perch 56 attached to intermediate shaft 62. In this embodiment, mount 54 functions as a rotating perch, and a counterbalance spring 63 (not shown in FIG. 5 for clarity; shown in FIG. 6) is attached to the rotating perch 54 and the fixed perch 56. The intermediate shaft 62 may be hexagonal in shape to facilitate mounting of the fixed perch 56. Preloading the counterbalance spring advantageously improves the performance of the motorized roller shade 20.

Figure 7A:
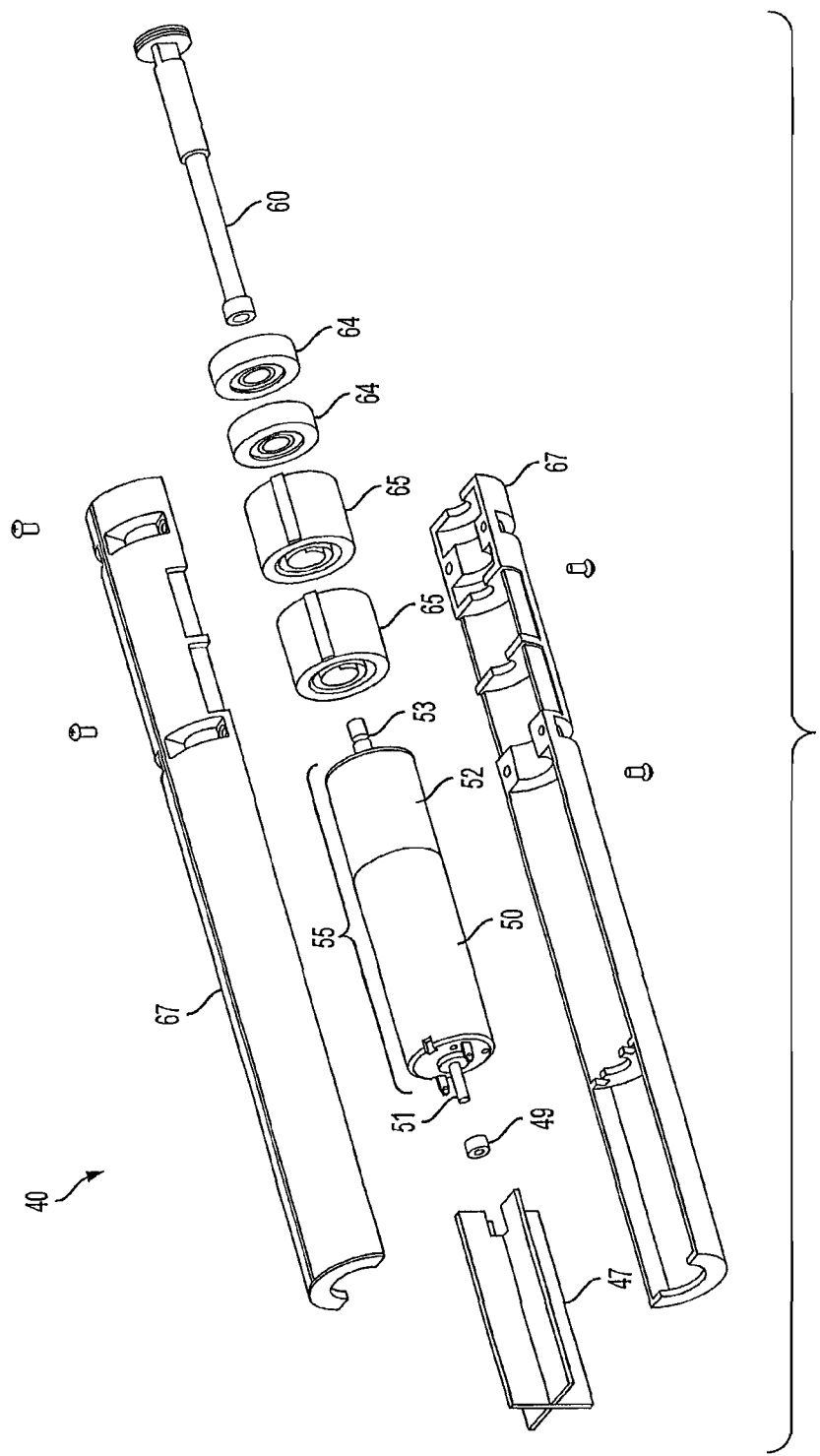
FIGS. 7A and 7B depict exploded, isometric views of a motor/controller unit according to an alternative embodiment of the present invention.
Figure 7B:
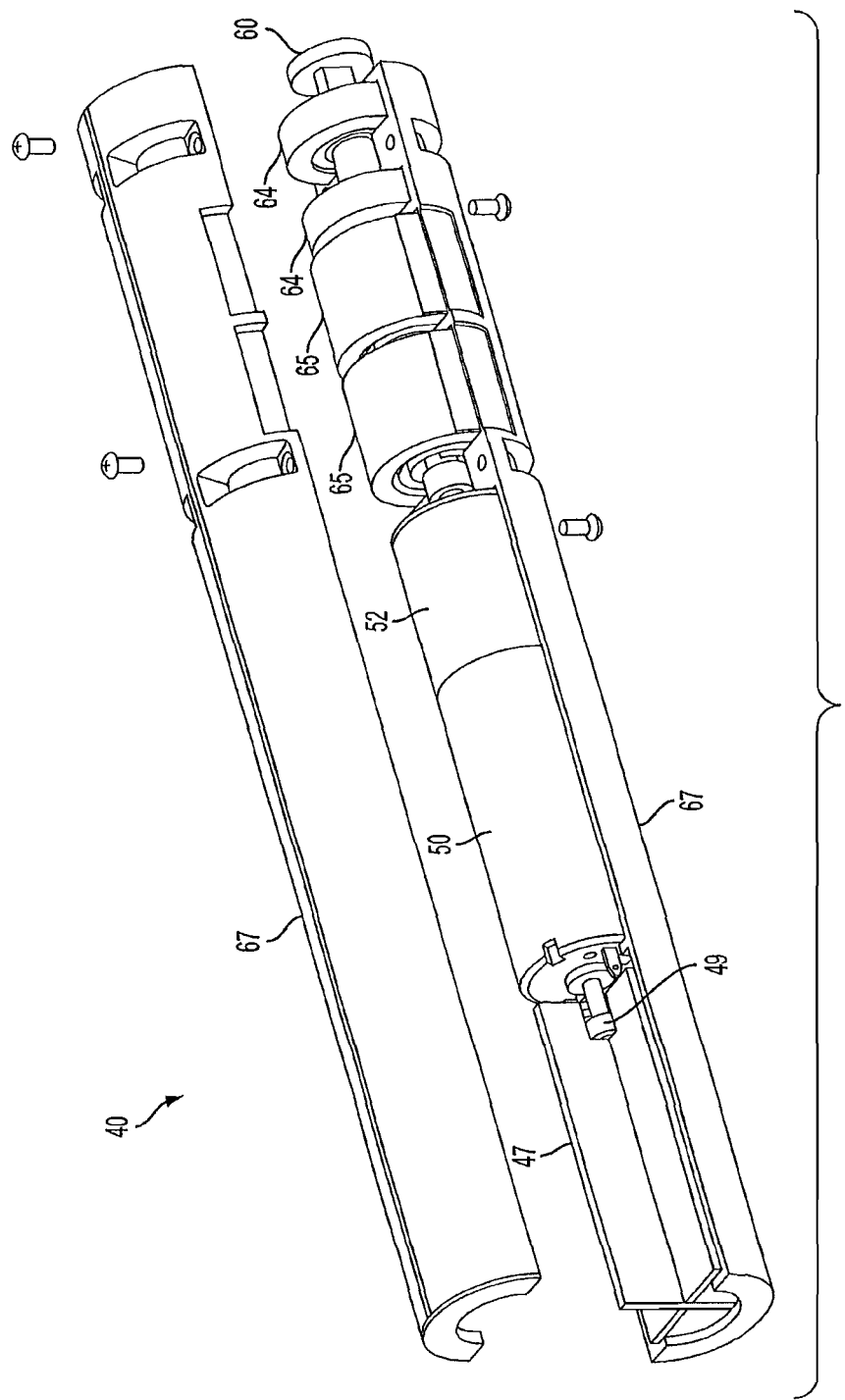

FIGS. 7A and 7B depict exploded, isometric views of a motor/controller unit 40 according to an alternative embodiment of the present invention. In this embodiment, housing 67 contains the major components of the motor/controller unit 40, including DC gear motor 55 (e.g., DC motor 50 and motor gear reducing assembly 52), one or more circuit boards 47 with the supporting circuitry and electronic components described above, and at least one bearing 64. The output shaft 53 of the DC gear motor 55 is fixedly-attached to the support shaft 60, while the inner race of bearing 64 is rotatably-attached support shaft 60. In one counterbalance embodiment, at least one power spring 65 is disposed within housing 67, and is rotatably-attached to support shaft 60. Housing 67 may be formed from two complementary sections, fixed or removably joined by one or more screws, rivets, etc.

Figure 7C:
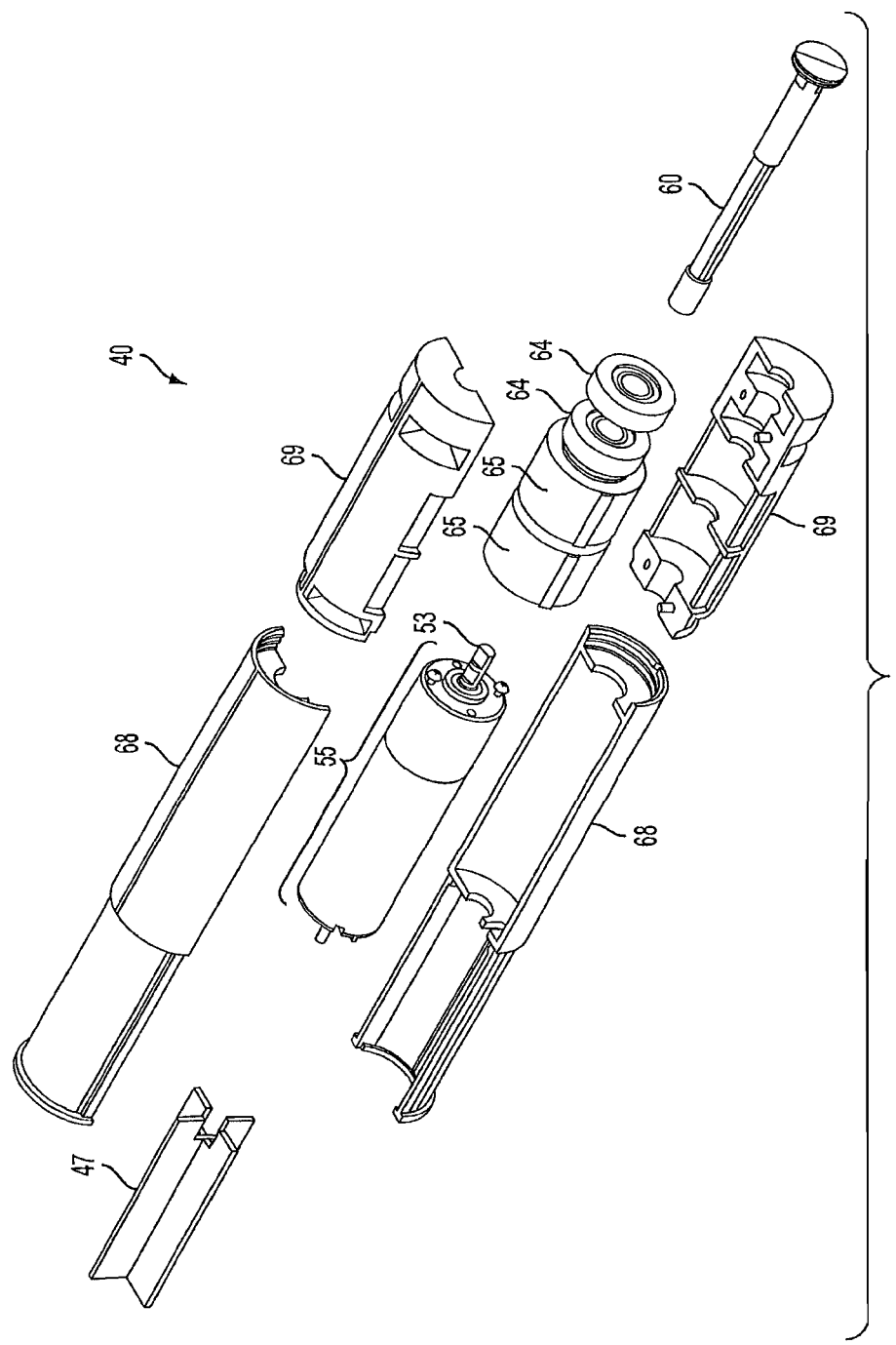

FIGS. 7C, 7D and 7E depict isometric views of a motor/controller unit 40 according to another alternative embodiment of the present invention. In this embodiment, housing 68 contains the DC gear motor 55 (e.g., DC motor 50 and motor gear reducing assembly 52), one or more circuit boards 47 with the supporting circuitry and electronic components described above, while housing 69 includes at least one bearing 64. Housings 68 and 69 may be attachable to one another, either removably or permanently. The output shaft 53 of the DC gear motor 55 is fixedly-attached to the support shaft 60, while the inner race of bearing 64 is rotatably-attached support shaft 60. In one counterbalance embodiment, at least one power spring 65 is disposed within housing 69, and is rotatably-attached to support shaft 60. While the depicted embodiment includes two power springs 65, three (or more) power springs 65 may be used, depending on the counterbalance force required, the available space within shade tube 32, etc. Housings 68 and 69 may be formed from two complementary sections, fixed or removably joined by one or more screws, rivets, etc.

Figure 8A:
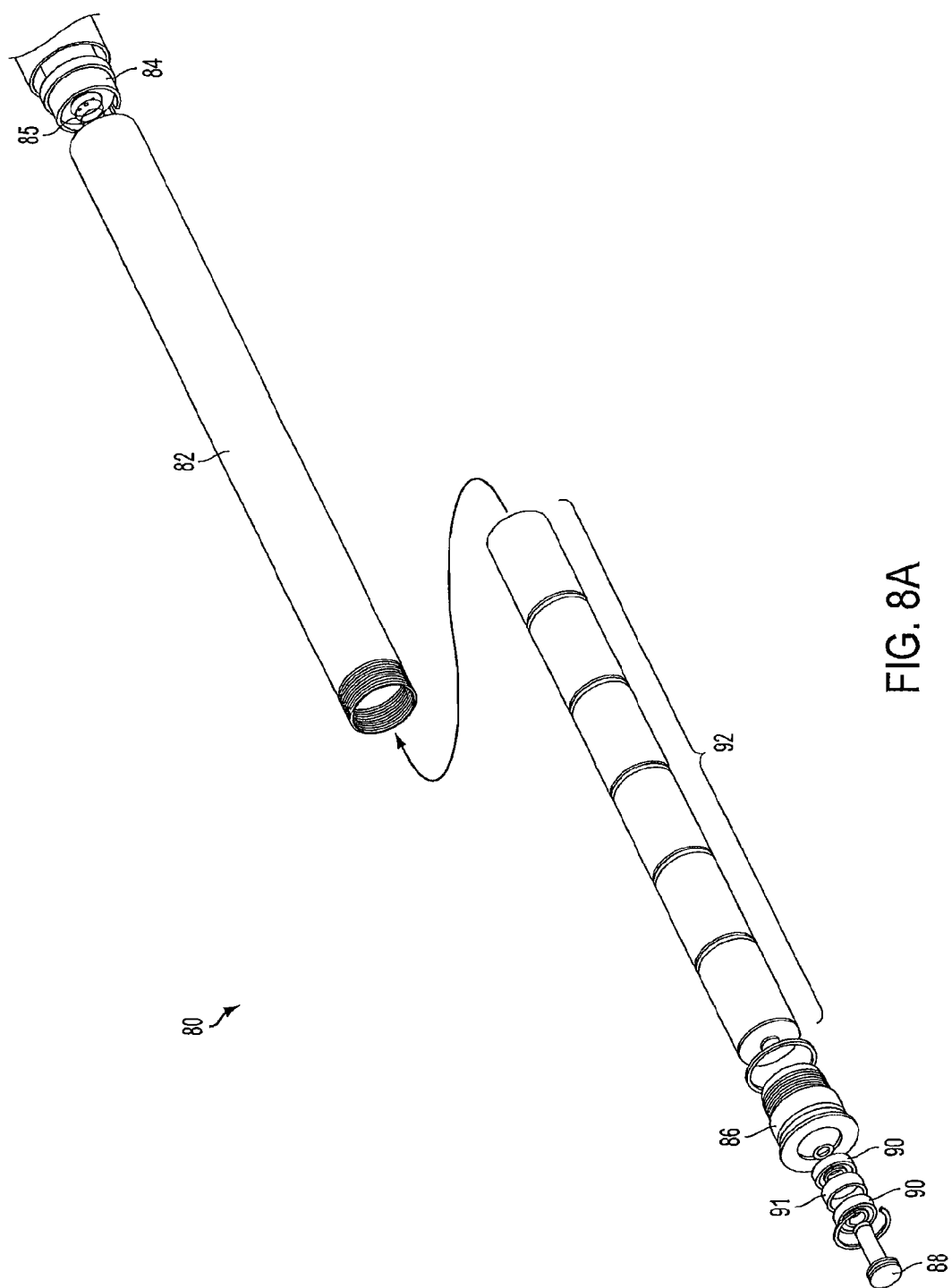
FIG. 8A depicts an exploded, isometric view of the power supply unit depicted in FIGS. 4 and 5.

FIG. 8A depicts an exploded, isometric view of the power supply unit 80 depicted in FIGS. 4 and 5. Generally, the power supply unit 80 includes a battery tube 82, an outer end cap 86, and an inner end cap 84. The outer end cap 86 includes one or more bearings 90 that are rotatably coupled to a support shaft 88. In a preferred embodiment, outer end cap 86 includes two low-friction rolling element bearings, such as, for example, spherical ball bearings, separated by a spacer 91; each outer race is attached to the outer end cap 86, while each inner race is attached to the support shaft 88. Other types of low-friction bearings are also contemplated by the present invention. In one alternative embodiment, bearings 86 are simply bearing surfaces, preferably low-friction bearing surfaces, while in another alternative embodiment, support shaft 88 is fixedly attached to the outer end cap 86, and the external shade support bracket provides the bearing surface for the support shaft 88.

In the depicted embodiment, the outer end cap 86 is removable and the inner cap 84 is fixed. In other embodiments, the inner end cap 84 may be removable and the outer end cap 86 may be fixed, both end caps may be removable, etc. The removable end cap(s) may be threaded, slotted, etc.

The outer end cap 86 also includes a positive terminal that is coupled to the battery tube 82. The inner end cap 84 includes a positive terminal coupled to the battery tube 82, and a negative terminal coupled to a conduction spring 85. When a battery stack 92, including at least one battery, is installed in the battery tube 82, the positive terminal of the outer end cap 86 is electrically coupled to the positive terminal of one of the batteries in the battery stack 92, and the negative terminal of the inner end cap 84 is electrically coupled to the negative terminal of another one of the batteries in the battery stack 92. Of course, the positive and negative terminals may be reversed, so that the conduction spring 85 contacts the positive terminal of one of the batteries in the battery stack 92, etc.

The outer end cap 86 and the inner end cap 84 are mechanically coupled to the inner surface of the shade tube 32. In one embodiment, the outer surface of the mount 84 and the inner surface of the shade tube 32 are smooth, and the mechanical coupling is a press fit, an interference fit, a friction fit, etc. In another embodiment, the outer surface of the mount 84 includes several raised longitudinal protrusions that mate with cooperating longitudinal recesses in the inner surface of the shade tube 32. In this embodiment, the mechanical coupling is keyed; a combination of these methods is also contemplated. Importantly, the frictional resistance should be small enough such that the power supply unit 80 can be removed from the shade tube 32 for inspection, repair and battery replacement.

In a preferred embodiment, the battery stack 92 includes eight D-cell batteries connected in series to produce an average battery stack voltage of $9.6V_{avg}$. Other battery sizes, as well as other DC power sources disposable within battery tube 82, are also contemplated by the present invention.

After the motor/controller unit 40 and power supply unit 80 are built up as subassemblies, final assembly of the motorized roller shade 20 is quite simple. The electrical connector 42 is fitted within the inner cavity of shade tube 32 to a predetermined location; power cables 43 has a length sufficient to permit the remaining sections of the motor/controller unit 40 to remain outside the shade tube 32 until the electrical connector 42 is properly seated. The remaining sections of the motor/controller unit 40 are then fitted within the inner cavity of shade tube 32, such that the bearing housing 58 is approximately flush with the end of the shade tube 32. The power supply unit 80 is then inserted into the opposite end until the positive and negative terminals of the inner end cap 84 engage the terminal 41 of the electrical connector 42. The outer end cap 86 should be approximately flush with end of the shade tube 32.

Figure 8B:
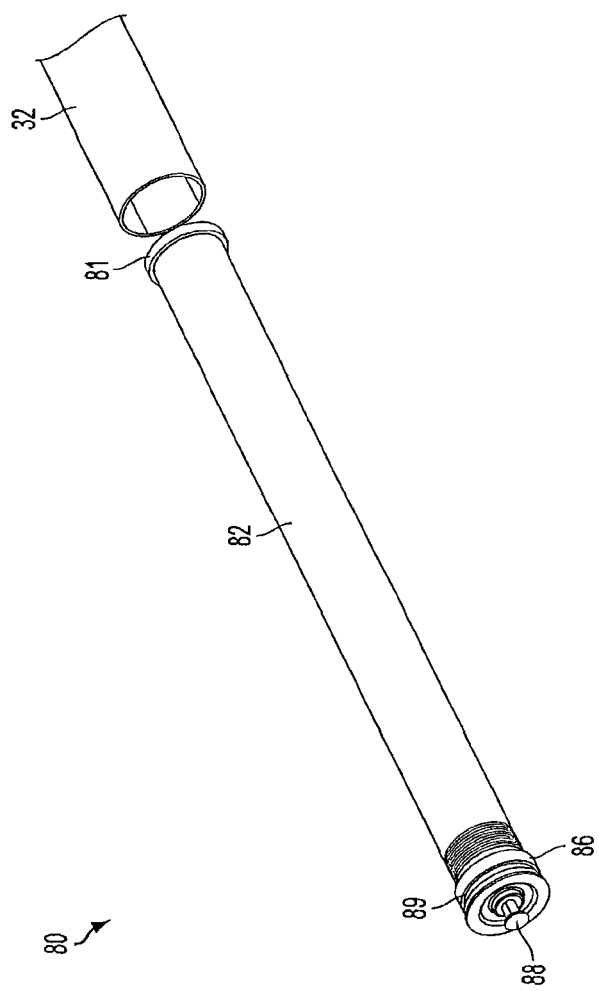
FIG. 8B depicts an exploded, isometric view of a power supply unit according to an alternative embodiment of the present invention.

In the alternative embodiment depicted in FIG. 8B, the outer end cap 86 is mechanically coupled to the inner surface of the shade tube 32 using a press fit, interference fit, an interference member, such as O-ring 89, etc., while the inner end cap 81 is not mechanically coupled to the inner surface of the shade tube 32.

In the alternative embodiment depicted in FIG. 8C, the shade tube 32 functions as the battery tube 82, and the battery stack 92 is simply inserted directly into shade tube 32 until one end of the battery stack 92 abuts the inner end cap 84. The positive terminal of the outer end cap 86 is coupled to the positive terminal of the inner end cap 84 using a wire, foil strip, trace, etc. Of course, the positive and negative terminals may be reversed, so that the respective negative terminals are coupled.

In a further alternative embodiment, the batteries may be mounted outside of the shade tube, and power may be provided to the components located within the shade tube using commutator or slip rings, induction techniques, and the like. Additionally, the external batteries may be replaced by any external source of DC power, such as, for example, an AC/DC power converter, a solar cell, etc.

FIGS. 9A and 9B depict exploded, isometric views of a power supply unit according to an alternative embodiment of the present invention. In this embodiment, power supply unit 80 includes a housing 95 with one or more bearings 90 that are rotatably coupled to a support shaft 88, a power coupling 93 to receive power from an external power source, and positive and negative terminals to engage the electrical connector 42. Power cables 97 (shown in phantom for clarity) extend from the power coupling 93, through a hollow central portion of support shaft 88, to an external DC power source. In a preferred embodiment, housing 95 includes two low-friction rolling element bearings 90, such as, for example, spherical ball bearings; each outer race is attached to the housing 95, while each inner race is attached to the support shaft 88. Other types of low-friction bearings are also contemplated by the present invention. Housing 95 may be formed from two complementary sections, fixed or removably joined by one or more screws, rivets, etc.

In one embodiment, the support shafts 88 are slidingly-attached to the inner race of ball bearings 90 so that the support shafts 88 may be displaced along the rotational axis of the shade tube 32. This adjustability advantageously allows an installer to precisely attach the end of the support shafts 88 to the respective mounting bracket by adjusting the length of the exposed portion of the support shafts 88. In a preferred embodiment, outer end cap 86 and housing 95 may provide approximately 0.5" of longitudinal movement for the support shafts 88. Additionally, mounting brackets 5, 7, 15 and 17 are embossed so that the protruding portion of the mounting bracket will only contact the inner race of bearings 64 and 90 and will not rub against the edge of the shade or the shade tube 32 if the motorized roller shade 20 is installed incorrectly. In a preferred embodiment, the bearings may accommodate up to 0.125" of misalignment due to installation errors without a significant reduction in battery life.

In an alternative embodiment, the microcontroller receives control signals from a wired remote control. These control signals may be provided to the microcontroller in various ways, including, for example, over power cables 97, over additional signal lines that are accommodated by power coupling 93, over additional signal lines that are accommodated by a control signal coupling (not shown in FIGS. 9A,B for clarity), etc.

Further embodiments of the present invention are presented in FIGS. 10-34.

Figure 10:
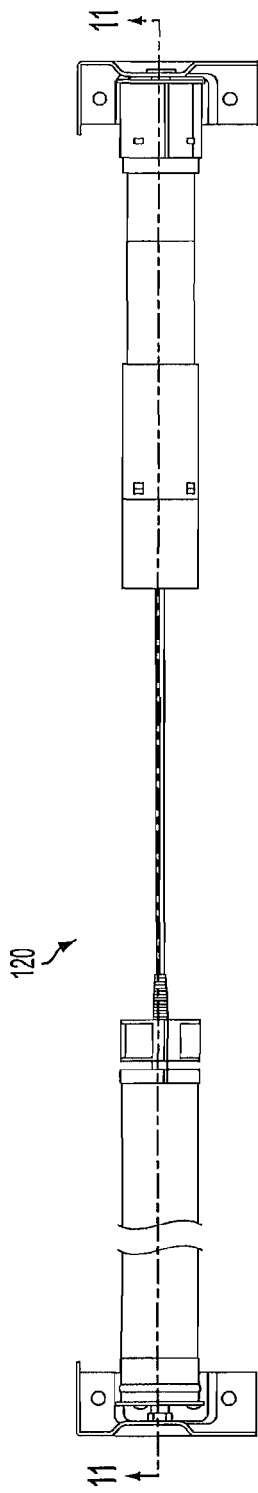
FIG. 10 presents a front view of a motorized roller shade, according to an embodiment of the present invention.
Figure 11:
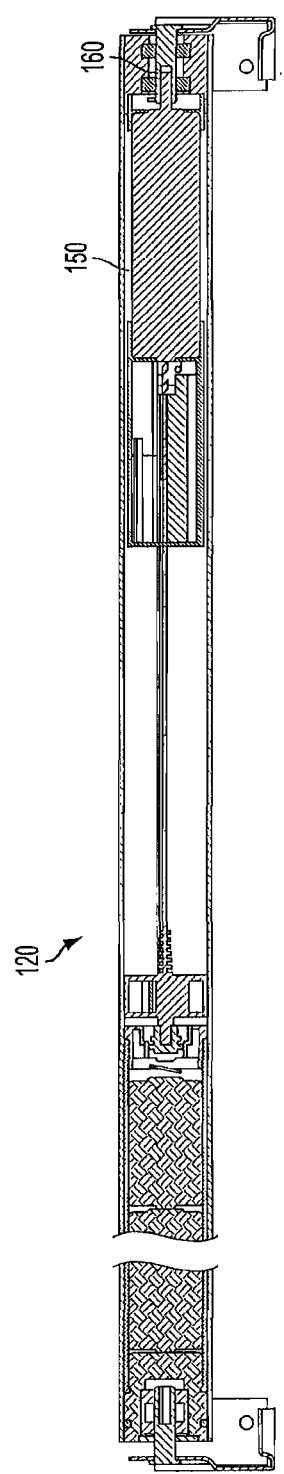
FIG. 11 presents a sectional view along the longitudinal axis of the motorized roller shade depicted in FIG. 10.

FIGS. 10 and 11 depict an alternative embodiment of the present invention without counterbalancing. FIG. 10 presents a front view of a motorized roller shade 120, while FIG. 11 presents a sectional view along the longitudinal axis of the motorized roller shade 120. In this embodiment, the output shaft of the DC gear motor 150 is attached directly to the support shaft 160, and an intermediate shaft is not included. Advantageously, the one or both of the mounting brackets may function as an antenna.

Figure 12:
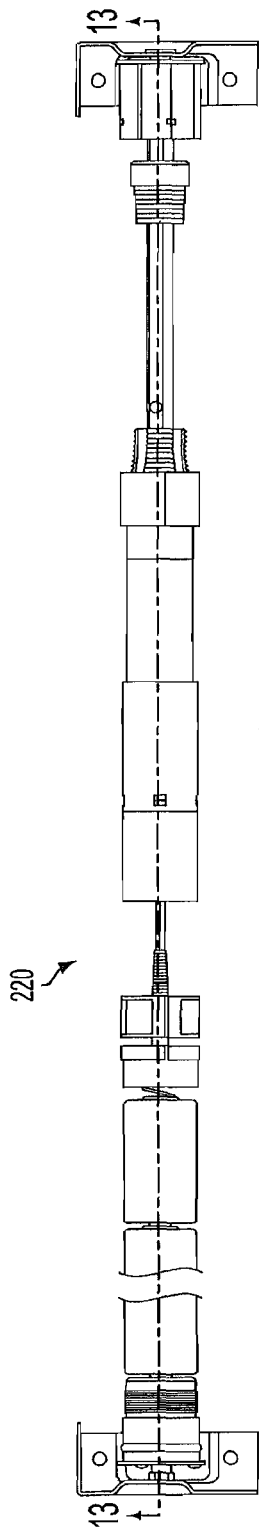
FIG. 12 presents a front view of a motorized roller shade, according to an embodiment of the present invention.
Figure 13:
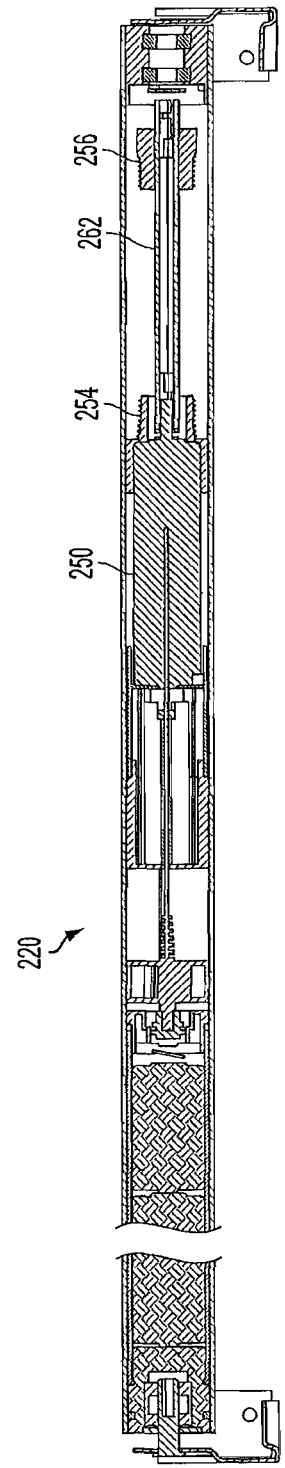
FIG. 13 presents a sectional view along the longitudinal axis of the motorized roller shade depicted in FIG. 12.

FIGS. 12 and 13 depict an alternative embodiment of the present invention with counterbalancing. FIG. 12 presents a front view of a motorized roller shade 220, while FIG. 13 presents a sectional view along the longitudinal axis of the motorized roller shade 220. In this embodiment, the output shaft of the DC gear motor 250 is attached to the intermediate shaft 262, and a counterbalance spring (not shown for clarity) couples rotating perch 254 to fixed perch 256.

Figure 14:
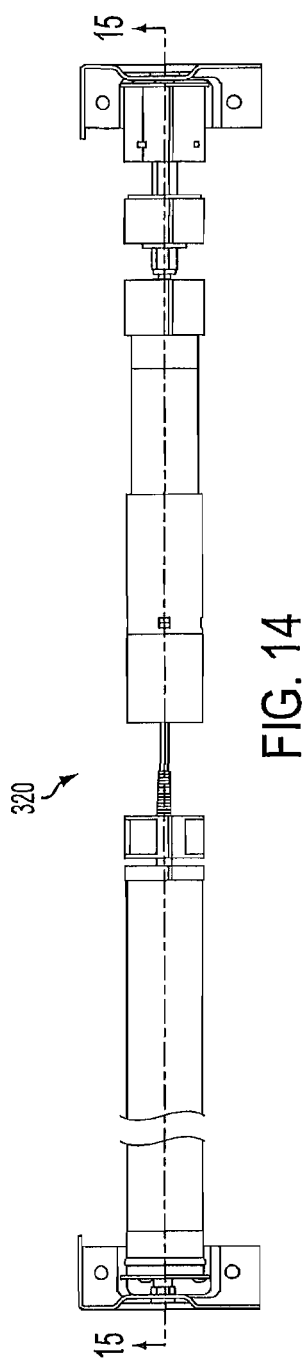
FIG. 14 presents a front view of a motorized roller shade, according to an embodiment of the present invention.
Figure 15:
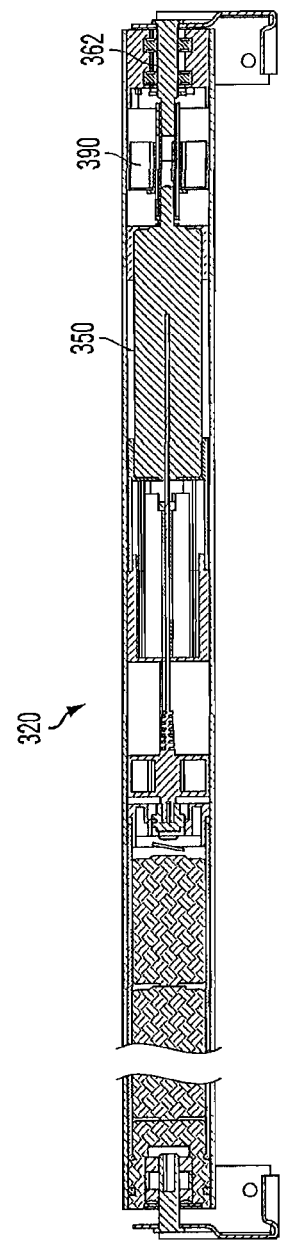
FIG. 15 presents a sectional view along the longitudinal axis of the motorized roller shade depicted in FIG. 14.

FIGS. 14 and 15 depict an alternative embodiment of the present invention with counterbalancing; FIG. 14 presents a front view of a motorized roller shade 320, while FIG. 15 presents a sectional view along the longitudinal axis of the motorized roller shade 320. In this embodiment, the output shaft of the DC gear motor 350 is attached to the intermediate shaft 362. A power spring 390 couples the intermediate shaft 362 to the inner surface of the shade tube 332.

Figure 16:
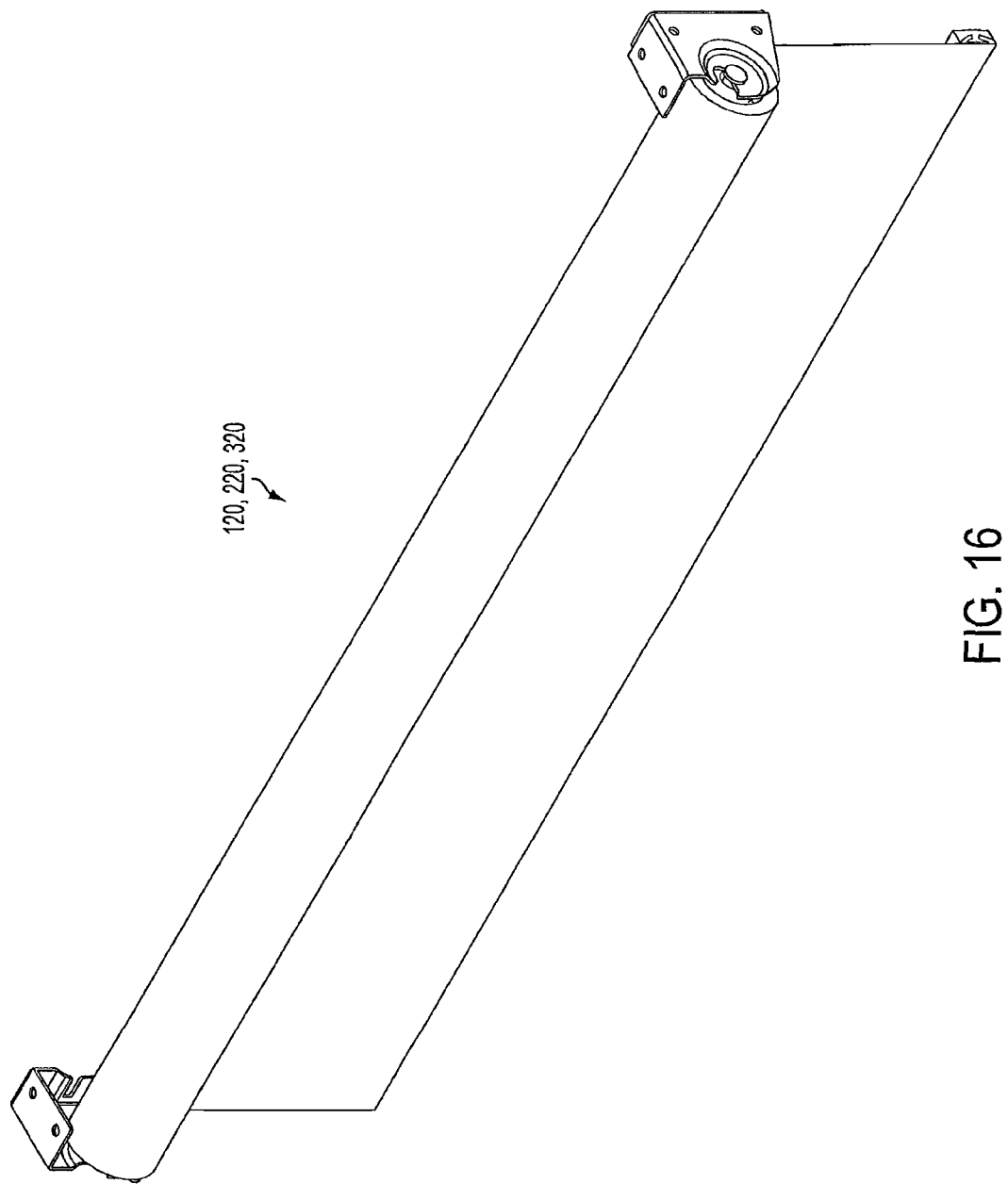
FIG. 16 presents an isometric view of a motorized roller shade assembly in accordance with the embodiments depicted in FIGS. 10-15.

FIG. 16 presents an isometric view of a motorized roller shade 120, 220, 320, etc., in accordance with the embodiments depicted in FIGS. 10-15 and 17-34.

Figure 17:
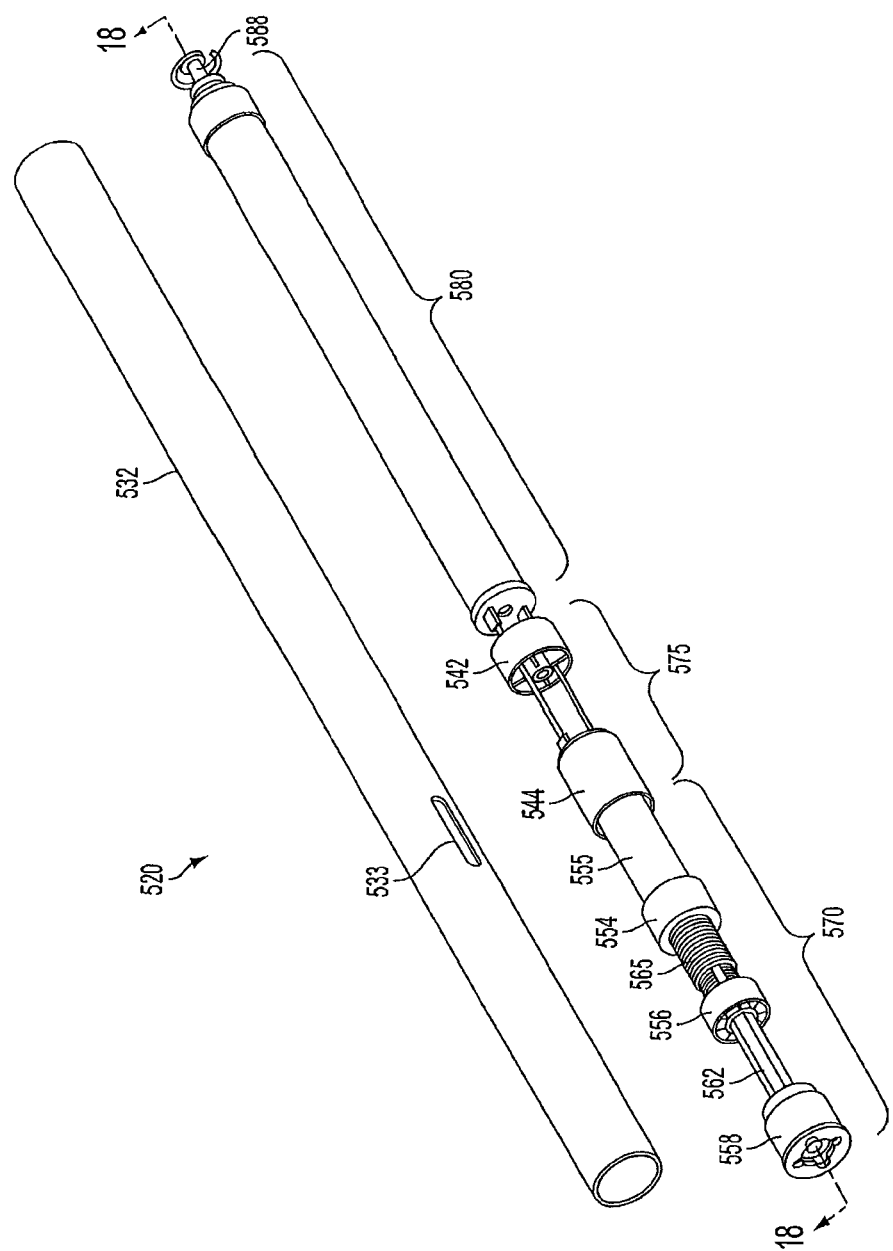
FIG. 17 presents a partially-exploded, isometric view of a motorized roller shade with counterbalancing, according to an embodiment of the present invention.
Figure 18:
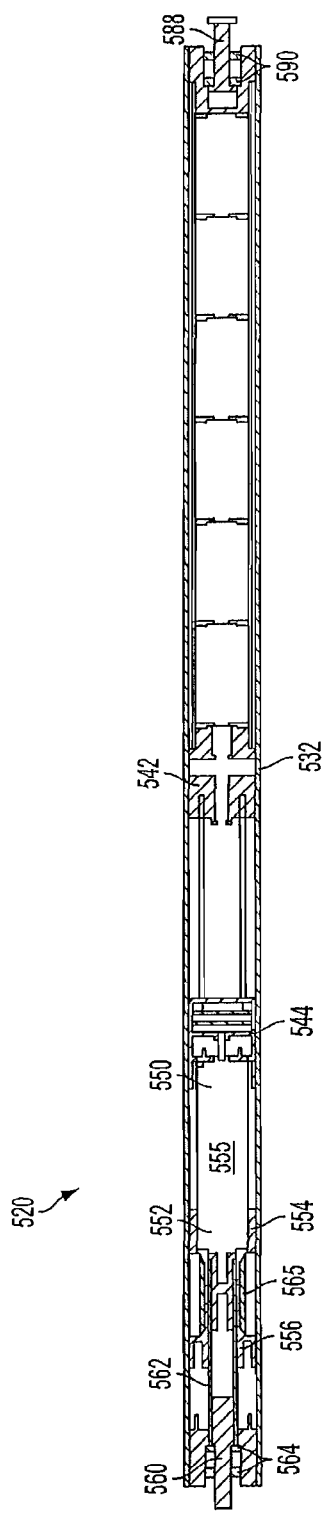
FIG. 18 presents a sectional view along the longitudinal axis of the embodiment depicted in FIG. 17.

FIGS. 17 and 18 depict an embodiment of the present invention, with counterbalancing, that is substantially the same as the embodiment depicted in FIGS. 4, 5, 6, 8A, 8B, and 8C, but reversed in orientation. FIG. 17 presents a partially-exploded, isometric view of a motorized roller shade 520, while FIG. 18 presents a sectional view along the longitudinal axis. Motorized roller shade 520 includes shade tube 532 with an optional slot 533 to facilitate wireless signal transmission, a motor unit 570, a controller unit 575 and a power supply unit 580. Generally, the motor unit 570 includes a DC gear motor 555 with a DC motor 550 and an integral motor gear reducing assembly 552, a mount or rotating perch 554 for the DC gear motor 555, and an end cap 558 housing one or more bearings 564, while the controller unit 575 includes an electrical power connector 542 and a circuit board housing 544; power supply unit 580 includes the battery stack and one or more bearings 590. The output shaft of the DC gear motor 555 is mechanically coupled to the fixed support shaft 560 through the intermediate support shaft 562, and a counterbalance spring 565 couples rotating perch 554 to fixed perch 556. Accordingly, during operation, the output shaft of the DC gear motor 555 remains stationary, while the housing of the DC gear motor 555 rotates with the shade tube 532. Bearings 564 are rotationally-coupled to support shaft 560, while bearings 590 are rotationally-coupled to support shaft 588.

Figure 19:
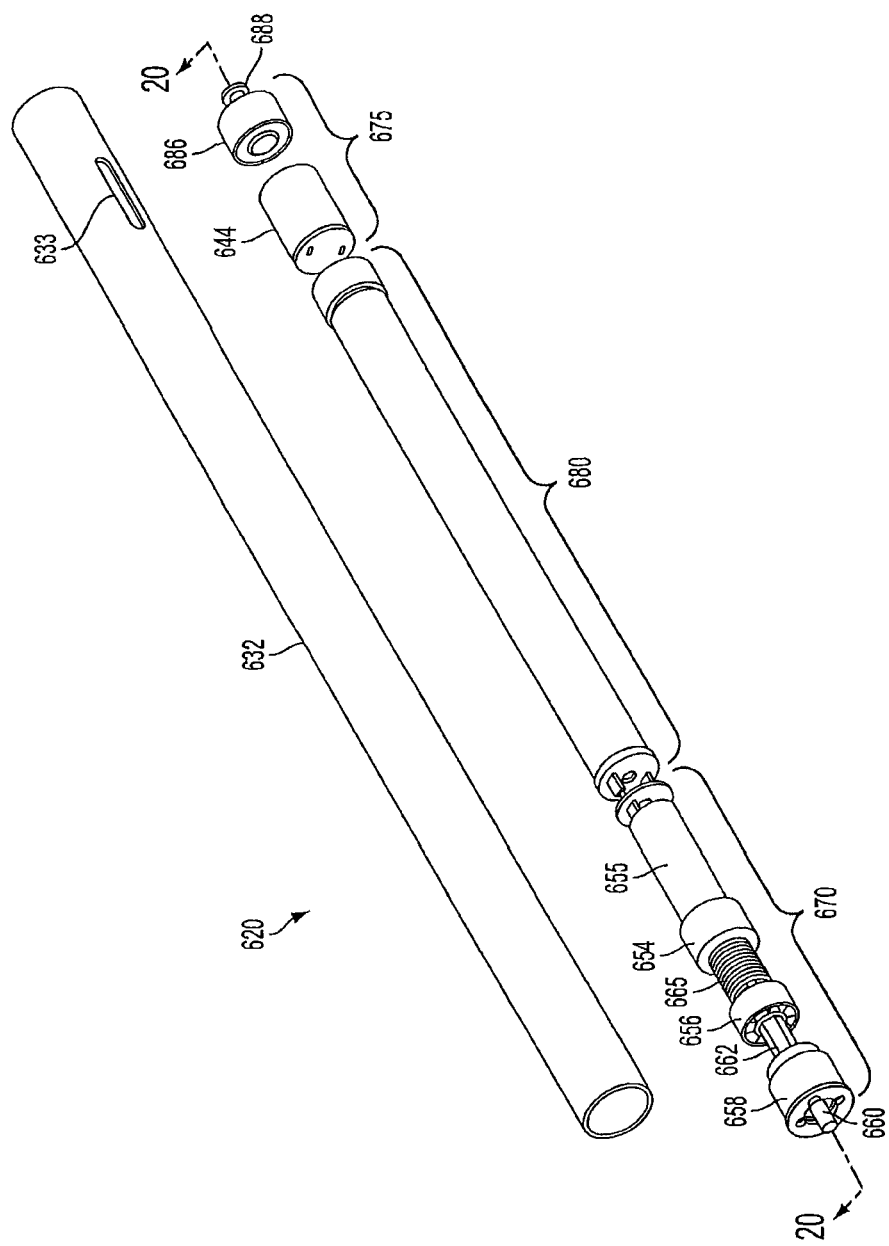
FIG. 19 presents a partially-exploded, isometric view of a motorized roller shade with counterbalancing, according to an embodiment of the present invention.
Figure 20:
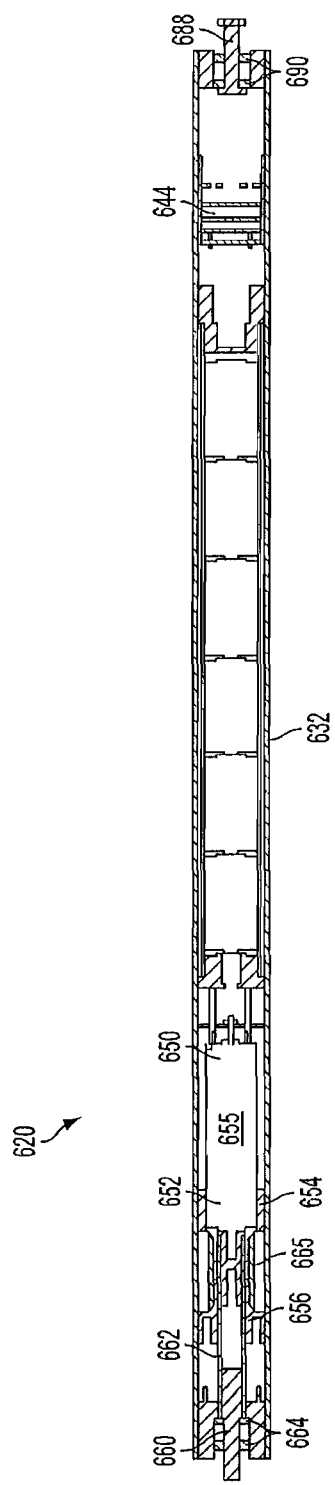
FIG. 20 presents a sectional view along the longitudinal axis of the embodiment depicted in FIG. 19.

FIGS. 19 and 20 depict an embodiment of the present invention, with counterbalancing, that is similar to the embodiment depicted in FIGS. 17 and 18. FIG. 19 presents a partially-exploded, isometric view of a motorized roller shade 620, while FIG. 20 presents a sectional view along the longitudinal axis. Motorized roller shade 620 includes shade tube 632 with a slot 633 to facilitate wireless signal transmission, a motor unit 670, a controller unit 675 and a power supply unit 680. Generally, the motor unit 670 includes a DC gear motor 655 with a DC motor 650 and an integral motor gear reducing assembly 652, a mount or rotating perch 654 for the DC gear motor 655, and an end cap 658 housing one or more bearings 664, while the controller unit 675 includes a circuit board housing 644 and an end cap 686 housing bearings 690. The output shaft of the DC gear motor 655 is mechanically coupled to the fixed support shaft 660 through the intermediate support shaft 662, and a counterbalance spring 665 couples rotating perch 654 to fixed perch 656. Accordingly, during operation, the output shaft of the DC gear motor 655 remains stationary, while the housing of the DC gear motor 655 rotates with the shade tube 632. Bearings 664 are rotationally-coupled to support shaft 660, while bearings 690 are rotationally-coupled to support shaft 688.

Figure 21:
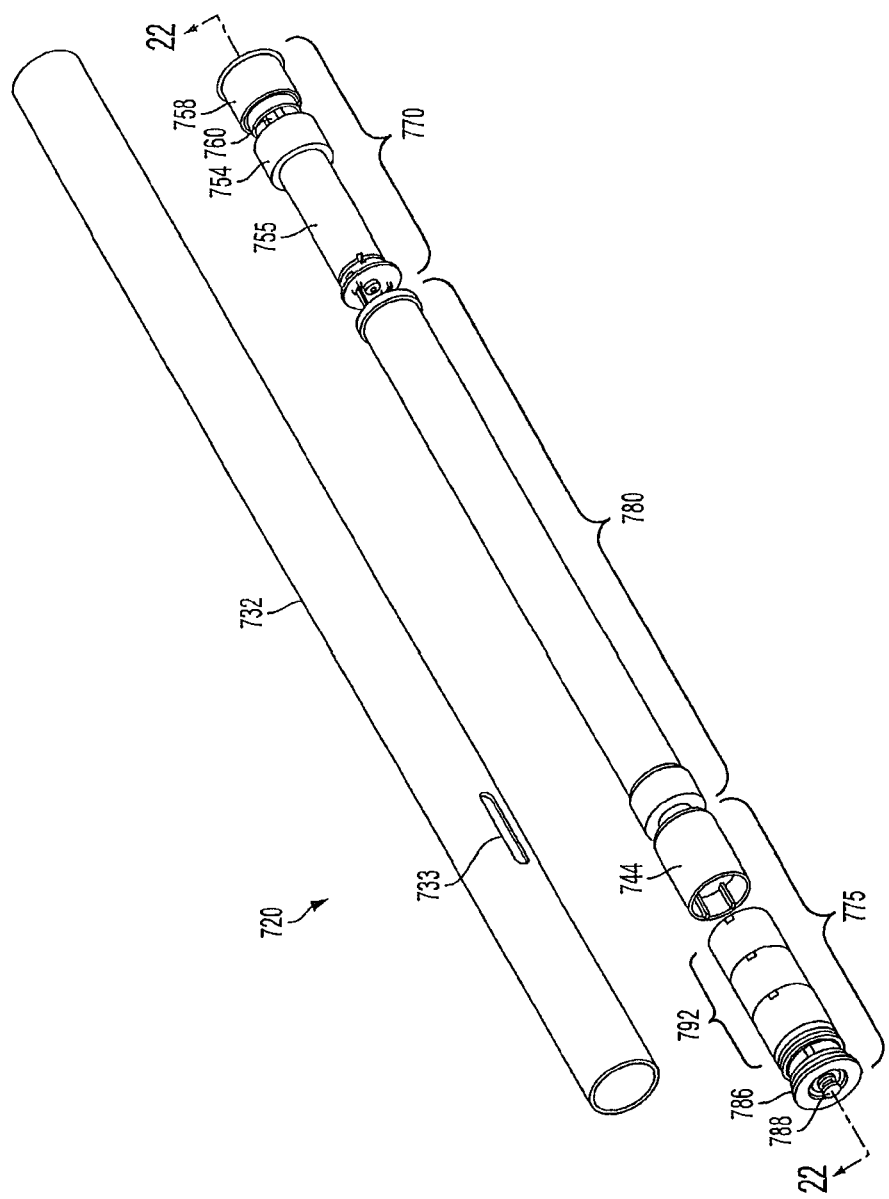
FIG. 21 presents a partially-exploded, isometric view of a motorized roller shade with counterbalancing, according to an embodiment of the present invention.
Figure 22:
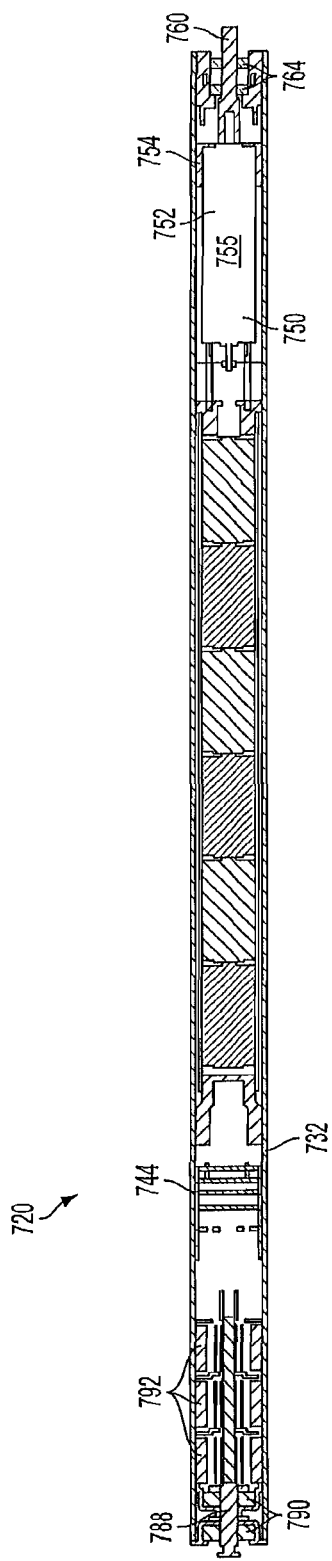
FIG. 22 presents a sectional view along the longitudinal axis of the embodiment depicted in FIG. 21.

FIGS. 21 and 22 depict an embodiment of the present invention with counterbalancing. FIG. 21 presents a partially-exploded, isometric view of a motorized roller shade 720, while FIG. 22 presents a sectional view along the longitudinal axis. Motorized roller shade 720 includes shade tube 732 with a slot 733 to facilitate wireless signal transmission, a motor unit 770, a controller unit 775 and a power supply unit 780. Generally, the motor unit 770 includes a DC gear motor 755 with a DC motor 750 and an integral motor gear reducing assembly 752, a mount 754 for the DC gear motor, and an end cap 758 housing one or more bearings 764, while the controller unit 775 includes a circuit board housing 744, one or more power springs 792 (three are depicted), and an end cap 786 housing one or more bearings 790. The power springs 792 are coupled to the fixed support shaft 788 and the inner surface of the shade tube 732, or, alternatively, the circuit board housing 744. The output shaft of the DC gear motor 755 is mechanically coupled to the fixed support shaft 760. Accordingly, during operation, the output shaft of the DC gear motor 755 remains stationary, while the housing of the DC gear motor 755, the controller unit 775 and the power supply unit 780 rotate with the shade tube 732. Bearings 764 are rotationally-coupled to support shaft 760, while bearings 790 are rotationally-coupled to support shaft 788.

Figure 23:
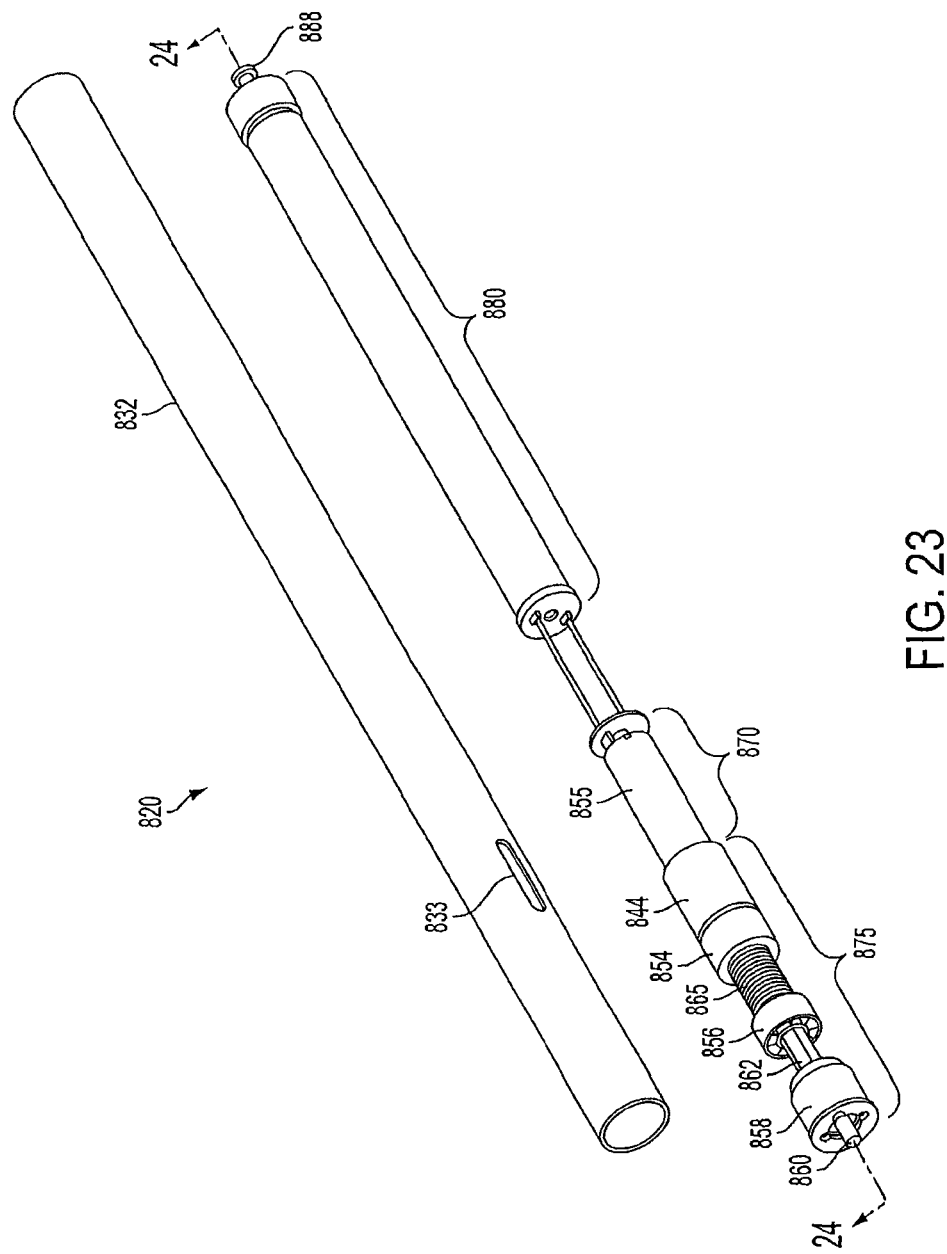
FIG. 23 presents a partially-exploded, isometric view of a motorized roller shade with counterbalancing, according to an embodiment of the present invention.
Figure 24:
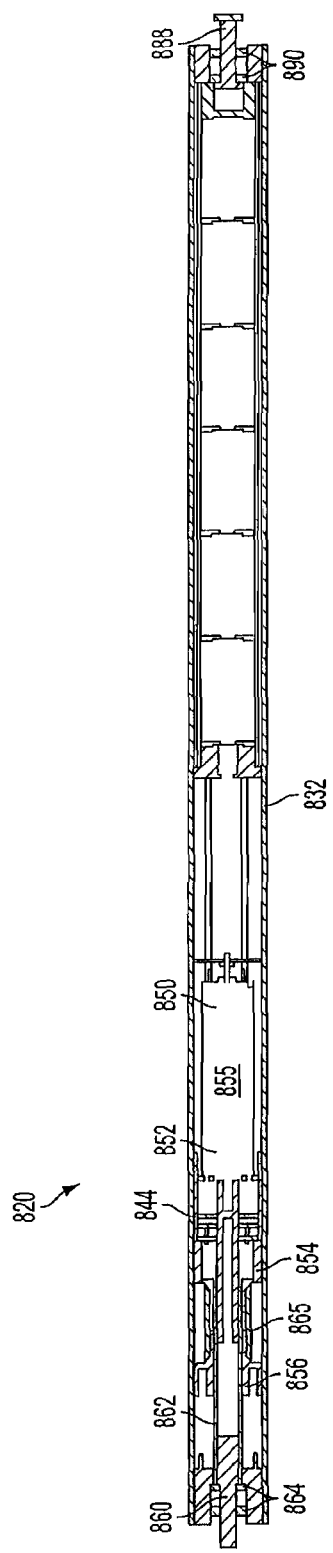
FIG. 24 presents a sectional view along the longitudinal axis of the embodiment depicted in FIG. 23.

FIGS. 23 and 24 depict an embodiment of the present invention, with counterbalancing, that is similar to the embodiment depicted in FIGS. 17 and 18. FIG. 23 presents a partially-exploded, isometric view of a motorized roller shade 820, while FIG. 24 presents a sectional view along the longitudinal axis. Motorized roller shade 820 includes shade tube 832 with a slot 833 to facilitate wireless signal transmission, a motor unit 870, a controller unit 875 and a power supply unit 880. Generally, the motor unit 870 includes a DC gear motor 855 with a DC motor 850 and an integral motor gear reducing assembly 852, while the controller unit 875 includes a circuit board housing 844, a mount or rotating perch 854, and an end cap 858 housing one or more bearings 864; power supply unit 880 includes the battery stack and one or more bearings 890. The output shaft of the DC gear motor 855 is mechanically coupled to the fixed support shaft 860 through the intermediate support shaft 862, and a counterbalance spring 865 couples rotating perch 854 to fixed perch 856. Accordingly, during operation, the output shaft of the DC gear motor 855 remains stationary, while the housing of the DC gear motor 855 rotates with the shade tube 832. Bearings 864 are rotationally-coupled to support shaft 860, while bearings 890 are rotationally-coupled to support shaft 888.

Figure 25:
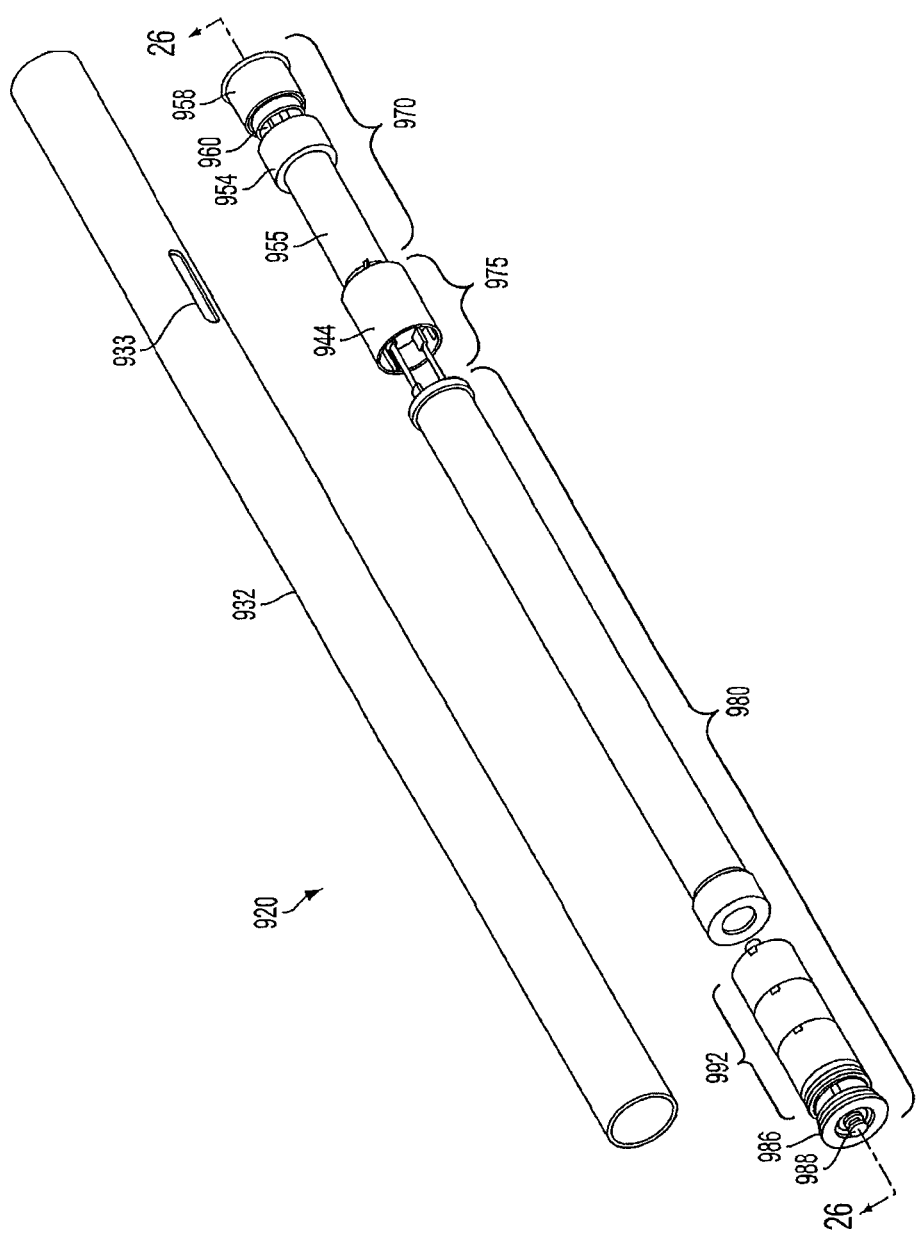
FIG. 25 presents a partially-exploded, isometric view of a motorized roller shade with counterbalancing, according to an embodiment of the present invention.
Figure 26:
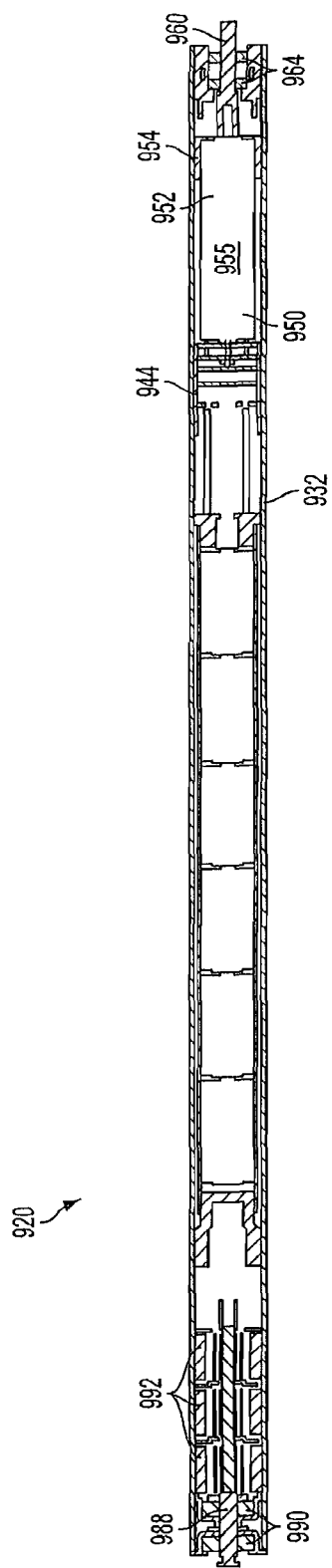
FIG. 26 presents a sectional view along the longitudinal axis of the embodiment depicted in FIG. 25.

FIGS. 25 and 26 depict one preferred embodiment of the present invention with counterbalancing. FIG. 25 presents a partially-exploded, isometric view of a motorized roller shade 920, while FIG. 26 presents a sectional view along the longitudinal axis. Motorized roller shade 920 includes shade tube 932 with a slot 933 to facilitate wireless signal transmission, a motor unit 970, a controller unit 975 and a power supply unit 980. Generally, the motor unit 970 includes a DC gear motor 955 with a DC motor 950 and an integral motor gear reducing assembly 952, a mount 954 for the DC gear motor, and an end cap 958 housing one or more bearings 964, while the controller unit 975 includes a circuit board housing 944. The power unit 980 includes the battery stack, one or more power springs 992 (three are depicted) and an end cap 986 housing one or more bearings 990. The power springs 992 are coupled to the fixed support shaft 988 and the inner surface of the shade tube 932 (as depicted), or, alternatively, to the battery stack. The output shaft of the DC gear motor 955 is mechanically coupled to the fixed support shaft 960. Accordingly, during operation, the output shaft of the DC gear motor 955 remains stationary, while the housing of the DC gear motor 955, the controller unit 975 and the power supply unit 980 rotate with the shade tube 932. Bearings 964 are rotationally-coupled to support shaft 960, while bearings 990 are rotationally-coupled to support shaft 988.

Alternative embodiments of the present invention are depicted in FIGS. 27-34. In contrast to the embodiments depicted in FIGS. 1-26, the output shaft of the DC gear motor is not mechanically coupled to the fixed support shaft. Instead, in these alternative embodiments, the output shaft of the DC gear motor is mechanically coupled to the shade tube, and the housing of the DC gear motor is mechanically coupled to one of the fixed support shafts, so that the housing of the DC gear motor remains stationary while the output shaft rotates with the shade tube.

Figure 27:
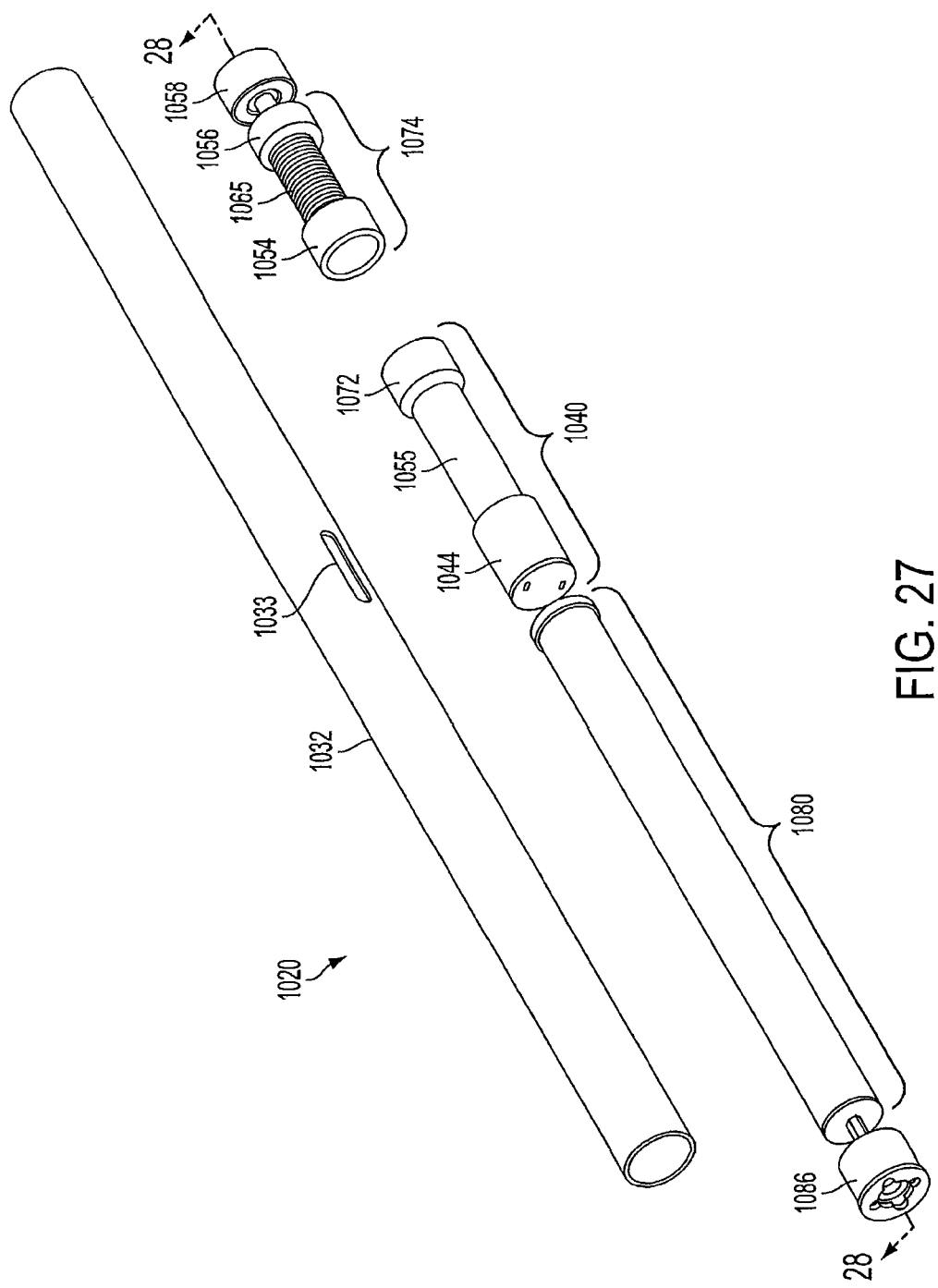
FIG. 27 presents a partially-exploded, isometric view of a motorized roller shade with counterbalancing, according to an alternative embodiment of the present invention.
Figure 28:
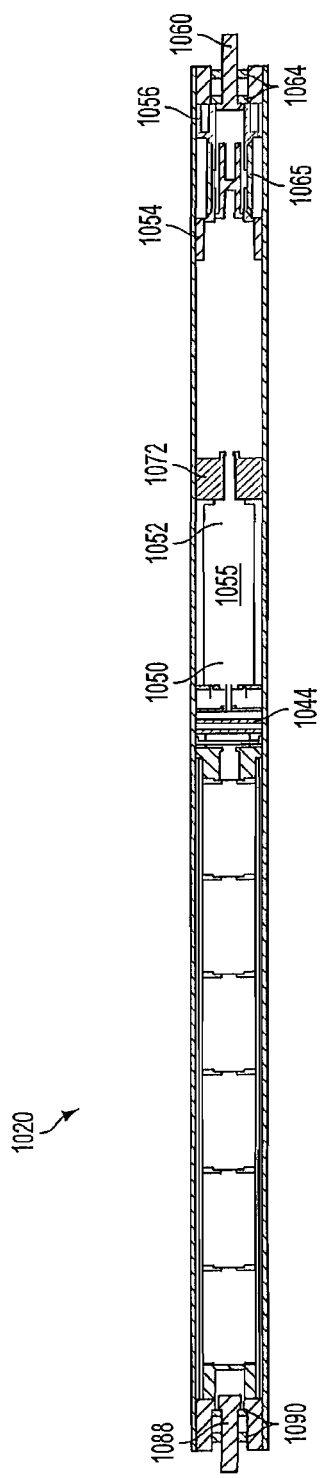
FIG. 28 presents a sectional view along the longitudinal axis of the embodiment depicted in FIG. 27.

FIGS. 27 and 28 depict an alternative embodiment of the present invention with counterbalancing. FIG. 27 presents a partially-exploded, isometric view of a motorized roller shade 1020, while FIG. 28 presents a sectional view along the longitudinal axis. Motorized roller shade 1020 includes shade tube 1032 with a slot 1033 to facilitate wireless signal transmission, a motor/controller unit 1040, a counterbalancing unit 1074 and a power supply unit 1080. Generally, the motor/controller unit 1040 includes a DC gear motor 1055 with a DC motor 1050 and an integral motor gear reducing assembly 1052, a circuit board housing 1044 and a torque transfer coupling 1072 attached to the output shaft of the DC gear motor 1055 and the shade tube 1032. The counterbalancing unit 1074 includes a rotating perch 1054 mechanically coupled to the shade tube 32, a fixed perch 1056 attached to the fixed support shaft 1060, and a counterbalance spring 1065 that couples the rotating perch 1054 to the fixed perch 1056. End cap 1058, housing one or more bearings 1064, and end cap 1086, housing one or more bearings 1090, are also attached to the shade tube 1032. The power supply unit 1080 includes the battery stack, and is attached to the fixed support shaft 1088. Importantly, the power supply unit 1080 is also attached to the motor/controller unit 1040. Accordingly, during operation, the output shaft of the DC gear motor 1055 rotates with the shade tube 1032, while both the motor/controller unit 1040 and power supply unit 1080 remain stationary. Bearings 1064 are rotationally-coupled to support shaft 1060, while bearings 1090 are rotationally-coupled to support shaft 1088.

Figure 29:
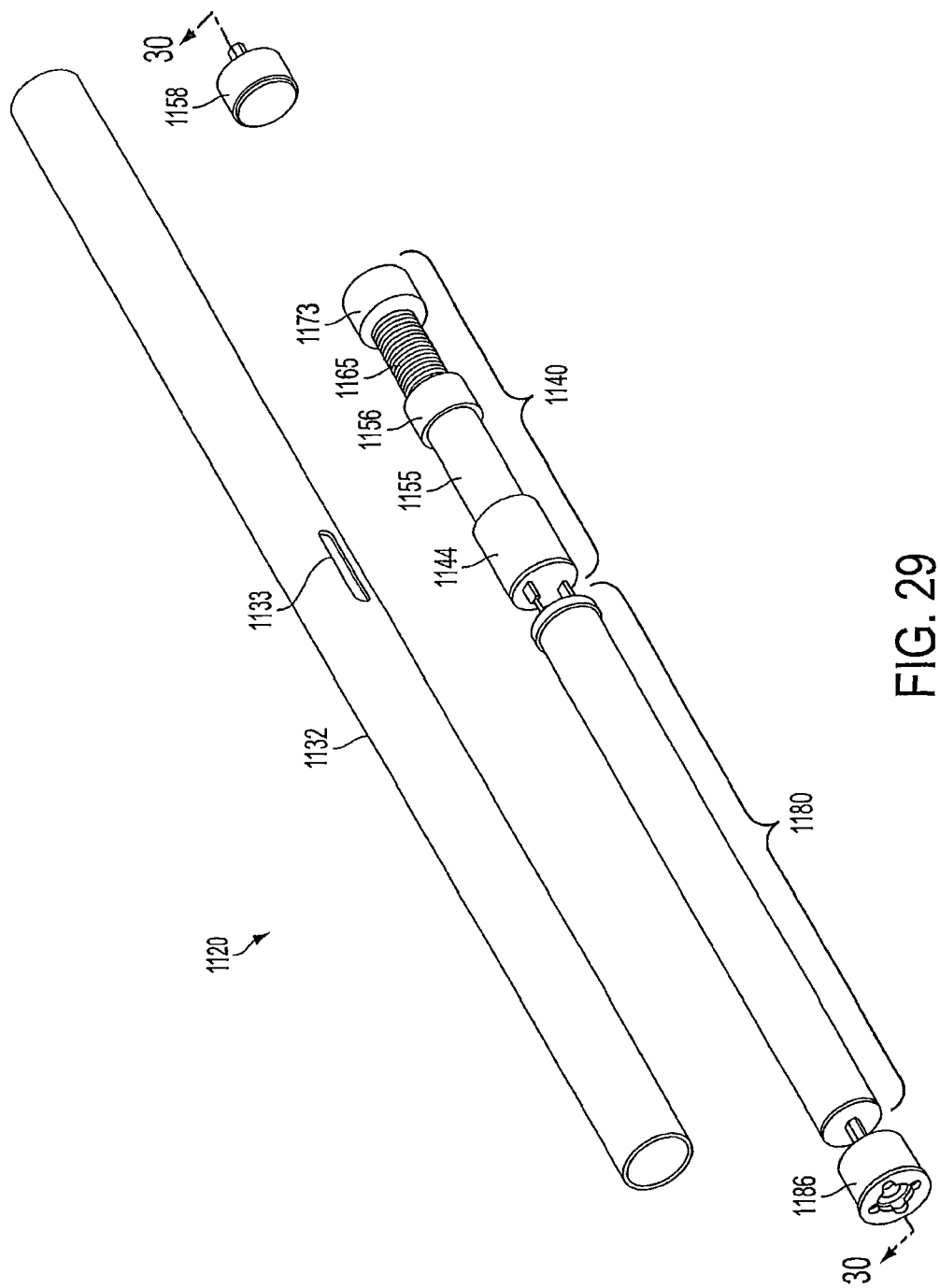
FIG. 29 presents a partially-exploded, isometric view of a motorized roller shade with counterbalancing, according to an alternative embodiment of the present invention.
Figure 30:
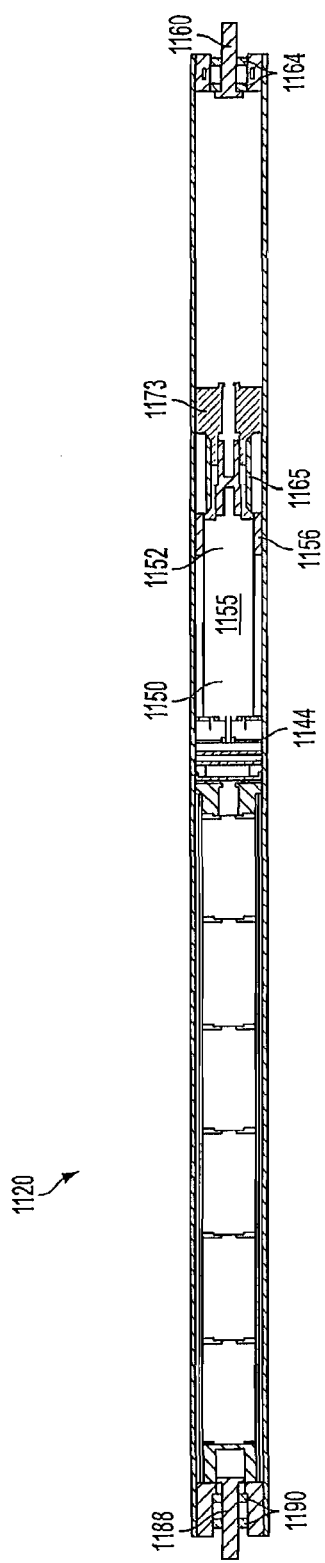
FIG. 30 presents a sectional view along the longitudinal axis of the embodiment depicted in FIG. 29.

FIGS. 29 and 30 depict an alternative embodiment of the present invention with counterbalancing. FIG. 29 presents a partially-exploded, isometric view of a motorized roller shade 1120, while FIG. 30 presents a sectional view along the longitudinal axis. Motorized roller shade 1120 includes a shade tube 1132 with a slot 1133 to facilitate wireless signal transmission, a motor/controller unit 1140, and a power supply unit 1180. Generally, the motor/controller unit 1140 includes a DC gear motor 1155 with a DC motor 1150 and an integral motor gear reducing assembly 1152, a circuit board housing 1144, a torque transfer coupling 1173 that is attached to the output shaft of the DC gear motor 1155 and the shade tube 1132, and that also functions as a rotating perch, a fixed perch 1156 attached to the DC gear motor 1155, and a counterbalance spring 1165 that couples the rotating perch/torque transfer coupling 1173 to the fixed perch 1156. End cap 1158, housing one or more bearings 1164, and end cap 1186, housing one or more bearings 1190, are also attached to the shade tube 1132. The power supply unit 1180 includes the battery stack, and is attached to the fixed support shaft 1188. Importantly, the power supply unit 1180 is also attached to the motor/controller unit 1140. Accordingly, during operation, the output shaft of the DC gear motor 1155 rotates with the shade tube 1132, while both the motor/controller unit 1140 and power supply unit 1180 remain stationary. Bearings 1164 are rotationally-coupled to support shaft 1160, while bearings 1190 are rotationally-coupled to support shaft 1188.

Figure 31:
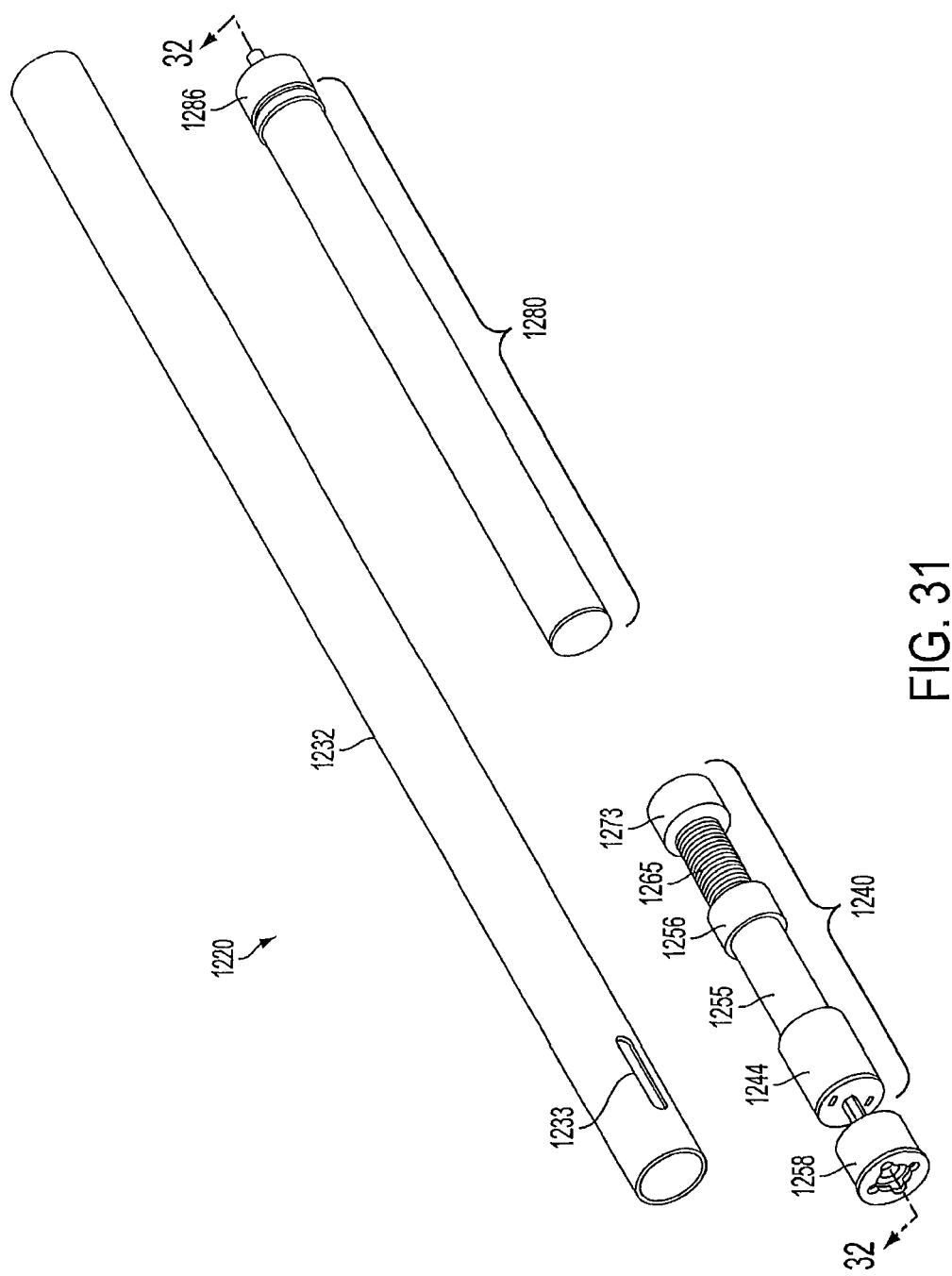
FIG. 31 presents a partially-exploded, isometric view of a motorized roller shade with counterbalancing, according to an alternative embodiment of the present invention.
Figure 32:
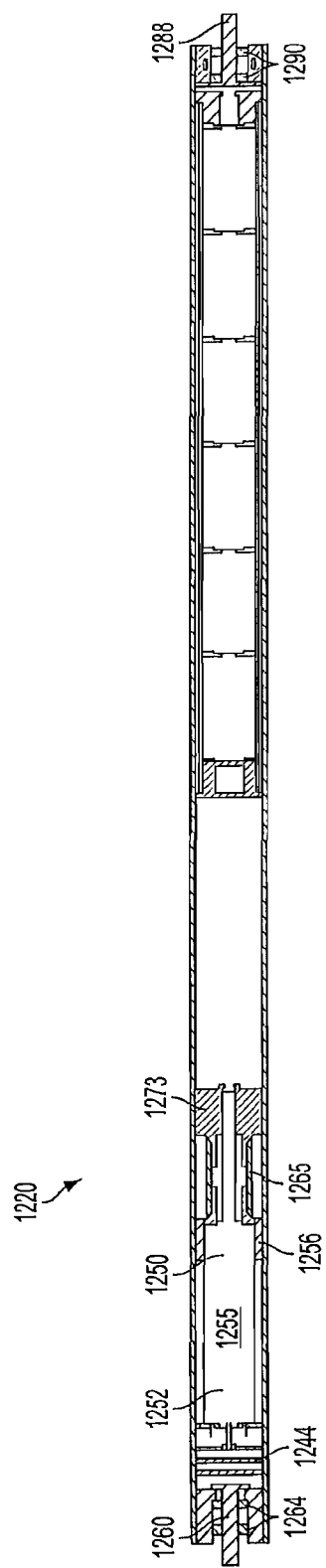
FIG. 32 presents a sectional view along the longitudinal axis of the embodiment depicted in FIG. 31.

FIGS. 31 and 32 depict an alternative embodiment of the present invention with counterbalancing. FIG. 31 presents a partially-exploded, isometric view of a motorized roller shade 1220, while FIG. 32 presents a sectional view along the longitudinal axis. Motorized roller shade 1220 includes a shade tube 1232 with a slot 1233 to facilitate wireless signal transmission, a motor/controller unit 1240, and a power supply unit 1280. Generally, the motor/controller unit 1240 includes a DC gear motor 1255 with a DC motor 1250 and an integral motor gear reducing assembly 1252, a circuit board housing 1244 attached to the fixed support shaft 1260, a torque transfer coupling 1273 that is attached to the output shaft of the DC gear motor 1255 and the shade tube 1232, and that also functions as a rotating perch, a fixed perch 1256 attached to the DC gear motor 1255, and a counterbalance spring 1265 that couples the rotating perch/torque transfer coupling 1273 to the fixed perch 1256. End cap 1258, housing one or more bearings 1264, and end cap 1286, housing one or more bearings 1290, are also attached to the shade tube 1232. The power supply unit 1280 includes the battery stack, and is attached to the shade tube 1232; the fixed support shaft 1288 is free-floating. Accordingly, during operation, the output shaft of the DC gear motor 1255, as well as the power supply unit 1280, rotates with the shade tube 1232, while the motor/controller unit 1240 remains stationary. Bearings 1264 are rotationally-coupled to support shaft 1260, while bearings 1290 are rotationally-coupled to support shaft 1288.

Figure 33:
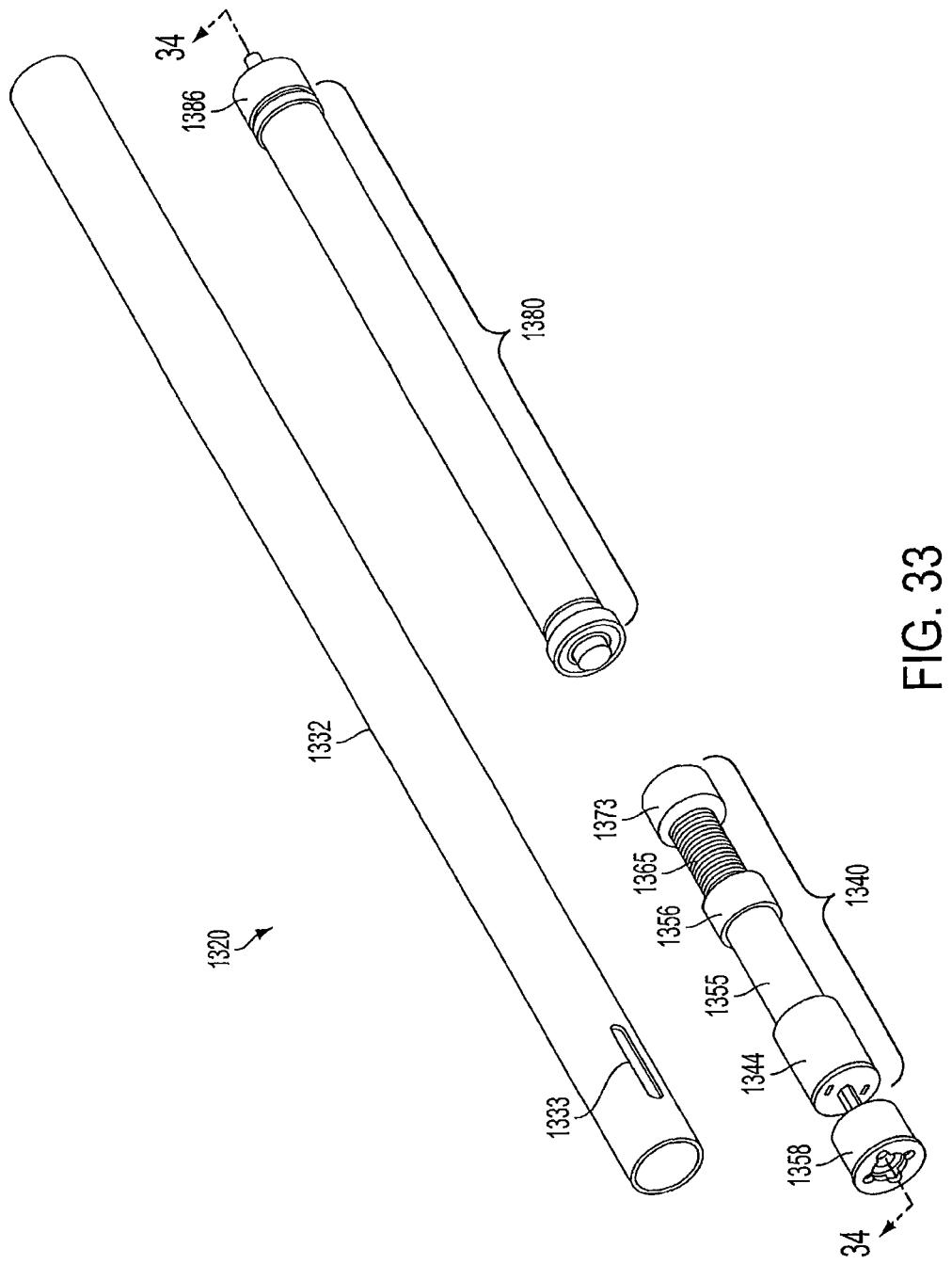
FIG. 33 presents a partially-exploded, isometric view of a motorized roller shade with counterbalancing, according to an alternative embodiment of the present invention.
Figure 34:
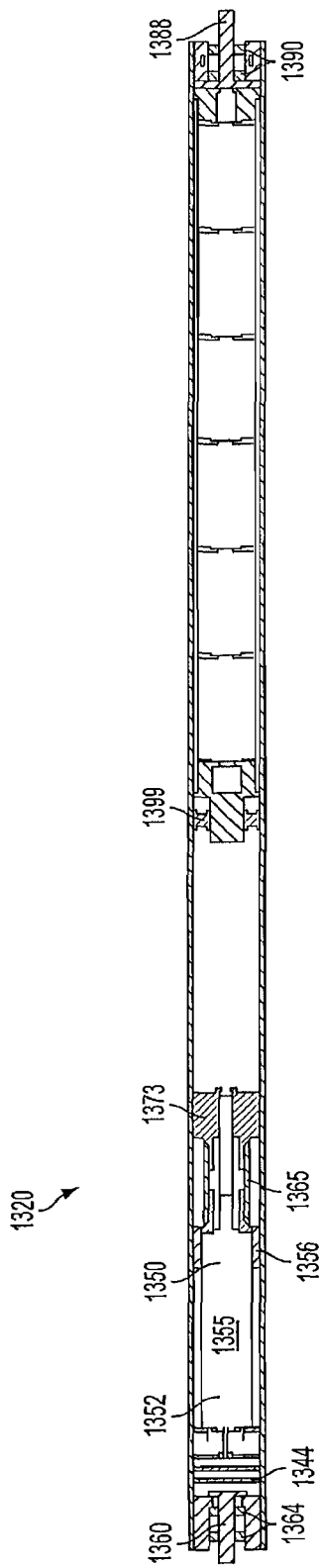
FIG. 34 presents a sectional view along the longitudinal axis of the embodiment depicted in FIG. 33.

FIGS. 33 and 34 depict an alternative embodiment of the present invention with counterbalancing. FIG. 33 presents a partially-exploded, isometric view of a motorized roller shade 1320, while FIG. 34 presents a sectional view along the longitudinal axis. Motorized roller shade 1320 includes a shade tube 1332 with a slot 1333 to facilitate wireless signal transmission, a motor/controller unit 1340, and a power supply unit 1380. Generally, the motor/controller unit 1340 includes a DC gear motor 1355 with a DC motor 1350 and an integral motor gear reducing assembly 1352, a circuit board housing 1344 attached to the fixed support shaft 1360, a torque transfer coupling 1373 that is attached to the output shaft of the DC gear motor 1355 and the shade tube 1332, and that also functions as a rotating perch, a fixed perch 1356 attached to the DC gear motor 1355, and a counterbalance spring 1365 that couples the rotating perch/torque transfer coupling 1373 to the fixed perch 1356. End cap 1358, housing one or more bearings 1364, and end cap 1386, housing one or more bearings 1390, are also attached to the shade tube 1332. The power supply unit 1380 includes the battery stack, and is attached to the fixed support shaft 1388; an additional bearing 1399 is also provided. Accordingly, during operation, the output shaft of the DC gear motor 1355 rotates with the shade tube 1332, while the motor/controller unit 1340 and the power supply unit 1380 remain stationary. Bearings 1364 are rotationally-coupled to support shaft 1360, bearings 1390 are rotationally-coupled to support shaft 1388, while bearing 1399 supports the shaft-like end portion of the power supply unit 1380.

Additionally, by enclosing the various components of the motorized roller shade within the shade tube, the blind or shade material can be extended to the ends of the tube, which advantageously reduces the width of the gap between the edge of the shade and the vertical surface of the opening in which the motorized roller shade is installed. For example, this gap can be reduced from 1 inch or more to about 7/16 of an inch or less on each side of the shade. The gaps can be the same width as well, which increases the ascetic appeal of the motorized roller shade. Additional light-blocking coverings, such as vertical tracks, are therefore not necessary.

Control Methods

Motorized roller shade 20 may be controlled manually and/or remotely using a wireless or wired remote control. Generally, the microcontroller executes instructions stored in memory that sense and control the motion of DC gear motor 55, decode and execute commands received from the remote control, monitor the power supply voltage, etc. More than one remote control may be used with a single motorized roller shade 20, and a single remote control may be used with more than one motorized roller shade 20.

Figure 35:
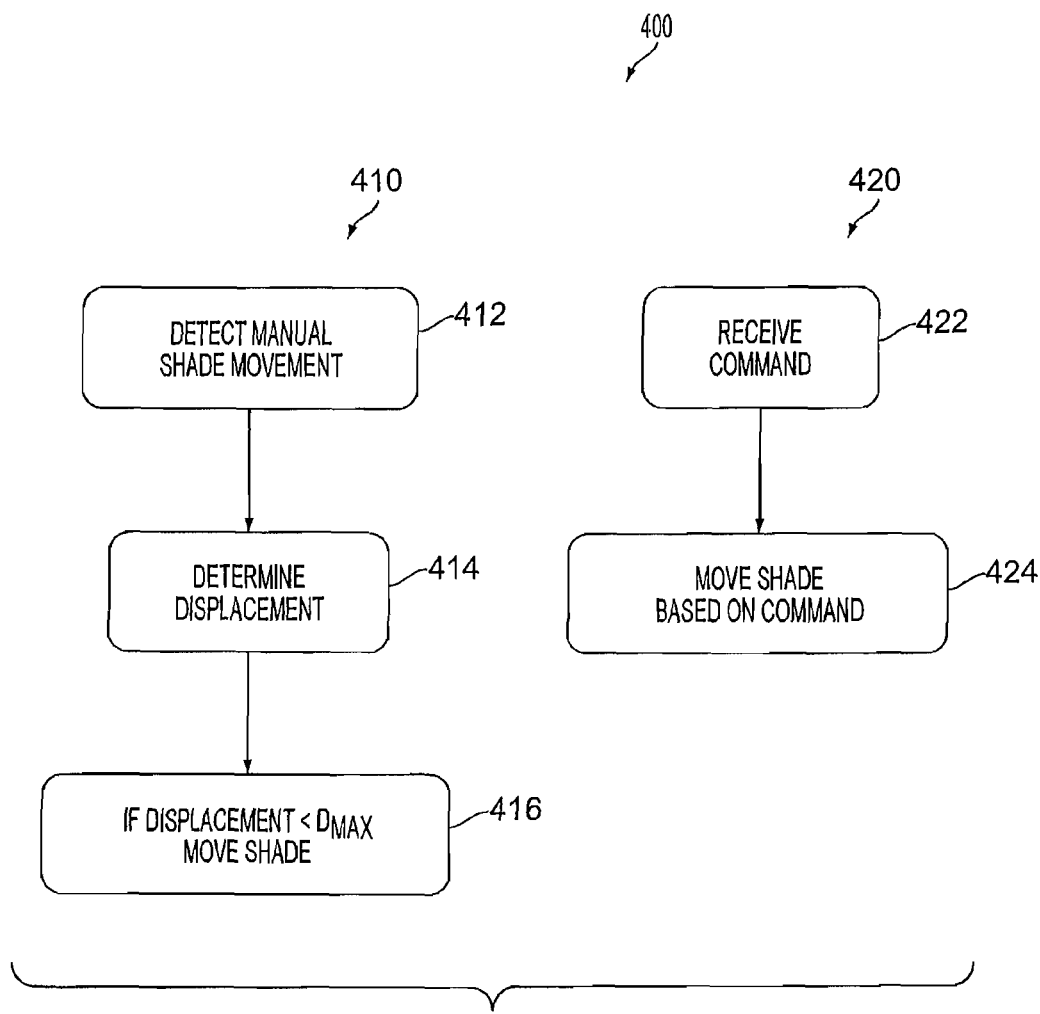
FIG. 35 presents a method 400 for controlling a motorized roller shade 20, according to an embodiment of the present invention.

FIG. 35 presents a method 400 for controlling a motorized roller shade 20, according to an embodiment of the present invention. Generally, method 400 includes a manual control portion 410 and a remote control portion 420. In one embodiment, method 400 includes the manual control portion 410, in another embodiment, method 400 includes the remote control portion 420, and, in a preferred embodiment, method 400 includes both the manual control portion 410 and the remote control portion 420.

During the manual control portion 410 of method 400, a manual movement of the shade 22 is detected (412), a displacement associated with the manual movement is determined (414), and, if the displacement is less than a maximum displacement, the shade 22 is moved (416) to a different position by rotating the shade tube 32 using the DC gear motor 55.

In one embodiment, the microcontroller detects a manual downward movement of the shade 22 by monitoring the encoder. In a preferred embodiment, after the initial downward movement or tug is detected, the microcontroller begins to count the encoder pulses generated by the rotation of the shade tube 32 relative to the fixed motor shaft 51. When the encoder pulses cease, the downward movement has stopped, and the displacement of the shade 22 is determined and then compared to a maximum displacement. In one embodiment, the shade displacement is simply the total number of encoder pulses received by the microcontroller, and the maximum displacement is a predetermined number of encoder pulses. In another embodiment, the microcontroller converts the encoder pulses to a linear distance, and then compares the calculated linear distance to a maximum displacement, such as 2 inches.

In one example, the maximum number of encoder pulses is 80, which may represent approximately 2 inches of linear shade movement in certain embodiments. If the total number of encoder pulses received by the microcontroller is greater than or equal to 80, then the microcontroller does not energize the DC gear motor 55 and the shade 22 simply remains at the new position. On the other hand, if the total number of encoder pulses received by the microcontroller is less than 80, then the microcontroller moves the shade 22 to a different position by energizing the DC gear motor 55 to rotate the shade tube 32. After the microcontroller determines that the shade 22 has reached the different position, the DC gear motor 55 is de-energized.

In preferred embodiments, the microcontroller maintains the current position of the shade 22 by accumulating the number of encoder pulses since the shade 22 was deployed in the known position. As described above, the known (e.g., open) position has an accumulated pulse count of 0, and the various intermediate positions each have an associated accumulated pulse count, such as 960, 1920, etc. When the shade 22 moves in the downward direction, the microcontroller increments the accumulated pulse counter, and when the shade 22 moves in the upward direction, the microcontroller decrements the accumulated pulse counter. Each pulse received from the encoder increments or decrements the accumulated pulse counter by one count. Of course, the microcontroller may convert each pulse count to a linear distance, and perform these calculations in units of inches, millimeters, etc.

In a preferred embodiment, limited manual downward movement of the shade 22 causes the microcontroller to move the shade to a position located directly above the current position, such as 25% open, 50% open, 75% open, 100% open, etc. Each of these predetermined positions has an associated accumulated pulse count, and the microcontroller determines that the shade 22 has reached the different position by comparing the value in the accumulated pulse counter to the accumulated pulse count of the predetermined position; when the accumulated pulse counter equals the predetermined position accumulated pulse count, the shade 22 has reached the different position.

Other sets of predetermined positions are also contemplated by the present invention, such as 0% open, 50% open, 100% open; 0% open, 33% open, 66% open, 100% open; 0% open, 10% open, 20% open, 30% open, 40% open, 50% open, 60% open, 70% open, 80% open, 90% open, 100% open; etc. Advantageously, the accumulated pulse count associated with each position may be reprogrammed by the user to set one or more custom positions.

Manual upward movement of the shade 22 may be detected and measured using an encoder that senses direction as well as rotation, such as, for example, an incremental rotary encoder, a relative rotary encoder, a quadrature encoder, etc. In other embodiments, limited upward movement of the shade 22 causes the microcontroller to move the shade to a position located above the current position, etc.

During the remote control portion 420 of method 400, a command is received (422) from a remote control, and the shade 22 is moved (424) to a position associated with the command.

In preferred embodiments, the remote control is a wireless transmitter that has several shade position buttons that are associated with various commands to move the shade 22 to different positions. The buttons activate switches that may be electro-mechanical, such as, for example, momentary contact switches, etc, electrical, such as, for example, a touch pad, a touch screen, etc. Upon activation of one of these switches, the wireless transmitter sends a message to the motorized roller shade 20 that includes a transmitter identifier and a command associated with the activated button. In preferred embodiments, the remote control is pre-programmed such that each shade position button will command the shade to move to a predetermined position. Additionally, remote control functionality may be embodied within a computer program, and this program may be advantageously hosted on a wireless device, such as an iPhone. The wireless device may communicate directly with the motorized roller shade 20, or though an intermediate gateway, bridge, router, base station, etc.

In these preferred embodiments, the motorized roller shade 20 includes a wireless receiver that receives, decodes and sends the message to the microcontroller for further processing. The message may be stored within the wireless receiver and then sent to the microcontroller immediately after decoding, or the message may be sent to the microcontroller periodically, e.g., upon request by the microcontroller, etc. One preferred wireless protocol is the Z-Wave Protocol, although other wireless communication protocols are contemplated by the present invention.

After the message has been received by the microcontroller, the microcontroller interprets the command and sends an appropriate control signal to the DC gear motor 55 to move the shade in accordance with the command. As discussed above, the DC gear motor 55 and shade tube 32 rotate together, which either extends or retracts the shade 22. Additionally, the message may be validated prior to moving the shade, and the command may be used during programming to set a predetermined deployment of the shade.

For example, if the accumulated pulse counter is 3840 and the shade 22 is 0% open, receiving a 50% open command will cause the microcontroller to energize the DC gear motor 55 to move the shade 22 upwards to this commanded position. As the shade 22 is moving, the microcontroller decrements the accumulated pulse counter by one count every time a pulse is received from the encoder, and when the accumulated pulse counter reaches 1920, the microcontroller de-energizes the DC gear motor 55, which stops the shade 22 at the 50% open position. In one embodiment, if a different command is received while the shade 22 is moving, the microcontroller may stop the movement of the shade 22. For example, if the shade 22 is moving in an upward direction and a close (0% open) command is received, the microcontroller may de-energize the DC gear motor 55 to stop the movement of the shade 22. Similarly, if the shade 22 is moving in a downward direction and a 100% open command is received, the microcontroller may de-energize the DC gear motor 55 to stop the movement of the shade 22. Other permutations are also contemplated by the present invention, such as moving the shade 22 to the predetermined position associated with the second command, etc.

In a preferred embodiment, a command to move the shade to the 100% open position resets the accumulated pulse counter to 0, and the microcontroller de-energizes the DC gear motor 55 when the encoder pulses cease. Importantly, an end-of-travel stop, such as bottom bar 28, stops 24 and 26, and the like, engage corresponding structure on the mounting brackets when the shade 22 has been retracted to the 100% open position. This physical engagement stops the rotation of the shade tube 32 and stalls the DC gear motor 55. The microcontroller senses that the encoder has stopped sending pulses, e.g., for one second, and de-energizes the DC gear motor 55. When the shade 22 is moving in the other direction, the microcontroller may check an end-of-travel pulse count in order to prevent the shade 22 from extending past a preset limit.

In other embodiments, the movement of the shade 22 may simply be determined using relative pulse counts. For example, if the current position of the shade 22 is 100% open, and a command to move the shade 22 to the 50% open position is received, the microcontroller may simply energize the DC gear motor 55 until a certain number of pulses have been received, by the microcontroller, from the encoder. In other words, the pulse count associated with predetermined position is relative to the predetermined position located directly above or below, rather than the known position.

Figure 41:
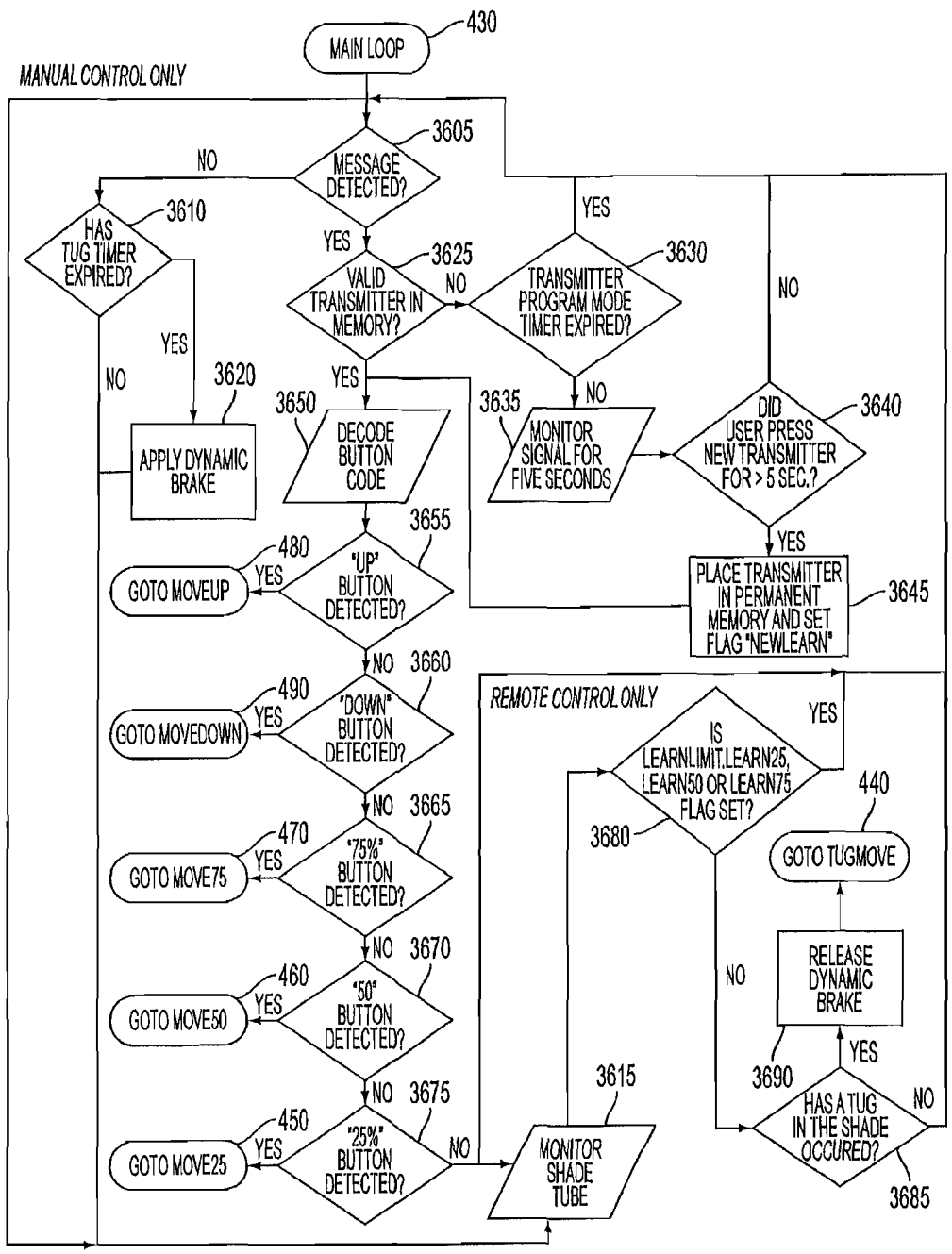
FIGS. 41-50 present operational flow charts according to one embodiment of the present invention.
Figure 46:
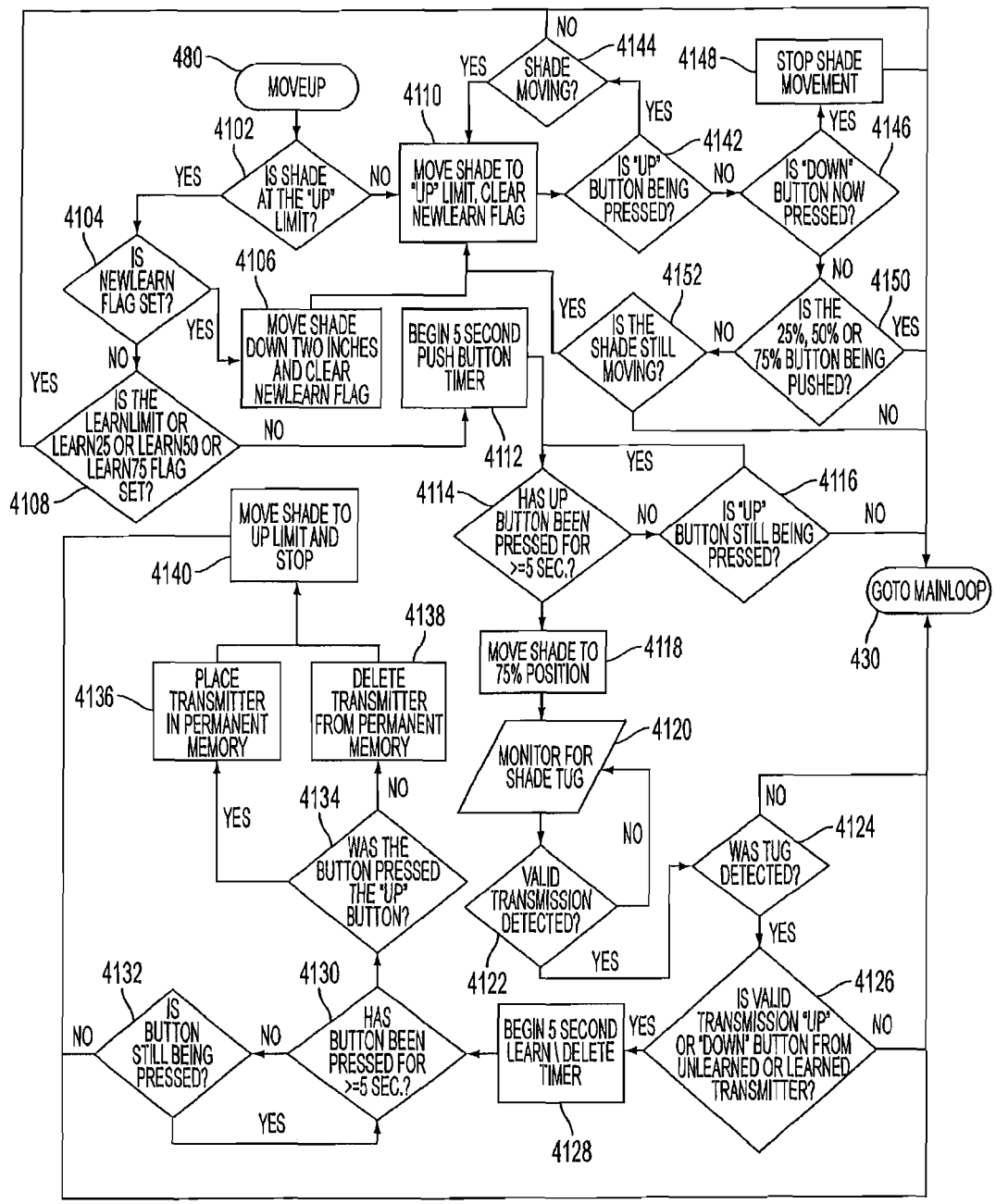
Figure 47:
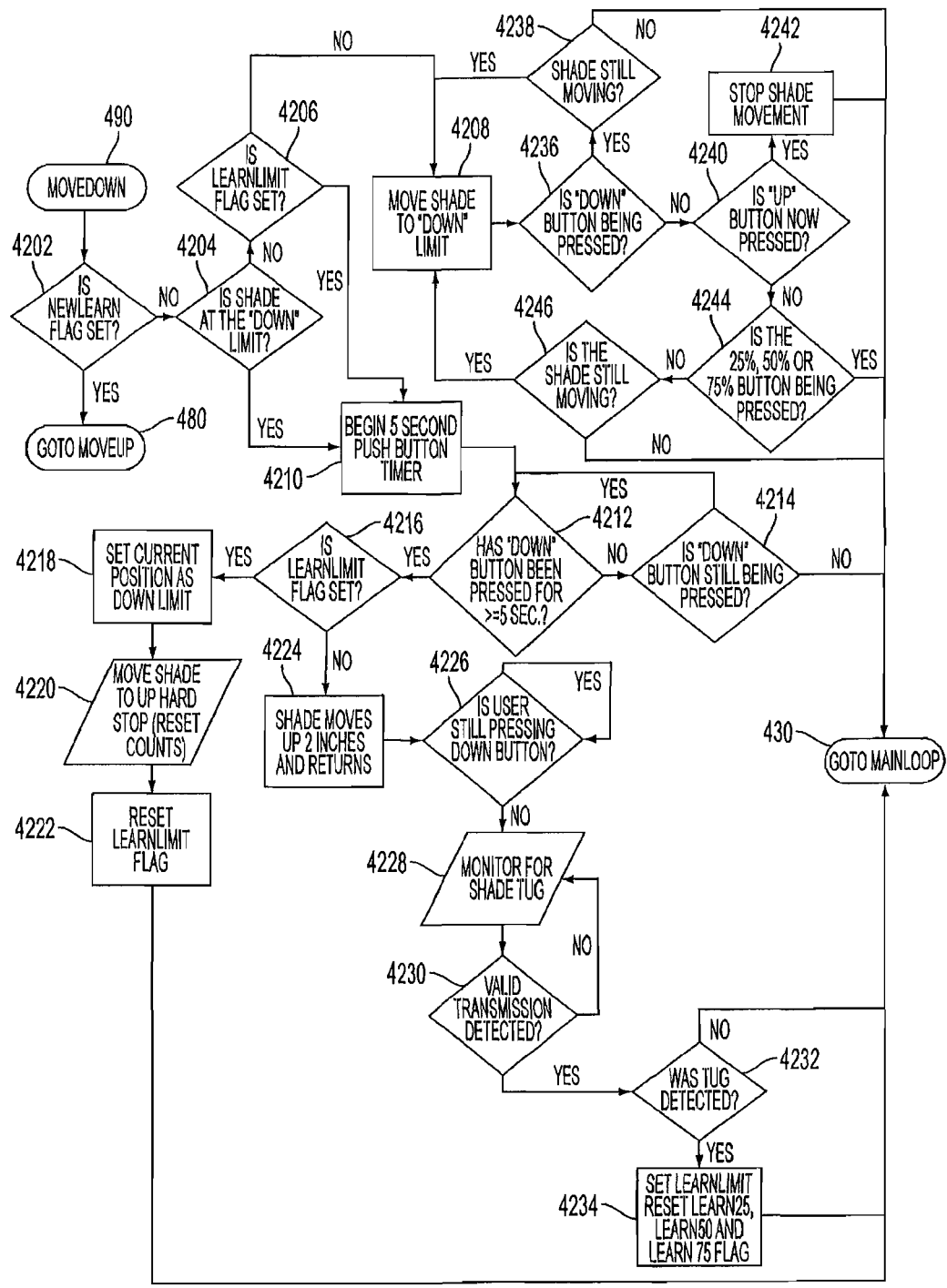
Figure 48:
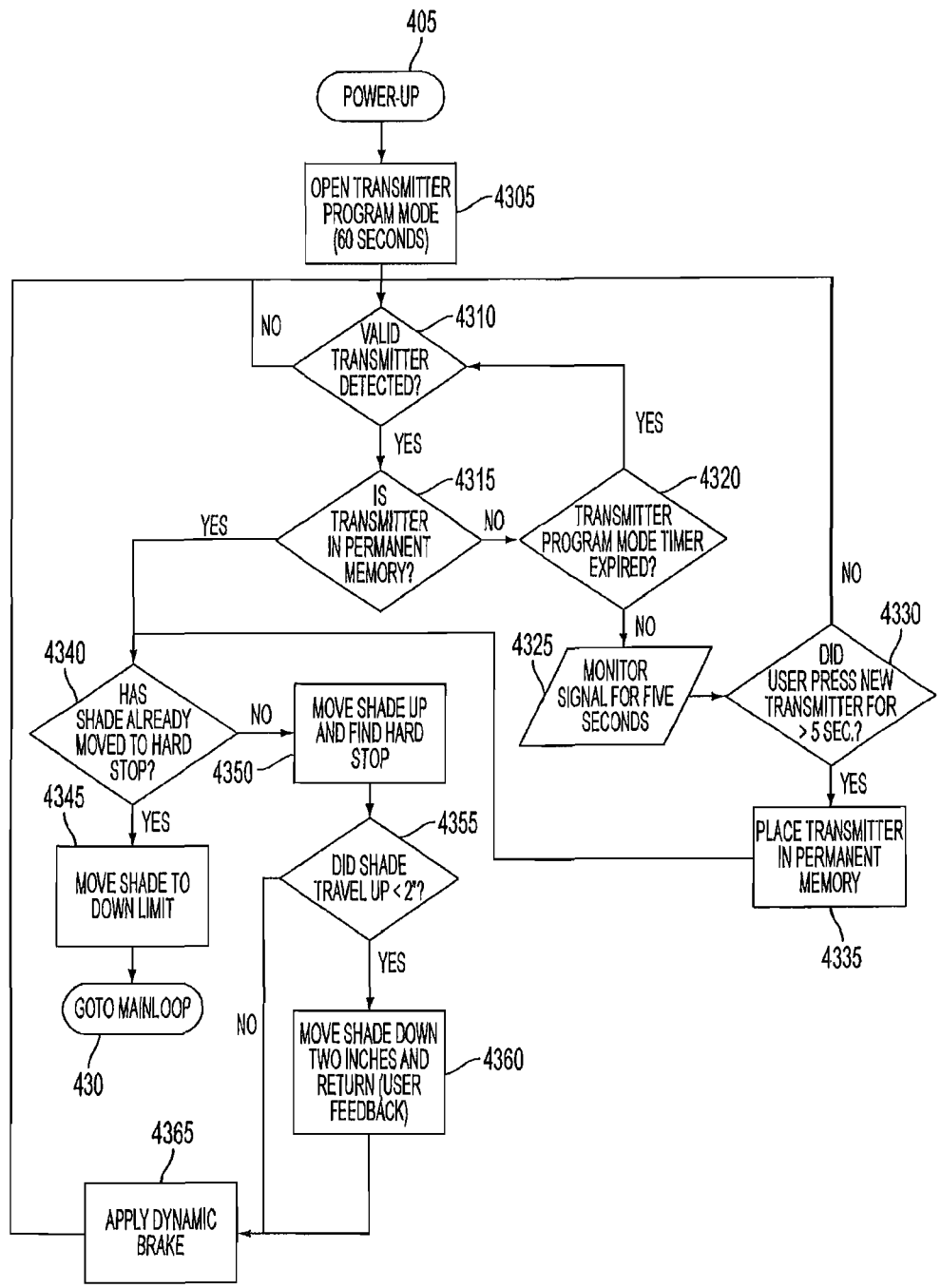

For the preferred embodiment, programming a motorized roller shade 20 to accept commands from a particular remote control depicted in FIGS. 41 and 48, while programming or teaching the motorized roller shade 20 to deploy and retract the shade 22 to various preset or predetermined positions, such as open, closed, 25% open, 50% open, 75% open, etc., is depicted in FIGS. 43 to 47. Other programming methodologies are also contemplated by the present invention.

In other embodiments, a brake may be applied to the motorized roller shade 20 to stop the movement of the shade 22, as well as to prevent undesirable rotation or drift after the shade 22 has been moved to a new position. In one embodiment, the microcontroller connects the positive terminal of the DC gear motor 55 to the negative terminal of DC gear motor 55, using one or more electro-mechanical switches, power FETS, MOSFETS, etc., to apply the brake. In another embodiment, the positive and negative terminals of the DC gear motor 55 may be connected to ground, which may advantageously draw negligible current. In a negative ground system, the negative terminal of the DC gear motor 55 is already connected to ground, so the microcontroller only needs to connect the positive terminal of the DC gear motor 55 to ground. Conversely, in a positive ground system, the positive terminal of the DC gear motor 55 is already connected to ground, so the microcontroller only needs to connect the negative terminal of the DC gear motor 55 to ground.

Once the positive and negative terminals of the DC gear motor 55 are connected, as described above, any rotation of the shade tube 32 will cause the DC gear motor 55 to generate a voltage, or counter electromotive force, which is fed back into the DC gear motor 55 to produce a dynamic braking effect. Other braking mechanisms are also contemplated by the present invention, such as friction brakes, electro-mechanical brakes, electro-magnetic brakes, permanent-magnet single-face brakes, etc. The microcontroller releases the brake after a manual movement of the shade 22 is detected, as well as prior to energizing the DC gear motor 55 to move the shade 22.

In an alternative embodiment, after the shade 22 has been moved to the new position, the positive or negative terminal of the DC gear motor 55 is connected to ground to apply the maximum amount of braking force and bring the shade 22 to a complete stop. The microcontroller then connects the positive and negative terminals of the DC gear motor 55 together via a low-value resistor, using an additional MOSFET, for example, to apply a reduced amount of braking force to the shade 22, which prevents the shade 22 from drifting but allows the user to tug the shade 22 over long displacements without significant resistance. In this embodiment, the brake is not released after the manual movement of the shade is detected in order to provide a small amount of resistance during the manual movement.

In other embodiments, the motorized roller shade 20 may not include a brake and, instead, the counterbalancing and the drag reduction of the motorized roller shade 20 are such there is no need for a brake or a ratchet to stop the movement of the shade 22 at a particular position.

One example of a motorized roller shade 20 according to various embodiments of the present invention is described hereafter. The shade tube 32 is an aluminum tube having an outer diameter of 1.750 inches and a wall thickness of 0.062 inches. Bearings 64 and 90 each include two steel ball bearings, 30 mm OD×10 mm ID×9 mm wide, that are spaced 0.250" apart. In other words, a total of four ball bearings, two at each end of the motorized roller shade 20, are provided.

The DC gear motor 55 is a Buhler DC gear motor 1.61.077.423, as discussed above. The battery tube 82 accommodates 6 to 8 D-cell alkaline batteries, and supplies voltages ranges from 6 V to 12 V, depending on the number of batteries, shelf life, cycles of the shade tube assembly, etc. The shade 22 is a flexible fabric that is 34 inches wide, 60 inches long, 0.030 inches thick and weighs 0.100 lbs/sq. ft, such as, for example, Phifer Q89 Wicker/Brownstone. An aluminum circularly-shaped curtain bar 28, having a diameter of 0.5 inches, is attached to the shade 22 to provide taughtness as well as an end-of-travel stop. The counterbalance spring 63 is a clock spring that provides 1.0 to 1.5 in-lb of counterbalance torque to the shade 22 after it has reached 58 inches of downward displacement. In this example, the current drawn by the Bühler DC gear motor ranges between 0.06 and 0.12 amps, depending on friction.

In some embodiments, in order to conserve energy consumed by a magnetic encoder and/or a wireless receiver, the magnetic encoder and/or wireless receiver can be turned off or not energized when the architectural covering is not being used. In order to power on the magnetic encoder and/or wireless receiver, movement, i.e., tugging, of the shade or drapery by a user can indicate energization of the magnetic encoder and/or wireless receiver. Alternatively, movement or tugging on a manual movement cord can indicate energization of the magnetic encoder and/or wireless receiver.

In some embodiments, the movement of the shade or the manual movement cord can be two tugs or more tugs within a predetermined time period to differentiate from tugs indicating of the movement of the shade. The predetermined time period can be, for example, one second. In some embodiments, different numbers of tugs can indicate different functions to the microprocessor. For example, two tugs within a predetermined time period can indicate energization of the magnetic encoder and/or wireless receiver. Three tugs can indicate movement of the shade by a predetermined distance. Other numbers of tugs can indicate movement of the shade by other distances.

In some embodiments, the tugs can be determined by an accelerometer and not the magnetic encoder. The accelerometer can be powered by the power unit of the architectural covering or by the current generated by the tugging of the shade in the DC motor. The output of the accelerometer can be input into the microprocessor to signal that the magnetic encoder and/or wireless receiver be energized.

Figure 36:
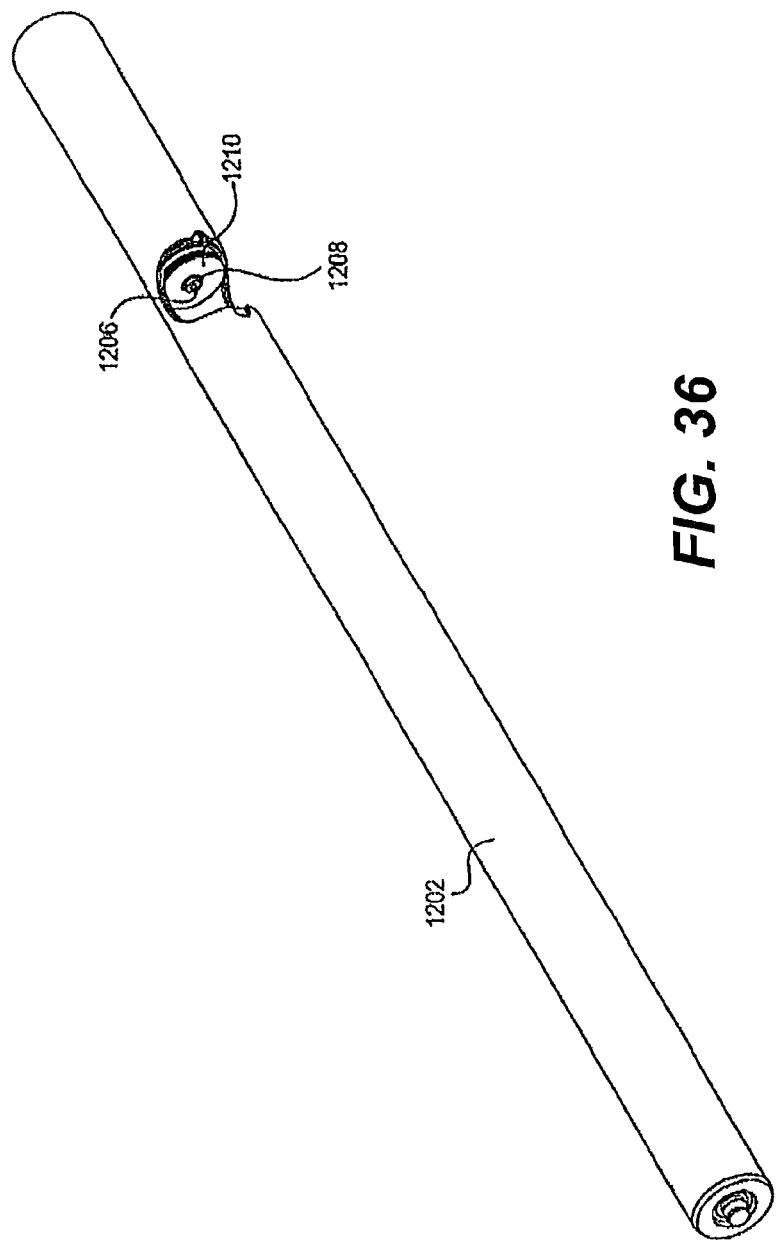
FIG. 36 presents a perspective or cutaway view of a roller shade assembly illustrating the motor control area in accordance with an embodiment of the present invention.
Figure 37:
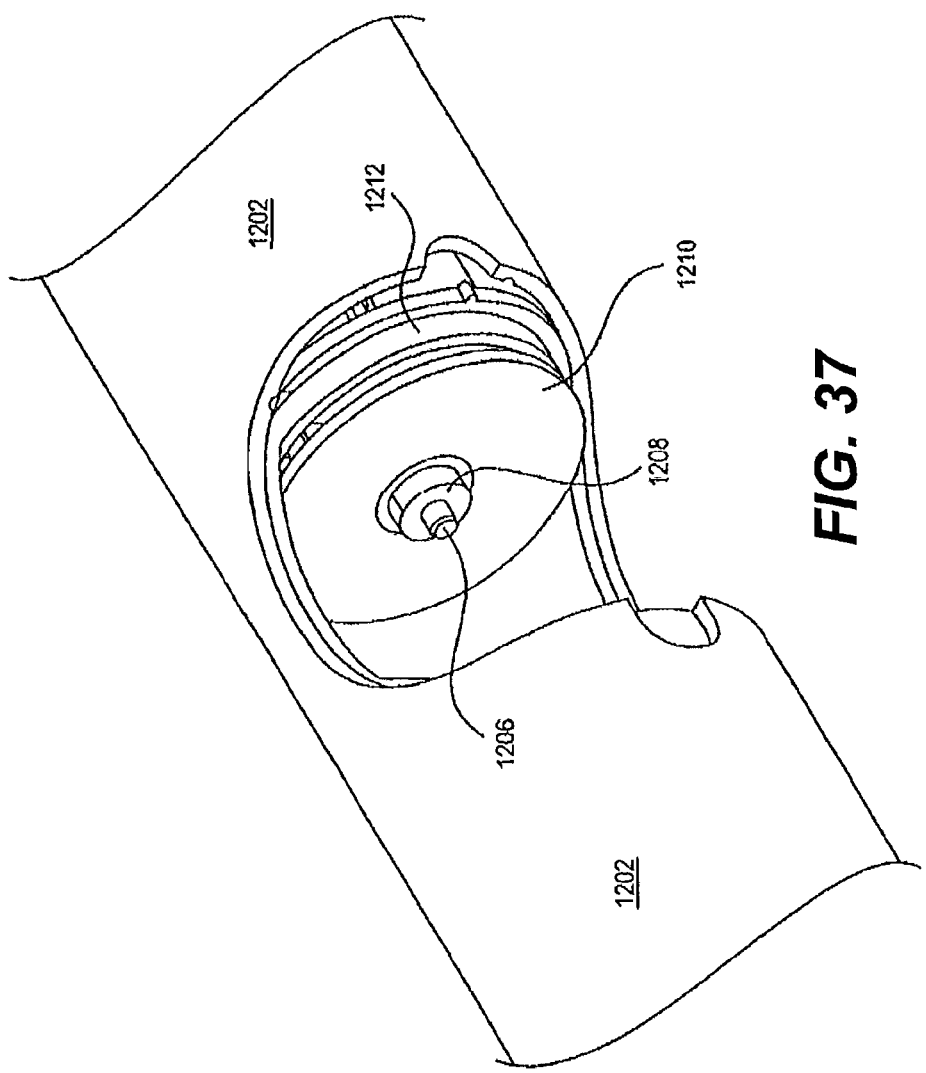
FIG. 37 presents an enlarged perspective view of the roller shade assembly depicted in FIG. 29.
Figure 38:
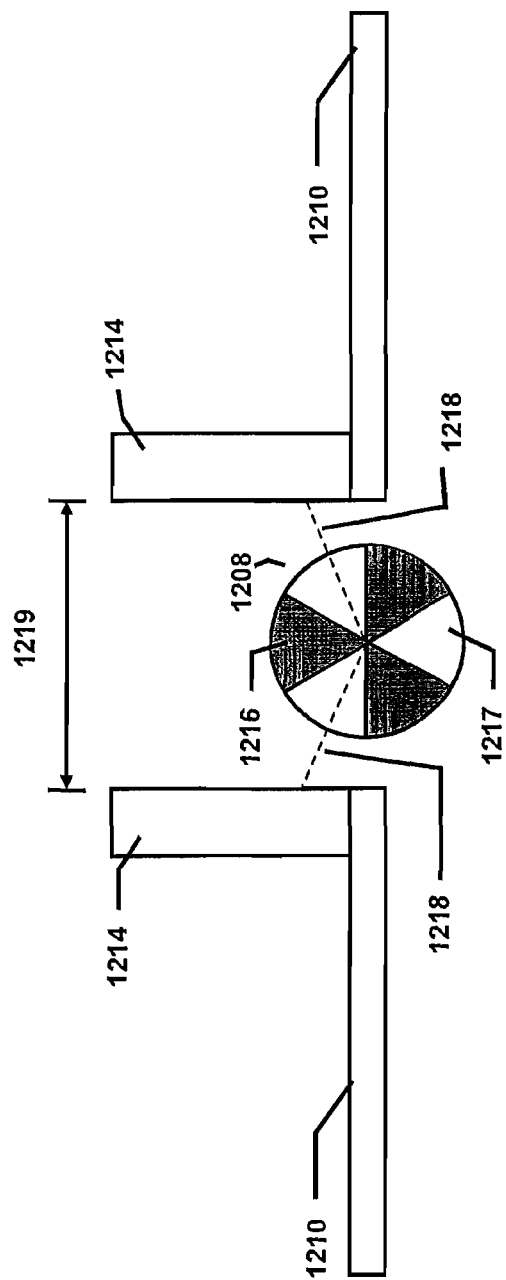
FIG. 38 presents a Hall Effect detector including a Hall Effect magnet and Hall Effect sensors in accordance with an embodiment of the present invention.

In other embodiments, referring to FIGS. 36 and 37, a Hall Effect detector can be used in place of the magnetic encoder. In particular, referring to FIG. 36, a roller shade or blind assembly 1202 includes a motor 1203 having an output shaft 1206 extending therefrom. The Hall Effect magnet wheel 1208 is mounted to said output shaft 1206. The Hall Effect magnet wheel 1208 is a multi-pole magnetic wheel that can, preferably, have six poles, as shown in FIG. 38. The roller shade or blind assembly 1202 also comprises a Hall Effect sensor 1214 as part of a printed circuit board 1210. The roller shade or blind assembly 1202 includes a microprocessor 1215, which is mounted to a printed circuit board 1210, or a second printed circuit board 1212, that is configured to count the pulses to determine the operational and positional characteristics of the roller shade or blind assembly 1202. The microprocessor 1215 can be electrically connected to the power supply (1280 in FIG. 33 for example), the first printed circuit board 1210 or any other component of the system.

During operation, once the shade or blind assembly 1202 is energized, the shade or blind will be able to move or translate to a predetermined position. One preferred distance is about 12 inches (30.5 cm) but it can be any desired distance/position in the path of travel of the shade or blind. The aforementioned translations of the shade or blind may be automatic from a time out command after energizing the power supply or a manual movement of the shade or blind 1204, such as a tug, or a depression of a button on a remote transmitter. Once the shade or blind 1204 is deployed to the position as described above, the motorized shade or blind assembly 1202 is now positioned for further user response and input.

FIG. 38 illustrates a schematic of an embodiment of the Hall Effect magnet wheel 1208 in position with the Hall Effect sensor 1214 on the printed circuit board 1210. The Hall Effect magnet wheel 1208 includes three poles 1216 that activate the Hall Effect and three poles 1217 that deactivate the Hall Effect. However any other number of magnetic poles are hereby contemplated for use. In one embodiment, a 90° phase shift results in an ideal quadrature signal from the Hall Effect sensor 1214. As such, the Hall Effect magnet wheel 1208 can be positioned relative to the Hall Effect sensor 1214 to result in a 30° difference. In the embodiment shown in FIG. 38, the 30° difference is divided between the two Hall Effect sensors 1214, such that the center point of the Hall Effect magnet wheel 1208 is at a 15° angle relative to the plane of the printed circuit board 1210 from the Hall Effect sensors 1214, as shown by the dashed lines 1218 in FIG. 38. In some embodiments, the distance 1219 between the two Hall Effect sensors 1214 can be 0.082 inches (2.0828 millimeters) to result in the 15° angle.

Figure 39:
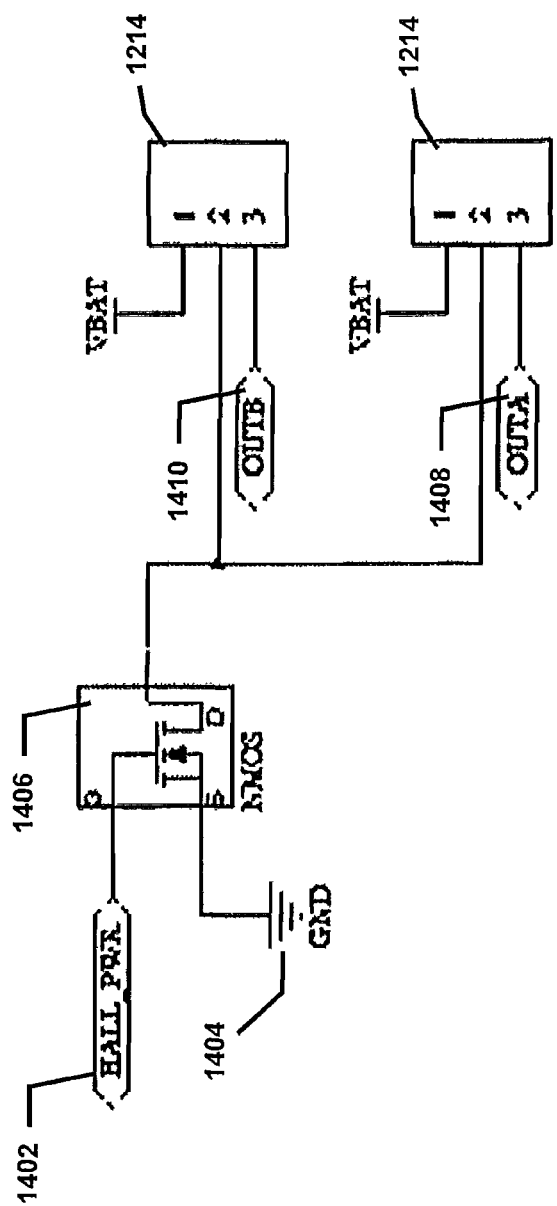
FIG. 39 presents a Hall Effect detector power circuit to power Hall Effect sensors.

FIG. 39 illustrates a schematic of an example circuit 1400 to power the Hall Effect sensors 1214. In particular, to conserve power for the roller shade or blind assembly 1202, the Hall Effect sensors 1214 can be turned off when they are not used, and turned on when a tug has been detected or a command has been received from the remote control. The circuit 1400 includes a power input 1402 for the Hall Effect sensors 1214. The power input 1402 is preferably received from an input/output pin of the microprocessor 1215 mounted to a second printed circuit board 1212. The voltage of the power input 1402 can be compatible with the microprocessor 1215 and can be, for example, 3.3 volts.

The power input 1402 is input into the gate of the transistor 1406 and a ground 1404 is input to the gate of the transistor 1406. The transistor 1406 can be, for example, a metal-oxide-semiconductor field-effect transistor ("MOSFET"). The transistor 1406 is configured to connect the ground when a voltage is received at the power input 1402 from the microprocessor 1215, thereby completing the circuit and powering the Hall Effect sensors 1214. If the microprocessor determines that the Hall Effect sensors 1214 should not be energized, it will not provide a voltage to the power input 1402 and the transistor 1406 is configured to, in turn, sever the connection to the ground 1404. For example, if the microprocessor 1215 determines that a predetermined duration of time has passed since the last tug, it may determine that the Hall Effect sensors 1214 should not be energized. The output 1408 of a first one of the Hall Effect sensors 1214 and the output 1410 of the second one of the Hall Effect sensors 1214 can be input to the microprocessor 1215, so the microprocessor 1215 can detect a tug. In other embodiments, any or predetermined signals received from the remote control can be input into the microprocessor 1215 so that the microprocessor 1215, in turn, determines that the Hall Effect sensors 1214 should be energized.

Figure 40:
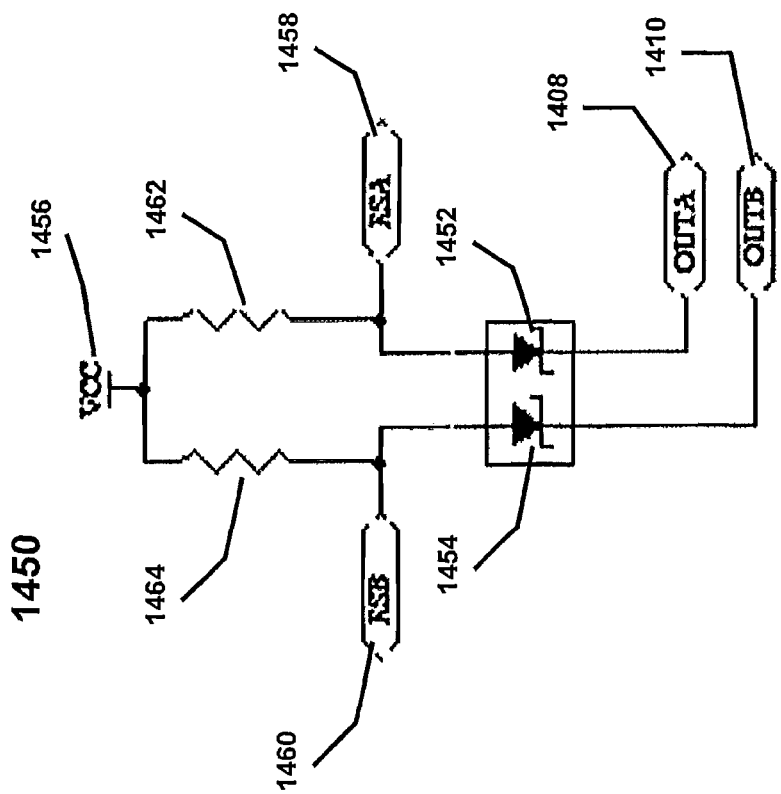
FIG. 40 presents a tug detection circuit to detect a tug on the shade.

FIG. 40 illustrates a schematic of an example circuit 1450 to detect a tug. The outputs 1408 and 1410 of the Hall Effect sensors 1214 pass through diodes 1452 and 1454, respectively. When the Hall Effect sensors 1214 are off, the current produced by the tug itself in the motor is used to power the Hall Effect sensors 1214 to output a voltage in their respective outputs 1408 and 1410. The diodes 1452 and 1454 are used to block current leak that may occur through the Hall Effect sensors 1214 due to continuous switching between the $V_{CC}$ voltage 1456 of about 3.3 volts and the $V_{BAT}$ voltage. Accordingly, the Hall Effect sensors 1214 can be compatible with the microprocessor 1215 that also operates at 3.3 volts.

RSA 1458 and RSB 1460 are the reference points for the microprocessor 1215 detect a voltage at the outputs 1408 and 1410, respectively. In particular, RSA 1458 is the stepped down voltage of the output 1408 and RSB 1460 is the stepped down voltage of the output 1410. As such, when a proper magnetic field is detected by the Hall Effect sensors 1214, at least one of the signals RSA 1458 and RSB 1460 is pulled to ground and the resistors 1462 and 1464 pull the signals RSA 1458 and RSB 1460 back up to the $V_{CC}$ voltage 1456 when the opposite magnetic field is present.

Therefore, as the motor moves or a user tugs the roller shade or blind assembly 1202, the input into the microprocessor 1215 alternates between a logic low of zero volts, i.e., ground, and a logic high of 3.3 volts. In addition to being used to detect a tug, the alternating voltage can be used to determine a number of counts for location of the roller shade or blind assembly 1202.

In some embodiments, the circuit 1450 can be configured to detect and distinguish between relatively short tugs and relatively long tugs. For example, a relatively short tug can have a duration of under one second, whereas a relatively long tug can have a duration of over one second. In another example, a relatively short tug can have a displacement of under a predetermined distance, whereas a relatively long tug can have a displacement of greater than a predetermined distance. The duration or distance of the tug can be determined by, for example, the microprocessor 1215 counting the time period that the output of the circuit 1450 is at a logic low and then comparing that time period to a predetermined threshold. The predetermined threshold can be, for example, one second.

The microprocessor 1215 can then initiate different functions for the roller shade or blind assembly 1202 depending on whether a relatively short or a relatively long tug has been detected. For example, a relatively short tug can initiate a movement of 50% of the roller shade or blind assembly 1202, whereas a relatively long tug can initiate a movement of the roller shade or blind assembly 1202 is extended to its downward limit according to the "Movedown" routine. Alternatively, the a relatively long tug can indicate manual control of the shade and does not result in energization of the motor 55.

For most window shades, the vast majority of their life is spent in a static position. That is, very little of its life is the window shade actually moving or operating. Therefore, as one example, the motorized roller shade assembly 10 sits in an asleep state where the microprocessor 1215 of printed circuit board 1210, 1212 has cut the power to the Hall Effect sensors 1214 (this would be considered an asleep state). While the term Hall Effect sensor is used in association with this description, it is hereby contemplated that any other form of sensor can be used in this arrangement. Hall Effect sensors are essentially semiconductors that have a constant energy draw, or a transducer that varies its output in response to a magnetic field. As such, the asleep state saves current draw from batteries thereby prolonging the life of the batteries.

Once the microprocessor 1215 of printed circuit board 1210, 1212 senses a change in state, or a reason to put the shade in an awake state, the microprocessor of printed circuit board 1210, 1212 powers-up or sends power to Hall Effect Sensors. This change in state can be a manual movement of the shade, a button press on a remote, or any other disturbance or change in condition sensed by the microprocessor 1215.

As one example, when a user manually pulls the bottom bar 28, this causes the motor 55 to generate a current—this is because every motor acts as a generator when it is spun. In this example, the microprocessor 1215 senses this spike in current and immediately switches on the Hall Effect Sensors 1214. As the bottom bar 28 is moved, the output shaft 1206 rotates which rotates magnetic wheel 1208. The energized Hall Effect sensors 1214 sense the passing magnetic poles 1216 which are counted thereby providing the new position of the bottom bar 28. This information about the new position is used when the shade is later commanded to move to a new position, as is described herein. Also, while this arrangement is extremely accurate, to ensure no built-up error occurs, from time-to-time, the shade is programmed to make a hard-stop thereby zeroing-out the counter and ensuring that accurate positioning occurs. Simultaneously, or nearly simultaneous with powering-up the Hall Effect sensors 1214, the dynamic break is released to allow for easier manual movement of bottom bar 28. In response to this manual movement, the microprocessor 1215 may or may not command the motor 55 to move the bottom bar 55 to another position (a tug or micro tug).

The Hall Effect sensors 1214 remain in a powered-up state and the dynamic break remains released throughout the manual movement and for a predetermined amount of time thereafter to ensure they sense the entirety of the manual movement. Once the predetermined amount of time passes after a manual movement, the power again is cut to the Hall Effect Sensors 1214 and the dynamic break is again initiated and the shade returns to an asleep or power-conserve state.

Similarly, as another example, when a user presses a button on a remote, or another wireless command is received, again the Hall Effect sensors 1214 are powered up and the dynamic break is released. This time, however, the motor 55 is powered and moves the bottom bar to the commanded position. The Hall Effect sensors 1214 remain in a powered-up state and the dynamic break remains released throughout the motorized movement and for a predetermined amount of time thereafter to ensure they sense the entirety of the movement. Once the predetermined amount of time passes after a motorized movement, the power again is cut to the Hall Effect Sensors 1214 and the dynamic break is again initiated and the shade returns to an asleep or power-conserve state.

As another example, while it is desired to conserve energy so as to prolong the life of the batteries, it is also desired that the bottom bar position be accurately tracked. As such, to accomplish the best balance of both power conservation as well as accuracy, in one arrangement the microprocessor 1215 intermittently turns the Hall Effect Sensors 1214 on and off. This turning on and off of the Hall Effect sensors 1214 is not in response to any change in state or other externally caused condition, and instead is simply a double-check, or fail-safe measure. As an example, the microprocessor 1215 turns the Hall Effect sensors 1214 on for a tenth of a second every second, or one millisecond every ten mili seconds or one micro second every ten micro seconds or any other amount of time. This arrangement provides the benefit of ensuring that a movement is sensed while still conserving a great amount of power. In the examples above, when the Hall Effect sensors 1214 are powered up one micro second every ten microseconds, a 90% power consumption reduction is accomplished because the Hall Effect sensors 1214 are only powered up 10% of the time.

Figure 40A:
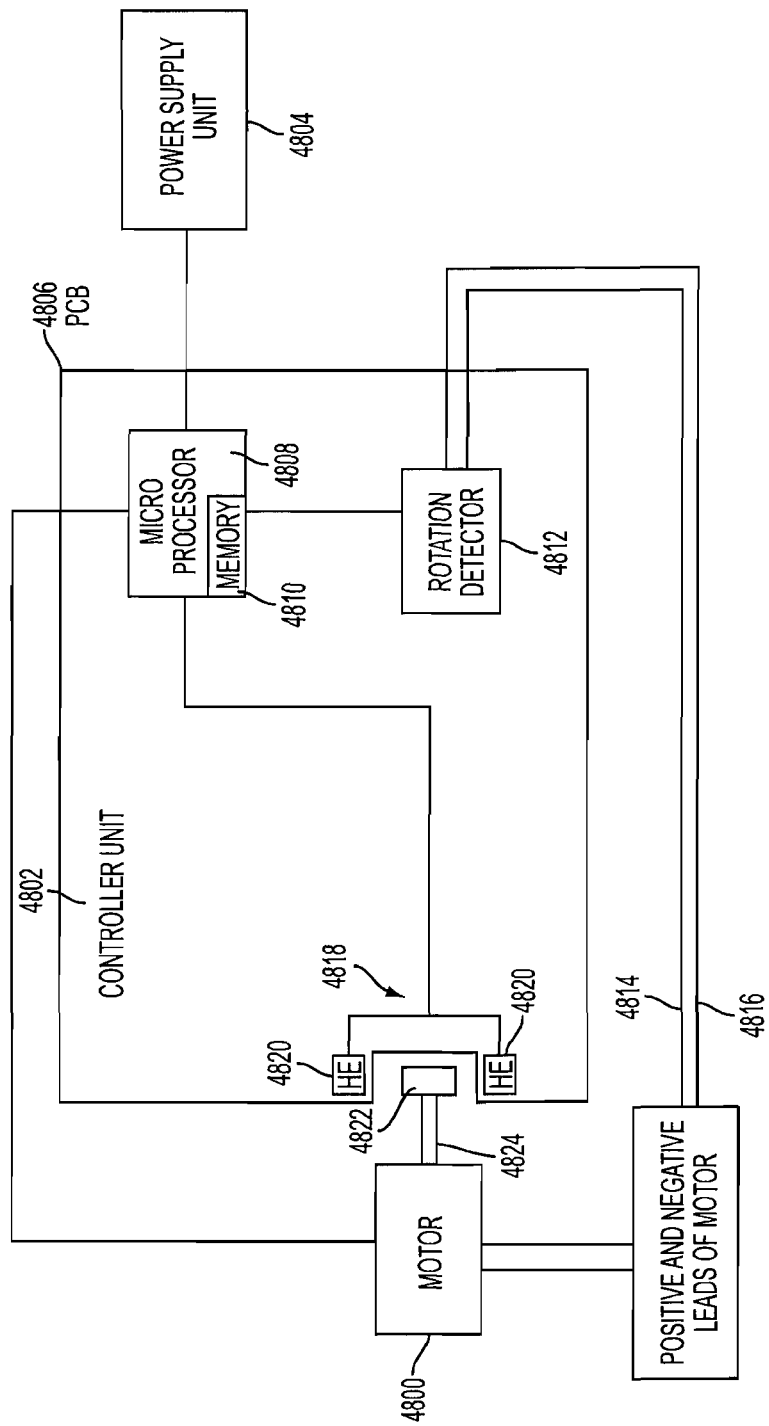
FIG. 40A is s schematic diagram of a system that helps preserves the life of the battery of a battery powered window shade while allowing detection of manual tug movement of the shade.

As yet another example, with reference to FIG. 40A a system is presented for preserving the life of the batteries of a battery powered shade while allowing for detection of a manual movement of the shade as well as tracking the location of the shade during a manual or motorized movement of the shade. This system, includes a motor unit 4800, a controller unit 4802 operatively connected to and associated with the motor 4800 and a power supply unit 4804 operatively and electrically connected to the motor unit 4800 and the controller unit 4802.

The controller unit 4802 is any form of a controller and may include a plurality of components and/or pieces. In one arrangement, controller unit 4802 is formed of one or more printed circuit board or PCBs 4806 which is connected to an end of the motor 4800. The PCB 4806 serves to host or hold or connect the plurality of components of the controller unit 4802. Connected to the PCB 4806 a microprocessor 4808, which is formed of any type of a processing unit capable of receiving and processing information and outputs a result. In one arrangement microprocessor 4808 is connected to or includes memory 4810 which is any form of a device capable of storing information or instructions, such as software.

The controller unit 4802 also includes a rotation detector 4812 which is operatively connected to the microprocessor 4808. The rotation detector 4812 is any form of a circuit, component, sensor, or semiconductor capable of detecting movement of motor 4800. In one arrangement, rotation detector 4812 is one or more transistors that are connected to the positive lead 4814 and/or the negative lead 4816 of the motor 4800. In this arrangement, when the shade is pulled, the motor 4800 is forced to rotate, as the motor 4800 rotates this creates voltage and/or current on the positive lead 4814 and/or the negative lead 4816 leading from the motor 4800. The rotation detector 4812 detects this positive or negative change in the voltage this triggers the transistor to turn on, or complete a circuit with the microprocessor 4808. Or, said another way, when the rotation detector 4812 detects motion of the motor 4800, a signal is sent to the microprocessor 4808. When the microprocessor 4808 receives this signal from the rotation detector 4812 it processes this information and based on the instructions stored in the memory 4810 turns the system from an asleep state to an awake state, or said another way, powers-up the controller unit 4802. In one arrangement, a single rotation detector 4812 is connected to both the positive lead 4814 and the negative lead 4816. In another arrangement, a single rotation detector 4812 is connected to the positive lead 4814 and a single rotation detector 4812 is connected to the negative lead 4816, which allows for improved sensing of not just the change in state but also the direction the motor 4800 is being rotated.

The controller unit 4802 also includes an encoder unit 4818. Encoder unit 4818 is operatively and electrically connected to microprocessor 4808. Encoder unit 4818 is any form of a device which detects, measures, senses or counts the rotation of motor 4800. In one arrangement, encoder unit 4818 is one, two, three or more sensors 4820 positioned adjacent a wheel 4822 connected to a shaft 4824 extending outwardly from motor 4800. In one arrangement, sensors 4820 are Hall Effect sensors, and wheel 4822 is a magnetic wheel, however a chopper wheel and an optical encoder are also contemplated for use. In one arrangement, the sensors 520 are placed on the PCB 5006 of the controller unit 4802 adjacent to the wheel 4822 and where the PCB 4806 is connected to the motor 4800.

In this arrangement, when the rotation detector 4812 detects rotation of motor 4800, either by manual movement of the shade or by motorized movement, the microprocessor 4808 provides power to encoder unit 4818, or allows power to pass from power supply unit 4804 to encoder unit 4818, or closes the circuit to encoder unit 4818. This powers up the encoder unit 4818 which allows the encoder unit 4818 to detect, track, measure and/or sense the rotation of motor 4800. In the arrangement, wherein sensors 4820 are Hall Effect Sensors, turning-on (an awake state) and turning off (an asleep state) the Hall Effect Sensors improve battery life because Hall Effect Sensors, as well as many other types or sensors, constantly draw current. Therefore, turning off the flow of power to these sensors 4820 preserves battery life when the system knows not motion of the motor 4800 is occurring. Also, in the arrangement wherein sensors 4820 are Hall Effect Sensors, as the poles of the magnetic wheel 4822 pass the Hall Effect Sensors, pulses or signals are sent to microprocessor 4808 which tracks or counts these signals which is used by the microprocessor 4800 to determine the location of the during and after movement, whether it is manual or motorizes.

The unique arrangement of the shade presented herein allows for the first time manual movement of the shade material. While this certainly is an improvement over the prior art, this improvement provides its own challenges, which is tracking the position of the bottom bar during and after a manual movement. The use of sensors 4820 allows for tracking of the position, but the current draw if the batteries were turned on all the time is another problem. This problem is solved by the addition of the rotation detector 4812, which draws little to no current when the motor 4800 is not moving, and sends a signal to the microprocessor 4808 which wakes up the system when movement is sensed from the rotation detector 4812. Therefore, this arrangement allows for both detection of the position of the bottom bar of the shade during manual movement while also preserving the battery life.

FIGS. 41 to 50 present operational flow charts illustrating embodiments of the present invention. The functionality illustrated therein is implemented, generally, as instructions executed by the microcontroller. FIG. 41 depicts a "Main Loop" 430 that includes a manual control operational flow path, a remote control operational flow path, and a combined operational flow path. Main Loop 430 exits to various subroutines, including subroutine "TugMove" 440 (FIG. 42), subroutine "Move25" 450 (FIG. 43), subroutine "Move50" 460 (FIG. 44), subroutine "Move75" 470 (FIG. 45), subroutine "MoveUp" 480 (FIG. 46), and subroutine "MoveDown" 490 (FIG. 47), which return control to Main Loop 430. Subroutine "Power-Up" 405 (FIG. 48) is executed upon power up, and then exits to Main Loop 430. Subroutine "Hardstop" 415 (FIG. 49) is executed when a hard stop is, and then exits to Main Loop 430. Subroutine "Low Voltage" 425 (FIG. 50) is executed when in low voltage battery mode, and then exits to subroutine MoveUp 480.

FIG. 41 depicts the Main Loop 430. At step 3605, it is determined whether a message has been detected. If a message has not been detected, it is determined at step 3610 whether the tug timer has expired and, if not, the shade tube is monitored at step 3615. If the tug timer has expired, the dynamic brake is applied at step 3620. If a message is detected in step 3605, a determination is made in step 3625 as to whether a valid transmitter is stored in memory. If a valid transmitter is not stored in memory, step 3630 determines whether the transmitter program mode timer has expired and, if so, control is returned to step 3605. If the transmitter program mode timer has not expired, the signal is monitored for five seconds in step 3635 to determine at step 3640 whether the user has pressed new transmitter for more than five seconds. If the user has pressed new transmitter for more than five seconds, the transmitter is placed in permanent memory and the flag is set to "NewLearn" in step 3645. If the user has not pressed new transmitter for more than five seconds, control is returned to step 3605.

If it is determined in step 3625 that a valid transmitter is stored in memory, decode button code step 3650 begins. In step 3655, it is determined whether the "Up" button is detected; if so control flows to subroutine MoveUp 480, otherwise flow continues to step 3660, where it is determined whether the "Down" button is detected. If the Down button is detected, subroutine MoveDown 490 is invoked; otherwise, flow continues to step 3665, where it is determined if the "75%" button is detected, in which case subroutine Move75 470 begins. If the 75% button is not detected, it is determined in step 3670 if the "50%" button is detected. If so, subroutine Move50 460 is invoked and, if not, it is determined in step 3675 if the "25%" button is detected, in which case subroutine Move25 450 begins. If the "25%" button is not detected, flow continues to step 3615, as well as to step 3605 if in manual control.

In step 3680, it is determined whether the "LearnLimit," Learn25," "Learn50," or "Learn75" flag is set and, if so, flow returns to step 3605 to monitor for messages. If not, it is determined in step 3685 whether a tug has occurred in the shade. If a tug has occurred, the dynamic brake is released at step 3690 and flow then continues on to subroutine TugMove 440 (FIG. 42); otherwise, flow continues to step 3605 to monitor for messages.

Figure 42:
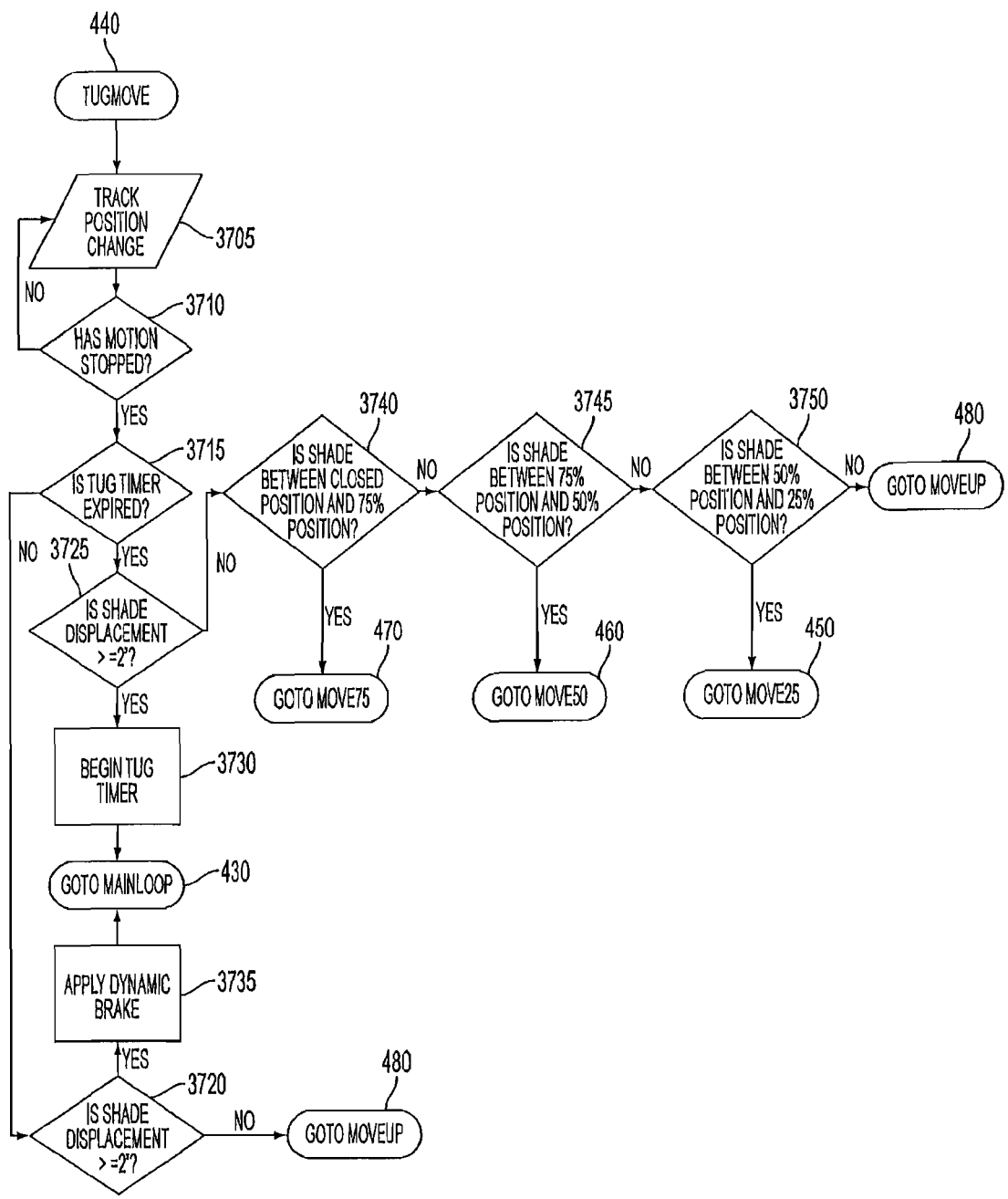

FIG. 42 depicts subroutine TugMove 440. In subroutine TugMove 440, position change is tracked in step 3705, and a determination is made in step 3710 if motion has stopped, in which case it is determined in step 3715 whether the tug timer has expired. If the tug timer has not expired, and if shade displacement is not greater than 2 inches, which is determined in step 3720, subroutine MoveUp 480 (FIG. 46) is executed; if, however, shade displacement is greater than two inches, the dynamic brake is applied in step 3735 and control is returned to MainLoop 430 (FIG. 41). If the tug timer has expired and if shade displacement is greater than two inches, determined in step 3725, the tug timer is started in step 3730, and then control is returned to MainLoop 430.

If the tug timer has expired and shade displacement is not greater than two inches, as determined in step 3725, a determination is made in step 3740 as to whether the shade is between the closed and 75% positions, in which case subroutine Move75 470 (FIG. 45) is executed. If the shade is not between the closed and 75% positions, a determination is made in step 3745 as to whether the shade is between the 75% and 50% positions, in which case subroutine Move50 460 (FIG. 44) is executed. If the shade is not between the 75% and 50% positions, a determination is made in step 3750 as to whether the shade is between the 50% and 25% positions, in which case subroutine Move25 450 (FIG. 43) is executed; otherwise subroutine MoveUp 480 (FIG. 46) is invoked.

Figure 43:
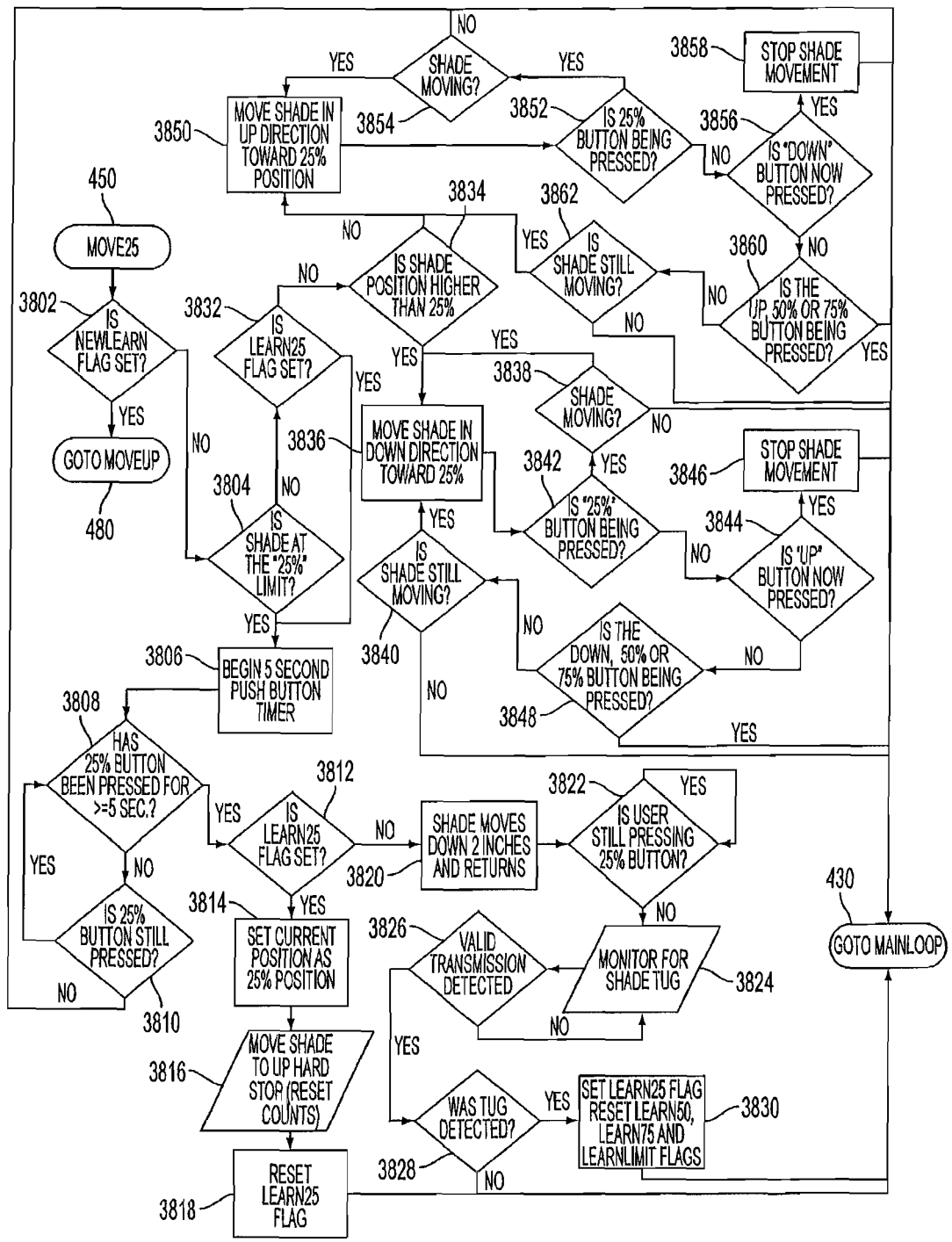

FIG. 43 depicts subroutine Move25 450. If the "NewLearn" flag is determined to be set in step 3802, subroutine MoveUp 480 (FIG. 46) is executed. Otherwise, it is determined in step 3804 whether the shade is a the 25% limit and, if so, the five second push button timer begins in step 3806, after which it is determined in step 3808 if the 25% button has been pressed for five seconds or more; if the 25% button has not been pressed for five seconds or more, it is determined in step 3810 whether the 25% button is still being pressed and, if not, control returns to the MainLoop 430 (FIG. 41). If, however, the 25% button is still being pressed, flow loops back to step 3808 to again determine whether the 25% button has been pressed for five seconds or longer. When the 25% button has been pressed for five seconds or more, it is determined in step 3812 if the Learn25 flag is set and, if yes, the current position is set as the 25% position in step 3814. Then, in step 3816, the shade is moved to up hard stop and the counts are reset, the Learn25 flag is reset in step 3818, and control returns to the MainLoop 430.

If it is determined in step 3812 that the Learn25 flag is not set, in step 3820 the shade moves down two inches and returns, and it is determined, in step 3822, whether the user is still pressing the 25% button. When the user stops pressing the 25% button, a shade tug is monitored in step 3824 and, when received, step 3826 determines whether a valid transmission is detected. Once a valid transmission is detected, it is determined in step 3828 if a tug was detected and, if a tug is detected, flags Learn25, Learn50, Learn75, and LearnLimit are set in step 3830, and control returns to the MainLoop 430. If a tug is not detected in step 3828, however, control returns to the MainLoop 430.

Returning to step 3804, if it is determined in that step that the shade is not at the 25% limit, it is determined in step 3832 whether the Learn25 flag is set and, if it is, the five second timer begins in step 3806, as discussed above. If the Learn25 flag is not set, however, it is determined in step 3834 if the shade is higher than the 25% position. If the shade is higher than the 25% position, the shade is moved in the downward direction toward the 25% position in step 3836, and it is determined in step 3838 if the shade is moving; if the shade is not moving, control returns to the MainLoop 430. As the shade is moved downward toward the 25% position in step 3836, it is determined, in step 3842, whether the 25% Button is being pressed and, if yes, it is determined whether the shade is moving in step 3838, described above. If, however, the 25% Button is not being pressed, it is determined, in step 3844, if the Up button is being pressed, in which case, shade movement is stopped in step 3846 and control returns to the MainLoop 430. If the Up button is not pressed, it is determined in step 3848 whether the Down, 50%, or 75% button is being pressed, in which case control returns to the MainLoop 430; otherwise, it is determined in step 3840 if the shade is still moving and, if so, the shade continues to move down and a determination is again made as to whether the 25% button is pressed, as described above for steps 3836 and 3842. If the shade is not moving, control returns to the MainLoop 430.

Referring again to step 3834, if it is determined that the shade position is not higher than 25%, the shade is moved in the upward direction toward the 25% position in step 3850. It is determined in step 3852 if the 25% Button is being pressed and, if yes, it is determined, in step 3854, whether the shade is moving. If the shade is moving, the determination of whether the 25% Button is being pressed continues in step 3852; if the shade is not moving, control returns to the MainLoop 430. If it is determined in step 3852 that the 25% Button is not being pressed, it is determined, in step 3856, if the Down button is pressed and, if it is, shade movement is stopped in step 3858 and control returns to the MainLoop 430. If, however, the Down button is not being pressed, it is determined, via step 3860, whether Up, 50%, or 75% buttons are being pressed; if so, control returns to the MainLoop 430, otherwise it is determined in step 3862 whether the shade is still moving and, if it is, the 25% button is monitored in steps 3850 and 3852 as described above. If the shade is not moving, control returns to the MainLoop 430.

Figure 44:
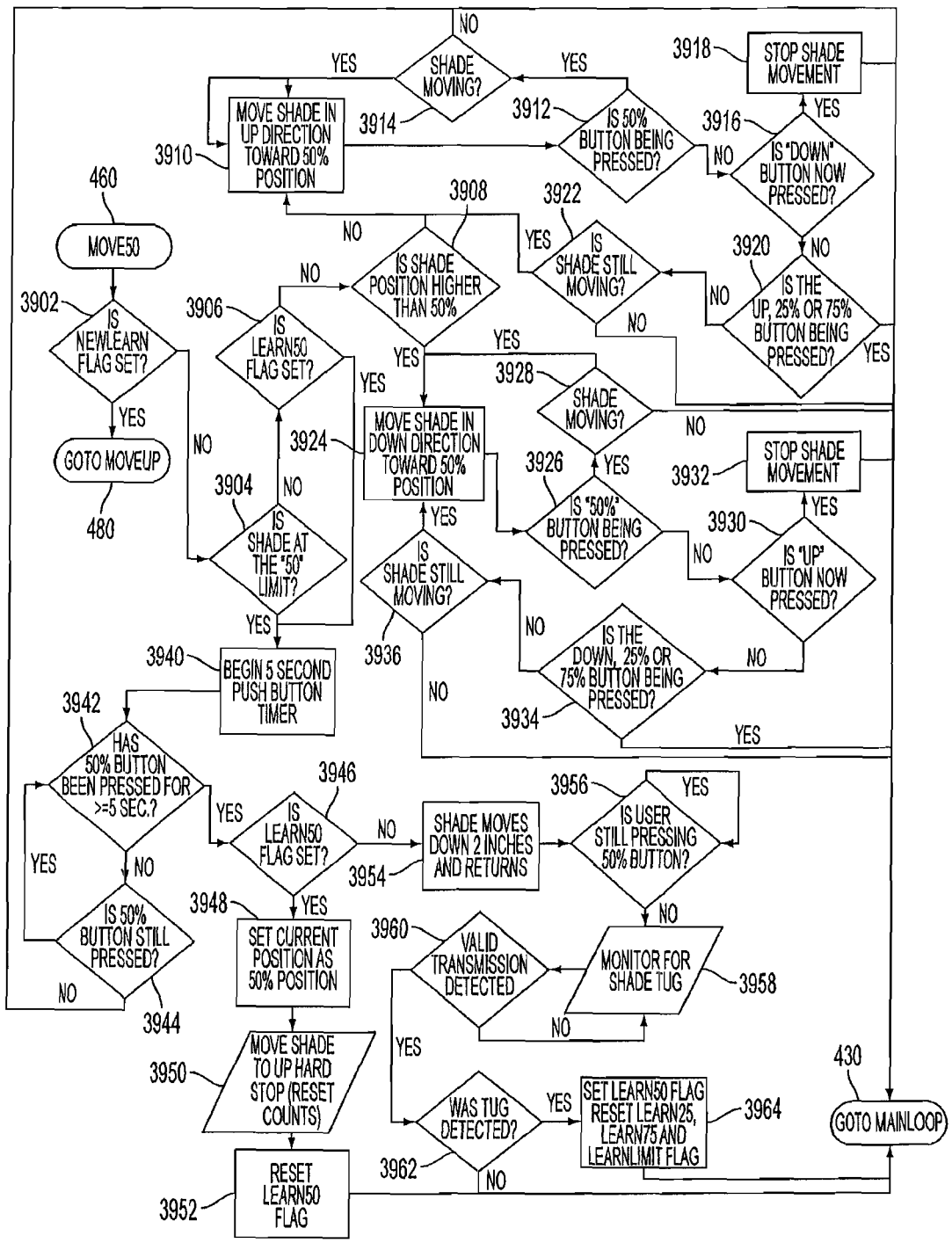

FIG. 44 depicts subroutine Move50 460. If the NewLearn flag is set, as determined in step 3902, subroutine MoveUp 480 (FIG. 46) is invoked; otherwise it is determined in step 3904 whether the shade is at the 50% limit and, if it is not, step 3906 determines whether the Learn50 flag is set. If the Learn50 flag is not set, step 3908 determines whether the shade position is higher than 50% and, if not, the shade is moved in the upward direction toward the 50% position in step 3910. If the 50% button is being pressed, as determined in step 3912, and if the shade is moving, as determined in step 3914, movement of the shade in the upward direction continues. If the 50% button is being pressed, but the shade is not moving, as determined in step 3914, control returns to the MainLoop 430 (FIG. 41). If it is determined in step 3912 that the 50% button is not being pressed, it is determined in step 3916 whether the Down button is pressed and, if it is, shade movement is stopped in step 3918 and control returns to the MainLoop 430. If the Down button is not pressed, however, it is determined in step 3920 whether the Up, 25%, or 75% buttons are pressed and, if so, control returns to the MainLoop 430 or, if not, step 3922 determines whether the shade is still moving and, if it is not, control returns to the MainLoop 430; if the shade is still moving, whether the 50% button is being pressed is monitored in steps 3910 and 3912 described above.

Returning to discussion of step 3908, if the shade position is higher than 50%, the shade is moved in the downward direction toward the 50% position in step 3924, and step 3926 monitors whether the 50% button is being pressed. If the 50% button is being pressed and if the shade is still moving, as determined in step 3928, the downward motion of the shade continues; if the shade is determined to not be moving in step 3928, however, control returns to the MainLoop 430. If the 50% button is not being pressed, it is determined in step 3930 if the Up button is pressed and, if it is, shade movement is stopped in step 3932 and control returns to the MainLoop 430. If the Up button is not pressed, it is determined in step 3934 whether the Down, 25%, or 75% button is being pressed and, if yes, control returns to the MainLoop 430; otherwise, step 3936 determines if the shade is still moving. If the shade is still moving, the monitoring of the 50% button being pressed resumes at steps 3924 and 3926, otherwise control returns to the MainLoop 430.

Returning to step 3906, if the Learn50 flag is set, or if the shade is determined in step 3904 to be at the 50% limit, the five second push button timer begins in step 3940, and step 3942 monitors whether the 50% button has been pressed for five seconds or more. If the 50% button has not been pressed for five seconds or more, step 3944 determines whether the 50% button is still being pressed and, if so, step 3942 continues to monitor for whether the 50% button has been pressed for five seconds or more. If the 50% button has been pressed for five seconds or more, it is determined in step 3946 whether the Learn50 flag is set and, if it is set, the current position is set as the 50% position in step 3948, the shade is moved to the up hard stop and the counts are reset in step 3950, the Learn50 flag is reset in step 3952, and control returns to the MainLoop 430. If, however, the Learn50 flag is not set, as determined in step 3946, in step 3954 the shade moves down two inches and returns, and step 3956 monitors until the 50% button is no longer pressed, at which point step 3958 monitors for a shade tug. Step 3960 determines whether a valid transmission is detected and, if so, step 3962 determines if a tug was detected, in which case the Learn50 flag is set, the Learn25, Learn75 and LearnLimit flags are reset in step 3964, and control returns to the MainLoop 430. If a tug was not detected, however, control simply returns to the MainLoop 430 without performing step 3964.

Figure 45:
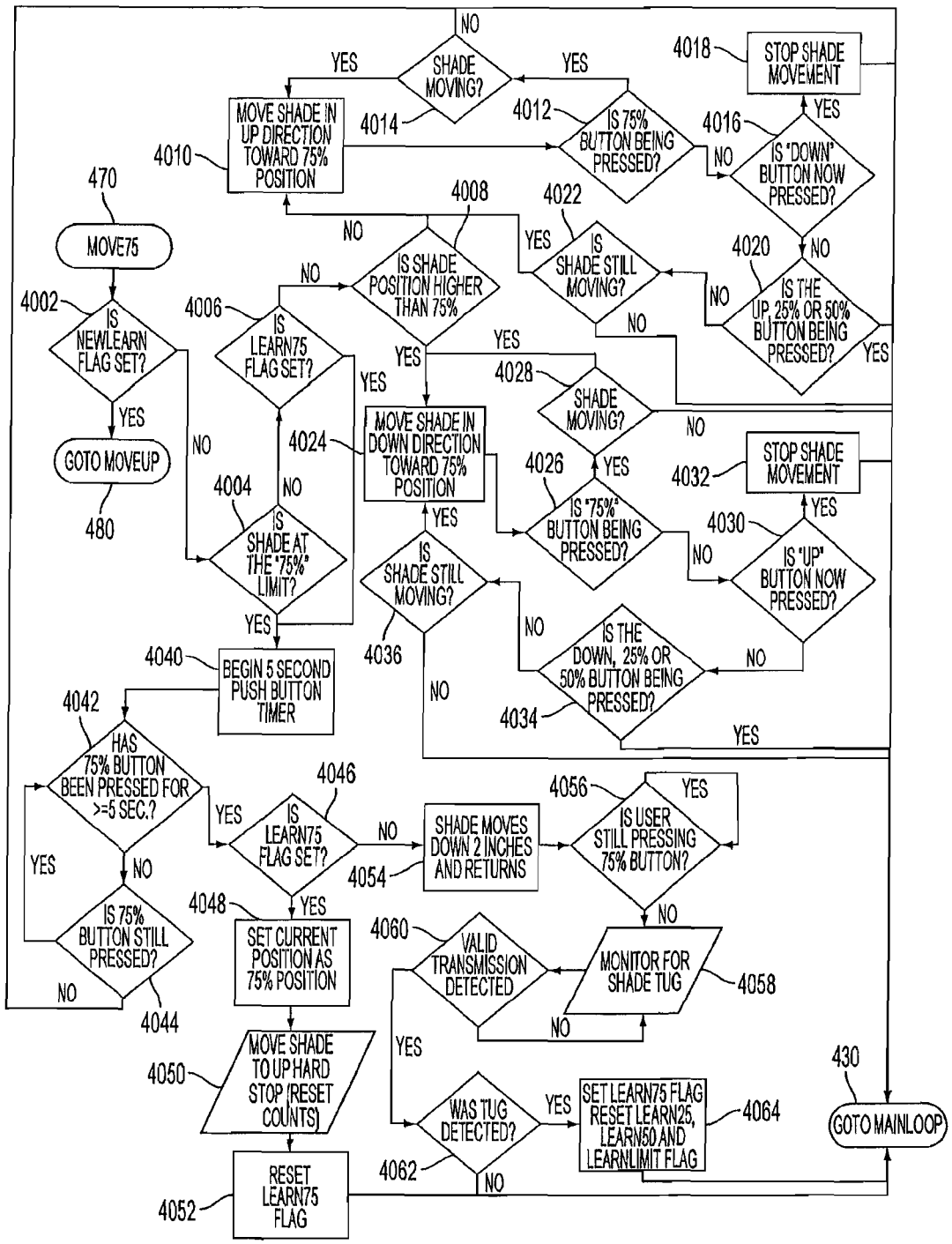

FIG. 45 depicts subroutine Move75 470. If the NewLearn flag is set, as determined in step 4002, subroutine MoveUp 480 (FIG. 46) is invoked; otherwise it is determined in step 4004 whether the shade is at the 75% limit and, if it is not, step 4006 determines whether the Learn75 flag is set. If the Learn75 flag is not set, step 4008 determines whether the shade position is higher than 75% and, if not, the shade is moved in the upward direction toward the 75% position in step 4010. If the 75% button is being pressed, as determined in step 4012, and if the shade is moving, as determined in step 4014, movement of the shade in the upward direction continues. If the 75% button is being pressed, but the shade is not moving, as determined in step 4014, control returns to the MainLoop 430 (FIG. 41). If it is determined in step 4012 that the 75% button is not being pressed, it is determined in step 4016 whether the Down button is pressed and, if it is, shade movement is stopped in step 4018 and control returns to the MainLoop 430. If the Down button is not pressed, however, it is determined in step 4020 whether the Up, 25%, or 50% buttons are pressed and, if so, control returns to the MainLoop 430 or, if not, step 4022 determines whether the shade is still moving and, if it is not, control returns to the MainLoop 430; if the shade is still moving, whether the 75% button is being pressed is monitored in steps 4010 and 4012 described above.

Referring again to step 4008, if the shade position is higher than 75%, the shade is moved in the downward direction toward the 75% position in step 4024, and step 4026 monitors whether the 75% button is being pressed. If the 75% button is being pressed and if the shade is still moving, as determined in step 4028, the downward motion of the shade continues; if the shade is determined to not be moving in step 4028, however, control returns to the MainLoop 430. If the 75% button is not being pressed, it is determined in step 4030 if the Up button is pressed and, if it is, shade movement is stopped in step 4032 and control returns to the MainLoop 430. If the Up button is not pressed, it is determined in step 4034 whether the Down, 25%, or 50% button is being pressed and, if yes, control returns to the MainLoop 430; otherwise, step 4036 determines if the shade is still moving. If the shade is still moving, the monitoring of the 75% button being pressed resumes at steps 4024 and 4026, otherwise control returns to the MainLoop 430.

In step 4006, if the Learn75 flag is set, or if the shade is determined in step 4004 to be at the 75% limit, the five second push button timer begins in step 4040, and step 4042 monitors whether the 75% button has been pressed for five seconds or more. If the 75% button has not been pressed for five seconds or more, step 4044 determines whether the 75% button is still being pressed and, if so, step 4042 continues to monitor for whether the 75% button has been pressed for five seconds or more. If the 75% button has been pressed for five seconds or more, it is determined in step 4046 whether the Learn75 flag is set and, if it is set, the current position is set as the 75% position in step 4048, the shade is moved to the up hard stop and the counts are reset in step 4050, the Learn75 flag is reset in step 4052, and control returns to the MainLoop 430. If, however, the Learn75 flag is not set, as determined in step 4046, in step 4054 the shade moves down two inches and returns, and step 4056 monitors until the 75% button is no longer pressed, at which point step 3958 monitors for a shade tug. Step 4060 determines whether a valid transmission is detected and, if so, step 4062 determines if a tug was detected, in which case the Learn75 flag is set, the Learn25, Learn50 and LearnLimit flags are reset in step 4064, and control returns to the MainLoop 430. If a tug was not detected, however, control simply returns to the MainLoop 430 without performing step 4064.

FIG. 46 depicts subroutine MoveUp 480. It is determined whether the shade is at the Up limit in step 4102. If the shade is at the Up limit, it is determined in step 4104 if the NewLearn flag is set, in which case the shade is moved down two inches and the NewLearn flag is cleared in step 4106, after which the shade is moved to the Up limit in step 4110, which also clears the NewLearn flag. If the NewLearn flag is not set, it is determined in step 4108 if the LearnLimit, Learn25, Learn50, or Learn 75 flag is set, in which case control returns to the MainLoop 430. If none of the Learn-Limit, Learn25, Learn50, or Learn 75 flags are set, the five second push button timer begins in step 4112. In step 4114, it is determined whether the Up button has been pressed for five seconds or more and, if not, step 4116 determines if the Up button is still being pressed; if not, control returns to the MainLoop 430; if so, step 4114 continues to monitor whether the Up button has been pressed for five seconds or more, after which the shade is moved to the 75% position in step 4118. A shade tug is monitored for in step 4120, and when a valid transmission is detected in step 4122, it is determined in step 4124 whether a tug was detected and, if not, control returns to the MainLoop 430; otherwise, it is determined in step 4126 whether the valid transmission was from the Up or Down button of a learned or unlearned transmitter, in which case the five second learn/delete timer begins in step 4128. In step 4130, it is determined whether the button has been pressed for five seconds or longer and, if not, step 4132 determines if the button is still being pressed; if not, control returns to the MainLoop 430, otherwise step 4130 continues to monitor whether the button has been pressed for five seconds or longer, at which point it is determined in step 4134 if the button pressed was the Up button and, if it was, the transmitter is placed in permanent memory in step 4136. If the button pressed was not the Up button, the transmitter is deleted from permanent memory in step 4138. After the transmitter is added to or deleted from permanent memory in step 4136 or 4138, respectively, the shade is moved to the Up limit and stopped in step 4140, and control returns to the MainLoop 430.

Referring again to step 4110, after the shade is moved to the Up limit and the NewLearn flag is cleared, it is determined in step 4142 whether the Up button is being pressed; if it is, a determination is made is step 4144 as to whether the shade is moving and, if it is, the shade continues to move to the Up limit and the NewLearn flag is cleared. If the Up button is not being pressed, however, it is determined in step 4146 whether the Down button is pressed and, if it is, shade movement is stopped in step 4148 and control returns to the MainLoop 430. If the Down button is not being pressed, step 4150 determines whether the 25%, 50% or 75% button is being pressed and, if yes, control returns to the MainLoop 430; otherwise, it is determined in step 4152 if the shade is still moving, in which case the monitoring of the Up button being pressed continues in steps 4110 and 4142. If the shade is not still moving, however, control returns to the Main-Loop 430.

FIG. 47 depicts subroutine MoveDown 490. If the NewLearn flag is determined in step 4202 to be set, subroutine MoveUp 480 (FIG. 46) is executed; otherwise, it is determined in step 4204 whether the shade is at the Down limit and, if it is not, and if the LearnLimit flag is not set, as determined in step 4206, the shade is moved to the Down limit in step 4208. If the LearnLimit flag is set, or if the shade is at the Down limit, the five second push timer begins, in step 4210. In step 4212, it is determined whether the Down button has been pressed for five or seconds or more and, if it has not, step 4214 determines if the Down button is still pressed. If the Down button is not still being pressed, control returns to the MainLoop 430 (FIG. 41); otherwise step 4212 monitors for whether the Down button has been pressed for five or seconds or more and, if so, step 4216 determines whether the LearnLimit flag is set; if the LearnLimit flag is set, the current position of the shade is set as the Down limit in step 4218, the shade is moved up to the hard stop and the counts are reset in step 4220, the Learn-Limit flag is reset in step 4222, and control returns to the MainLoop 430. If it is determined in step 4216 that the LearnLimit flag is not set, the shade moves up two inches and return in step 4224, after which it is determined in step 4226 if the user is still pressing the Down button and, if not, a shade tug is monitored for in step 4228. In step 4230, it is determined whether a valid transmission is detected and, in step 4232, whether a tug was detected, in which case the LearnLimit flag is set and the Learn25, Learn50, and Learn75 flags are reset; otherwise control returns to the MainLoop 430.

Referring again to step 4208, in which the shade is moved down, it is determined in step 4236 whether the Down button is being pressed and, if it is, whether the shade is still moving in step 4238. If it is determined in step 4238 that the shade is not moving, control is returned to the MainLoop 430. If it is determined in step 4236 that the Down button is not being pressed, step 4240 determines whether the Up button is being pressed and, if it is, shade movement is stopped in step 4242 and control returns to the MainLoop 430. If the Up button is not being pressed, it is determined in step 4244 whether the 25%, 50% or 75% buttons are being pressed; if this is the case, control returns to the MainLoop 430, otherwise it is determined in step 4246 whether the shade is still moving and, if it is, the monitoring of the Down button continues in steps 4208 and 4236. If the shade is not still moving, control returns to the MainLoop 430.

FIG. 48 depicts subroutine Power-Up 405. In step 4305, transmitter program mode is opened. In step 4310, it is determined whether a valid transmitter is detected. When a valid transmitter is detected, it is determined in step 4315 whether the transmitter is stored in permanent memory; if not, it is determined in step 4320 if the transmitter program mode timer has expired, in which case step 4310 continues to monitor for a valid transmitter detection. If the transmitter program mode timer has not expired, however, the signal is measured for five seconds in step 4325 and it is determined in step 4330 whether the user pressed New Transmitter for more than five seconds. If New Transmitter has not been pressed for more than five seconds, a valid transmitter detection is monitored for in step 4310; otherwise the transmitter is placed in permanent memory in step 4335 and it is determined in step 4340 if the shade has moved to the Hard Stop, in which case the shade is moved to the Down limit in step 4345 and control continues to the MainLoop 430. If the shade has not moved to the Hard Stop, the shade is moved up to find the Hard Stop in step 4350 and, if the shade traveled up less than two inches, as determined in step 4355, the shade is moved down two inches and returns, as shown in step 4360, after which the dynamic brake is applied in step 4365. If the shade did not travel up less than two inches, i.e., if the shade traveled up two inches or more, the dynamic brake is applied in step 4365 without moving the shade down two inches and returning it, as is done in step 4360.

Figure 49:
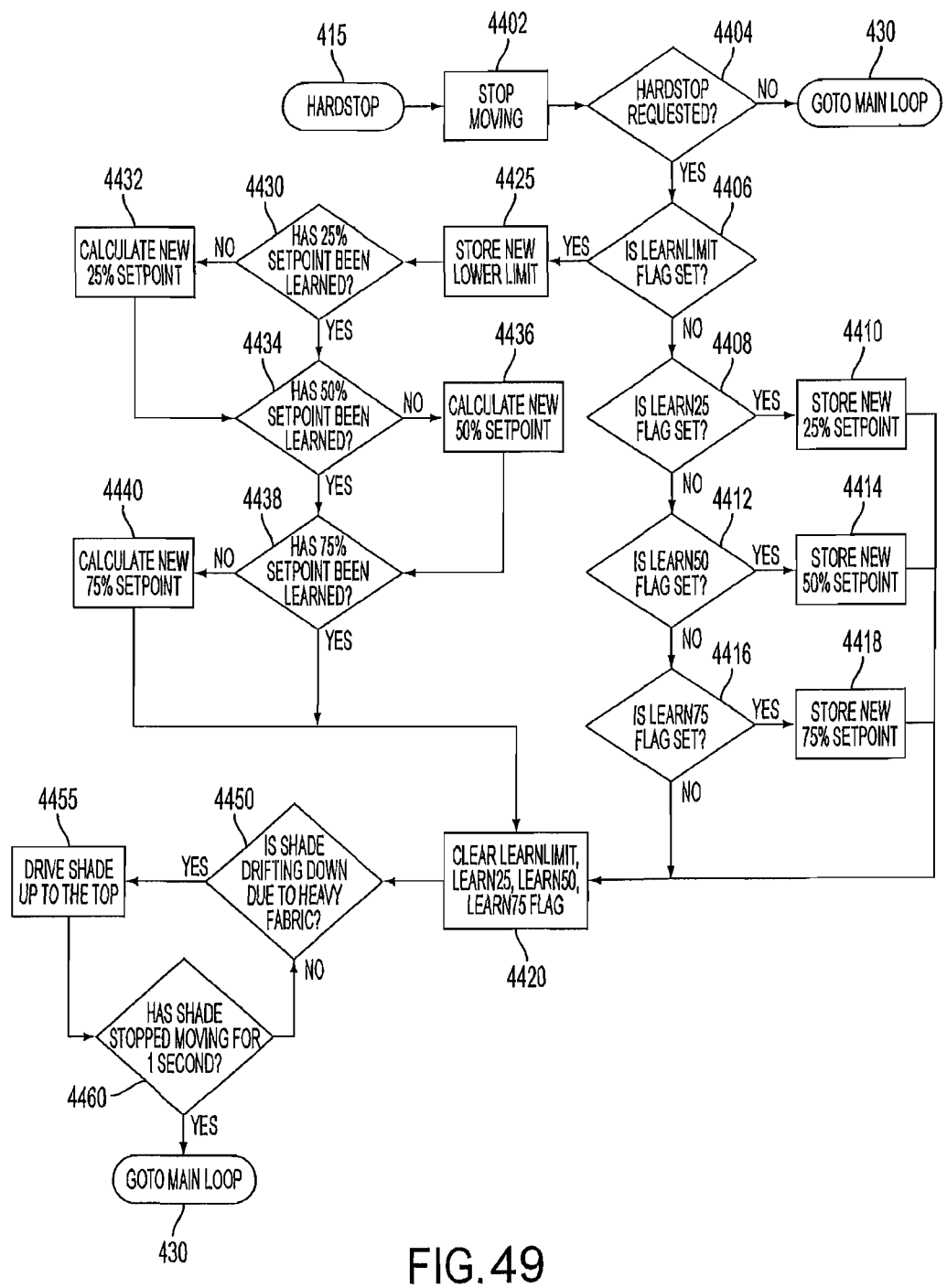

FIG. 49 depicts subroutine Hardstop 415. In step 4402, the shade stops moving and, in step 4404, it is determined whether a hardstop has been requested; if not, control returns to MainLoop 430 (FIG. 41), otherwise it is determined in step 4406 if the LearnLimit flag is set. If the LearnLimit flag is not set, it is determined in step 4408 if the Learn25 flag is set, in which case the new 25% setpoint is stored in step 4410; otherwise, it is determined, in step 4412 if the Learn50 flag is set, in which case the new 50% setpoint is stored in step 4414; otherwise it is determined, in step 4416 if the Learn75 flag is set, in which case the new 75% setpoint is stored in step 4418. If none of the LearnLimit, Learn25, Learn50, or Learn75 flags are set, or after the new 25%, 50%, or 75% setpoint is stored in steps 4410, 4414, or 4418, respectively, the LearnLimit, Learn25, Learn50, and Learn75 flags are cleared, as applicable, in step 4420.

If it is determined in step 4406 that the LearnLimit flag is set, a new lower limit is stored in step 4425, after which it is determined in step 4430 whether a 25% setpoint has been learned; if not, a new 25% setpoint is calculated in step 4432, and it is thereafter determined, in step 4434, if a 50% setpoint has been learned. If a 50% setpoint has not been learned, a new 50% setpoint is calculated in step 4436, and it is then determined in step 4438 if a 75% setpoint has been learned. If a 75% setpoint has not been learned, a new 75% setpoint is calculated in step 4440, and flow continues to step 4420, where the LearnLimit, Learn25, Learn50, and/or Learn75 flags are cleared, as described above. After the applicable flags are cleared in step 4420, it is determined in step 4450 whether the shade is drifting down due to heavy fabric, for example, in which case the shade is driven to the top in step 4455. In step 4460, it is determined whether the shade has stopped moving for one second, in which control returns to the MainLoop 430; otherwise it is again determined whether the shade is drifting down in step 4450.

Figure 50:
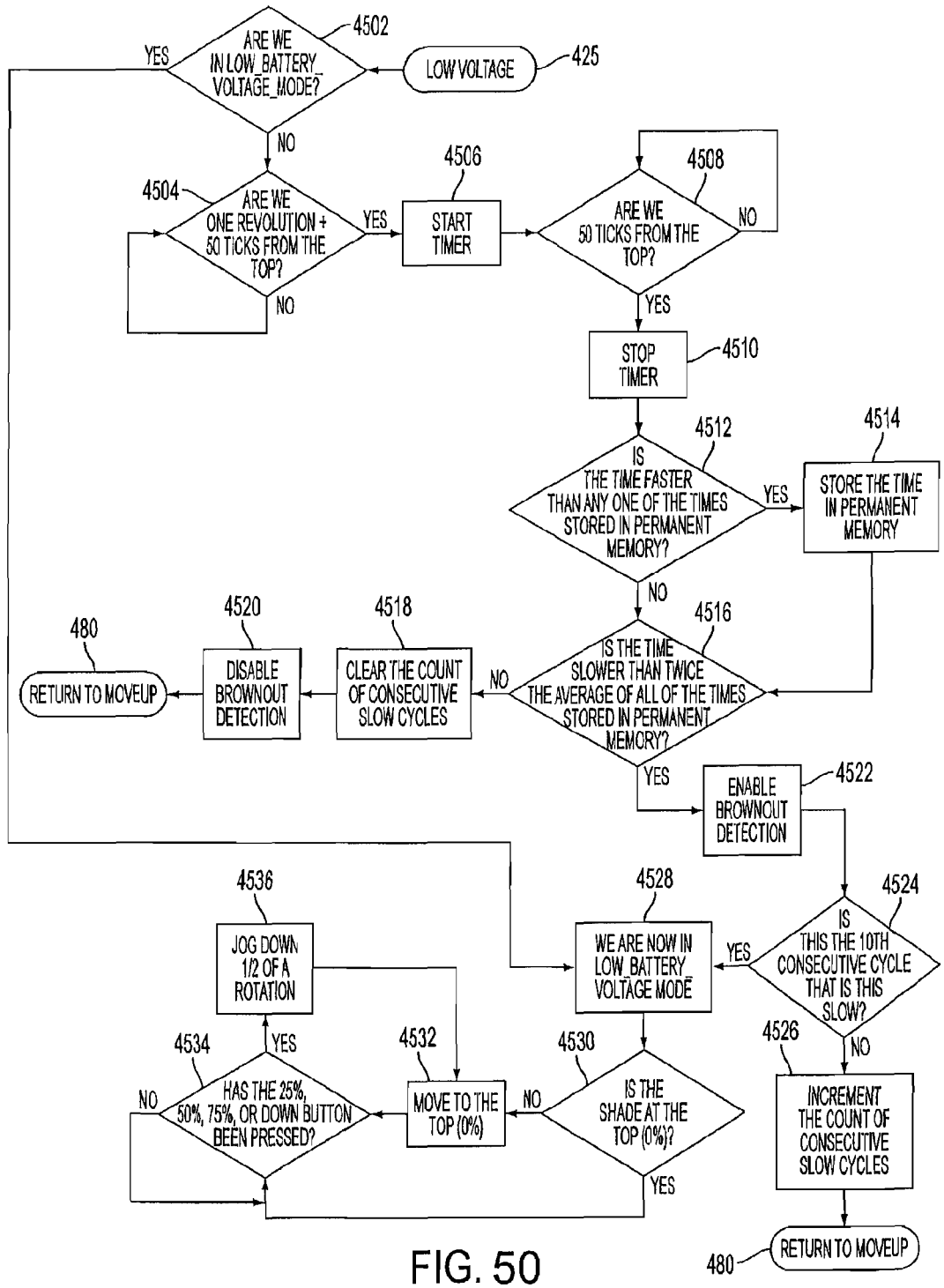

FIG. 50 depicts subroutine LowVoltage 425, in which it is determined, in step 4502, if the shade is in Low Battery Voltage Mode; if not, it is determined in step 4504 if the shade is one revolution plus 50 ticks from the top, in which case the timer is started in step 4506. When it is determined, in step 4508, that the shade is 50 ticks from the top, the timer is stopped in step 4510, and it is determined, in step 4512, whether the time is faster than any one of the times stored in permanent memory. If the time is faster than any one of the times stored in memory, the time is stored in permanent memory, the time is stored in step 4514; thereafter, or otherwise, it is determined in step 4516 if the time is slower than twice the average of all times stored in permanent memory and, if not, the count of consecutive slow cycles is cleared in step 4518, brownout detection is disabled in step 4520, and control returns to subroutine MoveUp 480 (FIG. 46). If the time is slower than twice the average of all times stored in permanent memory, however, brownout detection is enabled in step 4522, and it is determined, in step 4524, if this was the tenth consecutive slow cycle; if not, the count of consecutive slow cycles is incremented in step 4526 and control returns to subroutine MoveUp 480. In contrast, if this was the tenth consecutive slow cycle, Low Voltage Batter Mode 4528 is invoked. Similarly, Low Voltage Batter Mode 4528 is invoked based on the determination described above for step 4502.

In step 4530, it is determined, for Low Voltage Battery Mode, if the shade is at the top, e.g., is at zero (0) percent. If not, the shade is moved to the top in step 4532; otherwise, it is determined in step 4534 whether the 25%, 50%, 75%, or Down button has been pressed, in which case the shade is jogged down one-half (½) rotation in step 4536, and is then moved to the top in step 4532.

Figure 51:
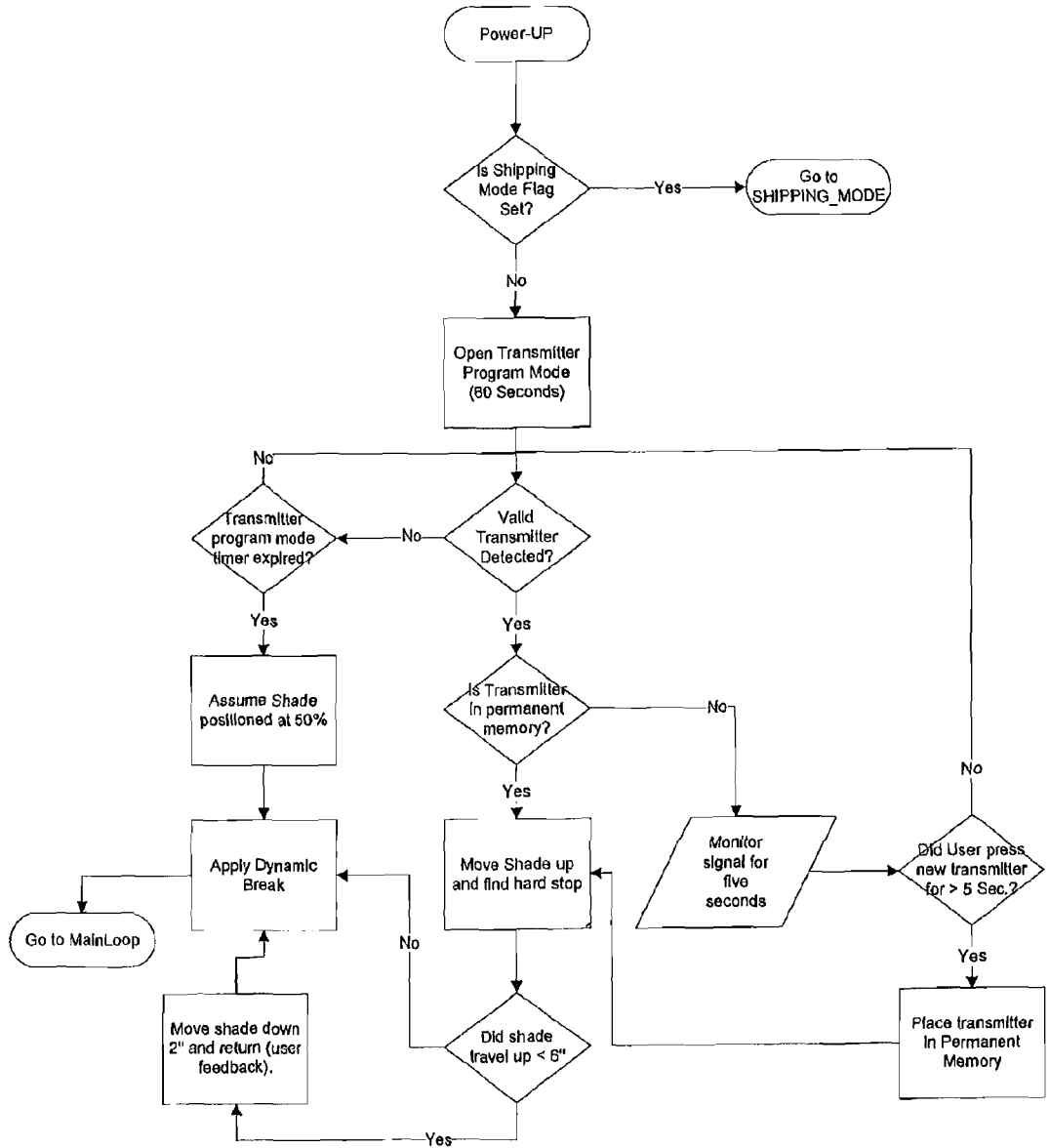
FIGS. 51-56 present operational flow charts according to another embodiment of the present invention.
Figure 52:
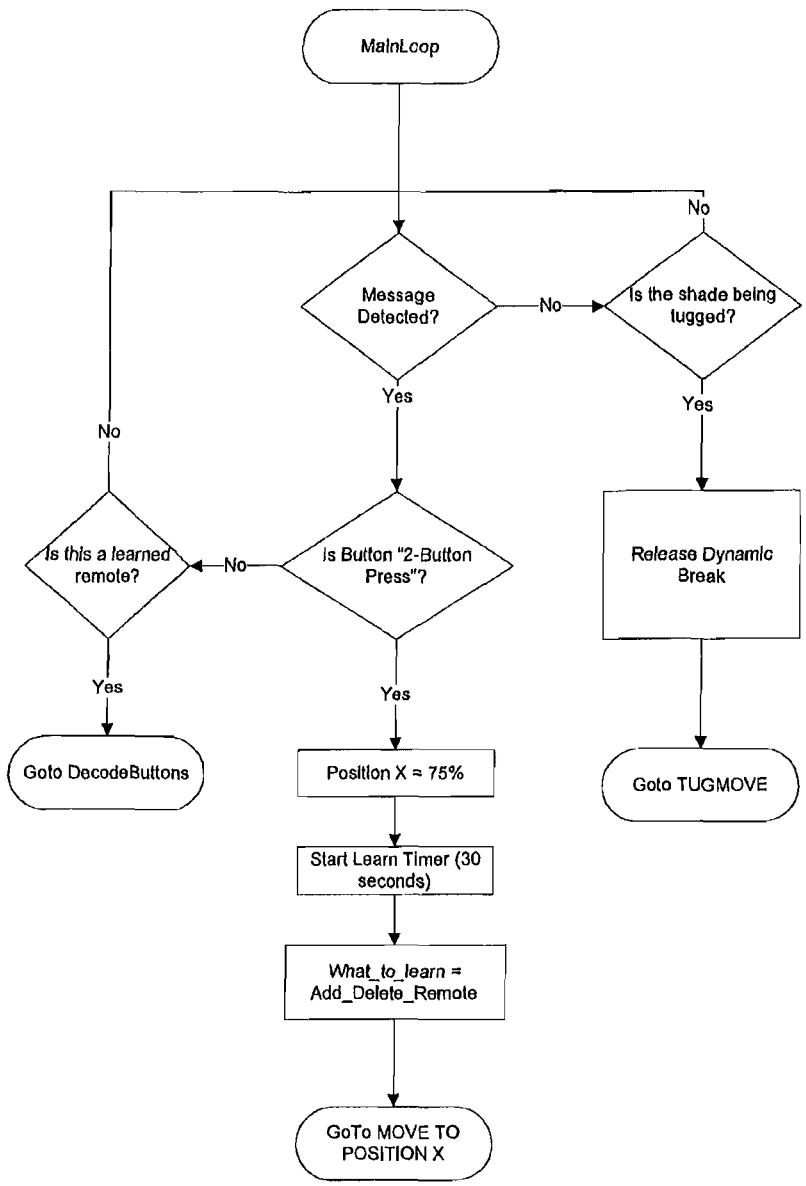
Figure 53:
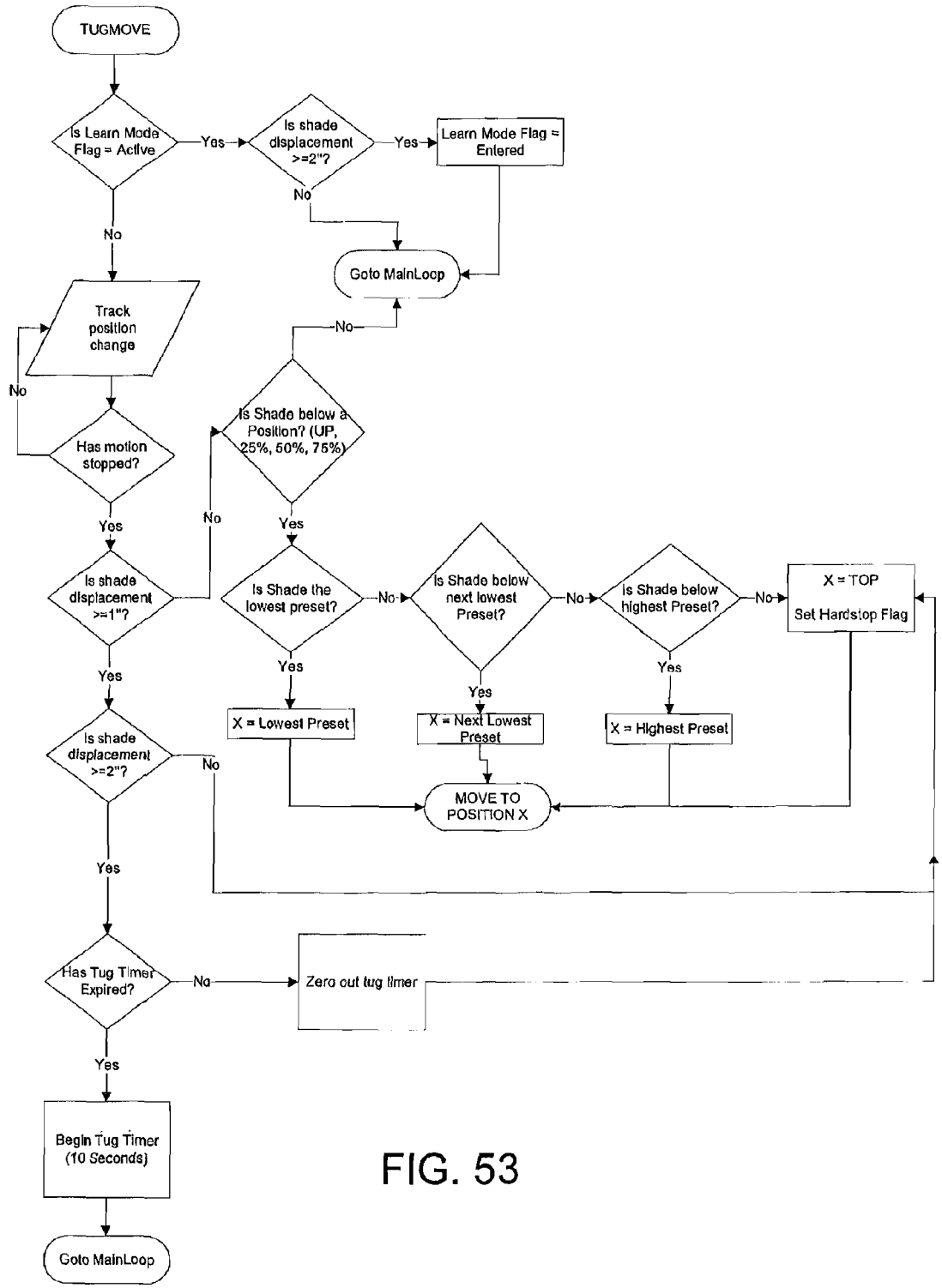
Figure 54:
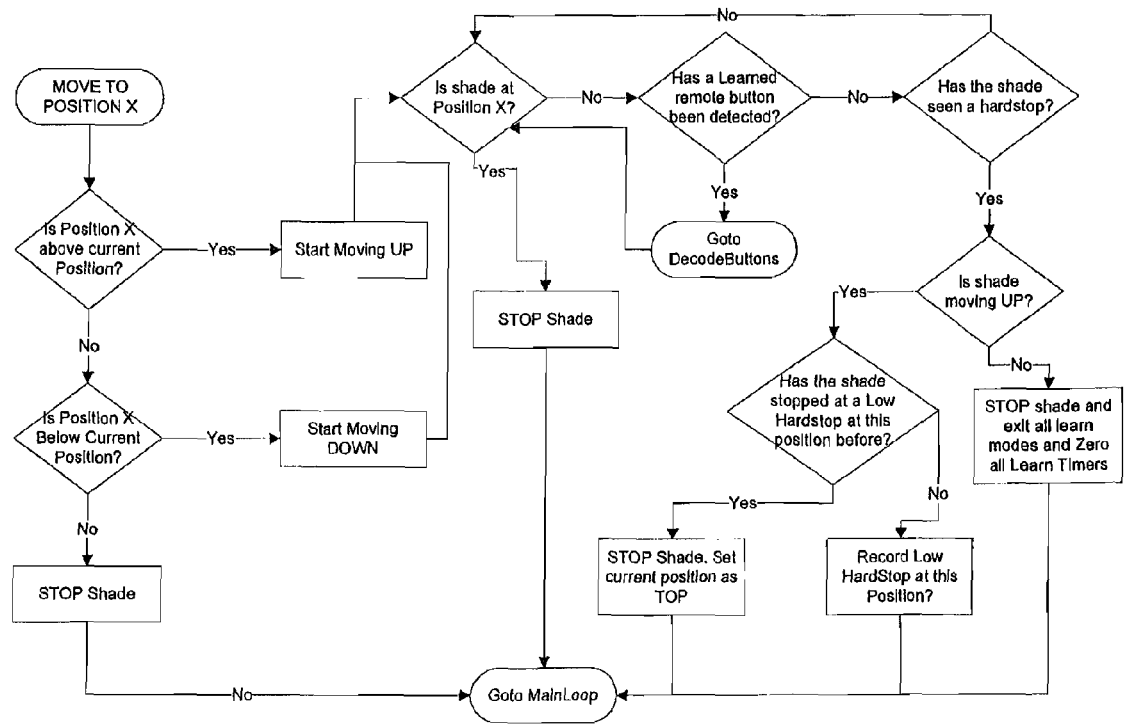
Figure 55A:
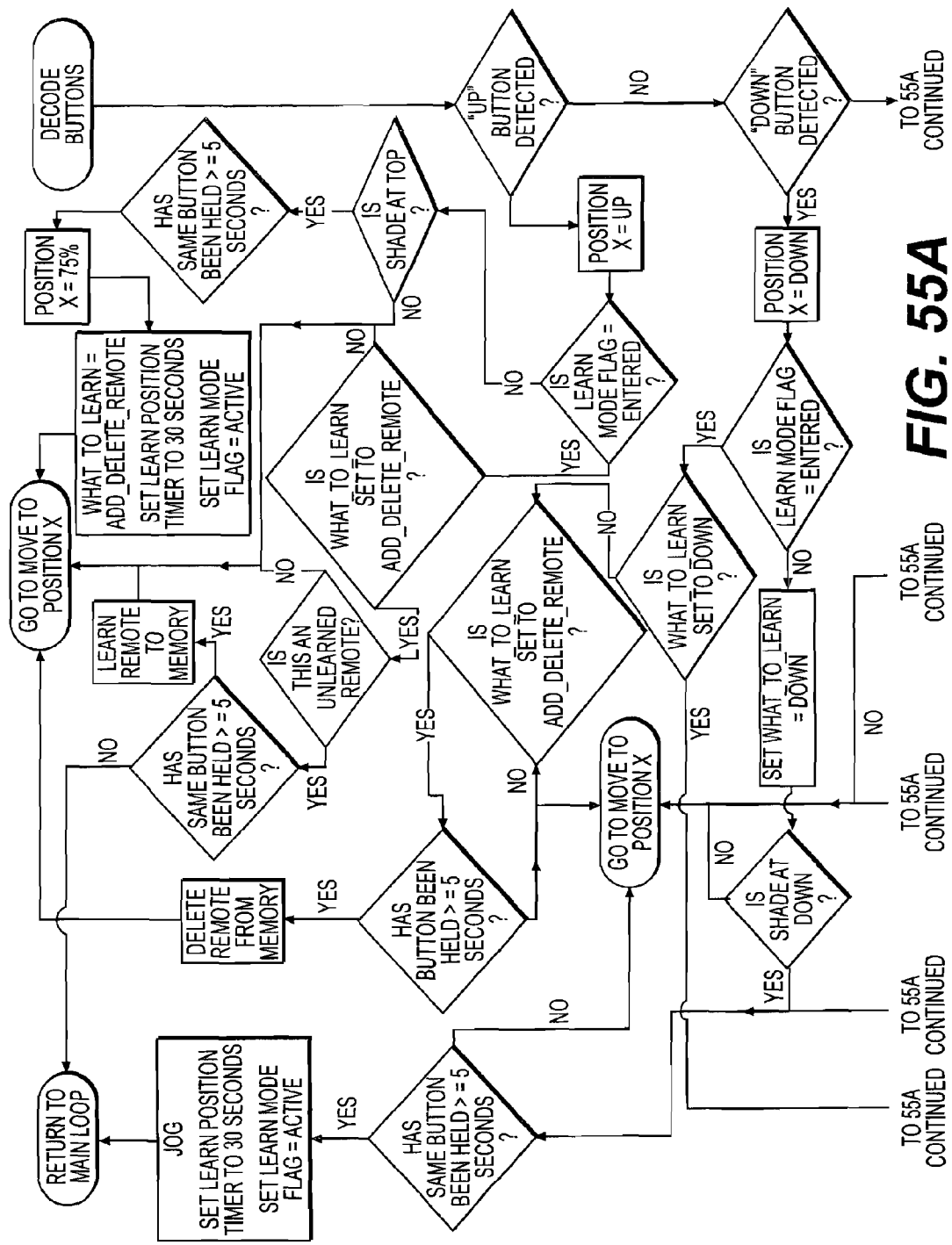
Figure 55A:
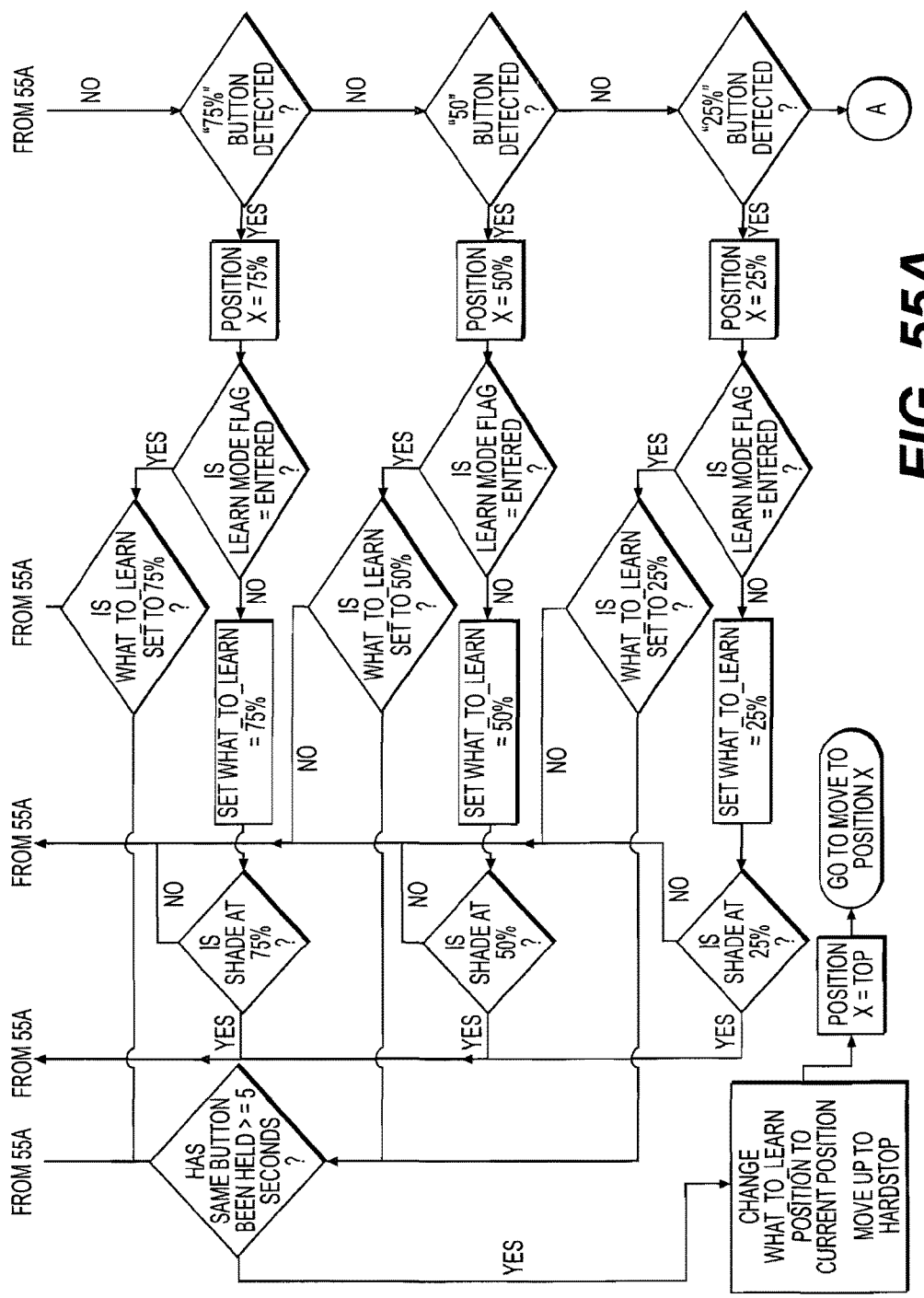
Figure 55B:
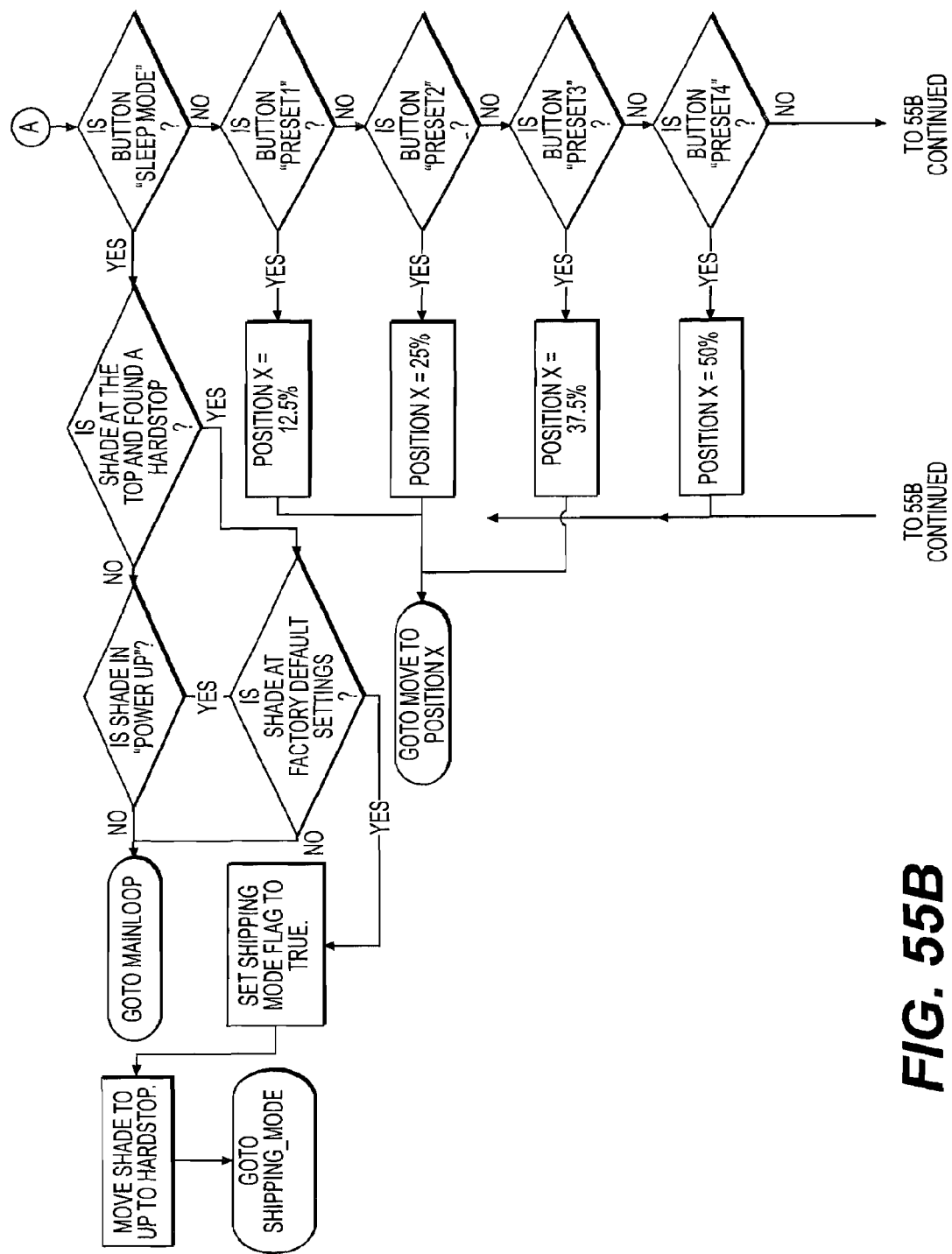
Figure 55B:
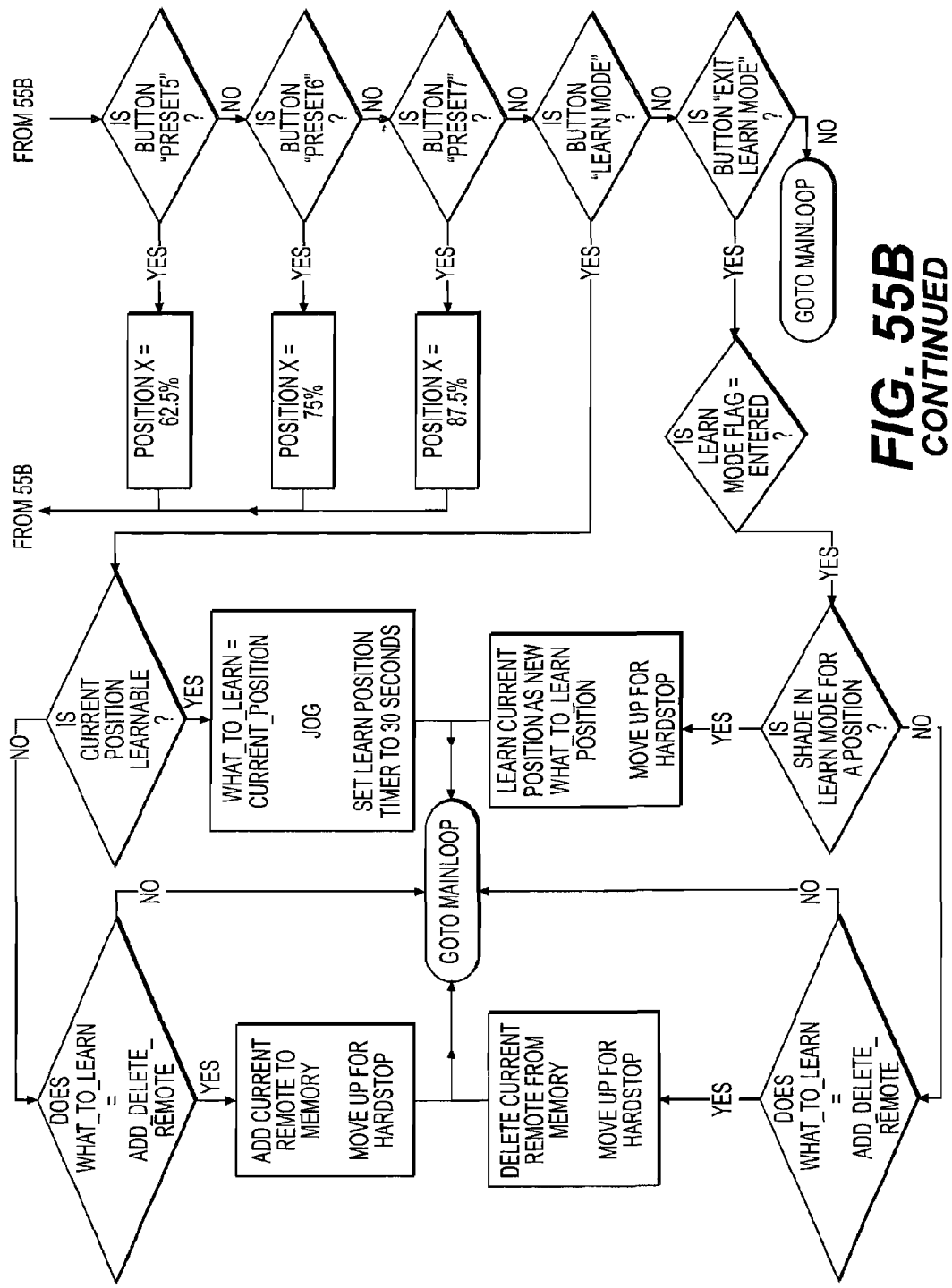
Figure 56:
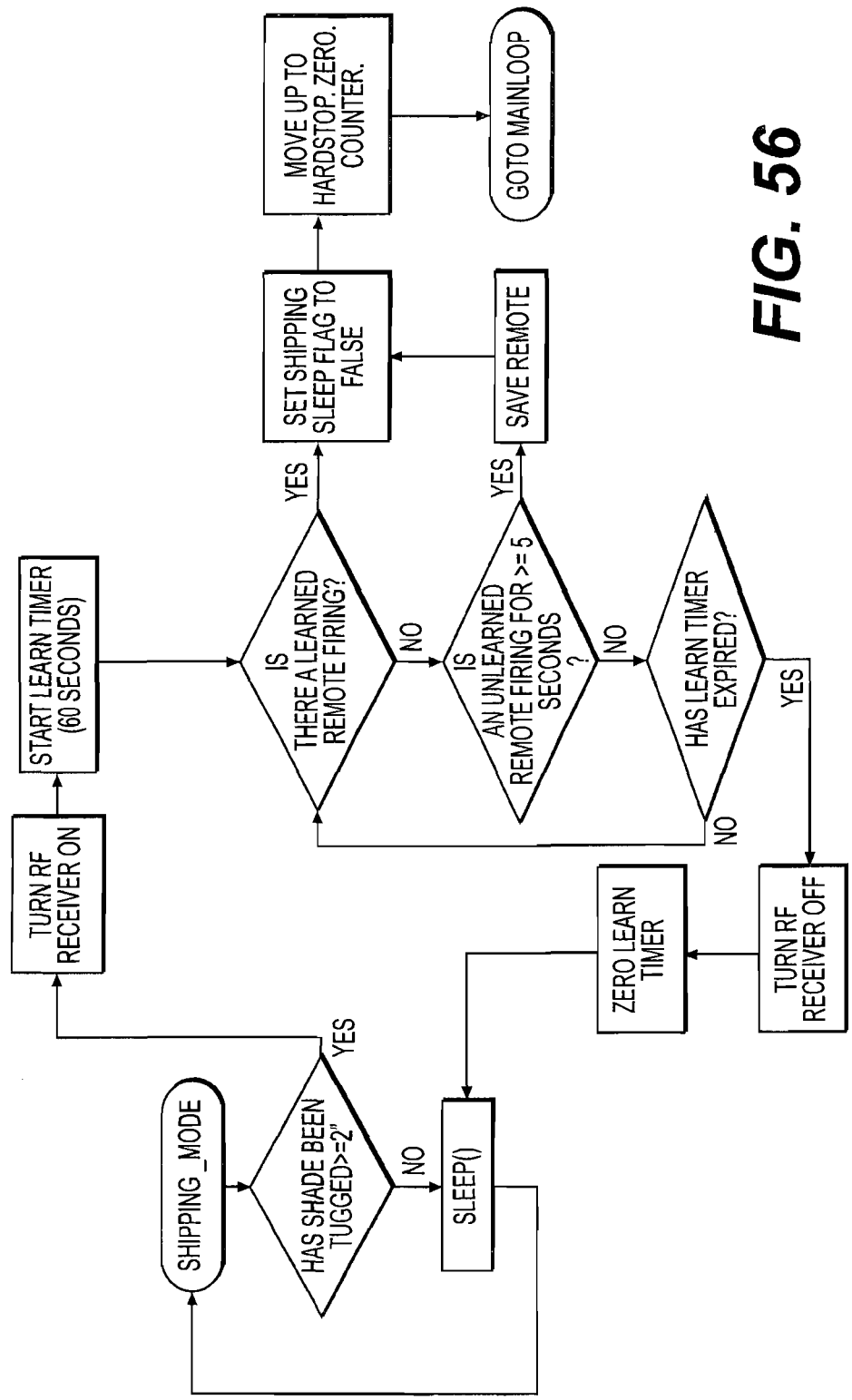

FIGS. 51 to 56 present operational flow charts illustrating other embodiments of the present invention. The functionality illustrated therein is implemented, generally, as instructions executed by the microcontroller. FIG. 51 depicts a "Power-Up" flow path to prepare the shade for a command when a signal from the remote control or transmitter is received. FIG. 52 depicts a "MainLoop" flow path that includes a manual control operational flow path and a remote control operational flow path. FIG. 53 depicts a "TugMove" flow path that initiated movement of the shade following detection of a tug. FIG. 54 depicts a "Move to Position X" flow path that determines the amount of movement of the shade. FIGS. 55A-B depict a "DecodeButtons" flow path that initiate various movements of the shade depending on button pressed on the remote control. Finally, FIG. 56 depicts a "Shipping_Mode" flow path that turns on the radio frequency receiver for recognizing a particular remote control.

Alternatively, a motorized roll shade rotates only the roll shade not the motor and power supply. The rotating parts in such a roll shade may have less rotating mass and require less current to operate compared to one where the motor and power supply are rotated. In addition, such a roll shade may not require a slip ring and/or a commutator ring to transmit power. The absence of a power coupling that includes a commutator ring or a slip ring may reduce manufacturing and operation cost and component failures.

Figure 57:
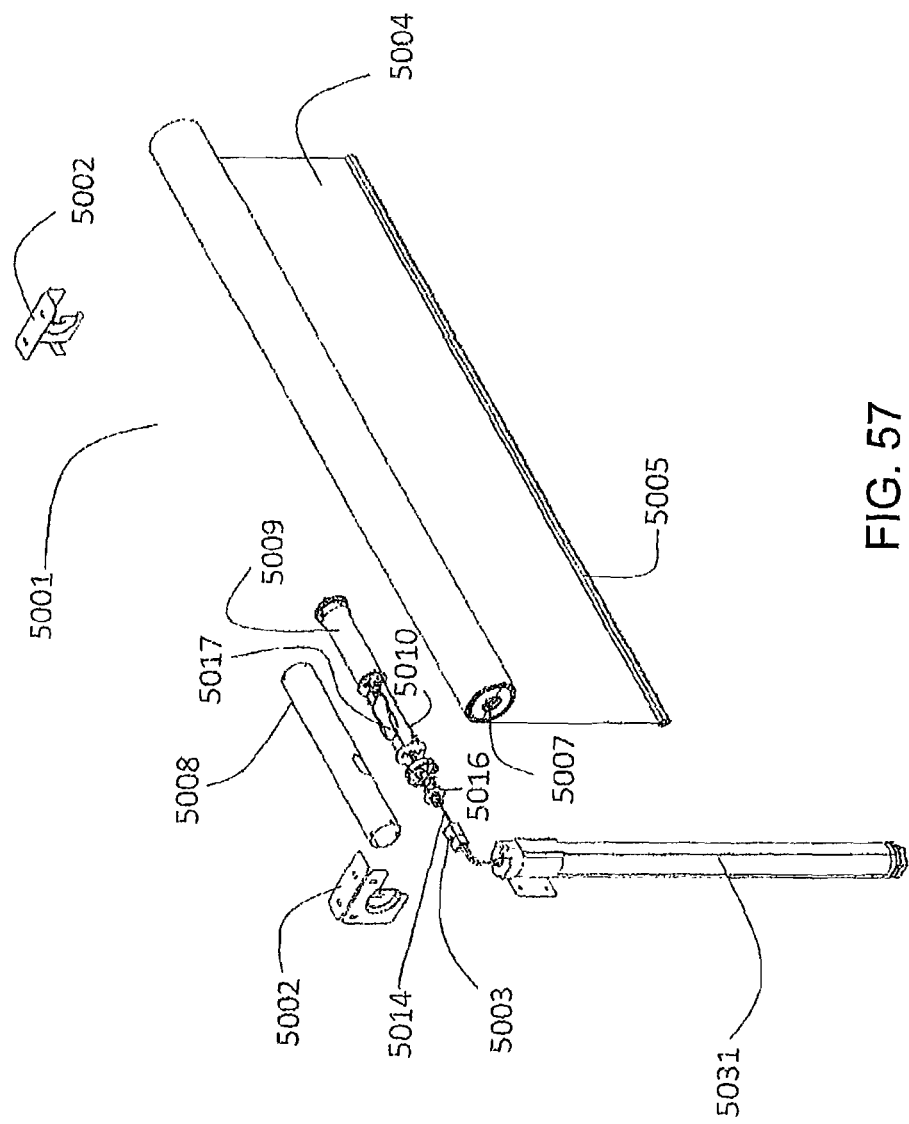
FIG. 57 is a perspective view of a roll shade system according to an embodiment of the present invention.

FIGS. 57-64 depict an alternative embodiment in accordance with the present invention. FIG. 57 depicts a perspective view of a roll shade assembly. FIG. 57 shows a roll shade system 5001 including one or more mounting brackets 5002, an architectural cover 5004, a bottom bar 5005, a roll shade tube 5007, a motor tube 5008, a motor assembly 5009, a receiving assembly 5010, a coaxial antenna wire 5017, an antenna system 5016, and an input wiring system 5014. The architectural cover 5004 may enclose the roll shade tube 5007 where one end of the architectural cover 5004 may be attached to the bottom bar 5005. The roll shade tube 5007 may enclose the motor tube 5008 that may further enclose the receiving assembly 5010 and the motor assembly 5009. The coaxial antenna wire 5017 may connect the antenna system 5016 and the receiving assembly 5010. A connector 5003 may be connected to the input wiring system 5014 one end of which may be connected to the receiving assembly 5010. In some aspects, the connector 5003 may be an electrical connector, preferably a low voltage connector. In various aspects, the connector 5003 may be further connected to a transformed line voltage or an external battery pack 5031.

FIG. 58 depicts a side or end view the roll shade system 5001 in FIG. 57. At least one of the mounting brackets 5002 may be directly or indirectly connected to an end of the roll shade tube 5007. One end of the architectural cover 5004 may be attached to the bottom bar 5005. In one aspect, the bottom bar 5005 may provide an end-of-travel stop. The architectural cover 5004 may enclose the roll shade tube 5007.

FIG. 59 depicts a plane view taken along the line 48-48 in FIG. 58. In one aspect, the roll shade system 5001 may be mounted in the top portion of a window, door, etc., using the mounting brackets 5002. The connector 5003 may be connected to the input wiring system 5014 enclosed, in part, by the roll shade tube 5007.

Figure 60:
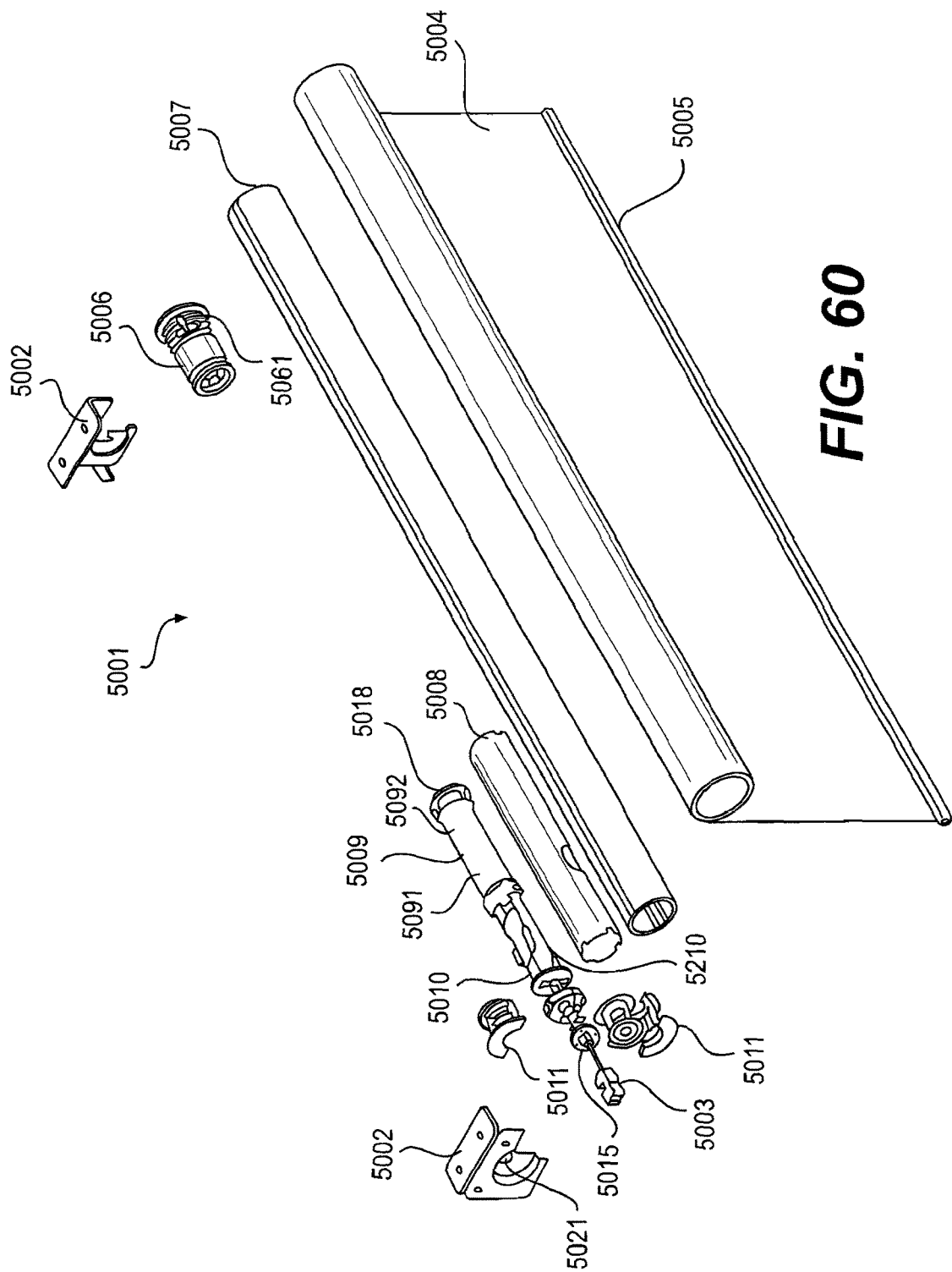
FIG. 60 is an exploded perspective view of components of a roll shade system according to an embodiment of the present invention.

FIG. 60 depicts an exploded perspective view of components of the roll shade system 5001 in FIG. 57. In addition to the architectural cover 5004 attached to the bottom bar 5005, the roll shade system 5001 may include a counterbalance assembly 5006, a drive wheel 5018, a motor tube 5008, a motor assembly 5009, a receiving assembly 5010, a support shaft 5015, and bearing housing 5011.

The counterbalance assembly 5006 may include a counterbalancing spring 5061 which may be preloaded to assist in rotating the roll shade tube 5007 and the roll shade system 5001. One end of the counterbalance assembly 5006 may be attached to the roll shade tube 5007 so that the one end of the counterbalance assembly 5006 and the roll shade tube 5007 can rotate in a synchronized manner whereas the other end of the counterbalance assembly 5006 remains stationary.

The drive wheel 5018 may be rotatably connected to one end of the motor assembly 5009 so that the drive wheel 5018 can rotate while the motor assembly 5009 remains stationary. The other end of the motor assembly 5009 may be fixedly attached to the receiving assembly 5010. The motor assembly 5009 may include an internal motor 5091 and optionally a gear motor reducing assembly 5092, which are shown in dashed line in the motor assembly 5009 in FIG. 60. In one aspect, the internal motor 5091 may include a DC gear motor.

The motor tube 5008 may enclose the motor assembly 5009 and the receiving assembly 5010. The bearing housing 5011 may be placed at an end of the motor tube 5008. The roll shade tube 5007 may enclose the motor tube 5008. In one aspect, the roll shade tube 5007 may enclose the motor tube 5008 and the bearing housing 5011. The bearing housing 5011 may be rotatably connected to the support shaft 5015 so that the bearing housing 5011 can rotate while the support shaft 5015 remains stationary. The mounting bracket 5002 may include a mounting slot 5021. The support shaft 5015 may be fixedly connected to the mounting slot 5021. In one aspect, the mounting slot 5021 may lock the support shaft 5015 to not rotate.

Figure 61:
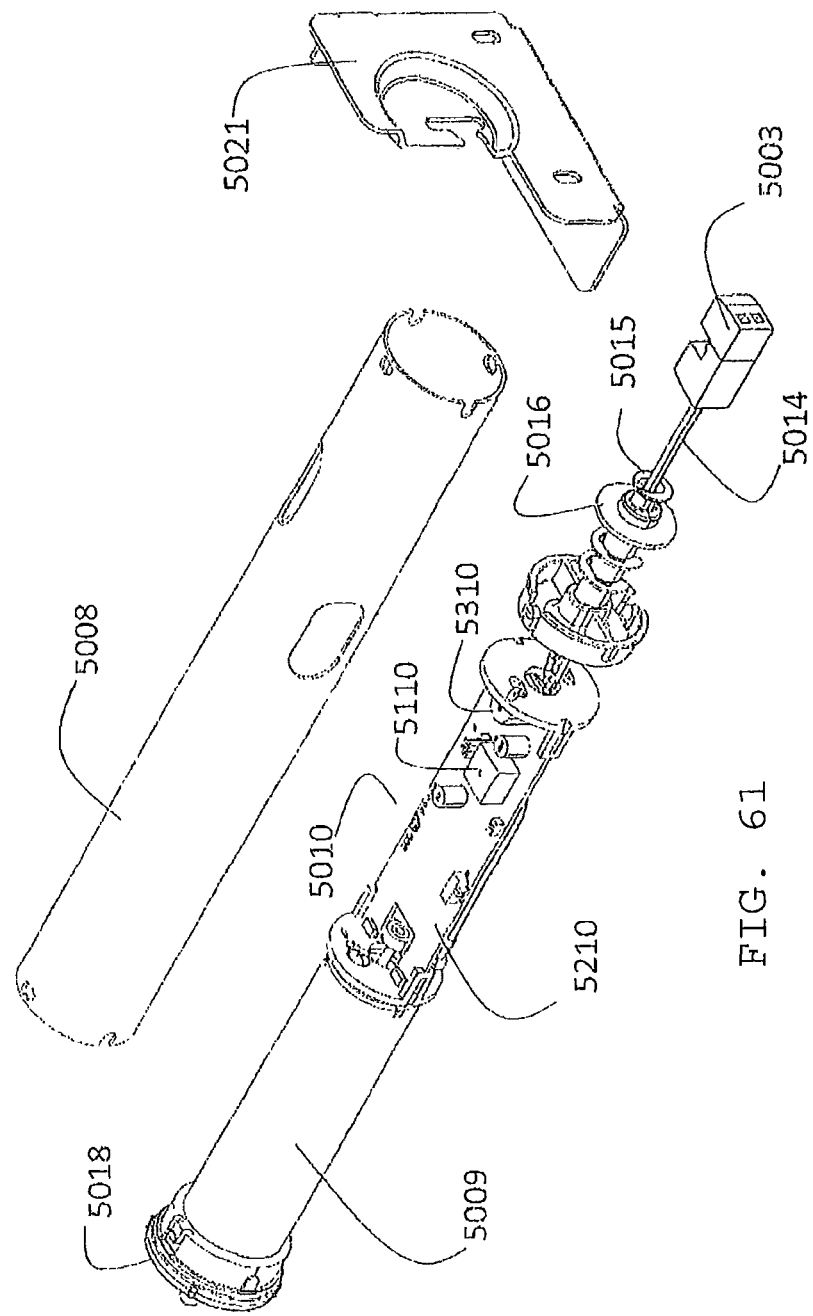
FIG. 61 depicts another exploded perspective view of components of the roll shade system 5001 in FIG. 57.

FIG. 61 depicts another exploded perspective view of components of the roll shade system 5001 in FIG. 57. FIG. 61 shows the roll shade system 5001 that may include the mounting bracket 5002, the motor tube 5008, the drive wheel 5018, the motor assembly 5009, the receiving assembly 5010, the antenna system 5016, the support shaft 5015, the input wiring system 5014 and the connector 5003. The receiving assembly 5010 may include one or more circuit boards 5210 on a backside of the receiving assembly 5010. The circuit boards 5210 may include all of the supporting circuitry and electronic components necessary to sense and control the operation of the motor 5091, manage and/or condition the power supplied for the of the roll shade system 5001, etc., including, for example, a motor controller or microcontroller 5110, a Radio Frequency (RF) receiving unit 5310 and memory (not shown for a clarity).

Figure 62:
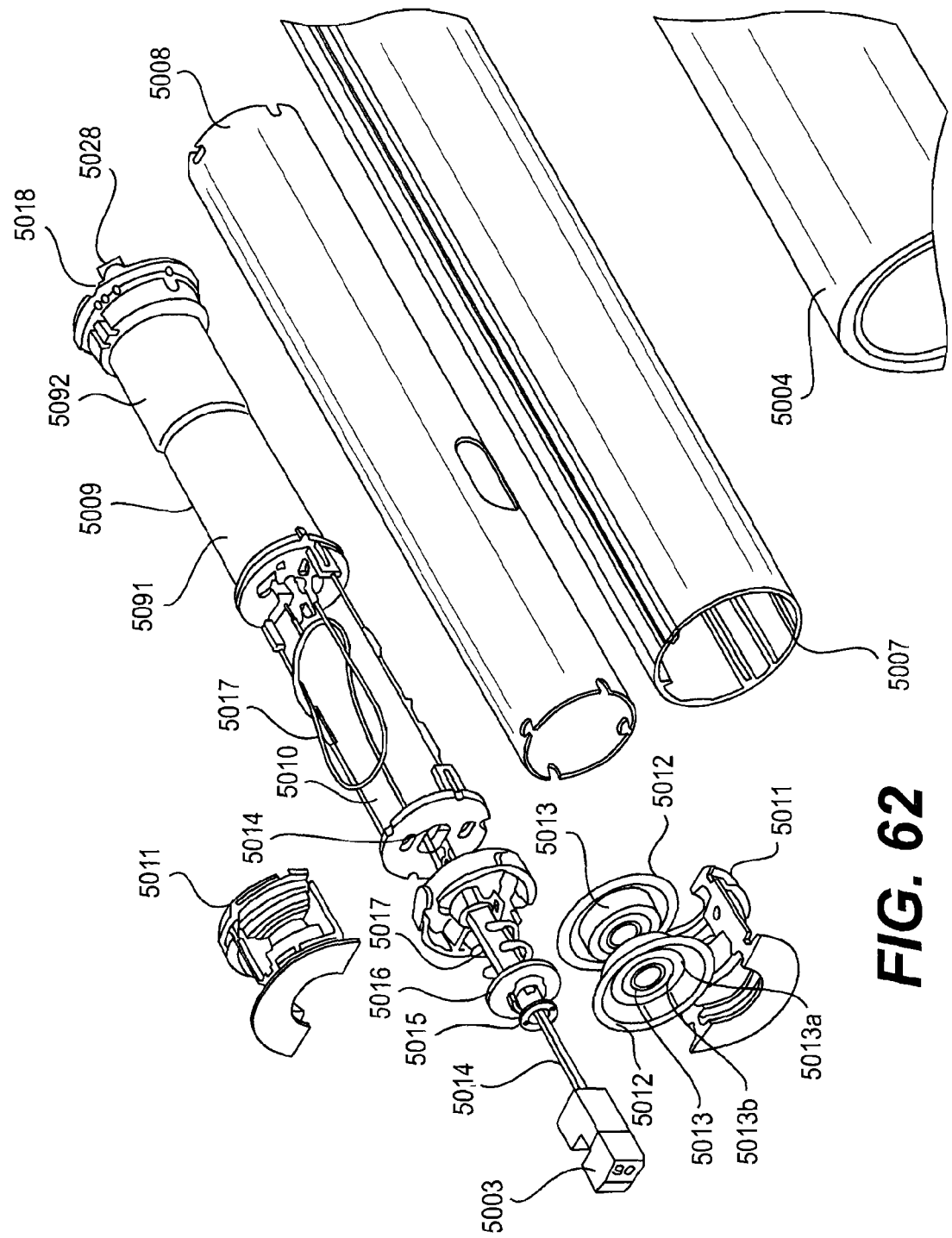
FIG. 62 is an enlarged perspective view of the components in FIG. 60.

FIG. 62 depicts an enlarged perspective view of the components in FIG. 60. A coaxial antenna wire 5017 that is supported by the receiving assembly 5010 may be wired or plugged into the receiving assembly 5010. In one aspect, one end of the coaxial antenna wire 5017 may be wired or plugged into an electrical terminal (not shown for clarity) of the receiving assembly 5010, or optionally into the circuits 5210 in the receiving assembly 5010. The other end of the coaxial antenna wire 5017 may be plugged into the antenna system 5016 placed outside the receiving assembly 5010. The receiving assembly 5010 and the antenna system 5016 may be electrically connected. The antenna system 5016 may carry signals to the receiving assembly 5010. In one aspect, the antenna system 5016 may carry signals to the motor controller 5110 (FIG. 61) in the receiving assembly 5010. In various aspects, the signals may be carried by the coaxial antenna wire 5017 from the antenna system 5016 to the receiving assembly 5010. The antenna system 5016 may be capable of carrying a Radio Frequency (RF) band. Optionally, the antenna system 5016 may be capable of wirelessly carrying signals to the receiving assembly 5010.

The roll shade system 5001 may include the input wiring system 5014. One end of the input wiring system 5014 may be wired or plugged into the connector 5003 to establish an electrical connection. The other end of the input wiring system 5014 may be wired or plugged into the receiving assembly 5010, or optionally into the motor controller 5110 in the receiving assembly 5010. The connector 5003, the input wiring system 5014, and the receiving assembly 5010 may remain stationary during operation of the internal motor 5091. The support shaft 5015 may be positioned to support the input wiring system 5014 each end of which may be wired and/or plugged into the receiver assembly 5010 and into the connector 5003, respectively, to establish an electrical connection between the connector 5003 and the receiving assembly 5010.

The roll shade system 5001 may include the bearing housing 5011 that may include one or more O-rings 5012 and one or more bearings 5013. In one aspect, the bearing housing 5011 may include two bearings 5013 where each outer race 5013a of the bearings 5013 is attached to the bearing housing 5011 while the inner race 5013b of the bearings 5013 is attached to the support shaft 5015. The O-rings 5012 may be coupled to the bearing housing 5011. One end of the bearing housing 5011 may be mechanically coupled to the roll shade tube 5007. In some aspects, the roll shade tube 5007, the bearing housing 5011 and the outer races 5013a of the bearing 5015, the O-rings 5012 may rotate while the inner race 5013b of the bearings 5013 and the support shaft 5015 remain stationary during operation of the internal motor 5091.

The motor tube 5008 may be mechanically coupled to the receiving assembly 5010 and the motor assembly 5009, using a press fit, an interference fit, a friction fit, a key, adhesive, or the like. The roll shade tube 5007 may enclose the motor tube 5008 and the drive wheel 5018. In one aspect, a part of the roll shade tube 5007 may be mechanically coupled to the drive wheel 5018, using a press fit, an interference fit, a friction fit, a key, adhesive, or the like. Another part of the roll shade tube 5007 may be mechanically coupled to the bearing housing 5011. In various aspects, the internal motor 5091 may be mechanically coupled to a connection shaft 5028. The internal motor 5091 may rotate the connection shaft 5028 and subsequently the drive wheel 5018, the roll shade tube 5007 and the bearing housing 5011.

Figure 63:
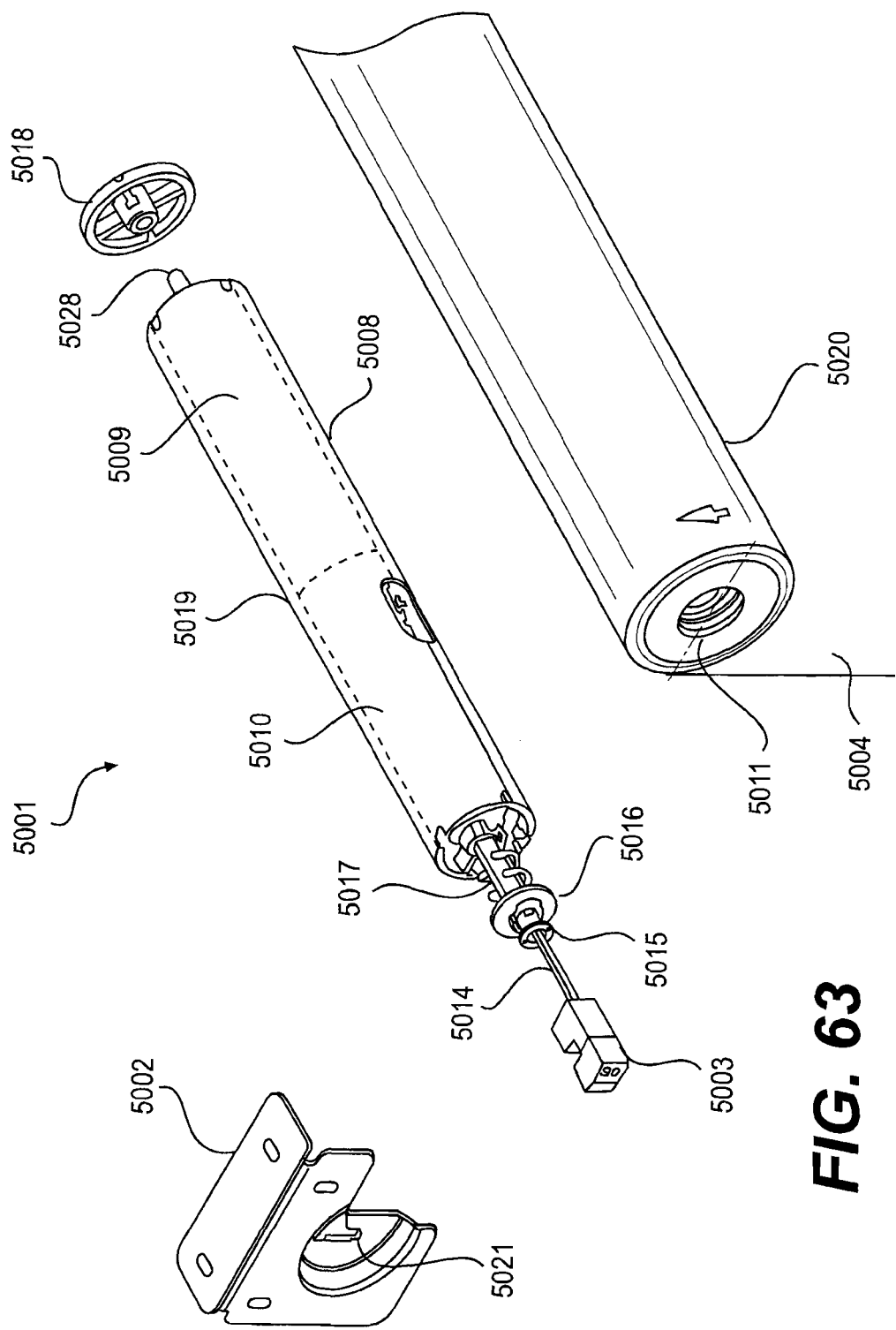
FIG. 63 is a perspective view of components including components that rotate and components that do not rotate according to an embodiment of the present invention.

FIG. 63 depicts a partial view of components that rotate and components that do not rotate during operation of an internal motor in the roll shade system 5001 in FIG. 57. The support shaft 5015 may be mechanically coupled to a mounting bracket 5002. In one aspect, one end of the support shaft 5015 may be mounted in the mounting slot 5021 of the mounting bracket 5002. The mounting slot 5021 may prevent the support shaft 5015 from turning when the roll shade system 5001 turns the architectural cover 5004 through the travel extent of the cover 5004. The other end of the support shaft 5015 may be fixedly connected to the receiving assembly 5010 so that the receiving assembly 5010 can remain stationary during operation of the internal motor 5091 (see FIG. 62). The motor assembly 5009 and the receiving assembly 5010 may be located within and fixed to the motor tube 5008 where the receiving assembly 5010 is fixedly coupled to the support shaft 5015 so that the receiving assembly 5010, the internal motor 5091, the motor assembly 5009, and the motor tube 5008 can remain stationary during operation of the internal motor 5091. The drive wheel 5018 may be mechanically coupled to the connection shaft 5028 where the connection shaft 5028 may be connected to the internal motor 5091 in the motor assembly 5009 so that the internal motor 5091 can rotate the drive wheel 5018.

The roll shade system 5001 may include non-rotating components 5019. The non-rotating components 5019 may include one or more of the connector 5003, the input wiring system 5014, the support shaft 5015, inner races 5013b of at least one of the bearings 5013 (see FIG. 62), the antenna

5016, the coaxial antenna wire 5017, the receiving assembly 5010, the motor tube 5008 and one end of the counterbalance assembly 5006 (see FIG. 60). In some aspects, the non-rotating components 5019 may include one or more of the connector 5003, the input wiring system 5014, the support shaft 5015, inner races 5013*b* of at least one bearings 5013 (see FIG. 62), the antenna 5016, the coaxial antenna wire 5017, the motor controller 5110 (see FIG. 61), the receiving assembly 5010, the internal motor 5091 (see FIG. 60), the motor assembly 5009, the motor tube 5008 and an inner end of the counterbalance spring 5061 (see FIG. 60). The non-rotating components 5019 may include all the components electrically connected to the roll shade system 5001.

The roll shade system 5001 may include rotating components 5020. The rotating components 5020 may include the bearing housing 5011, O-rings 5012 (see FIG. 62), outer races 5013*a* of at least one of the bearings 5013 (see FIG. 61), the roll shade tube 5007 (see FIG. 62), the drive wheel 5018, an outer end of the counterbalance spring 5061 (see FIG. 60) and the architectural cover 5004.

Figure 64:
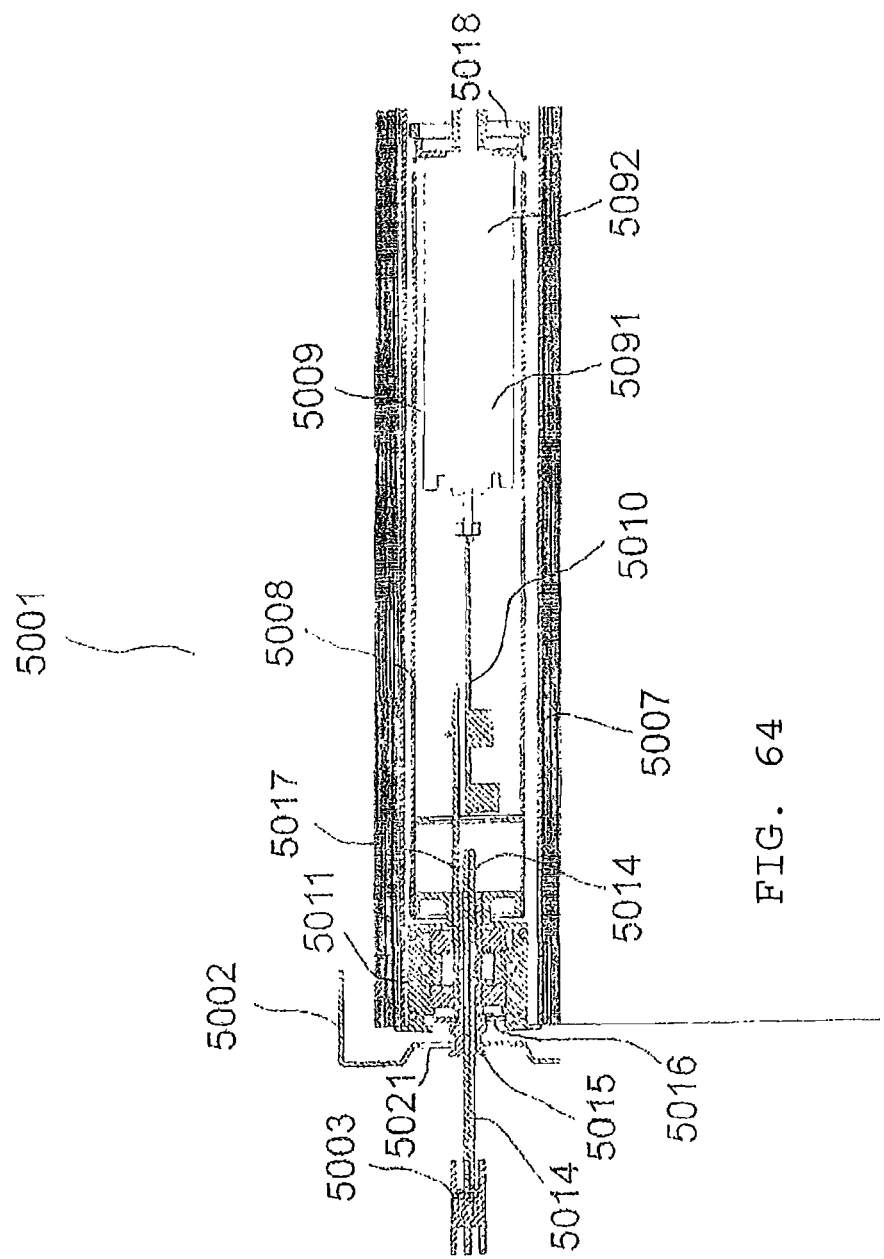
FIG. 64 is a partial section view of a roll shade system in FIG. 57.

FIG. 64 depicts a partial section view of the roll shade system 5001 in FIG. 57. The drive wheel 5018 may be rotatably connected to one end of the motor assembly 5009 so that the drive wheel 5018 may rotate while the motor assembly 5009 remains stationary during operation of the internal motor 5091. The receiving assembly 5010 may be coupled to the motor assembly 5009. One end of the coaxial antenna wire 5017 may be wired or plugged into the antenna 5016 and the other end may be wired or plugged into the receiving assembly 5010. The bearing housing 5011 may be position at one end of the receiving assembly 5010. One end of the bearing housing 5011 may be fixed to the roll shade tube 5007. The roll shade tube 5007 may rotatably enclose the motor tube 5008 so that the roll shade tube 5007 together with the bearing housing 5011 can rotate while the motor tube 5008 remains stationary.

One end of the input wiring system 5014 may be wired or plugged into the connector 5003 and the other end may be wired or plugged into the receiving assembly 5010. The connector 5003 may include electrical terminals (not shown for clarity) to establish an electrical connection between the connector 5003 and the receiving assembly 5010. The roll shade system 5001 may utilize an external power supply to operate the internal motor. The external power entering the connector 5003 may be carried by the input wiring system 5014 to the roll shade system 5001. The power supply wiring via the input wiring system 5014 may be routed through the support shaft 5015. Optionally, the support shaft 5015 may include a hollow mounting shaft. In one aspect, the power supply wiring is routed through the hollow mounting shaft that does not rotate with the roll shade tube 5007. The power wiring through the non-rotating hollow shaft may not abrade or twist the wiring during operation of the internal motor 5091.

A wiring from the antenna system 5016 may be routed in a depression in an outer surface of the support shaft 5015 and below an inner race 5013*b* of the bearings 5013. Optionally, the roll shade system 5001 may not contain an internal power supply and may require less rotating mass and less current to operate compared to one equipped with an internal power supply. In one aspect, in the roll shade system 5001, the internal motor 5091 in the motor assembly 5009, the motor controller 5110 in the receiving assembly 5010, the RF antenna 5016 and the power supply do not rotate with the roll shade tube 5007. In some aspects, the roll shade system 5001 may not require a slip ring and/or a commutator ring to transmit power. Optionally, the roll shade system 5001 may not contain a slip ring and/or a commutator ring to transmit power.

Figure 65:
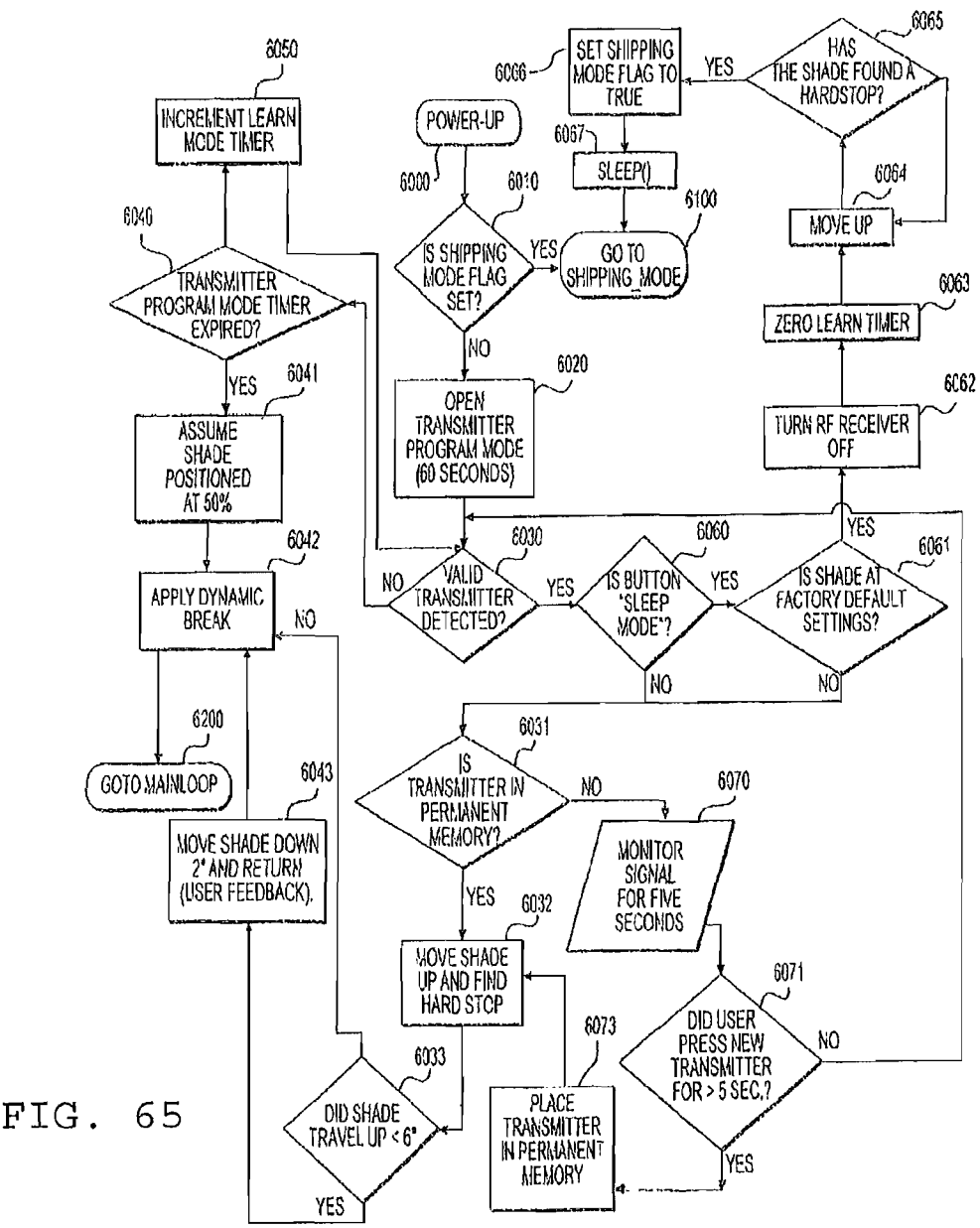
FIG. 65-70 present operational flow charts illustrating various alternative embodiments of the present invention.

FIGS. 65-70 present operational flow charts illustrating alternative embodiments of the present invention. The functionality illustrated therein is implemented, generally, as instructions executed by the microcontroller. FIG. 65 depicts a "Power-UP" routine 6000 that is executed upon power up. The Power-UP 6000 exits to subroutines including a "Main Loop" routine 6200 (see FIG. 66) and a "SHIPPING MODE" routine 6100 (see FIG. 70). The Main Loop 6200 (see FIG. 66) exits to various subroutines include a "TUG-MOVE" 6300 (see FIG. 67), a "MOVE TO POSITION X" routine (see FIG. 68) and a "DECODE BUTTONS" routine 7000 (see FIGS. 58-1 to 58-4).

FIG. 65 depicts the "Power-UP" 6000. In the Power-UP 6000, control proceeds to step 6010 to determine if the shipping mode flag has been set. If the shipping mode flag has been set, control proceeds to the SHIPPING MODE 6100. If not, control proceeds to step 6020 to open the transmitter program mode for sixty seconds and further proceeds to step 6030 to determine if a valid transmitter is detected.

If a valid transmitter is detected, control proceeds to step 6060 to determine if the button is "Sleep Mode". If the button is "Sleep Mode", control proceeds to step 6061 to determine if the shade is at the factory default settings. If the shade is at the factory default settings, control proceeds to step 6062 to turn off the RF receiver and further to step 6063 to zero out the learn timer. And control proceeds to step 6064 to move up the shade and further to step 6065 to determine if the shade has found a hardstop. If the shade has not found a hardstop, control returns to step 6064. If the shade has found a hardstop, control proceeds to step 6066 to set the shipping mode flag to "True" and further to step 6067 to enter the Sleep( ) command. And control proceeds to the SHIPPING MODE 6100.

If it is determined in step 6060 that the button is not "Sleep Mode" or it is determined in step 6061 that the shade is not at the factory default settings, control proceeds to step 6031 to determine if the transmitter is in permanent memory.

If the transmitter is not in permanent memory, control proceeds to step 6070 to monitor a signal for five seconds and further to step 6071 to determine if the user has pressed a new transmitter for more than five seconds. If the user has not pressed a new transmitter for more than five seconds, control returns to step 6030 and further proceeds as described herein. If the user has pressed a new transmitter for more than five seconds, control proceeds to step 6073 to place the transmitter in permanent memory and further to step 6032 to move up the shade and find a hardstop. And control proceeds to step 6033 to determine if the shade has traveled less than six inches. If the transmitter is in permanent memory in step 6031, control proceeds to step 6032 to move up the shade and to find a hardstop. And control proceeds to step 6033 to determine if the shade has traveled less than six inches.

If the shade has traveled less than six inches, control proceeds to step 6043 to move down the shade two inches and to return for a user feedback. Control further proceeds to step 6042 to apply a dynamic break and then returns to the Main Loop 6200. If the shade has not traveled less than six inches, control proceeds to step 6042 to apply the dynamic break and then proceeds to the Main Loop 6200.

If it is determined in step 6030 that a valid transmitter is not detected, control proceeds to step 6040 to determine if the transmitter program mode timer has expired. If the transmitter program mode time has not expired, control proceeds to step 6050 to activate the incremental learn mode timer and returns to step 6030. If the transmitter program mode time has expired, control proceeds to step 6041 and assumes that the shade is at the 50% position. And control proceeds to step 6042 to apply the dynamic break and returns to the Main Loop 6200.

Figure 66:
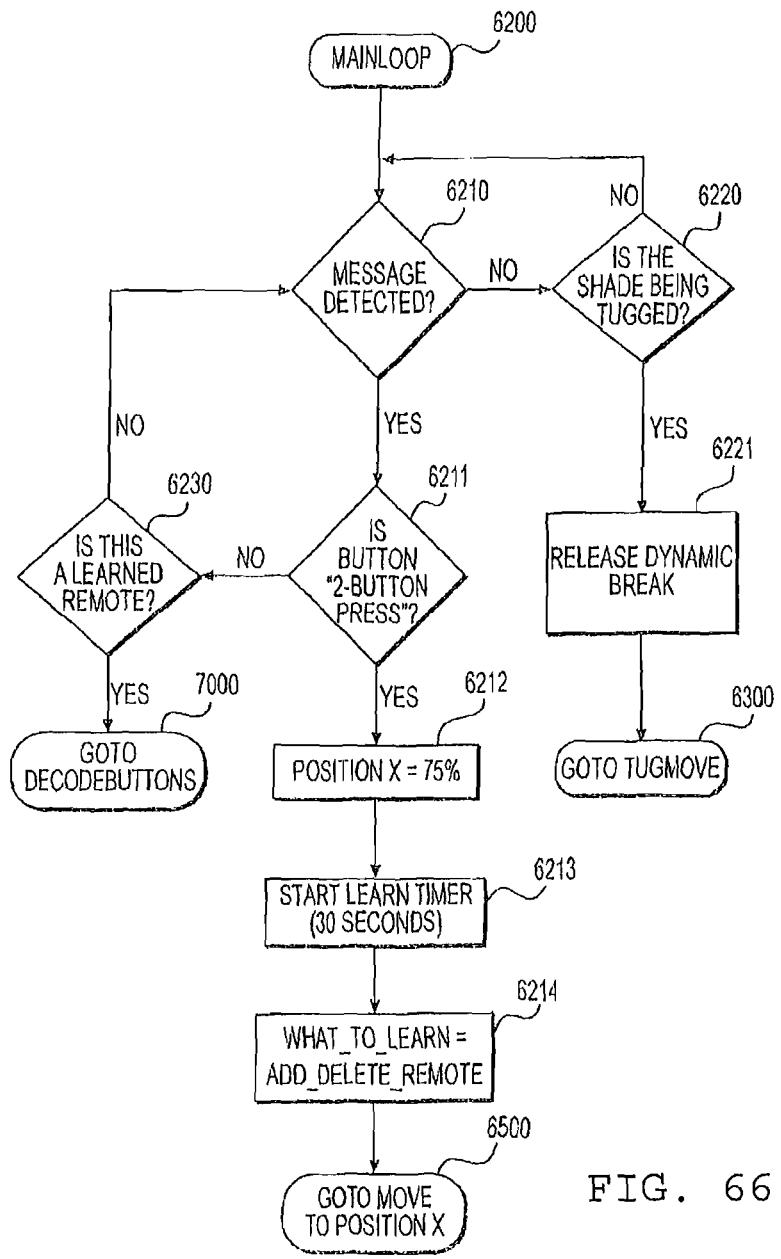

FIG. 66 depicts the Main Loop 6200. In the Main Loop 6200, control proceeds to step 6210 to determine if a message is detected. If a message is not detected, control proceeds to step 6220 to determine if the shade is being tugged. If the shade is not being tugged, control returns to step 6210. If the shade is being tugged, control proceeds to step 6221 to release the dynamic break and then proceeds to the TUGMOVE 6300.

If it is determined in step 6210 that a message is detected, control proceeds to step 6211 to determine if the button is the "2-Button Press". If the button is not "2-Button Press", control proceeds to step 6230 to determine if the button is a learned remote. If the button is not a learned remote, control returns to step 6210. If the button is a learned remote button, control proceeds to the DecodeButtons 7000.

If it is determined in step 6211 that the button is the "2-Button Press", control proceeds to step 6212 to move the shade to position X=75%, further to step 6213 to start the learn timer for 30 seconds, and then to step 6214 to set "What_to_learn" to "Add_Delete_Remote". And control proceeds to the MOVE TO POSITION X 6500.

Figure 67:
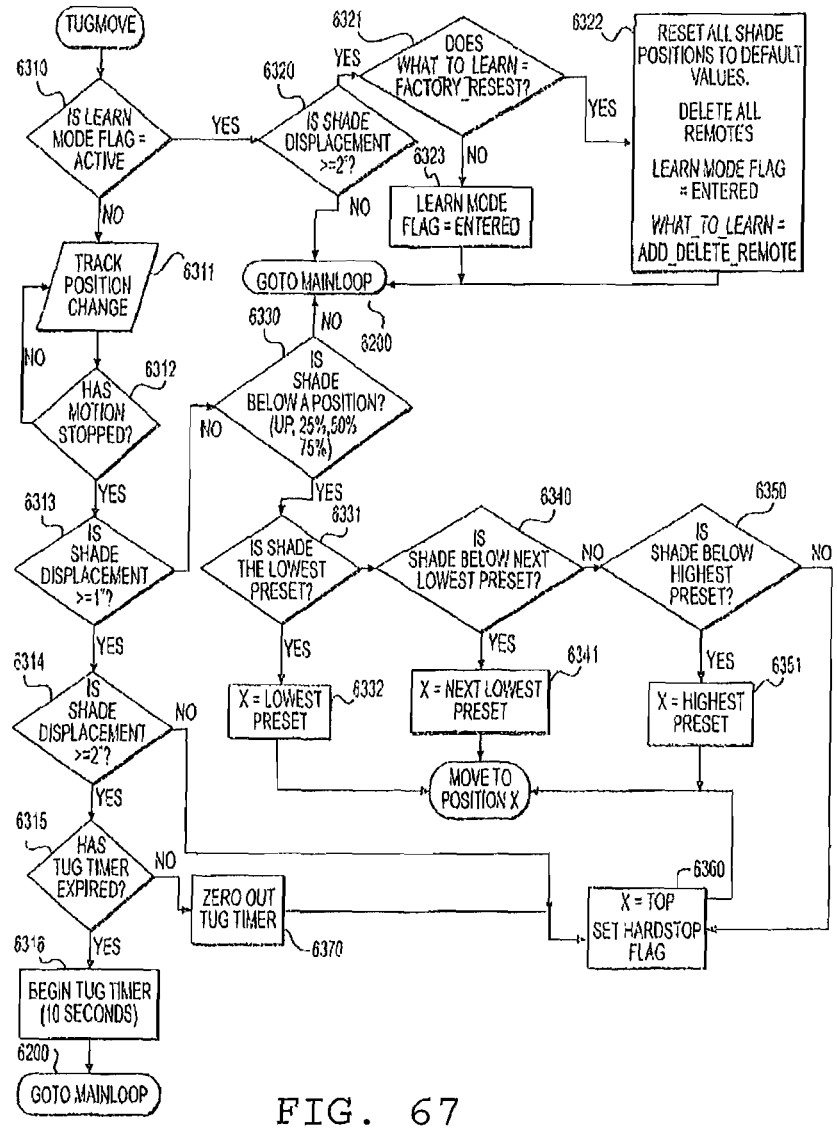
Figure 68:
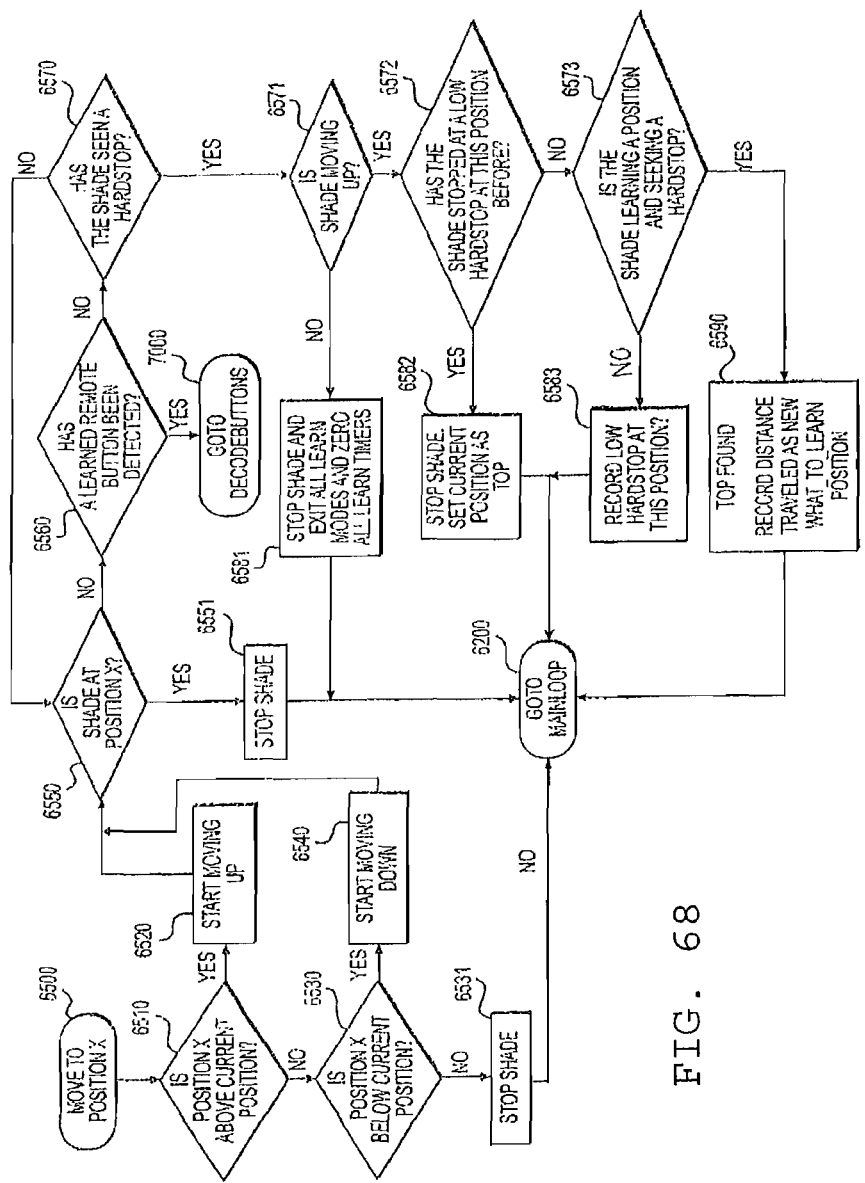

FIG. 67 depicts the TUGMOVE 6300. In the TUGMOVE 6300, control proceeds to step 6310 to determine if "Learn Mode Flag" has been set to "Active". If "Learn Mode Flag" has been set to "Active", control proceeds to step 6320 to determine if the shade displacement is two inches or more.

If the shade displacement is not two inches or more, control proceeds to the Main Loop 6200. If the shade displacement is two inches or more, control proceeds to step 6321 to determine if "What_to_Learn" has been set to "Factory_Reset".

If "What_to_Learn" has been set to "Factory_Reset", control proceeds to step 6322 to reset all shade positions to default values, delete all remotes, set "Learn Mode Flag" to "Entered" and set "What_to_Learn" to "Add_Delete_Remote." And control proceeds to the Main Loop 6200. If "What_to_Learn" has not been set to "Factory_Reset" in step 6321, control proceeds to step 6323 to set "Learn Mode Flag" to "Entered" and returns to the Main Loop 6200.

If it is determined in step 6310 that "Learn Mode Flag" has not been set to "Active", control proceeds to step 6311 to change the track position and further proceeds to step 6312 to determine if the motion has stopped. If the motion has not stopped, control returns to step 6311. If the motion has stopped, control proceeds to step 6313 to determine if the shade displacement is one inch or more.

If the shade displacement is not one inch or more, control proceeds to step 6330 to determine if the shade is below a position of "UP", "25%", "50%", or "75%".

If the shade is not below any of "UP", "25%", "50%", or "75%", control returns to the Main Loop 6200. If the shade is below any of "UP", "25%", "50%", or "75%", control proceeds to step 6331 to determine if the shade is placed at the lowest preset.

If the shade is placed at the lowest preset, control proceeds to step 6332 to set "X" to "Lowest Preset" and further proceeds to the MOVE TO POSITION X 6500. If the shade is not placed at the lowest preset, control proceeds to step 6340 to determine if the shade is placed below the next lowest preset.

If the shade is placed below the next lowest preset, control proceeds to step 6341 to set "X" to "Next Lowest Preset" and further proceeds to the MOVE TO POSITION X 6500. If the shade is not placed below the next lowest preset, control proceeds to step 6350 to determine if the shade is placed below the highest preset.

If the shade is place is placed below the highest present, control proceeds to step 6351 to set "X" to "Highest Preset" and further proceeds to the MOVE TO POSITION X 6500. If the shade is not placed below the highest preset, control proceeds to step 6360 to set "X" to "TOP" and to set "Hardstop Flag" on and further proceeds to the MOVE TO POSITION X 6500.

If it is determined in step 6313 that the shade displacement is one inch or more, control proceeds to step 6314 to determine if the shade displacement is two inches or more.

If the shade displacement is not two inches or more, control proceeds to step 6360 to set "X" to "TOP" and to set "Hardstop Flag" on and further proceeds to the MOVE TO POSITION X 6500. If that the shade displacement is two inches or more, control proceeds to step 6315 to determine if the tug timer has expired.

If the tug timer has not expired, control proceeds to step 6370 to zero out the tug timer and further proceeds to step 6360 to set "X" to "TOP" and to set "Hardstop Flag" on. And control proceeds to the MOVE TO POSITION X 6500. If the tug timer has expired, control proceeds to step 6316 to begin the tug timer in 10 seconds and returns to the Main Loop 6200.

FIG. 57 depicts the MOVE TO POSITION X 6500. In the MOVE TO POSITION X 6500, control proceeds to step 6510 to determine if the position X is above the current position.

If the position X is above the current position, control proceeds to step 6520 to start moving up the shade and proceeds to step 6550 to determine if the shade is at the position X.

If the shade is at the position X, control proceeds to step 6551 to stop the shade and returns to the Main Loop 6200. If the shade is not at the position X, control proceeds to step 6560 to determine if the learned remote button has been detected.

If the learned remote button has been detected, control proceeds to the DecodeButtons 7000. If the learned remote button has not been detected in step 6560, control proceeds to step 6570 to determine if the shade has seen a hardstop. If the shade has not seen a hardstop, control returns to step 6550. If the shade has seen a hardstop, control proceeds to step 6571 to determine if the shade is moving up.

If the shade is not moving up, control proceeds to step 6581 to stop the shade, exit all learn modes, and zero out all learn timers and returns to the Main Loop 6200. If the shade is moving up, control proceeds to step 6572 to determine if the shade has stopped for a low hardship at this position before.

If the shade has stopped for a low hardship at this position before, control proceeds to step 6582 to stop the shade and to set the current position as "TOP" and returns to the Main Loop 6200. If the shade has not stopped for a low hardship at this position before, control proceeds to step 6573 to determine if the shade is learning a position and seeking a hardstop.

If the shade is learning a position and/or seeking a hardstop, control proceeds to step 6590 to set "Top Found" on and to record the distance traveled as new "What_to_Learn_Position" and further proceeds to the Main Loop 6200. If the shade is neither learning a position nor seeking a hardstop, control proceeds to step 6583 to record a low hardstop at this position and returns to the Main Loop 6200.

If it is determined in step 6510 that the position X is not above the current position, control proceeds to step 6530 to determine if the position X is below the current position. If the position X is not below the current position, control proceeds to step 6531 to stop the shade and returns to the Main Loop 6200. If the position X is below the current position, control proceeds to step 6540 to start moving up the shade. And control proceeds to step 6550 and further proceeds as described herein.

Figures 1, 69:
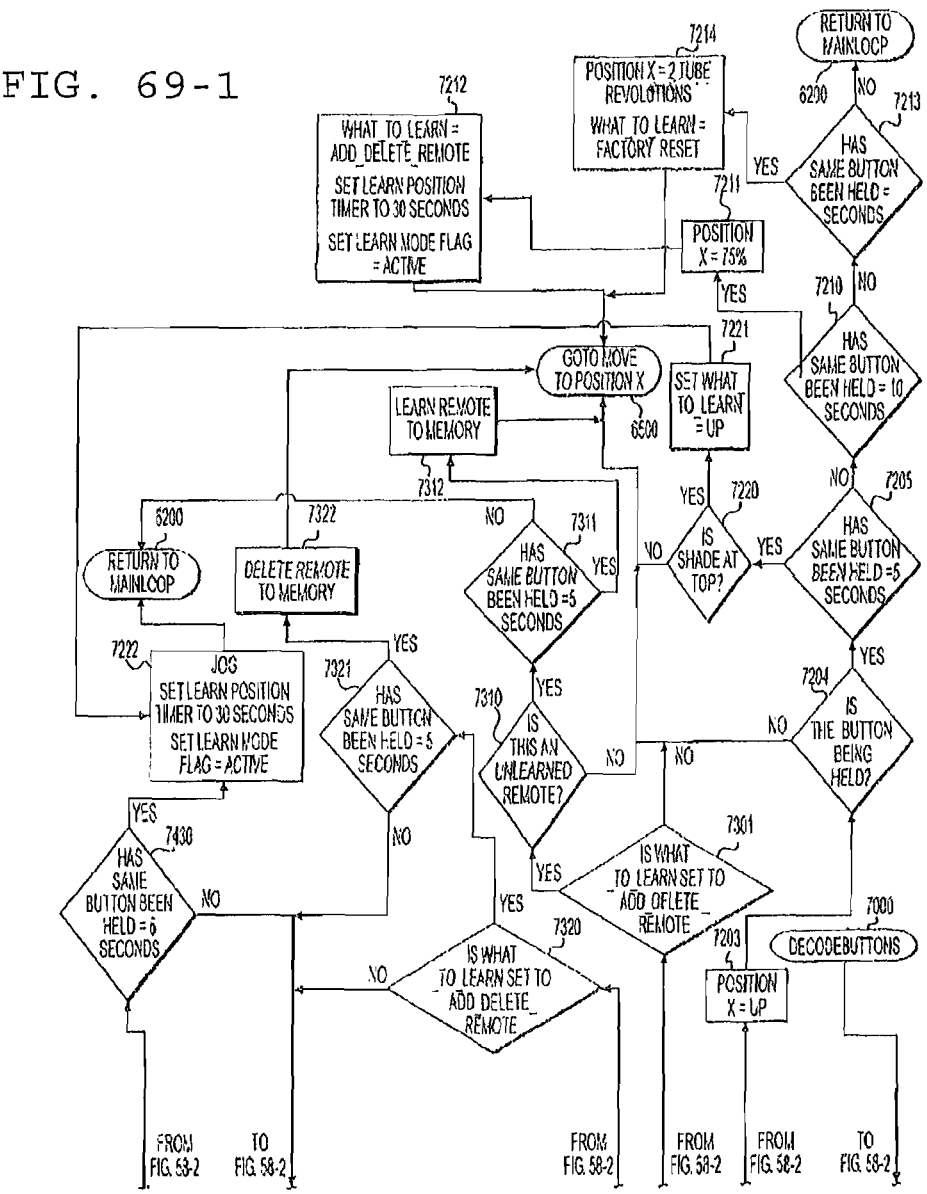

FIGS. 58-1 to 58-4 depict the DECODEBUTTONS 7000. In the DECODEBUTTONS 7000 (FIG. 69-1), control proceeds to step 7100 (FIG. 69-2) to determine if the "UP" button is detected.

Figures 2, 69:
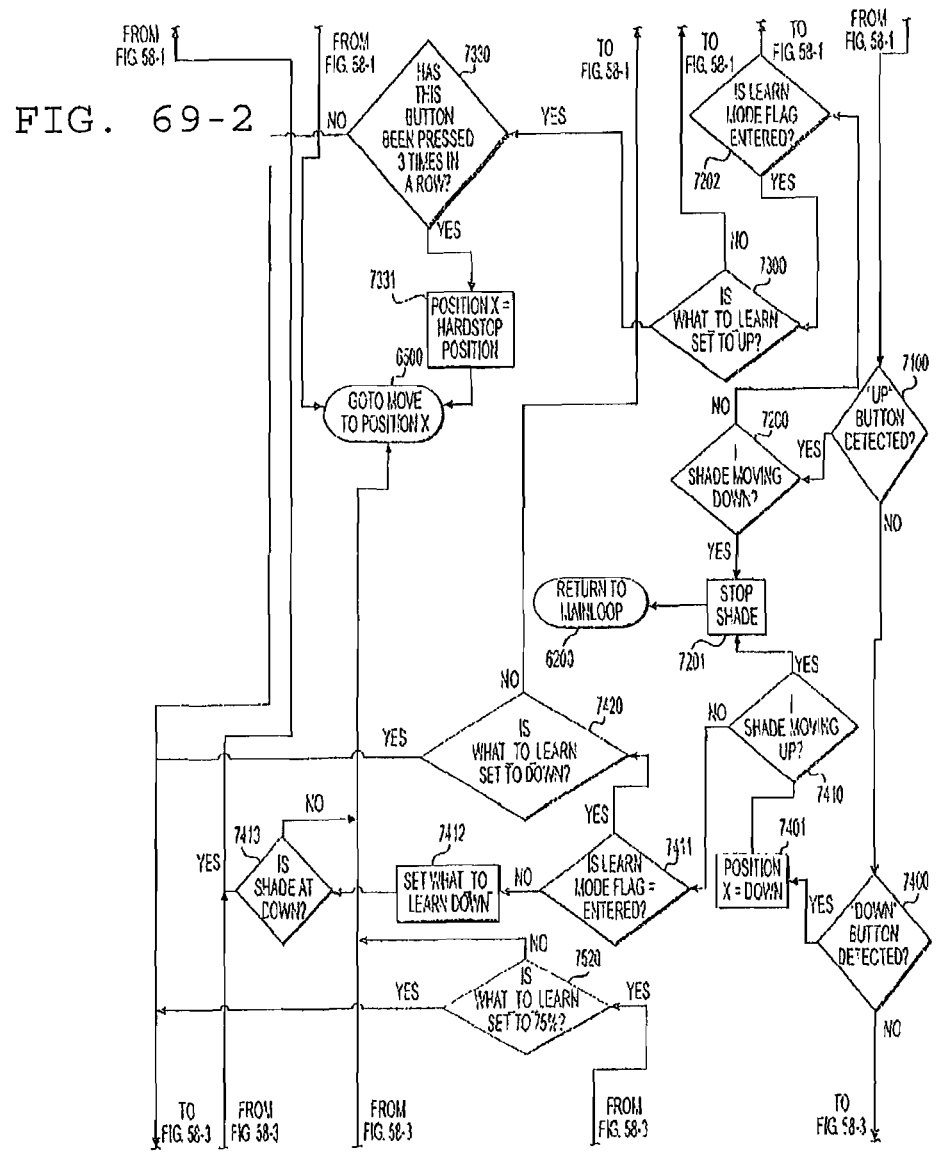
Figures 3, 69:
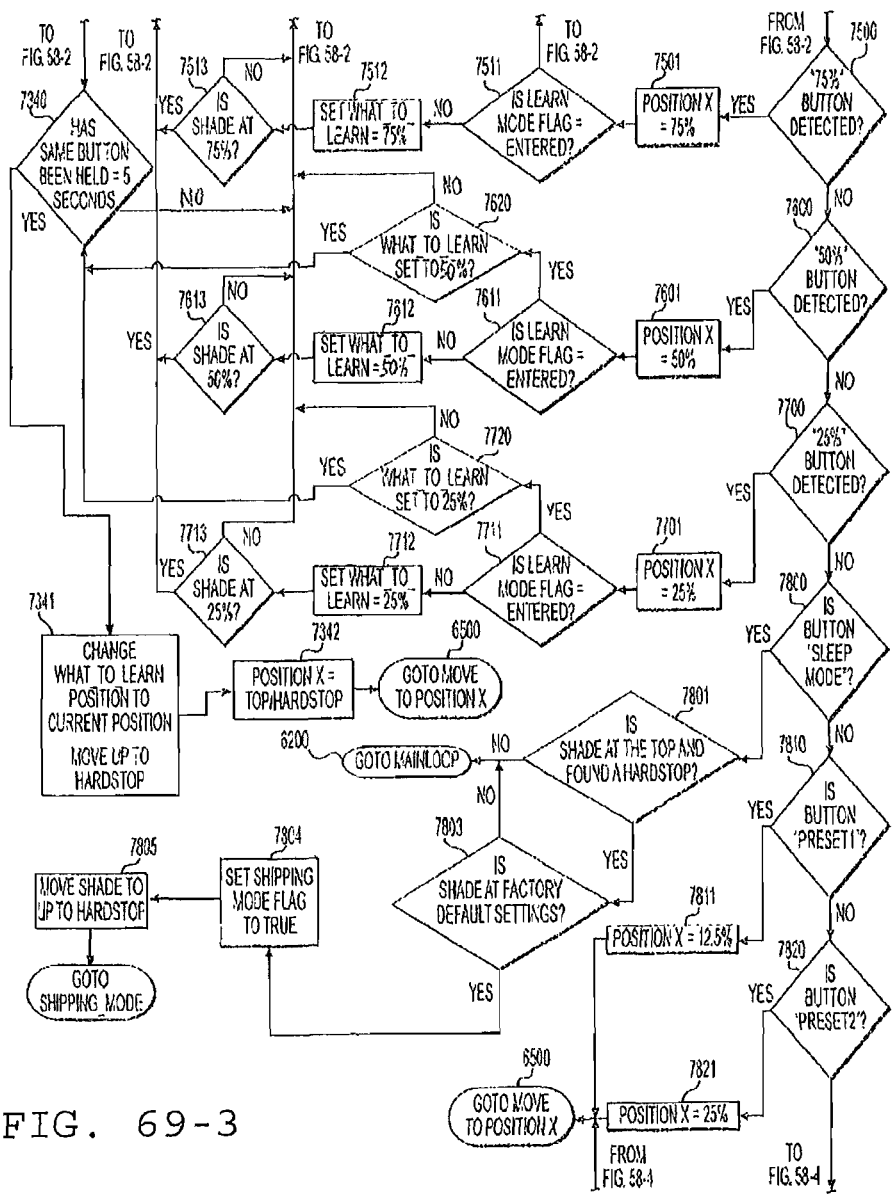
FIG. 3 depicts an exploded, isometric view of the motorized roller shade assembly depicted in FIG. 2B.
Figures 4, 69:
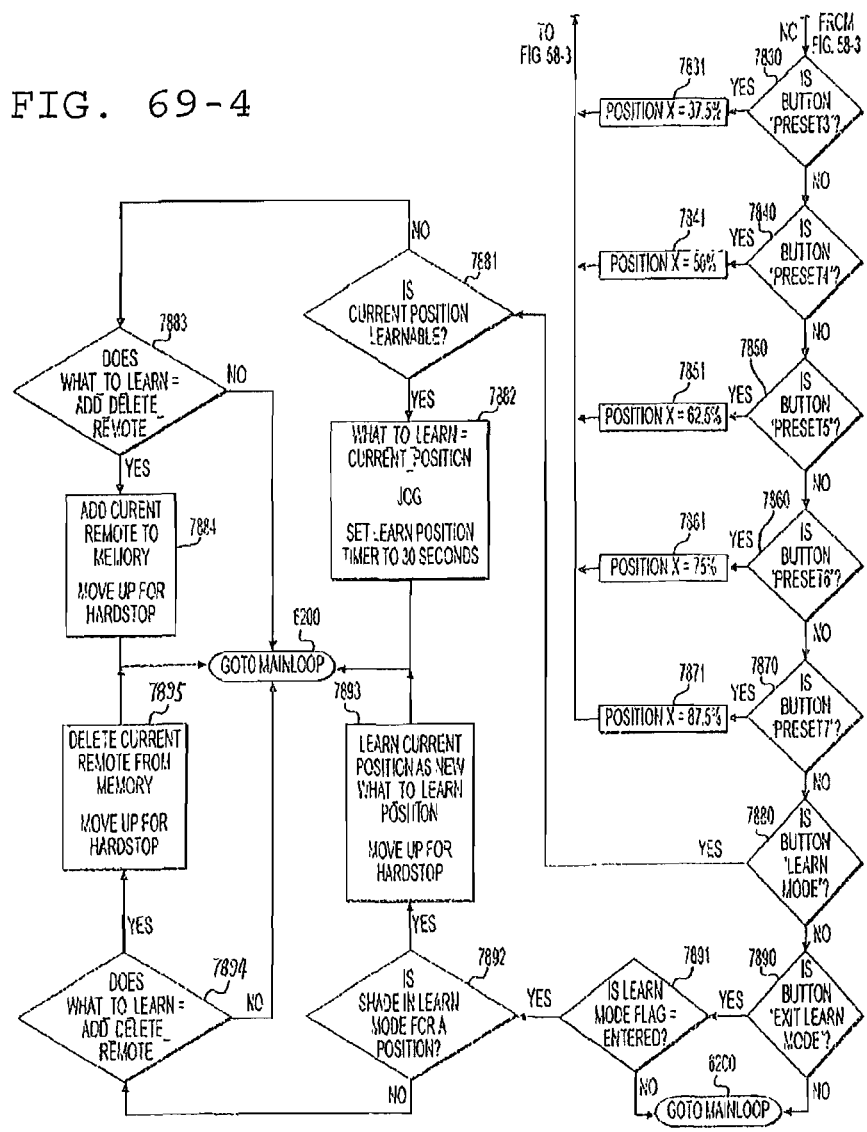

As shown in FIG. 69-2, if the "UP" button is detected in step 7100, control proceeds to step 7200 to determine if the shade is moving down. If the shade is moving down, control proceeds to step 7201 to stop the shade and returns to the Main Loop 6200. If the shade is not moving down, control proceeds to step 7202 to determine if "Learn Mode Flag" has been set to "Entered".

If the "Learn Mode Flag" has not been set to "Entered", as shown in FIG. 69-1, control proceeds to step 7203 to set position X to "UP" and further proceeds to step 7204 to determine if the button is being held. If the button is not being held, control proceeds to the MOVE TO POSITION X 6500. If the button is being held, control proceeds to step 7205 to determine if the button has been held for five seconds.

If the button has been held for five seconds, control proceeds to step 7220 to determine if the shade is at "TOP". If the shade is at "TOP", control proceeds to step 7221 to set "What_to_Learn" to "UP" and further proceeds to step 7222 to jog the shade and set "Learn Position Timer" to "30 Seconds" and "Learn Mode Flag" to "Active". And control returns to the Main Loop 6200. If the shade is not at "TOP", control proceeds to the MOVE TO POSITION X 6500. If the button has not been held for five seconds in step 7205, control proceeds to step 7210 to determine if the button has been held for ten seconds.

If the button has been held for ten seconds, control proceeds to step 7211 to set position X to 75% and further proceeds to step 7212 to set "What_to_Learn" to "Add_Delete_Remote", "Learn Position Timer" to "30 Seconds" and "Learn Mode Flag" to "Active." And control proceeds to the MOVE TO POSITION X 6500. If the button has not been held for ten seconds in step 7210, control proceeds to step 7213 to determine if the button has been held for fifteen seconds.

If the button has been held for fifteen seconds, control proceeds to step 7214 to set the position X to "2 TUBE REVOLUTIONS" and "What_to_Learn" to "Factory_Reset" and further proceeds to the MOVE TO POSITION X 6500. If not, control returns to the Main Loop 6200.

As shown in FIG. 69-2, if it is determined in step 7202 that "Learn Mode Flag" has been set to "Entered", control proceeds to 7300 to determine if "What_To_Learn" has been set to "UP".

If "What_To_Learn" has not been set to "UP", as shown in FIG. 69-1, control proceeds to step 7301 to determine if "What_To_Learn" has been set to "Add_Delete_Remote". If "What_To_Learn" has not been set to "Add_Delete_Remote", control proceeds to the MOVE TO POSITION X 6500. If "What_To_Learn" has been set to "Add_Delete_Remote", control proceeds to step 7310 to determine if the button is an unlearned remote.

If the button is an unlearned remote, control proceeds to step 7311 to determine if the button has been held for five seconds. If the button has been held for five seconds, control proceeds to step 7312 to set "Learn Remote" to "Memory" and further proceeds to the MOVE TO POSITION X 6500. If the button has not been held for five seconds in step 7311, control returns to the Main Loop 6200. If the setting is not an unlearned mode in step 7310, control proceeds to the MOVE TO POSITION X 6500.

As shown in FIG. 69-2, if it is determined in step 7300 that "What_to_Learn" has been set to "UP", control proceeds to step 7330 to determine if the button has been pressed three times in a row. If the button has been pressed three times in a row, control proceeds to step 7331 to set the position X to the hardship position and further proceeds to the MOVE TO POSITION X 6500. If the button has not been pressed three times in a row, control proceeds to step 7340 (FIG. 69-3) to determine if the same button has been held for five seconds.

As shown in FIG. 69-3, if the same button has been held for five seconds, control proceeds to step 7341 to change "What_to_Learn" position to the current position and move up the shade to the hardstop. And control proceeds to step 7342 to set the position X to "TOP/Hardstop" and further proceeds to the MOVE TO POSITION X 6500. If the same button has not been held for five seconds in step 7340, control proceeds to the MOVE TO POSITION X 6500 (FIG. 69-2).

As shown in FIG. 69-2, if it is determined in step 7100 that the "UP" button is not detected, control proceeds to step 7400 to determine if the "DOWN" button is detected.

If the "DOWN" button is detected, control proceeds to step 7401 to set the position X to "DOWN" and further proceeds to step 7410 to determine if the shade is moving up. If the shade is moving up, control proceeds to step 7201 to stop the shade and returns to the Main Loop 6200. If the shade is not moving up in step 7410, control proceeds to step 7411 to determine if "Learn Mode Flag" has been set to "Entered".

If "Learn Mode Flag" has been set to "Entered", control proceeds to step 7420 to determine if "What_to_Learn" has been set to "DOWN". If "What_to_Learn" has been set to "DOWN", control proceeds to step 7340 (FIG. 69-3) and further proceeds as described herein. If not, control proceeds to step 7320 (FIG. 69-1) to determine if "What_to_Learn" has been set to "Add_Delete_Remote".

As shown in FIG. 69-1, if "What_to_Learn" has been set to "Add_Delete_Remote", control proceeds to step 7321 to determine if the button has been held for five seconds. If the button has been held for five seconds, control proceeds to step 7322 to delete "Remote" from memory and further proceeds to the MOVE TO POSITION X 6500. If the button has not been held for five seconds, control proceeds to the MOVE TO POSITION X 6500 (FIG. 69-2). If "What_to_Learn" has not been set to "Add_Delete_Remote" in step 7320, control proceeds to the MOVE TO POSITION X 6500 (FIG. 69-2).

As shown in FIG. 69-2, if it is determined in step 7400 that the "DOWN" button is not detected, control proceeds to step 7500 (FIG. 69-3) to determine if the "75%" button is detected.

As shown in FIG. 69-3, if the "75%" is detected in step 7500, control proceeds to step 7501 to set the position X to "75%" and further proceeds to step 7511 to determine if "Learn Mode Flag" has been set to "Entered".

If "Learn Mode Flag" has been set to "Entered", control proceeds to step 7520 (FIG. 69-2) to determine if "What_ to_Learn" has been set to "75%". As shown in FIG. 69-2, if "What_to_Learn" has been set to "75%", control proceeds to step 7340 (FIG. 69-3) and further proceeds as described herein. If not, control proceeds to the MOVE TO POSITION X 6500.

As shown in FIG. 69-3, if it is determined in step 7511 that "Learn Mode Flag" has not been set to "Entered", control proceeds to step 7512 to set "What_to_Learn" to "75%" and further proceeds to step 7513 to determine if the shade is at 75%. If the shade is at 75%, control proceeds to step 7430 (FIG. 69-1) to determine if the same button has been held for five seconds. As shown in FIG. 69-1, if the same button has been held for five seconds, control proceeds to step 7222 and further proceeds as described herein. If not, control proceeds to the MOVE TO POSITION X 6500 (FIG. 69-2).

As shown in FIG. 69-3, if it is determined in step 7500 that the "75%" button is not detected, control proceeds to step 7600 to determine if the "50%" button is detected. If the "50%" button is detected, control proceeds to step 7601 to set the position X to "50%" and further proceeds to step 7611 to determine if "Learn Mode Flag" has been set to "Entered".

If "Learn Mode Flag" has been set to "Entered", control proceeds to step 7620 to determine if What_to_Learn" has been set to "50%". If What_to_Learn" has not been set to "50%", control proceeds to the MOVE TO POSITION X 6500 (FIG. 69-2). If What_to_Learn" has been set to "50%", control proceeds to step 7340 and further proceeds as described herein.

If it is determined in step 7611 that "Learn Mode Flag" has not been set to "Entered", control proceeds to step 7612 to set "What_to_Learn" to "50%" and further proceeds to step 7613 to determine if the shade is at 50%. If the shade is at 50%, control proceeds to step 7430 (FIG. 69-1) and further proceeds as described herein. If not, control proceeds to the MOVE TO POSITION X 6500 (FIG. 69-2).

As shown in FIG. 69-3, if it is determined in step 7600 that the "50%" button is not detected, control proceeds to step 7700 to determine if the "25%" button is detected. If the "25%" button is detected, control proceeds to step 7701 to set the position X to "25%" and further proceeds to step 7711 to determine if "Learn Mode Flag" has been set to "Entered".

If "Learn Mode Flag" has been set to "Entered", control proceeds to step 7720 to determine if "What_to_Learn" has been set to "25%". If "What_to_Learn" has been set to "25%", control proceeds to step 7340 and further proceeds as described herein. If not, control proceeds to the MOVE TO POSITION X 6500 (FIG. 69-2).

If it is determined in step 7711 that "Learn Mode Flag" has not been set to "Entered", control proceeds to step 7712 to set "What_to_Learn" to "25%" and further proceeds to step 7713 to determine if the shade is at 25%. If the shade is at 25%, control proceeds to step 7430 (FIG. 69-1) and further proceeds as described herein. If not, control proceeds to the MOVE TO POSITION X 6500 (FIG. 69-2).

As shown in FIG. 69-3, if it is determined in step 7700 that the "25%" is not detected, control proceeds to step 7800 to determine if the button is "Sleep Mode". If the button is "Sleep Mode", control proceeds to step 7801 to determine if the shade is at the "TOP" and has found a hardstop. If neither the shade is at the "TOP" nor the shade found a hardstop, control returns to the Main Loop 6200. If the shade is at the "TOP" and found a hardstop, control proceeds to step 7803 to determine if the shade is at the factory default settings.

If the shade is at the factory default settings, control proceeds to step 7804 to set "SHIPPING MODE FLAG" to "TRUE" and further proceeds to step 7805 to move up the shade to the hardstop. And control proceeds to the SHIPPING MODE 6100. If the shade is not at the factory default settings in step 7803, control returns to the Main Loop 6200.

As shown in FIG. 69.3, if it is determined in step 7800 that the button is not "Sleep Mode", control proceeds to step 7810 to determine if the button is "Preset 1". If the button is "Preset 1", control proceeds to step 7811 to set the position X to "12.5%" and further proceeds to the MOVE TO POSITION X 6500. If not, control proceeds to step 7820 to determine if the button is "Preset 2".

If the button is "Preset 2", control proceeds to step 7821 to set the position X to "25%" and further proceeds to the MOVE TO POSITION X 6500. If not, control proceeds to step 7830 (58-4) to determine if the button is "Preset 3".

As shown in FIG. 69-4, if the button is "Preset 3", control proceeds to step 7831 to set the position X to "37.5%" and further proceeds to the MOVE TO POSITION X 6500 (FIG. 69-3). If not, control proceeds to step 7840 to determine if the button is "Preset 4".

If the button is "Preset 4", control proceeds to step 7841 to set the position X to "50%" and further proceeds to the MOVE TO POSITION X 6500 (FIG. 69-3). If not, control proceeds to step 7850 to determine if the button is "Preset 5".

If the button is "Preset 5", control proceeds to step 7851 to set the position X to "62.5%" and further proceeds to the MOVE TO POSITION X 6500 (FIG. 69-3). If not, control proceeds to step 7860 to determine if the button is "Preset 6".

If the button is "Preset 6", control proceeds to step 7861 to set the position X to "75%" and further proceeds to the MOVE TO POSITION X 6500 (FIG. 69-3). If not, control proceeds to step 7870 to determine if the button is "Preset 7".

If the button is "Preset 7", control proceeds to step 7871 to set position X to "87.5%" and further proceeds to the MOVE TO POSITION X 6500 (FIG. 69-3). If not, control proceeds to step 7880 to determine if the button is "Learn Mode".

If the button is "Learn Mode", control proceeds to step 7881 to determine if the current position is learnable. If the current position is learnable, control proceeds to step 7882 to set "What_to_Learn" to the current position, jog the shade and set "Learn Position Timer" to thirty seconds. And control returns to the Main Loop 6200. If the current position is not learnable, control proceeds to step 7883 to determine if "What_to_Learn" has been set to "Add_Delete_Remote". If "What_to_Learn" has been set to "Add_Delete_Remote", control proceeds to step 7884 to add the current remote to memory and move up the shade to the hardstop and returns to the Main Loop 6200. If not, control returns to the Main Loop 6200.

If it is determined in step 7880 that the button is not "Learn Mode", control proceeds to step 7890 to determine if the button is "Exit Learn Mode". If the button is not "Exit Learn Mode", control returns to the Main Loop 6200. If the button is "Exit Learn Mode", control proceeds to step 7891 to determine if "Learn Mode Flag" has been set to "Entered". If "Learn Mode Flag" has not been set to "Entered", control returns to the Main Loop 6200. If "Learn Mode Flag" has been set to "Entered" in step 7891, control proceeds to step 7892 to determine if the shade is in "Learn Mode" for a position.

If the shade is in "Learn Mode" for a position, control proceeds to step 7893 to set "Learn Current Position" as new "What_to_Learn" position and to move up the shade to the hardstop. And control returns to the Main Loop 6200. If the shade is not in "Learn Mode" for a position in step 7892, control proceeds to 7894 to determine if "What_to_Learn" has been set to "Add_Delete_Remote".

If What_to_Learn" has been set to "Add_Delete_Remote", control proceeds to step 7895 to delete the current remote from memory and move up the shade to the hardstop and returns to the Main Loop 6200. If What_to_Learn" has not been set to "Add_Delete_Remote" in step 7894, control returns to the Main Loop 6200.

Figure 70:
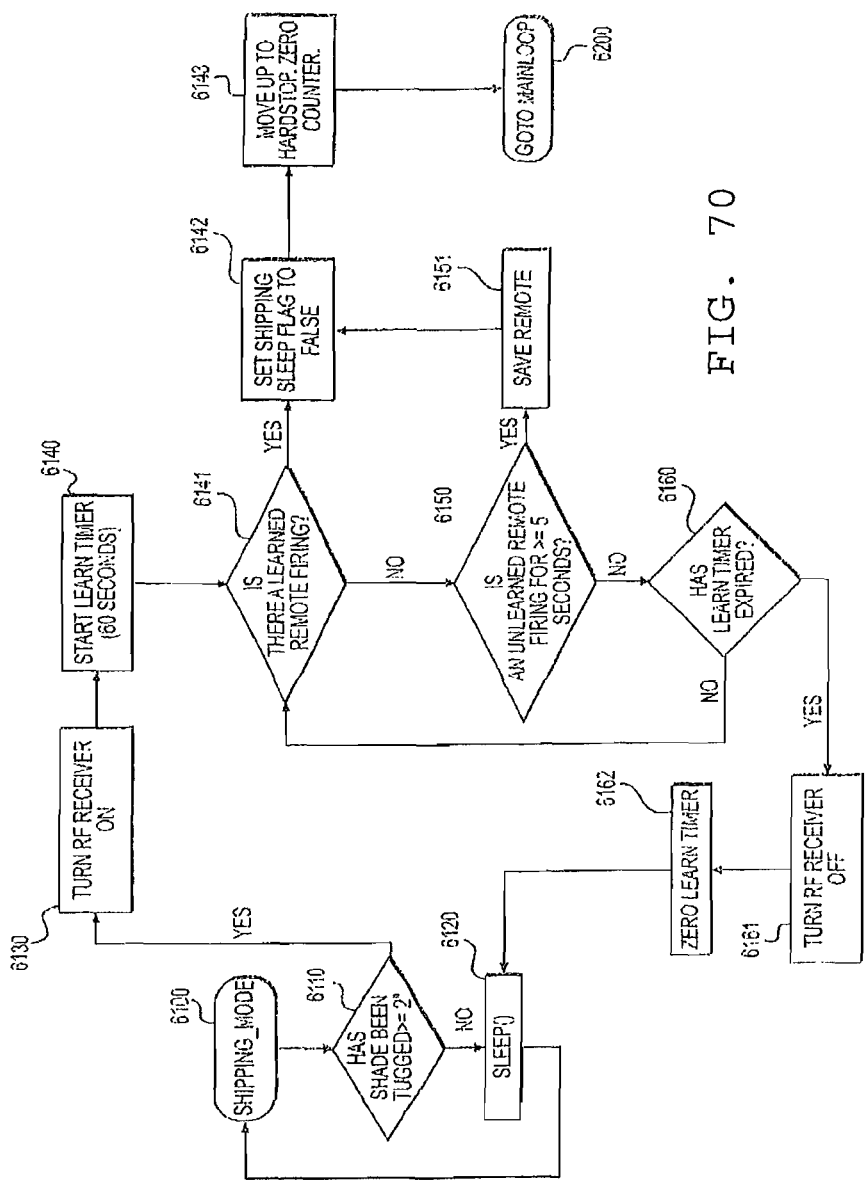

FIG. 70 depicts the SHIPPING MODE 6100. In the SHIPPING MODE 6100, control proceeds to step 6110 to determine if the shade has been tugged two inches or more.

If the shade has not been tugged two inches or more, control proceeds to step 6120 to enter the Sleep( ) command and returns to the SHIPPING MODE 6100. If the shade has been tugged two inches or more, control proceeds to step 6130 to turn on the RF receiver and further proceeds to step 6140 to start the learn timer for 60 seconds. And control proceeds to step 6141 to determine if there is a learned remote firing.

If there is a learned remote firing, control proceeds to step 6142 to set "Shipping Sleep Flag" to "False" and further proceeds to step 6143 to move up the shade to the hardstop and to zero out the counter. And control returns to the Main Loop 6200. If there is no learned remote firing in step 6141, control proceeds to step 6150 to determine if an unlearned remote firing has been on for five seconds or more.

If an unlearned remote firing has been on for five seconds or more, control proceeds to step 6151 to save the remote. And control proceeds to step 6142 to set "Shipping Sleep Flag" to "False" and then to step 6143 to move up the shade to the hardstop and to zero out the counter. And control returns to the Main Loop 6200.

If it is determined in step 6150 that an unlearned remote firing has not been on for five seconds or more, control proceeds to step 6160 to determine if the learn timer has expired. If the learn timer has not been expired, control returns to step 6141. If the learn timer has expired, control proceeds to step 6161 to turn off the RF receive and proceeds to step 6162 to zero out the learn timer. And control proceeds to step 6120 to enter the "Sleep" command and returns to the SHIPPING MODE 6100.

Figure 73:
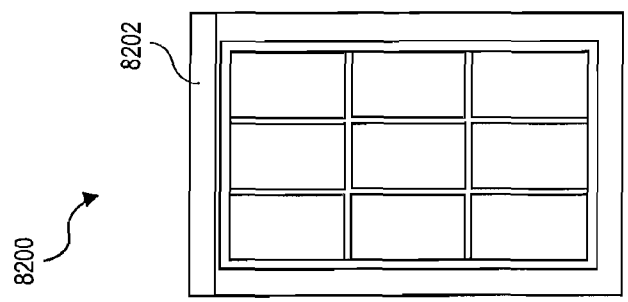
FIG. 73 is a plan view of the window or roller shade assembly depicted in FIGS. 71 and 72 wherein the shade assembly is deployed to third or open position.
Figure 72:
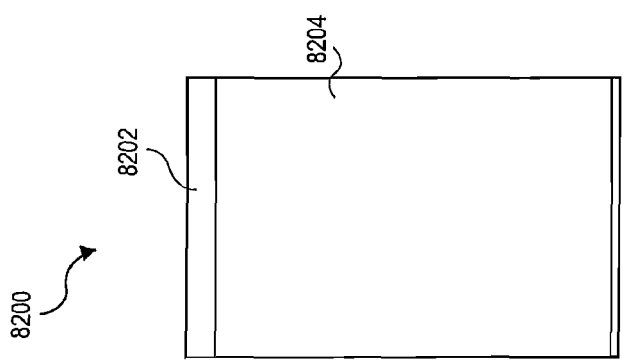
FIG. 72 is a plan view of the window and roller shade assembly depicted in FIG. 71 wherein the roller shade assembly is deployed in a second or closed position.
Figure 71:
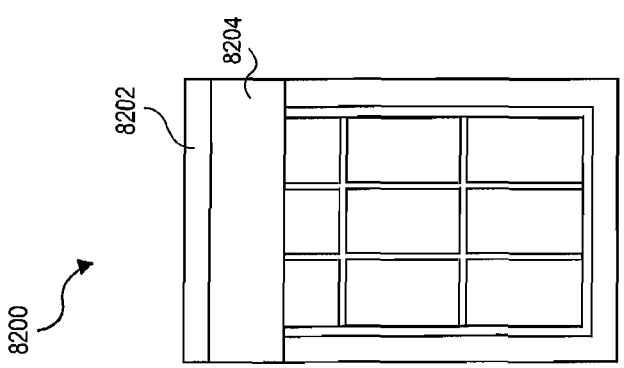
FIG. 71 is a plan view of a window with a roller shade assembly in accordance with an embodiment of the present invention wherein the shade assembly is deployed in a first position.

Turning now to FIGS. 71-73, a schematic view of a window, generally designated 1200 is illustrated, wherein the window 8200 has a blind or shade assembly 8202 mounted thereto having a shade or blind 8204. Referring now specifically to FIG. 71, the blind or shade assembly 8202 has the shade or blind 8024 deployed in a first position whereas FIG. 72 depicts the shade or blind assembly 8202 wherein the shade or blind 8204 is fully deployed to the closed position, covering the window 8200. FIG. 73 depicts the shade or blind assembly 8202 wherein the shade or blind 8204 is in a third, fully open position. The aforementioned figures and corresponding positions will be discussed further in connection with FIGS. 74 and 75.

Figure 74:
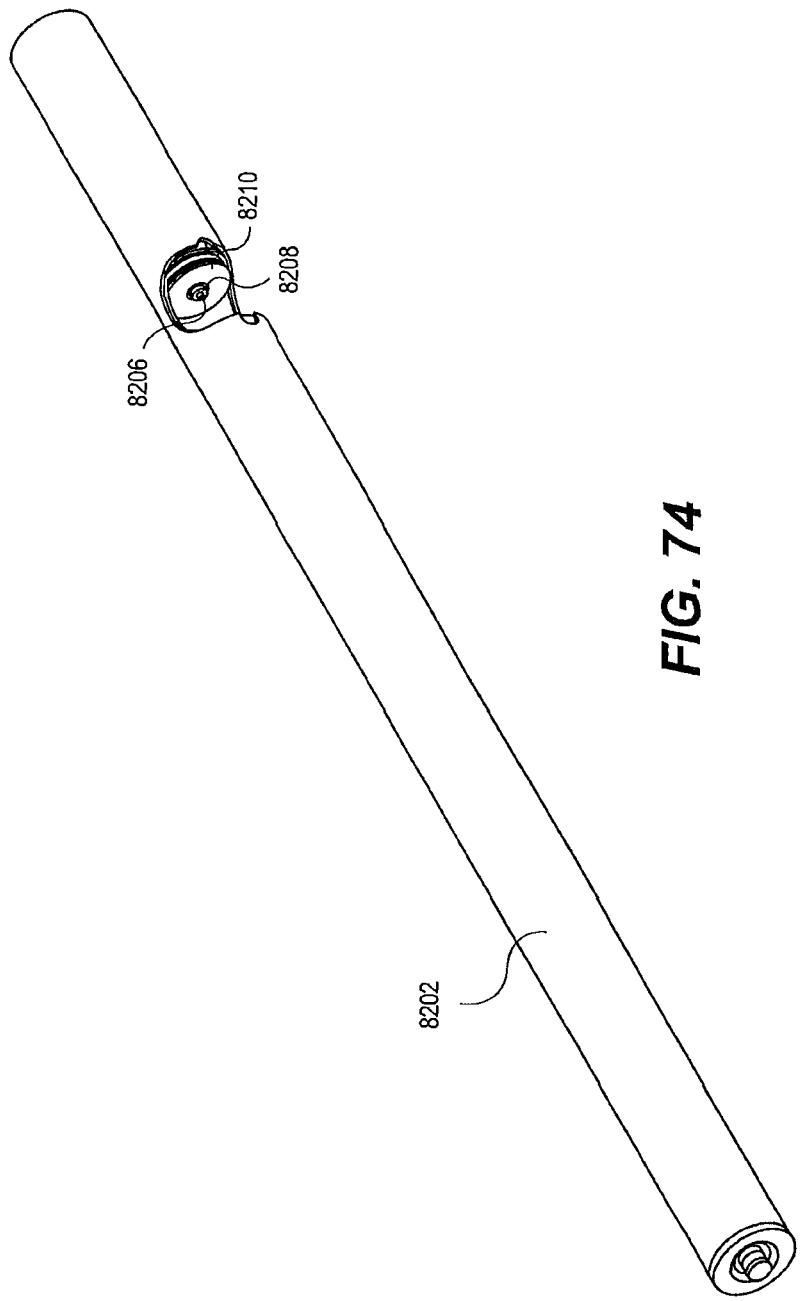
FIG. 74 is a perspective or cutaway view of a roller shade assembly illustrating the motor control area in accordance with an embodiment of the present invention.
Figure 75:
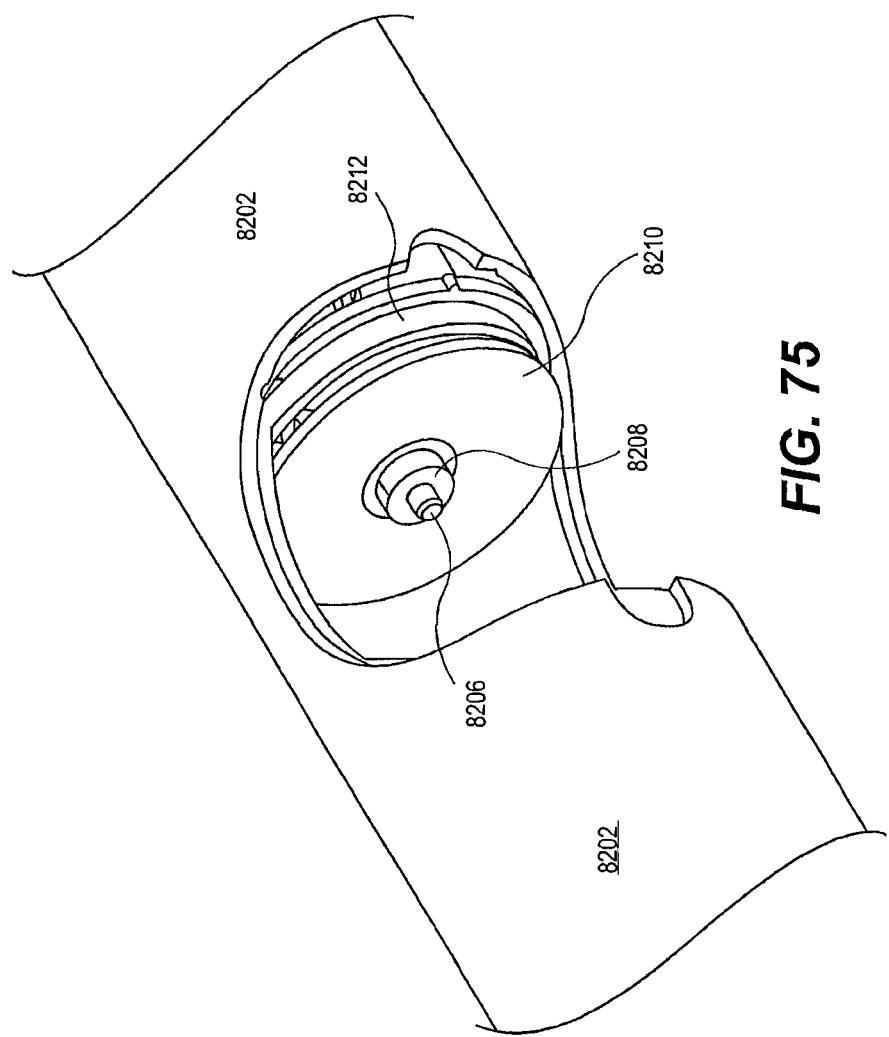
FIG. 75 in an enlarged perspective view of the roller shade assembly depicted in FIG. 74.

Turning now to FIGS. 74 and 75, the roller shade or blind assembly 8202 is depicted in accordance with the embodiments of the present invention described herein. As illustrated in FIGS. 74 and 75, the roller or shade assembly 8202 includes a motor (not shown) having an output shaft 8206 extending therefrom. A Hall Effect magnet wheel 8208 is mounted to said output shaft 8206. The roller shade or blind assembly 8202 also comprises a Hall Effect sensor as part of a printed circuit board 8210. Alternatively, the roller shade or blind assembly 8202 may employ a chopper wheel wherein an optical encoder is mounted to the printed circuit board 8210 instead of the above-discussed Hall Effect magnet wheel and sensor. Moreover, the roller shade or blind assembly 8202 may alternatively employ a magnetic reed witch or a potentiometer.

The roller shade or blind assembly 8202 includes a microprocessor (not shown) as previously discussed, which is mounted to a second printed circuit board 8212. The microprocessor is electrically connected to the power supply and the first printed circuit board 8210.

During operation, once the shade or blind assembly 8202 is installed and energized or otherwise powered up, the shade or blind 8204 will be able to move or translate to a predetermined position. One preferred distance is about 12 inches (30.5 cm) but it can be any desired distance/position in the path of travel of the shade or blind 8204, for example as illustrated in FIG. 71. The aforementioned translations of the shade or blind 8204 may be automatic from a time out command after energizing the power supply or a manual movement of the shade or blind 8204, such as a tug, or a depression of a button on a remote transmitter. Once the shade or blind 8204 is deployed to the position as described above, the motorized shade or blind assembly 8202 is now positioned for further user response and input. The user may now manually pull the shade or blind 8204 to the fully closed position as depicted in FIG. 72.

Next, the control unit may proceed to time out and translate of move the shade or blind 8204 to a third or fully open position as depicted in FIG. 73. The aforementioned last movement or translation is typically automatic by means of a countdown timer but alternatively could be initiated by a transmitter or a short tug on the shade or blind 8204. In one embodiment, the described setup would likely be performed each time the power supply is energized and in said embodiment, may occur automatically if for some reason the Hall Effect sensor 8210 lost count causing a hard stop.

The upper limit hard stop, as previously mentioned, at the top of the roller shade travel is utilized to re-sync the encoder count by detecting the upper travel limit. The use of "absolute encoders" is permitted as well as "non-absolute encoders" which must be recalibrated or re-synced to an encoder zero position as desired, in this case the hard stop at the top. Over time, an encoder might become slightly out of sync with the actual shade position causing the shade assembly to not function correctly or as desired. This described occurrence can easily happen when the reed switch is falsely triggered by the encoder magnet rocking or oscillating due to motor and fabric and spring working against each other at some position of travel. One may correct this "out of sync condition" forcing a hard stop every certain amount of cycles to re-sync said encoder. Please note the number of cycles is an arbitrary number and can be any desired or needed value. The aforementioned syncing process is preferred as it is undesirable to take an energy hit by stalling the motor every time the blind or shade 8204 is retracted all the way and it is undesirable to introduce noise. e.g., clank, etc., by having the bottom bar of the blind or shade, for example, hit the hard stop every time the blind or shade 8204 is retracted.

In one example for setting a custom upper limit during the setup, the end user may use a lower starting position for the blind or shade 8204 as one of the intermediate positions. So, for instance, if the end user were to tug on the blind or shade 8204 to propel it to the top, the end user may alternatively stop at an intermediate position to allow for the blind or shade 8204 to be more easily accessible. Since the intermediate positions are programmable, an end user may set the upper height to whatever "artificial top" desired or preferred.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An architectural covering, comprising:
shade material;
a motor operatively connected to the shade material such that operation of the motor causes movement of the shade material;
a controller unit operatively connected to the motor;
the controller unit configured to control operation of the motor;
the controller unit having a microprocessor;
a power supply unit electrically connected to the motor;
wherein the power supply unit includes one or more batteries;
at least one sensor operatively connected to the microprocessor;
the at least one sensor configured to detect rotation of the motor;
the controller unit configured to switch between an awake state, wherein the at least one sensor is energized, and an asleep state, wherein the at least one sensor is not energized, so as to conserve power; a counterbalance assembly operatively connected to the architectural covering, the counterbalance assembly configured to provide a counterbalance force to the shade material.

2. The architectural covering of claim 1, wherein the architectural covering is configured to switch to an awake state, wherein the at least one sensor is powered in response to detection of a manual movement of the shade material.

3. The architectural covering of claim 1, wherein the at least one sensor includes at least one Hall Effect sensor.

4. The architectural covering of claim 1, further comprising a magnet wheel operably connected to the motor such that rotation of the motor causes rotation of the magnet wheel.

5. The architectural covering of claim 1, further comprising at least one transistor connected to an electrical lead of the motor, wherein the at least one transistor is configured to detect a manual movement of the motor.

6. The architectural covering of claim 1, wherein the at least one sensor is configured to output pulses when the motor rotates, the microprocessor is configured to determine a position of the shade material from the pulses.

7. The architectural covering of claim 1, further comprising a wireless receiver operably connected to the microprocessor, the wireless receiver configured to receive wireless signals from a remote control device.

8. The architectural covering of claim 1, wherein the motor is positioned within a roller tube and the shade material is operably connected to the roller tube.

9. The architectural covering of claim 1, wherein the controller unit is positioned within a roller tube and the shade material is operably connected to the roller tube.

10. An architectural covering comprising
shade material;
a motor operatively connected to the shade material such that operation of the motor causes movement of the shade material;
a controller unit operatively connected to the motor;
the controller unit configured to control operation of the motor;
the controller unit having a microprocessor;
a power supply operatively connected to the motor and the controller unit;
a counterbalance assembly operatively connected to the architectural covering;
the counterbalance assembly configured to provide a counterbalance force;
at least one sensor operatively connected to the controller unit;
the at least one sensor configured to detect rotation of the motor;
the controller unit configured to switch between an awake state, wherein the at least one sensor is energized, and an asleep state, wherein the at least one sensor is not energized, so as to conserve power.

11. The architectural covering of claim 10, wherein the architectural covering is configured to switch to an awake state, wherein the at least one sensor is powered in response to detection of a manual movement of the shade material.

12. The architectural covering of claim 10, wherein the at least one sensor includes at least one Hall Effect sensor.

13. The architectural covering of claim 10, further comprising a magnet wheel operably connected to the motor such that rotation of the motor causes rotation of the magnet wheel.

14. The architectural covering of claim 10, further comprising at least one transistor connected to an electrical lead of the motor, wherein the at least one transistor is configured to detect a manual movement of the motor.

15. The architectural covering of claim 10, wherein the at least one sensor is configured to output pulses when the motor rotates, and the microprocessor is configured to determine a position of the shade material from the pulses.

16. The architectural covering of claim 10, further comprising a wireless receiver operably connected to the microprocessor, the wireless receiver configured to receive wireless signals from a remote control device.

17. The architectural covering of claim 10, further comprising a wireless receiver operably connected to the controller unit, wherein the controller unit is configured to switch from an asleep state to the awake state upon reception of an appropriate wireless signal.

18. The architectural covering of claim 10, wherein the power supply is formed of a plurality of batteries.

19. The architectural covering of claim 10, wherein the motor is positioned within a roller tube and the shade material is operably connected to the roller tube.

20. The architectural covering of claim 10, wherein the controller unit is positioned within a roller tube and the shade material is operably connected to the roller tube.

21. The architectural covering of claim 10, wherein the motor and counterbalance assembly are positioned within a roller tube and the shade material is operably connected to the roller tube.

22. An architectural covering comprising:
shade material;
a motor operatively connected to the shade material such that operation of the motor causes movement of the shade material;
a controller unit operatively connected to the motor;
the controller unit configured to control operation of the motor;
the controller unit having a microprocessor;

a power supply operatively connected to the motor and the controller unit;

a wireless receiver operably connected to the microprocessor;

the wireless receiver configured to receive wireless signals from a remote control device;

at least one sensor operatively connected to the controller unit;

the at least one sensor configured to detect rotation of the motor;

the controller unit configured to switch between an awake state, wherein the at least one sensor is energized, and an asleep state, wherein the at least one sensor is not energized so as to conserve power; a counterbalance assembly operatively connected to the architectural covering, the counterbalance assembly configured to provide a counterbalance force to the shade material.

23. The architectural covering of claim 22, wherein the controller unit is configured to switch to an awake state wherein the at least one sensor is powered in response to detection of a manual movement of the shade material.

24. The architectural covering of claim 22, wherein the at least one sensor includes at least one Hall Effect sensor.

25. The architectural covering of claim 22, further comprising a magnet wheel operably connected to the motor such that rotation of the motor causes rotation of the magnet wheel.

26. The architectural covering of claim 22, further comprising at least one transistor connected to an electrical lead of the motor, wherein the at least one transistor is configured to detect a manual movement of the motor.

27. The architectural covering of claim 22, wherein the at least one sensor is configured to output pulses when the motor rotates, and the microprocessor is configured to determine a position of the shade material from the pulses.

28. The architectural covering of claim 22, wherein the controller unit is configured to switch from an asleep state to the awake state upon reception of an appropriate wireless signal.

29. The architectural covering of claim 22, wherein the power supply is formed of a plurality of batteries.

30. The architectural covering of claim 22, wherein the motor is positioned within a roller tube and the shade material is operably connected to the roller tube.

31. The architectural covering of claim 22, wherein the controller unit is positioned within a roller tube and the shade material is operably connected to the roller tube.

32. The architectural covering of claim 22, wherein the motor and counterbalance assembly are positioned within a roller tube and the shade material is operably connected to the roller tube.

33. A motor and control unit for an architectural covering, comprising:
a motor;
a shaft connected to the motor;
a magnetic device connected to the shaft such that rotation of the shaft causes rotation of the magnetic device;
a controller unit electrically connected to the motor, the controller unit having a microprocessor;
a power supply electrically connected to the motor and the controller unit;
at least one Hall Effect sensor positioned adjacent to the magnetic device, the at least one Hall Effect sensor electrically connected to the microprocessor;
the controller unit configured to switch between an awake state, wherein the at least one sensor is energized, and an asleep state, wherein the at least one sensor is not energized, so as to conserve energy;
wherein when energized, the at least one Hall Effect sensor detects rotation of the shaft and the microprocessor tracks a position of the architectural covering; a counterbalance assembly operatively connected to the motor, the counterbalance assembly configured to provide a counterbalance force.

34. The motor and control unit of claim 33, wherein the microprocessor energizes the at least one Hall Effect sensor in response to a manual movement of the motor.

35. The motor and control unit of claim 33, wherein the microprocessor energizes the at least one Hall Effect sensor in response to a wireless control signal received by the controller unit.

36. The motor and control unit of claim 33, wherein the rotation detector includes at least one transistor connected to an electrical lead of the motor and configured to detect a manual movement of the motor.

37. The architectural covering of claim 33, further comprising one or more transistors that are connected to a positive lead and/or a negative lead of the motor, wherein the one or more transistors are configured to detect a manual movement of the motor.

38. The motor and control unit of claim 33, further comprising a wireless receiver electronically coupled to the microprocessor, the wireless receiver configured to receive wireless signals from a remote control device.

39. The architectural covering of claim 33, further comprising a wireless receiver electronically coupled to the microprocessor, wherein the controller unit is configured to switch from an asleep state to the awake state upon reception of an appropriate wireless signal.

40. The architectural covering of claim 33, wherein the microprocessor is configured to cut power and place the architectural covering in an asleep state after a predetermined amount of time without movement.

41. The architectural covering of claim 33, wherein the microprocessor is configured to cut power and place the architectural covering in an asleep state after a predetermined amount of time without receiving a move command signal.

42. A motorized architectural covering comprising:
shade material;
a motor operatively connected to the shade material;
a controller unit operatively connected to the architectural covering;
at least one sensor operatively connected to the architectural covering;
the at least one sensor configured to detect movement of the architectural covering;
the controller unit configured to switch between an awake state, and an asleep state, so as to conserve power;
wherein the shade material is movable to a different position by manual movement of the shade, as well as by transmitting a wireless signal to the controller unit using a remote control device; a counterbalance assembly operatively connected to the architectural covering, the counterbalance assembly configured to provide a counterbalance force to the shade material.

43. A motorized architectural covering of claim 42, wherein when in the awake state, power is supplied to the at least one sensor, and wherein when in the asleep state, power is not supplied to the at least one sensor.

44. A motorized architectural covering comprising:
shade material;
a motor operatively connected to the shade material;

a controller unit operatively connected to the architectural covering;

at least one sensor operatively connected to the architectural covering;

the at least one sensor configured to detect movement of the architectural covering;

the controller unit configured to switch between an awake state, and an asleep state, so as to conserve power;

wherein the shade material is movable to a different position by manual movement of the shade, as well as by motorized movement by operation of the motor; a counterbalance assembly operatively connected to the architectural covering, the counterbalance assembly configured to provide a counterbalance force to the shade material.

45. A motorized architectural covering of claim 44, wherein when in the awake state, power is supplied to the at least one sensor, and wherein when in the asleep state, power is not supplied to the at least one sensor.

46. A motorized architectural covering comprising:
shade material;
a motor operatively connected to the shade material;
a controller unit operatively connected to the architectural covering;
at least one sensor operatively connected to the architectural covering;
the at least one sensor configured to detect movement of the architectural covering;
the controller unit configured to switch between an awake state, and an asleep state, so as to conserve power;
a counterbalance assembly operatively connected to the architectural covering, the counterbalance assembly configured to provide a counterbalance force to the shade material.

47. A motorized architectural covering of claim 46, wherein when in the awake state, power is supplied to the at least one sensor, and wherein when in the asleep state, power is not supplied to the at least one sensor.

\* \* \* \* \*